US009870021B2

(12) United States Patent
Olsson et al.

(10) Patent No.: US 9,870,021 B2
(45) Date of Patent: Jan. 16, 2018

(54) MAGNETIC MANUAL USER INTERFACE DEVICES

(75) Inventors: Mark S. Olsson, La Jolla, CA (US); Ray Merewether, La Jolla, CA (US); Loni M. Canepa, San Diego, CA (US); Alexander L. Warren, San Diego, CA (US); Amos H. Jessup, San Diego, CA (US); Michael J. Martin, San Diego, CA (US); George L. Jemmott, San Marcos, CA (US)

(73) Assignee: SEESCAN, INC., San Diego, CA (US)

( * ) Notice: Subject to any disclaimer, the term of this patent is extended or adjusted under 35 U.S.C. 154(b) by 1989 days.

(21) Appl. No.: 12/756,068

(22) Filed: Apr. 7, 2010

(65) Prior Publication Data

US 2010/0265176 A1    Oct. 21, 2010

Related U.S. Application Data

(60) Provisional application No. 61/169,656, filed on Apr. 15, 2009, provisional application No. 61/235,668, filed on Aug. 20, 2009, provisional application No. 61/236,034, filed on Aug. 21, 2009.

(51) Int. Cl.
*G05G 5/05* (2006.01)
*G05G 9/047* (2006.01)
*G06F 3/01* (2006.01)
*G06F 3/0338* (2013.01)

(52) U.S. Cl.
CPC ............... *G05G 5/05* (2013.01); *G05G 9/047* (2013.01); *G06F 3/016* (2013.01); *G06F 3/0338* (2013.01); *G05G 2009/04707* (2013.01); *G05G 2009/04755* (2013.01)

(58) Field of Classification Search
None
See application file for complete search history.

(56) References Cited

U.S. PATENT DOCUMENTS

| 3,112,464 A | 11/1963 | Ratajski et al. ............. 338/32 H |
| 3,170,323 A | 2/1965 | Kuhrt et al. .................... 73/136 |
| 3,331,971 A | 7/1967 | Moller ............................ 310/10 |
| 3,764,779 A | 10/1973 | Kadoya et al. |

(Continued)

FOREIGN PATENT DOCUMENTS

| GB | 2 172 079 A | 9/1986 |
| JP | 3 036946 U | 4/1991 |

OTHER PUBLICATIONS

PCT/IB2010/000310 PCT International Search Report (10 pgs) with Written Opinion of ISA (9 pgs).

(Continued)

*Primary Examiner* — Duane N Taylor, Jr.
(74) *Attorney, Agent, or Firm* — Steven C. Tietsworth, Esq.

(57) ABSTRACT

Various finger tip controlled manual interface devices that can be used as inputs to personal computers, electromechanical systems and video game consoles utilize concentrically arranged magnets. The polarities of the magnets are oriented to provide restoration forces on a one of the magnets to bias it toward a neutral position. A magnetic sensor including a plurality of sensing elements such as Hall effect devices generates output signals representative of direction and amount of movement of the magnet that is biased to the neutral position.

13 Claims, 109 Drawing Sheets

(56) References Cited

U.S. PATENT DOCUMENTS

| | | | |
|---|---|---|---|
| 3,980,808 A | 9/1976 | Kikuchi et al. | |
| 4,107,604 A | 8/1978 | Bernier | 324/208 |
| 4,161,726 A | 7/1979 | Burson et al. | 340/365 |
| 4,216,467 A | 8/1980 | Colston | 340/365 |
| 4,293,837 A | 10/1981 | Jaffe et al. | 338/32 |
| 4,348,142 A | 9/1982 | Figour | 414/2 |
| 4,459,578 A | 7/1984 | Sava et al. | 338/128 |
| 4,500,867 A | 2/1985 | Ishitobi et al. | 338/128 |
| 4,651,558 A | 3/1987 | Martin et al. | |
| 4,774,458 A | 9/1988 | Aronoff | 324/146 |
| 4,825,157 A | 4/1989 | Milkan | 324/208 |
| 4,998,182 A | 3/1991 | Krauter et al. | |
| 5,168,221 A | 12/1992 | Houston | 324/207.13 |
| 5,670,987 A | 9/1997 | Doi et al. | 345/156 |
| 5,831,596 A | 11/1998 | Marshall et al. | 345/161 |
| 5,939,679 A | 8/1999 | Olsson | |
| 5,959,863 A * | 9/1999 | Hoyt et al. | 700/85 |
| 5,969,520 A | 10/1999 | Schottler | 324/207.2 |
| 6,265,864 B1 | 7/2001 | De Winter et al. | 324/207.2 |
| 6,501,458 B2 | 12/2002 | Baker | 345/161 |
| 6,515,650 B2 * | 2/2003 | Arita et al. | 345/156 |
| 6,580,269 B2 | 6/2003 | Hillgsmann et al. | 324/251 |
| 6,704,001 B1 | 3/2004 | Schena et al. | 345/161 |
| 6,831,679 B1 | 12/2004 | Olsson et al. | |
| 7,081,883 B2 * | 7/2006 | Chen | 345/163 |
| 7,394,173 B2 | 7/2008 | Cope et al. | 310/15 |
| 7,474,296 B2 * | 1/2009 | Obermeyer et al. | 345/156 |
| 8,054,291 B2 * | 11/2011 | Takatsuka | 345/157 |
| 2001/0024192 A1 * | 9/2001 | Lewis | 345/163 |
| 2002/0033798 A1 | 3/2002 | Nakamura | 345/156 |
| 2002/0149565 A1 | 10/2002 | Sako | 345/161 |
| 2006/0146018 A1 * | 7/2006 | Arneson et al. | 345/161 |
| 2007/0182842 A1 | 8/2007 | Sonnenschein et al. | |
| 2008/0184799 A1 * | 8/2008 | Phan Le et al. | 73/514.31 |
| 2008/0315866 A1 | 12/2008 | Banerjee | 324/207.2 |
| 2009/0102460 A1 | 4/2009 | Schott et al. | 324/207.2 |
| 2009/0121707 A1 | 5/2009 | Schott | 324/207.2 |
| 2009/0201017 A1 | 8/2009 | Peev et al. | 324/251 |

OTHER PUBLICATIONS

"ML x90333—A New Dimension in Contactless Sensing," May 23, 2007, 2 pgs, Melexis Semiconductors web page (www.melexis.com/NewsDetail).

* cited by examiner

MAGNETIC MANUAL USER INTERFACE DEVICES

CROSS-REFERENCE TO RELATED APPLICATIONS

The present application claims priority based on U.S. Provisional Patent Application No. 61/169,656, filed on 15 Apr. 2009, entitled Magnetic Ball and Ring User Interface Device, U.S. Provisional Patent Application No. 61/235,668 filed on Aug. 20, 2009 entitled Magnetic Ball and Ring User Interface Device, and U.S. Provisional Application No. 61/236,034 filed on Aug. 21, 2009 entitled Enhanced Magnetic User Interface Devices.

FIELD OF THE INVENTION

The present invention relates to manual input devices, such as joysticks, that function as user interfaces to electronic computing devices.

BACKGROUND OF THE INVENTION

There are many electronic computing systems, such as personal computers and video game consoles, that have interface circuitry and/or interface software designed to function with a manual user input device that can be readily manipulated by a user to input commands, move a cursor, select an icon, move a player in a video game, etc. The QWERTY keyboard is often not the best user interface device for a given application. Computer mouse devices, track balls, drag pads, joy sticks, and touch screens have therefore been extensively developed and commercialized over the years. Each has its advantages and disadvantages. There is still a need for improved manual user interface devices, and in particular, compact, durable manual user interfaces with high resolution, that provide tactile feedback to the user.

SUMMARY OF THE INVENTION

The present invention provides a user interface device that includes a manual actuator having an axis and a plurality of magnets arranged in a concentric relationship. At least one of the magnets is operatively coupled to the manual actuator. The polarity of the magnets is oriented such that the interaction of their magnetic fields provides restoring forces that urge the coupled magnet so that its magnetic axis is aligned with a neutral axis. A plurality of magnetic sensing elements are positioned to detect changes in a magnetic field due to movement of the operatively coupled magnet and generate signals representative of the movement of the operatively coupled magnet relative to the neutral axis.

BRIEF DESCRIPTION OF THE DRAWINGS

Throughout the drawing figures like reference numerals refer to like parts.

DETAILED DESCRIPTION

The present invention provides improved user interface devices in which a manual actuator exhibits resistance to manipulation and returns to a neutral position without the need for centering springs, flexible membranes, or other physically deflected or compressed mechanical elements. The user interface devices rely primarily on permanent magnets and magnetic field measurement to provide restorative force and output control data. One embodiment of the magnetic manual user interface device is able to measure user input in six degrees of freedom based on magnetic field measurement. Magnetic restoring force for the manual actuator is derived from the interaction of magnetic fields. A spherical magnet suspended within an annular magnet provides the restorative force. In some embodiments multiple spherical magnets interact with annular magnets as well as with each other. In some embodiments the spherical magnets may be flattened on top or truncated, and such variants are referred to herein as semi-spherical magnets.

The term "permanent magnet" as used herein refers to any object that is magnetized and creates its own persistent magnetic field. Suitable ferromagnetic materials for a permanent magnet include iron, nickel, cobalt, rare earth metals and their alloys, e.g. Alnico and Neodymium. The permanent magnet can also be made of powderized ferromagnetic material held together with an organic binder. Unless otherwise indicated, all references to magnets herein refer to permanent magnets.

Figure 1:
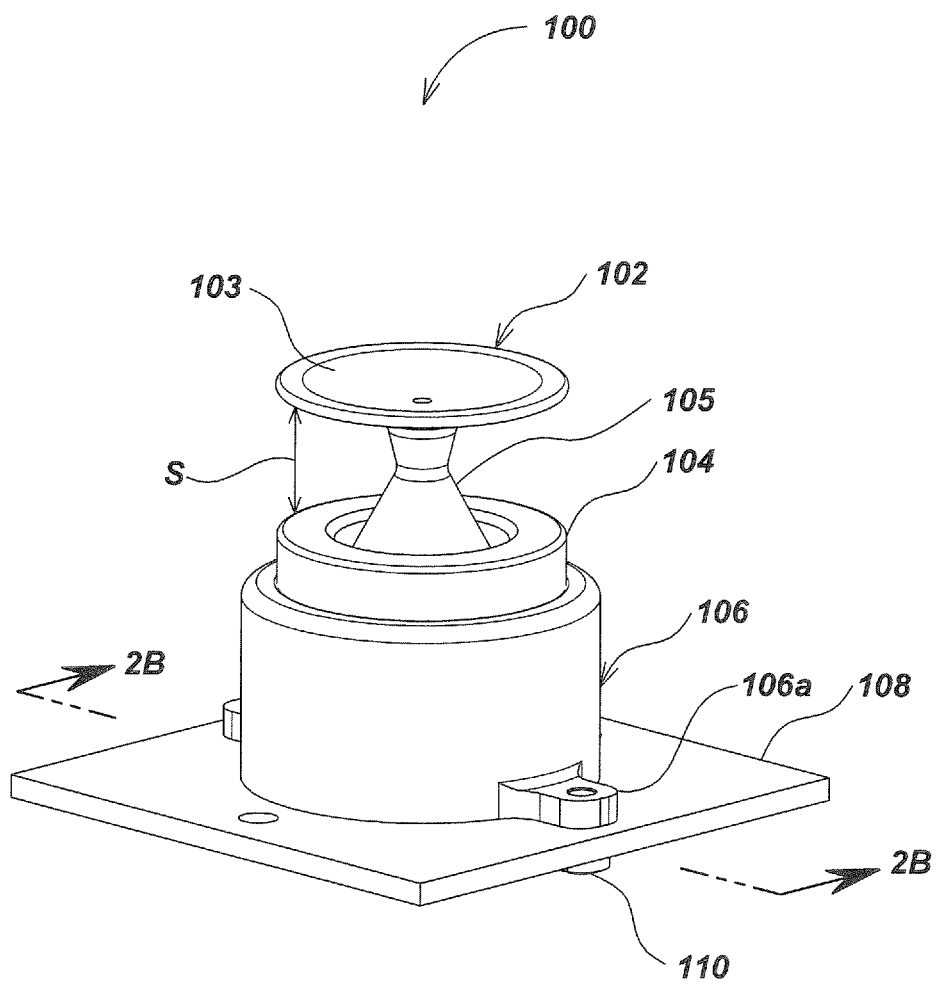
FIG. 1 is an isometric view illustrating an embodiment of the present invention that includes a spherical magnet suspended inside an annular magnet.
Figure 2A:
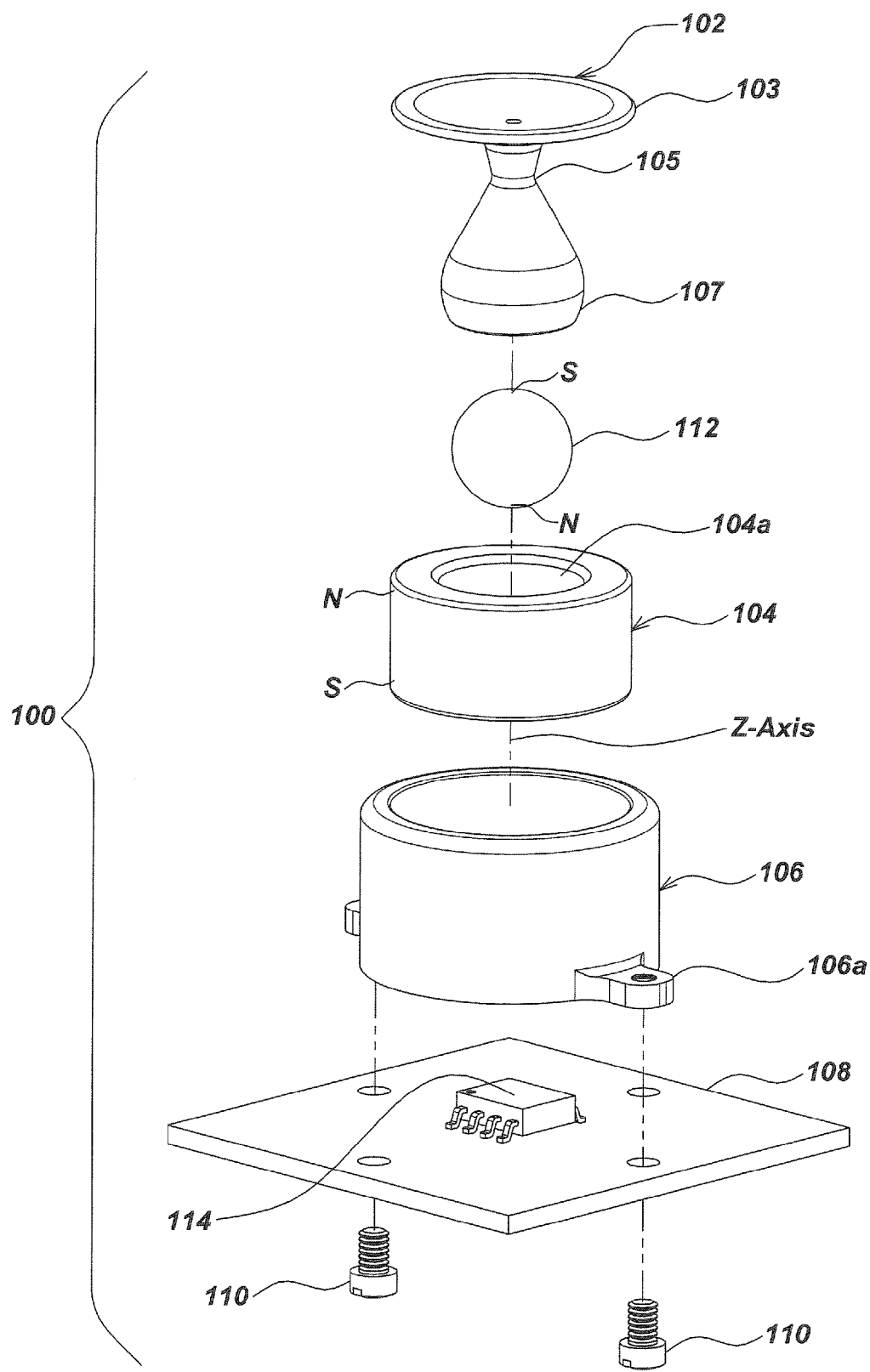
FIG. 2A is an exploded isometric view illustrating details of the construction of the embodiment of FIG. 1.

Referring to FIG. 1, a first embodiment of a magnetic manual user interface device 100 has a ball and socket joystick configuration that includes a manual actuator 102 comprising an integrally molded hour glass-shaped plastic actuator shaft 105, a paddle 103 and a magnet cup 107 (FIG. 2A). The paddle 103 is disk-shaped and extends horizontally from the upper end of the actuator shaft 105. An exemplary diameter for the paddle 103 is one inch (2.54 centimeters). The manual actuator 102 is rigidly connected to a spherical magnet 112 (FIG. 2A) which is suspended concentrically within a central cylindrical bore 104a (FIG. 2A) of an annular magnet 104, mounted in a rigid cylindrical plastic shell 106.

Referring to FIG. 2A, the North-South (N-S) magnetic axis of the spherical magnet 112 is aligned with the vertical axis of the actuator shaft 105. The magnet cup 107 fits over the spherical magnet 112 and is prevented from slipping relative to the spherical magnet 112 by snap-over force, adhesive bonding, or other suitable means of attachment. It is desirable that the magnet cup 107 fit closely within the inside diameter of the annular magnet 104 while still being able to slide and rotate freely. Preferably there is sufficient space S (FIG. 1) between the upper end of the annular magnet 104 and the paddle 103 so that a user can tilt the paddle 103 over a tilt angle (not illustrated).

A cylindrical molded plastic shell 106 is mounted to a printed circuit board (PCB) 108 with two screws 110 that are screwed into threaded holes in flanges 106*a* that extend from the cylindrical molded plastic shell 106. The magnetic manual user interface device 100 requires a plurality of magnetic sensing elements, such as Hall effect devices, to sense movement of the spherical magnet 112. The magnetic manual user interface device 100 preferably utilizes a three-axis magnetic sensor 114 (FIGS. 2A and 2B) such as, for example, the integrated circuit (IC) Melexis MLX90333 Triaxis 3D-Joystick Position sensor.

Figure 2B:
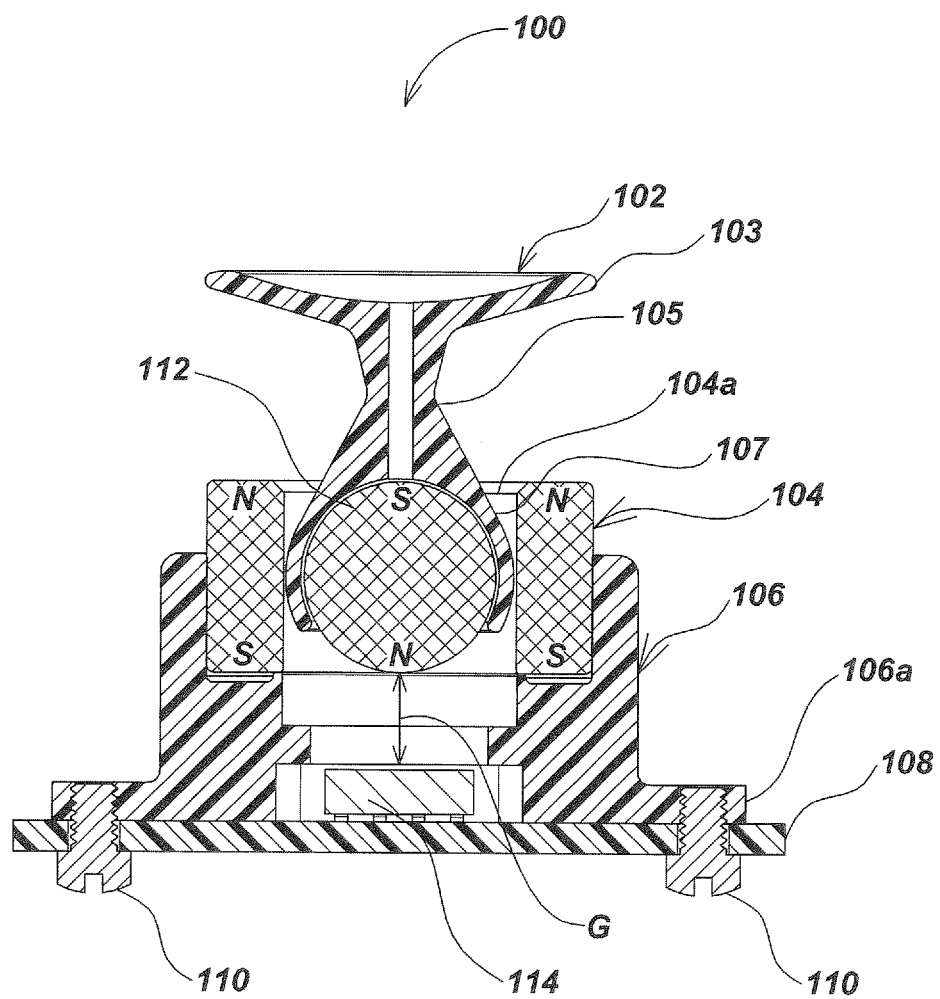
FIG. 2B is a vertical sectional view taken along line 2B-2B of FIG. 1.

Referring to FIG. 2B, the magnetic forces acting between the spherical magnet 112 and the annular magnet 104 act to force the two magnetic axes into alignment and provide a restoring force so that manual actuator 102 aligns itself into a vertical position when released by the user interface operator. This tilt back to vertical restoring force provides a springy, tactile force feedback sensation to the operator of the user interface when manual actuator 102 is tilted in any direction causing manual actuator 102 to self restore to a vertical position upon release. The nature of the magnetic field interaction between the spherical magnet 112 placed inside the annular magnet 104 has the further desirable property of forcing the spherical magnet 112 to center vertically along the Z-Axis (FIG. 2A) within annular magnet 104. This provides a vertical restoring force so that if the manual actuator is pressed downwards towards PCB 108 shortening the G distance, it will spring back and self restore to position so that the spherical magnet 112 is approximately centered vertically along the Z-Axis within annular magnet 104. Conversely, the manual actuator 102 can be pulled upwards away from the PCB 108 and when released will magnetically self restore to the neutral position illustrated. Further, this vertical movement can be precisely interpreted from the net magnetic field measurements taken from magnetic sensor 114 by means of interface circuitry and/or interface software, allowing even a very light touch on the manual actuator 102 to be indicated to the user interface. The Triaxis Melexis MLX90333 sensor is a monolithic IC that includes magnetic field sensing elements in the form of Hall effect devices and circuitry configured to select and/or interpolate between the outputs of the Hall effect devices. The Melexis MLX90333 sensor is programmable to take into account the mechanical and magnetic tolerances of the design of the magnetic manual user interface device 100. Unless otherwise indicated, the magnetic sensors used in the embodiments described herein are three-axis magnetic sensors of this type.

Conventional solid state Hall effect sensors sense a magnetic field in only one or two axes. The Melexis MLX90333 three axis magnetic sensor incorporates an Integrated Magneto-Concentrator or IMC®. The Melexis MLX90333 uses 4 conventional Hall plates located under the perimeter of the IMC in a CMOS integrated circuit to measure magnetic field components. The IMC is deposited on the CMOS integrated circuit during fabrication.

Figure 3A:
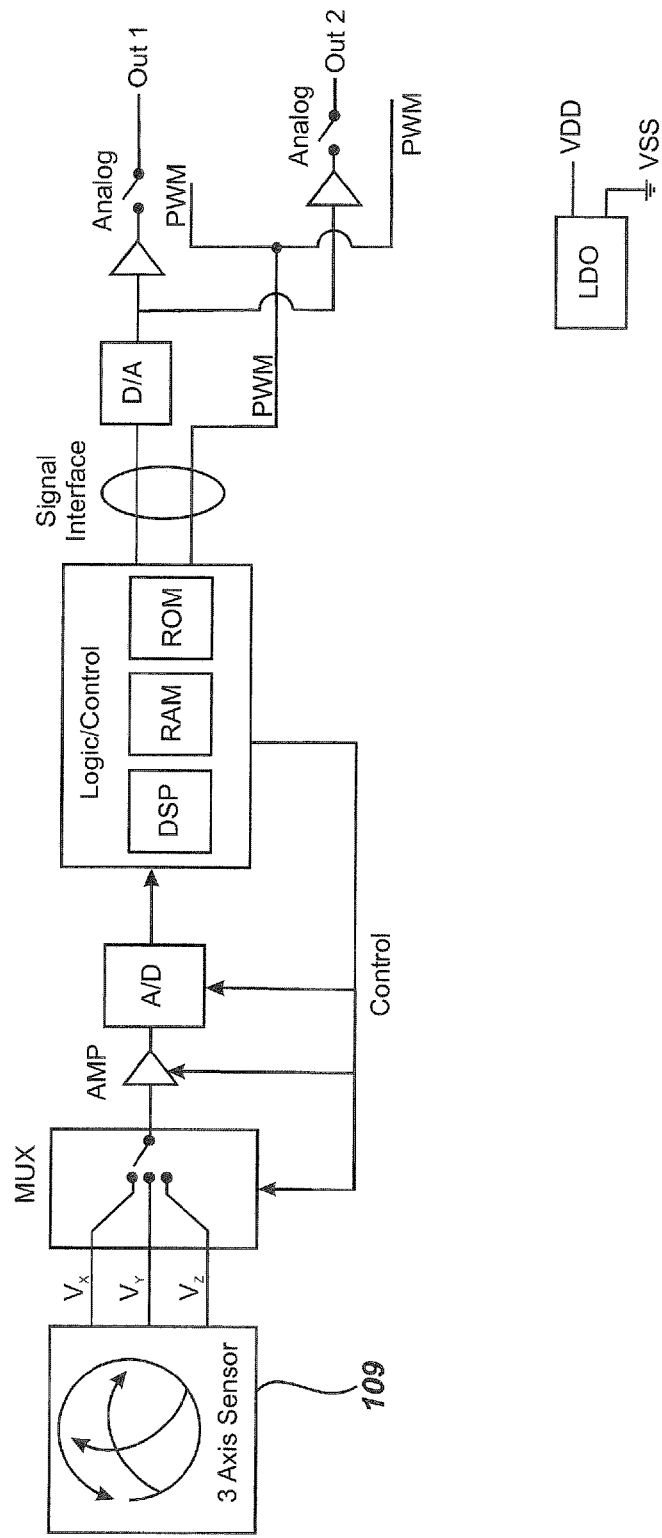
FIG. 3A is a functional block diagram of the magnetic sensor utilized in the embodiment of FIGS. 1, 2A and 2B illustrating its analog and pulse width modulation aspects.
Figure 3B:
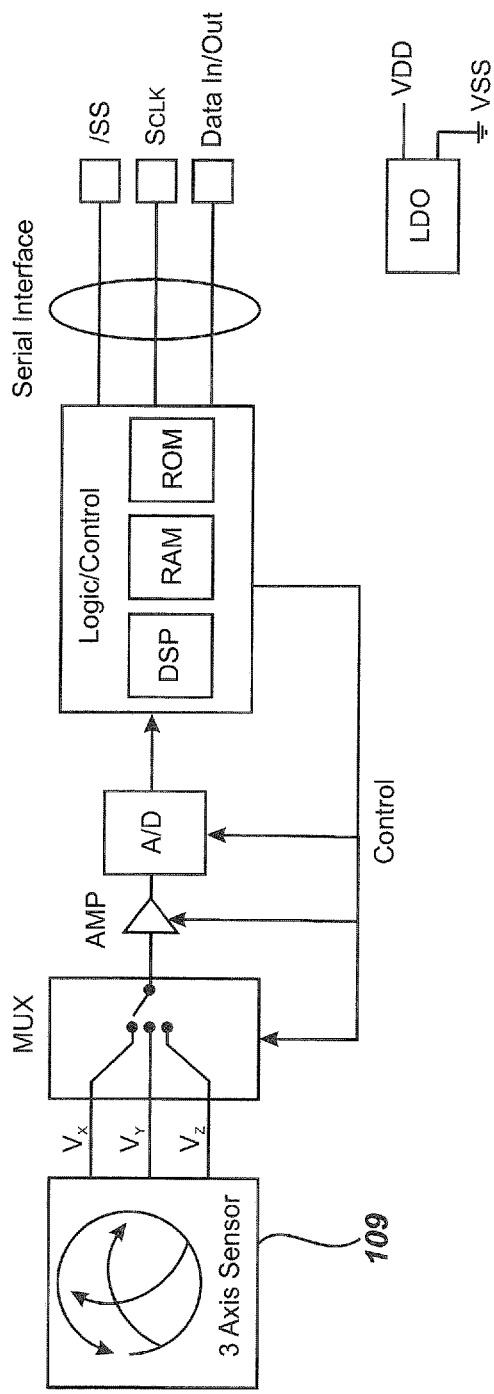
FIG. 3B is a functional block diagram of the magnetic sensor utilized in the embodiment of FIGS. 1, 2A and 2B illustrating its serial data communication protocol aspect.

Referring to FIGS. 3A and 3B, the external magnetic field causes a magnetic flux through the sensor front end 109. In particular, the external Z component of the field causes radial flux component in the IMC which is in turn sensed to a have a horizontal component in each of the four Hall plates. External magnetic fields parallel to the plane of the IMC and the CMOS integrated circuit cause magnetic fluxes in the Hall plates that have opposite sign in at least one Hall plate when compared to the fluxes produced by the vertical component. The outputs of the four separate Hall plates are added and subtracted in known fashion to provide three signals proportional to the three components (Hx, Hy, and Hz) of the external magnetic field.

The magnetic sensor 114 (FIGS. 2A and 2B) is centrally mounted beneath the spherical magnet 112 below, and spaced apart from, the annular magnet 104. The magnetic sensor 114 can measure the net magnetic field produced by all magnets, with respect to the location of magnetic sensor 114. The magnetic sensor 114 can provide information that allows the tilt of the spherical magnet 112 as well as its axial displacement from the Z-axis or neutral axis to be determined. The magnetic sensor 114 generates digital output signals useable as a control input to an electronic computing system (not illustrated) such as a personal computer or a video game console, or to an electro-mechanical system such as a robotic device, for example. The computing system can have interface circuitry and/or interface software (not described herein) that processes the digital output signal generated by the magnetic sensor 114 and interprets it as tilt and vertical displacement of spherical magnet 112 along the Z-axis or neutral axis. The manual actuator 102 of the magnetic manual user interface device 100 can be readily manipulated by a user to input commands, move a cursor, select an icon, move a player in a video game, etc. The interface circuitry and/or interface software is capable of processing the digital output signal to obtain other information, such as, for example, rotation angle, rotational and linear velocity, rotational and linear acceleration, frequency of vibration, etc.

The magnetic polarity of the annular magnet 104 and the magnetic polarity of the spherical magnet 112 are as arranged as illustrated in FIG. 2A. The opposite poles of the annular magnet 104 and the spherical magnet 112 are positioned so that they are adjacent to one another. One advantage of this opposite polarity arrangement is that the spherical magnet 112 tends to relocate itself roughly in the vertical center of the annular magnet 104. No mechanical retainer is needed to keep the spherical magnet 112 and the manual actuator 102 in operative relationship with the annular magnet 104 except the magnet cup 107 to center the spherical magnet 112 radially within the annular magnet 104. The magnet cup 107 is preferably composed of a low friction material. The magnetic axis of the spherical magnet 112 is initially aligned with the central vertical axis of the manual actuator 102. An increase in magnetic counterforce when the shaft 102 is moved in any direction away from the vertical, or when it is pushed downward along the neutral Z-axis, shortening the distance G. The resistance increases as the actuator shaft 105 is moved further in any of its degrees of freedom, up to a point. This variation in resistance provides a tactile feedback to the user giving the person a "feel" for how far the manual actuator 102 has been tilted. Another advantage of the opposite polarity arrangement is that the magnetic force between the annular magnet 104 and spherical magnet 112 acts as a restoring force that returns the manual actuator 102 to its vertical or neutral position. This eliminates the need for springs or flexible membranes to provide return force. To the user, the manual actuator 102 has a floating feeling. Thus the angular relationship of the annular magnet 104 axis and the spherical magnet 112 axis are caused to align by the magnetic forces. Unless radially constrained, the spherical magnet is unstable radially tending to attract towards the ring in a radial direction, and a close diametric fit between the magnets and a preferably low friction radial sleeve or spacer filling the radial gap (not illustrated) is advantageous to position the spherical magnet 112 approximately at the center of the annular magnet 104. The opposite orientation of the polarities of the magnets 112 and 104 results in the interaction of their magnetic fields generating restoring forces that urge the manual actuator 102 so that its central longitudinal axis is aligned with the neutral Z-axis which is preferably vertical, normal to the plane of the PCB 108.

More than one magnetic sensor 114 may be used in combination with the single spherical magnet 112 to provide a finer discrimination of user inputs when multiple digital data output signals are processed. A protective boot (not illustrated) may cover the actuator shaft 105, the cylindrical molded plastic shell 106, and the PCB 108 providing a moisture-resistant magnetic manual user interface device. Multiple copies of the magnetic manual user interface device 100 may be ganged together to provide a multi-finger or whole-hand magnetic manual user interface device (not illustrated) with separate control points for individual fingers or the user's palm.

In an alternate form of the magnetic manual user interface device 100, the annular magnet 104 can be an electromagnet (not illustrated), the field strength of which is variable with direct current supplied from a suitable drive circuit, thus providing a variable haptic response to manual user commands. This form of the magnetic manual user interface device 100 could be used, for example, to control virtual environments or provide environmental feedback from a remote device. For example, in such an embodiment, an array of a plurality of such magnetic manual user interface devices could be configured for manipulation by both hands, feet, joints or facial surfaces.

Referring to FIG. 2B it can be seen that the spherical magnet 112 is centrally suspended within the central cylindrical bore 104*a* of the annular magnet 104. There is a small gap G between the spherical magnet and the upper side of the magnetic sensor 114. There is also a small clearance between the outer periphery of the magnet cup 107 and the cylindrical inner surface of the annular magnet 104. As a result, the spherical magnet 112 may be tilted in any direction from the Z-axis, while still returning to its neutral orientation when the user manually releases the paddle 103. Additionally the manual actuator 102 may be rotated around the Z-axis by turning the actuator shaft 105.

Additional fixed or variable bias magnets (not illustrated in FIGS. 1-2B) may be added to the embodiment 100 to modify magnetic field responses, counteract magnetic saturation, or the like. A plurality of the magnetic sensors 114 may be used to refine or configure the detection of events in keeping with the data requirements of a given application. Different forms of the annular magnet 104 and spherical magnet 112 may be used. In a converse configuration the spherical magnet 112 may be fixed while the annular magnet 104 is movable around it.

Figure 4:
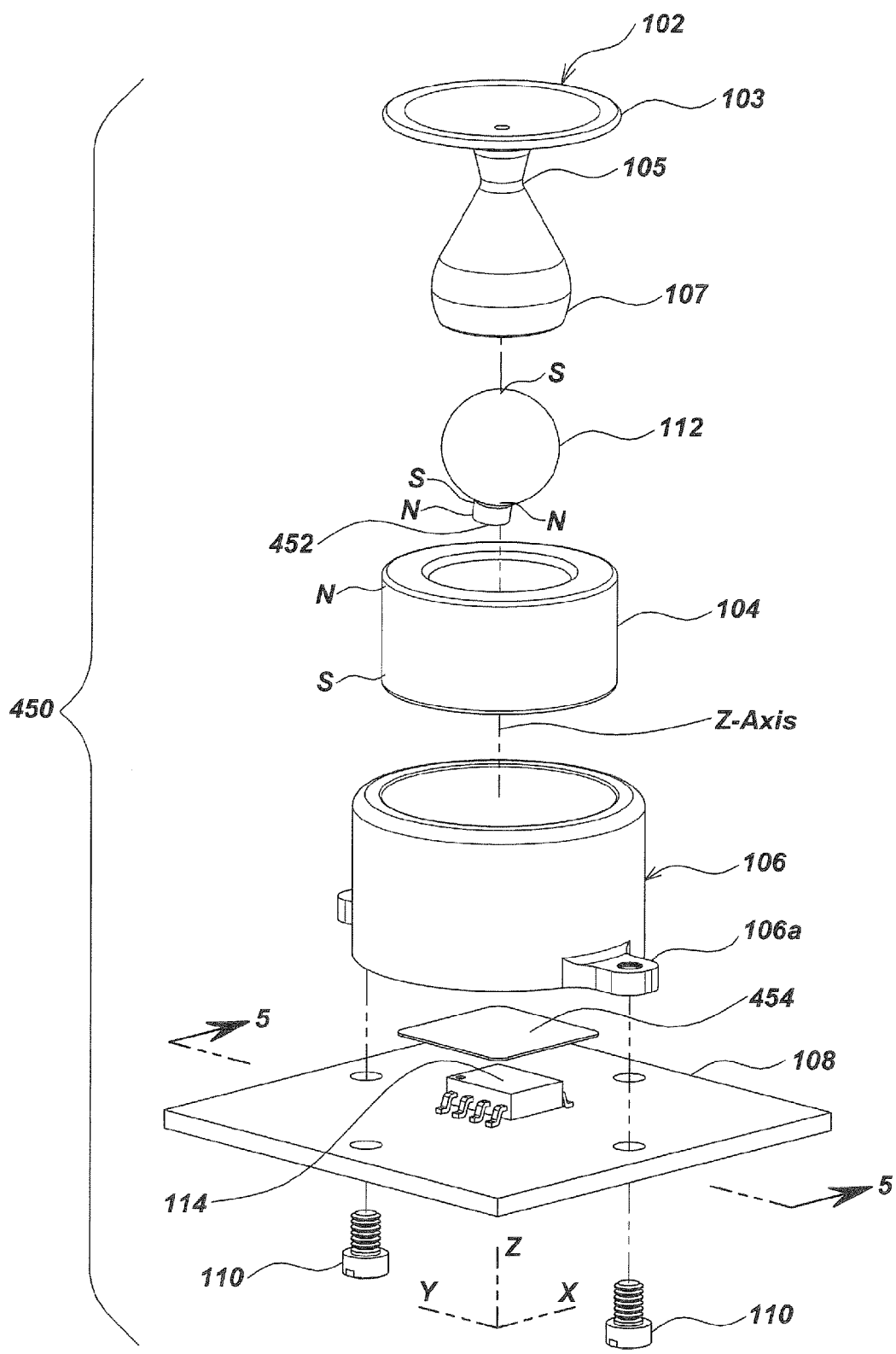
FIG. 4 is an exploded isometric view illustrating an alternate form of the embodiment of FIGS. 1-2B that utilizes a bias magnet.
Figure 5:
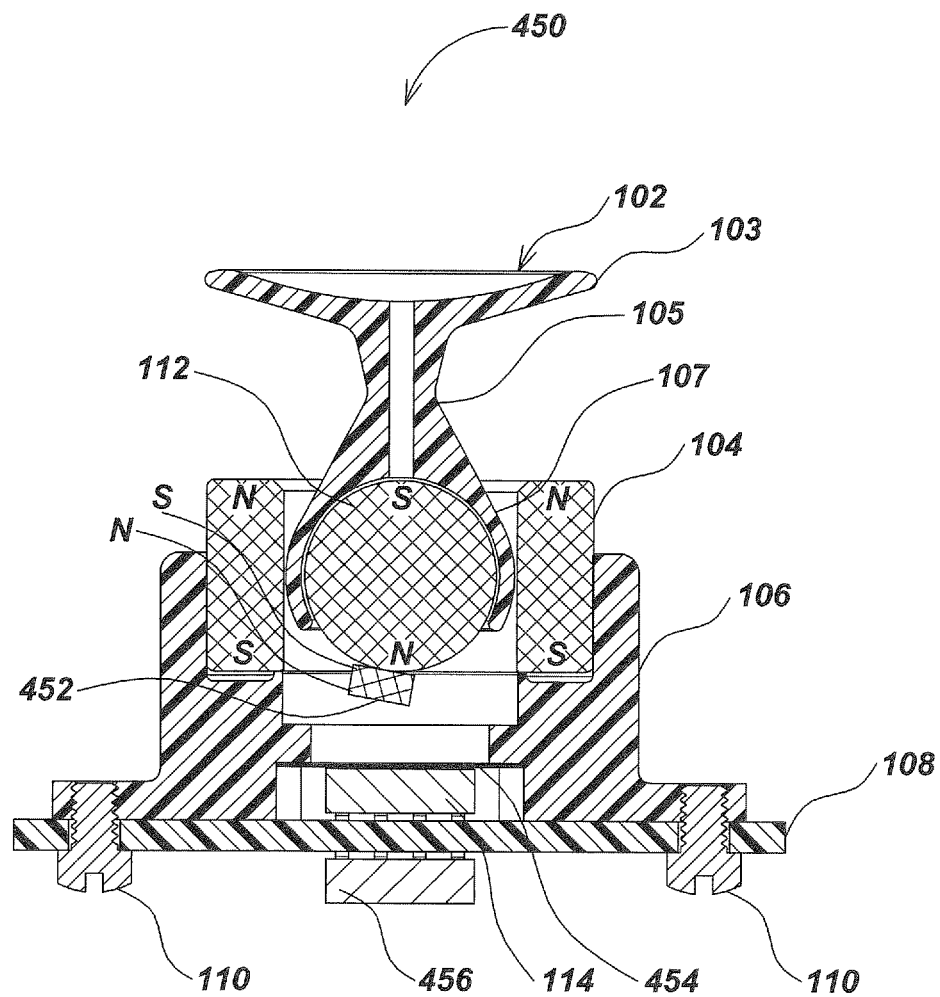
FIG. 5 is a vertical sectional view of the assembled user interface device of FIG. 4 taken along line 5-5 of FIG. 4 illustrating its two magnetic sensors.

FIGS. 4 and 5 illustrate a magnetic manual user interface device 450 that includes a bias magnet 452 that is attached to the bottom of a spherical magnet 112. A magnetic sensor 114 is protected by a sealing barrier 454. The bias magnet 452 has a disk-shape and a diameter smaller than that of the spherical magnet 112. The bias magnet 452 is attached to the lower side of the spherical magnet 112 in an off-center position, i.e. spaced from the Z-axis. This results in a non-symmetric about the Z-axis, composite magnetic field shape that can be used to determine degrees of rotation of the manual actuator 102 around the Z-axis. The bias magnet 452 is oriented with its south magnetic pole facing upwards, and the spherical magnet 112 to which it is attached is similarly oriented.

A second magnetic sensor 456 (FIG. 5) can be mounted on the underside of the PCB 108 below the magnetic sensor 114. The magnetic sensor 114 and magnetic sensor 456 provide a significantly finer discrimination of user inputs related to changes in the angle and displacement of the spherical magnet 112 and bias magnet 452, enhancing the interpretation of positional data from net magnetic field measurements by means of interface circuitry and/or interface software.

Figure 6:
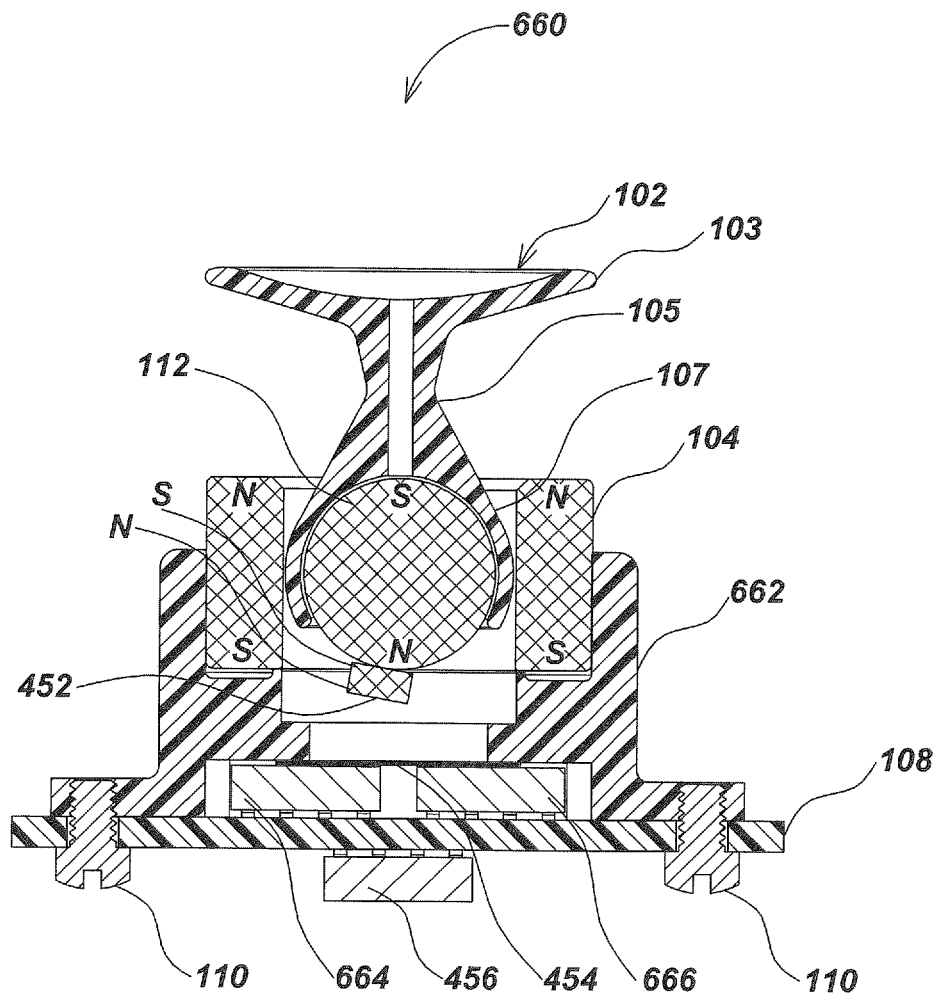
FIG. 6 is a vertical sectional view illustrating an alternate form of the embodiment of FIGS. 1, 2A and 2B that utilizes a bias magnet and three magnetic sensors.

Referring to FIG. 6, a magnetic manual user interface device 660 has a cylindrical plastic shell 662 that has been modified to provide additional space. Three magnetic sensors, a magnetic sensor 456, a magnetic sensor 664 and a magnetic sensor 666 are mounted below the spherical magnet 112 and the bias magnet 452 to provide finer discrimination of user inputs related to movement of the manual actuator 102 and the attached spherical magnet 112 and bias magnet 452, enhancing the interpretation of positional data from net magnetic field measurements. The magnetic sensor 664 and the magnetic sensor 666 are attached to the upper surface of the PCB 108 and are protected by the sealing barrier 454.

The spherical magnet 112 could be replaced with a movable magnet having another form, such as cylindrical. In an embodiment using a cylindrical magnet, the magnet cup 107 (FIG. 6) would be configured to centrally retain the cylindrical magnet, for example by using a cylindrical recess within an approximately spherical holder.

Figure 7:
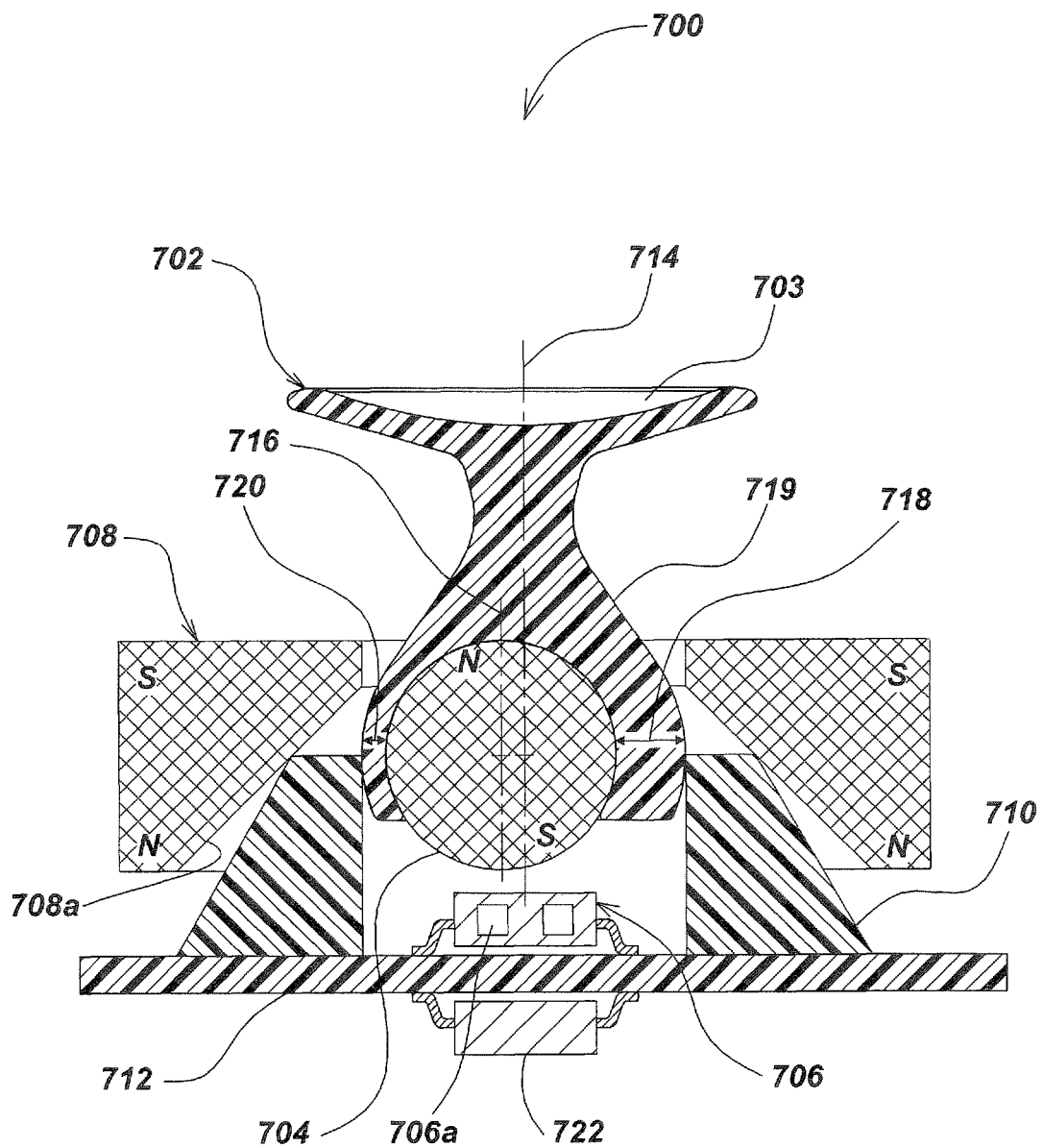
FIG. 7 is a vertical sectional view illustrating an alternate form of the embodiment of FIGS. 1, 2A and 2B in which the center line of the spherical magnet is offset relative to the central axis of the actuator.

A magnetic manual user interface device 700 is illustrated in FIG. 7, with a manual actuator 702 attached to a spherical magnet 704 eccentrically, such that the spherical magnet 704 is off-center relative to an axis of rotation 714 of a paddle 703, allowing the magnetic sensor 706 and magnetic sensor 722 to more clearly detect rotation as well as depression and angling movements of the paddle 703. In this embodiment, the manual actuator 702 is molded such that a sidewall thickness 718 of a magnet cup 719 is greater than a sidewall thickness 720, thereby placing an offset centerline 716 of the spherical magnet 704 at a predetermined offset distance from the axis of rotation 714 of the manual actuator 702. The magnetic sensor 706 is a dual-sensor version of a three-axis sensor such as a Melexis TSSOP16, situated such that one three-axis sensing element 706*a* is at a certain rotation of manual actuator 702, approximately aligned with the offset centerline 716 of the spherical magnet 704, the sensor element offset by approximately the same amount as the offset of the spherical magnet. A single three-element magnetic sensor could be used. The second magnetic sensor 722 is attached to the bottom side of a PCB 712. The off-center mounting of spherical magnet 704, dual-nature of magnetic sensor 706 and use of a second magnetic sensor 722 allow finer discrimination of user inputs related to downward depression, rotation, and titling of paddle 703 whose displacements and rotations are interpreted by interface circuitry and/or interface software from net magnetic field measurements. The magnetic manual user interface device 700 includes an annular magnet 708 having an angled or chamfered interior surface 708*a*. The chamfered interior surface 708*a* shapes the magnetic field of the annular magnet 708 to better couple to the spherical magnet 704. A cylindrical plastic base 710 supports the annular magnet 708 and is attached to the PCB 712.

Figure 8:
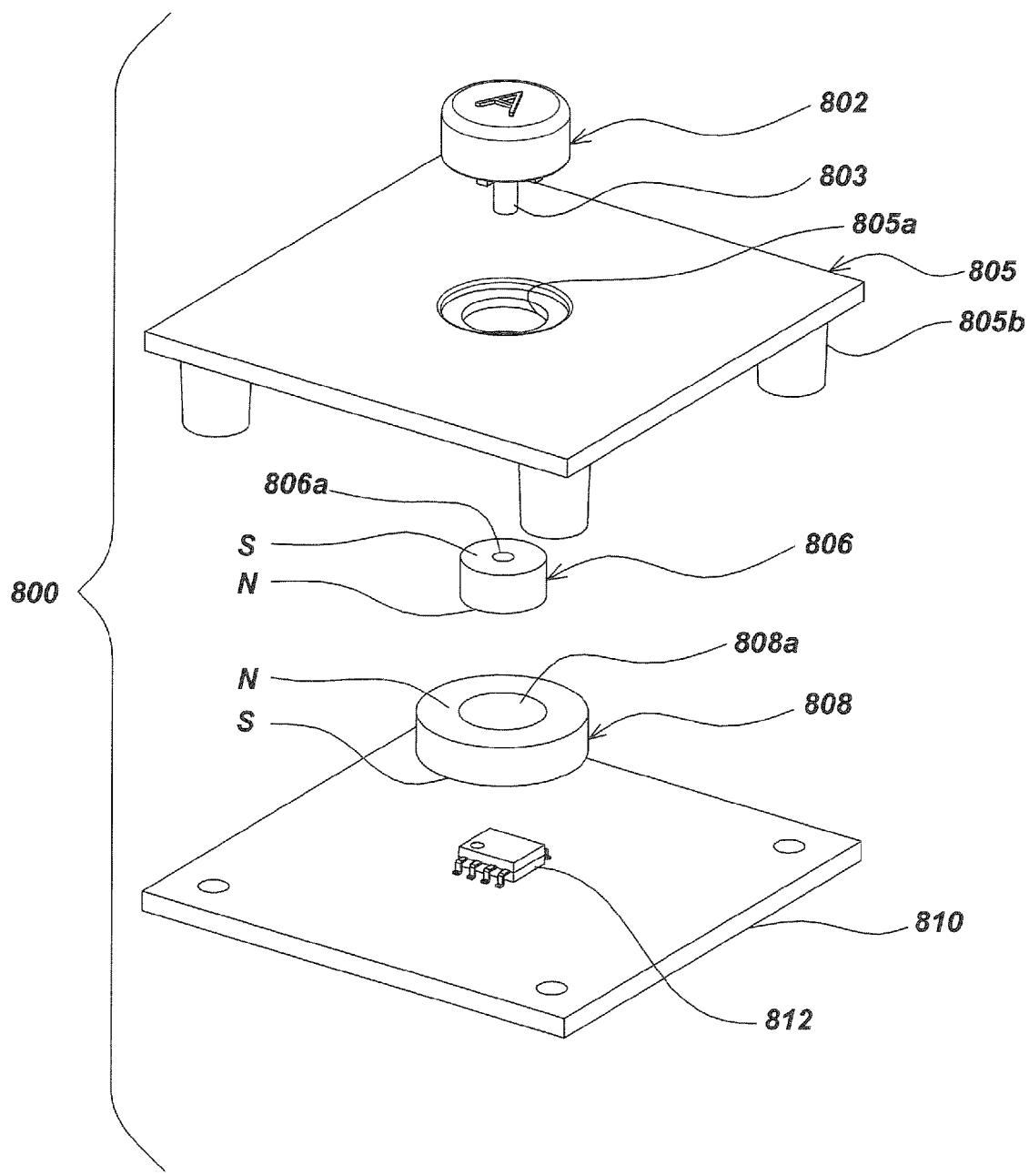
FIG. 8 is an exploded isometric view illustrating a button-style embodiment of the present invention that uses two concentric annular magnets.

Referring to FIG. 8, a magnetic manual user interface device 800 includes a manual actuator in the form of a cylindrical button 802 integrally molded with a central shaft 803. A variable-force button-type switch 800 can also be provided by situating a smaller annular magnet 806 or a disk-shaped magnet (not illustrated) inside a larger annular magnet 808. Such a button-type switch could provide a higher priority to a rapid press and a lower priority to a slower press. The ability to recognize and discriminate between press patterns can be provided via software on the data output from the magnetic sensor 812. The same software could enable the detection of a "false positive" presses—a rapid start with a rapid discontinuation, for example—or other distinguishable patterns of pressure.

In FIG. 8, the cylindrical button 802 reciprocates up and down and bottoms out on a circular flange 805*a* defining a hole in the center of a support table 805. The lower end of the central shaft 803 is secured into a central bore 806*a* of a smaller annular magnet 806. The smaller annular magnet 806 is lowered by pressing the cylindrical button 802 so that the smaller annular magnet 806 is forced down in a bore 808*a* of a larger annular magnet 808 and away from its equilibrium position. A magnetic sensor 812 is mounted to the top side of a PCB 810 beneath the smaller annular magnet 806 and measures the net magnetic field of the smaller annular magnet 806 and larger annular magnet 808. Legs 805*b* at the corners of the support table 805 are secured to the PCB 810 via screws (not illustrated). Digital data signals generated by the magnetic sensor 812 can be interpreted by interface software and/or electronic circuitry to define responses, such as the movement of game characters or by electro-mechanical devices such as a robotic device to perform certain movements. The N-S polarity orientation of the smaller annular magnet 806 and larger annular magnet 808 are inverted relative to each other so that the cylindrical button 802 feels to a user as if it is floating. Because varying degrees of pressure on the cylindrical button 802 will cause the smaller annular magnet 806 to move gradually through the field of the larger annular magnet 808, subtle patterns of input (such as light pressure followed by firm pressure, rapid pressing suddenly interrupted, or the like) can be interpreted by the interface software and/or interface circuitry to which the magnetic manual user interface device 800 is connected. A radial asymmetry to the field of the annular magnet 806 allows the rotation of the cylindrical button 802 to be measured by the magnetic sensor 812.

Figure 9:
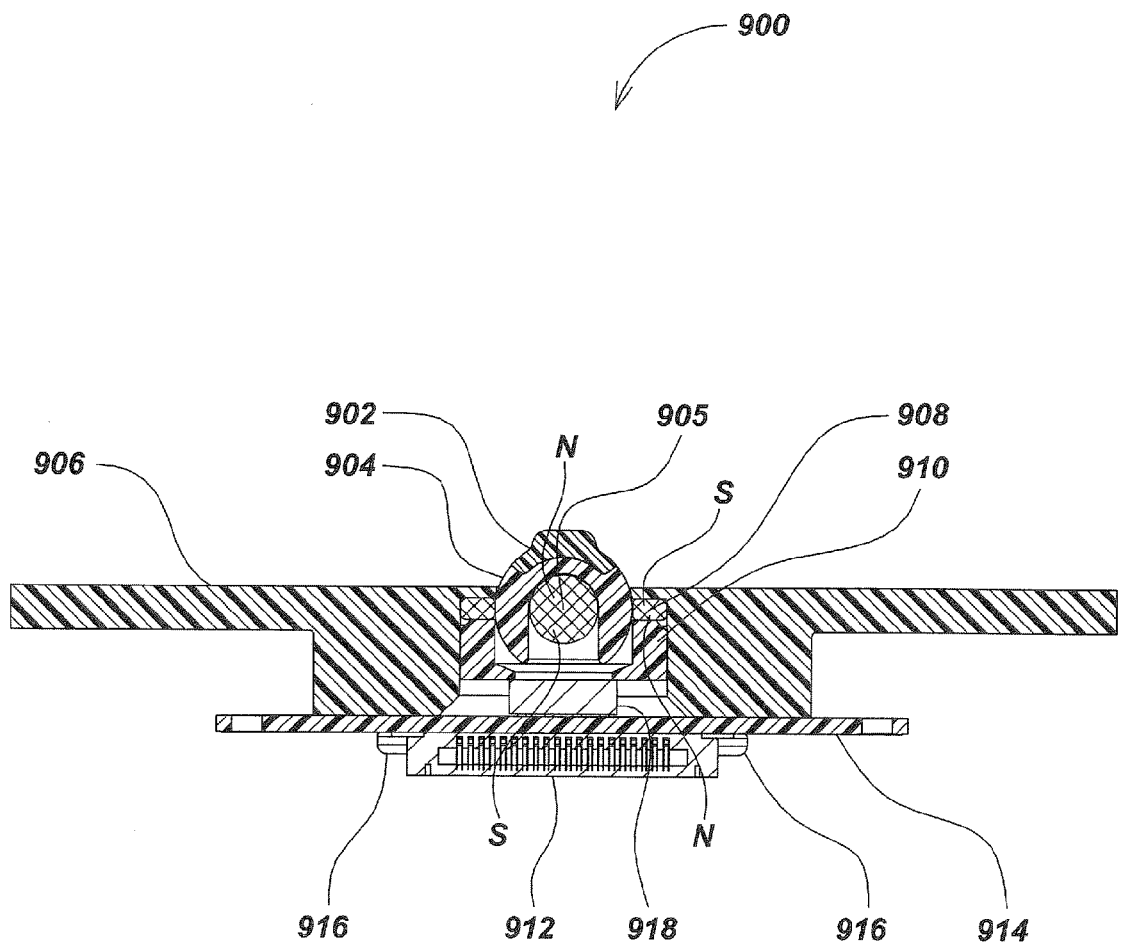
FIG. 9 is a vertical sectional view illustrating another button-style embodiment of the present invention.

FIG. 9 illustrates a magnetic manual user interface device 900 particularly suited for controlling the position of a cursor on the display of a laptop computer. The magnetic manual user interface device 900 includes a nearly spherical hollow manual actuator 904 that has an upper rubber or plastic nubbin 902 sized and configured for engagement by the fingertip of a user. Motion of the nubbin 902 moves the manual actuator 904 and an attached and enclosed spherical magnet 905. An annular magnet 908 surrounds the manual actuator 904 and is seated on a cylindrical Teflon® plastic holder 910. Magnetic restoring force between the annular magnet 908 and the spherical magnet 905 causes the manual actuator 904 to be restored from a displaced orientation to its neutral orientation when released by the user. A magnetic sensor 918 such as the aforementioned Melexis three-axis sensor, measures the net magnetic field as the manual actuator 904 is tilted in any direction or pressed downward. The annular magnet 908 and the Teflon® plastic holder 910 are seated in a cylindrical recess of a case 906, such as the outer case of a laptop computer (not illustrated) near the space bar. The magnetic sensor 918 is mounted to the top side of a PCB 914. A multi-pin connector 912 connects the PCB 914 and the magnetic sensor to an external computing board, or separate computer (not illustrated). A plurality of screws 916 secure the PCB 914 to the case 906.

Figure 10:
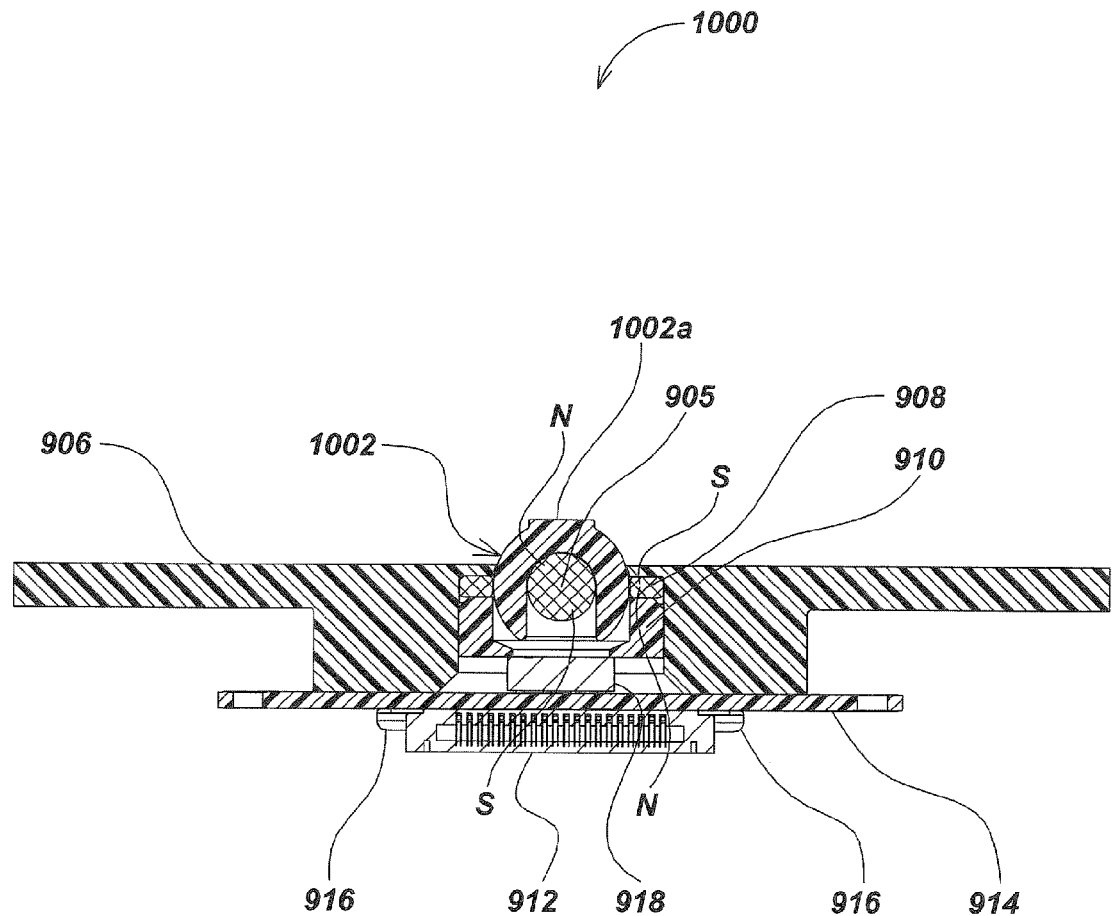
FIG. 10 is a vertical sectional view illustrating another form of the embodiment illustrated in FIG. 9.

FIG. 10 illustrates a magnetic manual user interface device 1000 that is similar to the magnetic manual user interface device 900, except a manual actuator 1002 has a flattened top surface 1002*a* instead of a nubbin to provide different finger-tip ergonomics.

Figure 11:
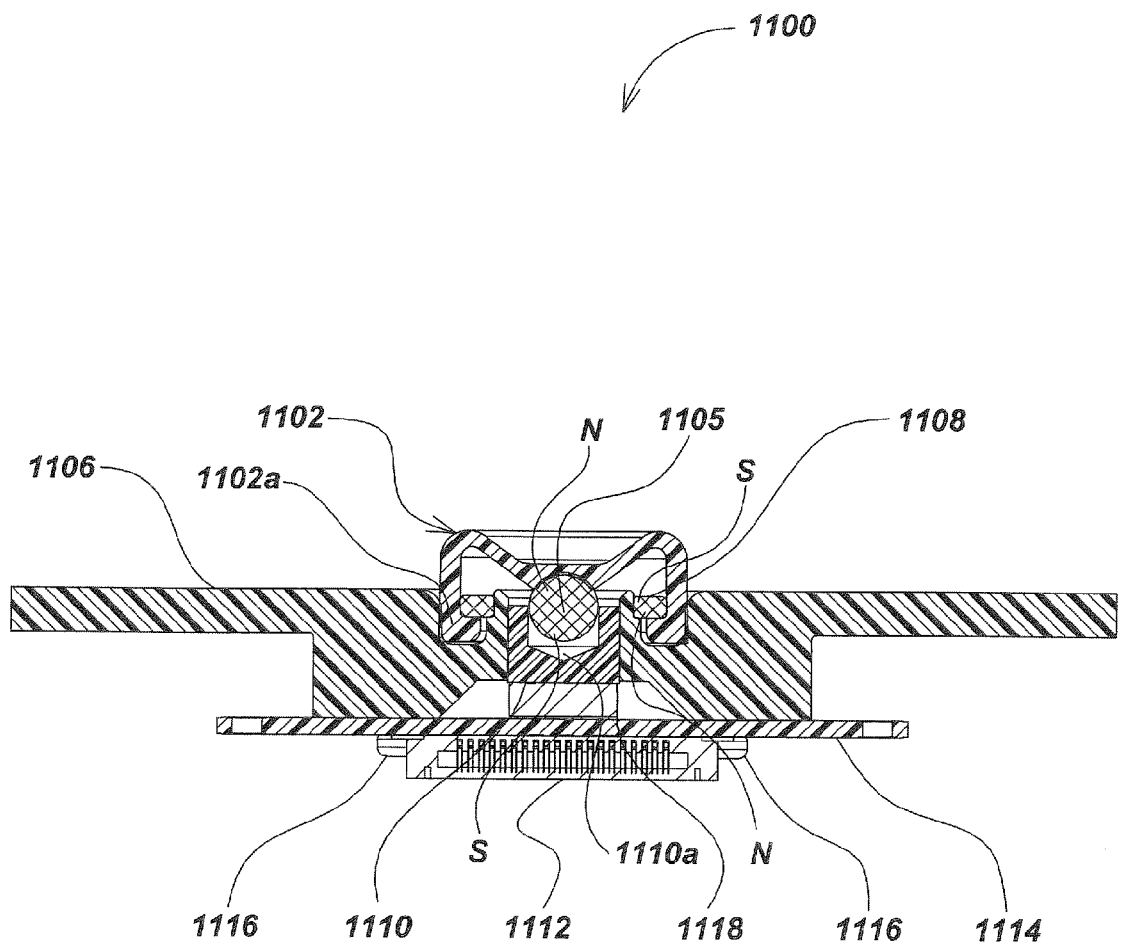
FIG. 11 is a vertical sectional view illustrating a moisture-resistant form of the magnetic manual user interface device of FIG. 10.

Referring to FIG. 11, a magnetic manual user interface device 1100 has a spherical magnet 1105 carried within a chamfered chamber 1110*a* within a hollow cylindrical sleeve 1110. A flexible cup-shaped manual actuator 1102 made of an elastomeric material such as synthetic rubber is attached to the spherical magnet 1105 and can be depressed and/or rotated with the index finger to move the spherical magnet 1105. A magnetic sensor 1118 mounted to the top side of a PCB 1114 measures the net magnetic field produced by the spherical magnet 1105 and annular magnet 1108. Interface circuitry and/or interface software can interpret the digital data output from the magnetic sensor 1118 into displacement of the spherical magnet 1105 in three dimensions (one linear and two rotary). An annular magnet 1108 is seated on a peripheral lip 1102*a* of the flexible elastomeric manual actuator 1102 and is relatively fixed in position while the spherical magnet 1105 may be displaced in various directions by finger tip pressure on the flexible elastomeric manual actuator 1102. When released, the spherical magnet 1105 will be restored to its initial neutral orientation by magnetic restoring force. The annular magnet 1108 is press-fit into place and retains the flexible elastomeric manual actuator 1102 in an upwardly opening circular recess molded in a case 1106 which is in turn attached to the PCB 1114 by a plurality of screws 1116. A multi-pin connector 1112 is attached to the underside of the PCB 1114 and provides a data output connection.

Figure 12:
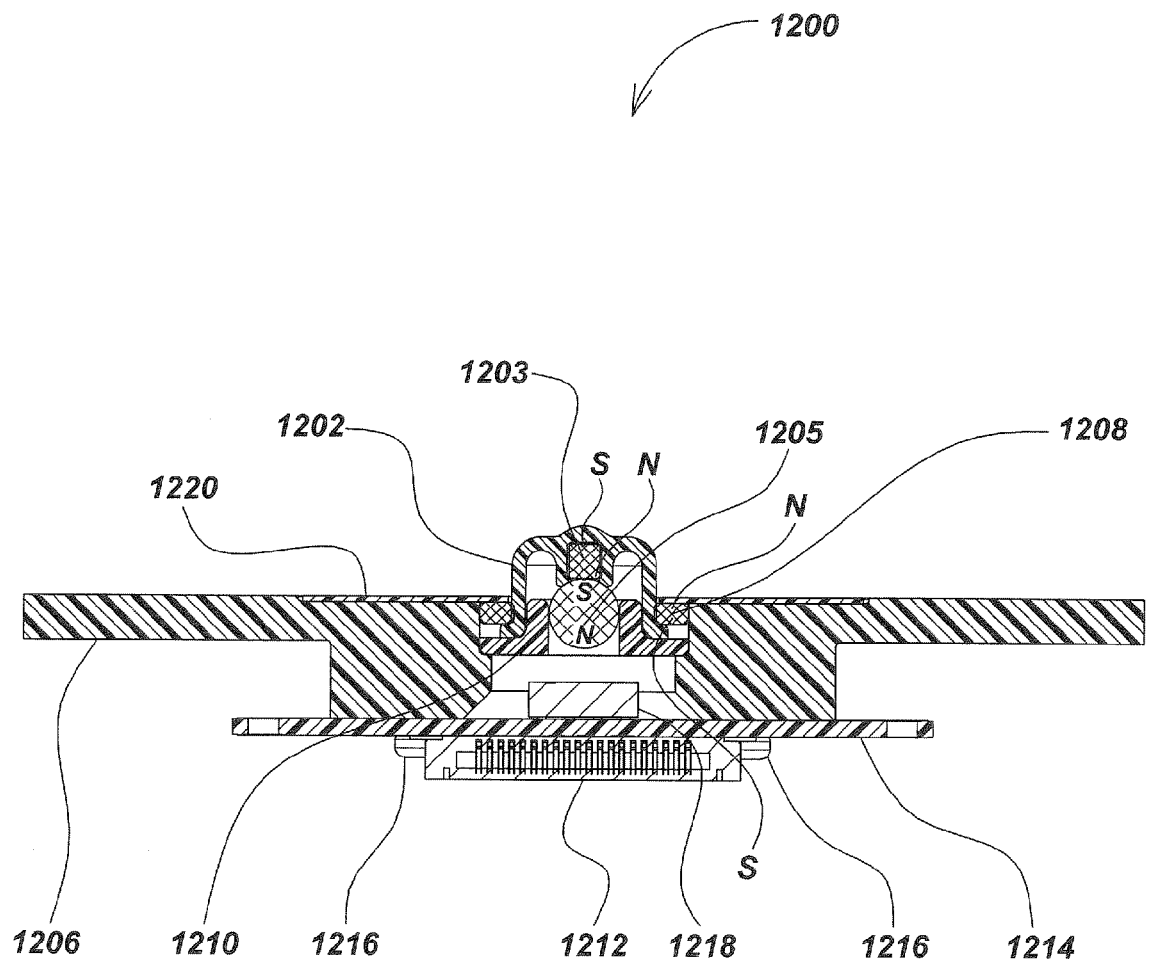
FIG. 12 is a vertical sectional view illustrating another form of the embodiment of FIG. 11 wherein a cylindrical magnet is attached to the actuator to contribute an alignment force.

Referring to FIG. 12, a magnetic manual user interface device 1200 has a flexible elastomeric manual actuator 1202 in the form of a flexible elastomeric cup-shaped cover. A cylindrical magnet 1203 is retained in a concentric dimple or pocket in the top center of the flexible elastomeric manual actuator 1202. A seal 1220, which may also serve as a label, is seated around the flexible elastomeric manual actuator 1202 and retains an annular magnet 1208. The alignment of a spherical magnet 1205 within the flexible elastomeric manual actuator 1202 is reinforced by the magnetic force of the cylindrical magnet 1203. The cylindrical magnet 1203 and the spherical magnet 1205 attract and clamp together magnetically, to move as a single unit. Adhesive may be used to bond them together. The spherical magnet 1205 is constrained laterally by a molded plastic retaining sleeve 1210. A magnetic sensor 1218 is mounted on a PCB 1214 which is retained by a plurality of screws 1216 to a case 1206. Displacement pressure on the flexible elastomeric manual actuator 1202 causes both mechanical and magnetic force to move the spherical magnet 1205 downwardly or at an angle. The measured net magnetic field can be interpreted by means of interface circuitry and/or interface software as the displacement of the spherical magnet 1205. The output data of magnetic sensor 1218 is transmitted by means of a multi-pin connector 1212. On release of the flexible elastomeric manual actuator 1202 by the operator, the cylindrical magnet 1203 is brought to its initial neutral position by the resilience of the flexible elastomeric manual actuator 1202 and by the magnetic force between the spherical magnet 1205 and the cylindrical magnet 1203. The spherical magnet 1205 is also restored to its initial neutral position by the magnetic restoring force between the spherical magnet 1205 and the annular magnet 1208.

Figure 13:
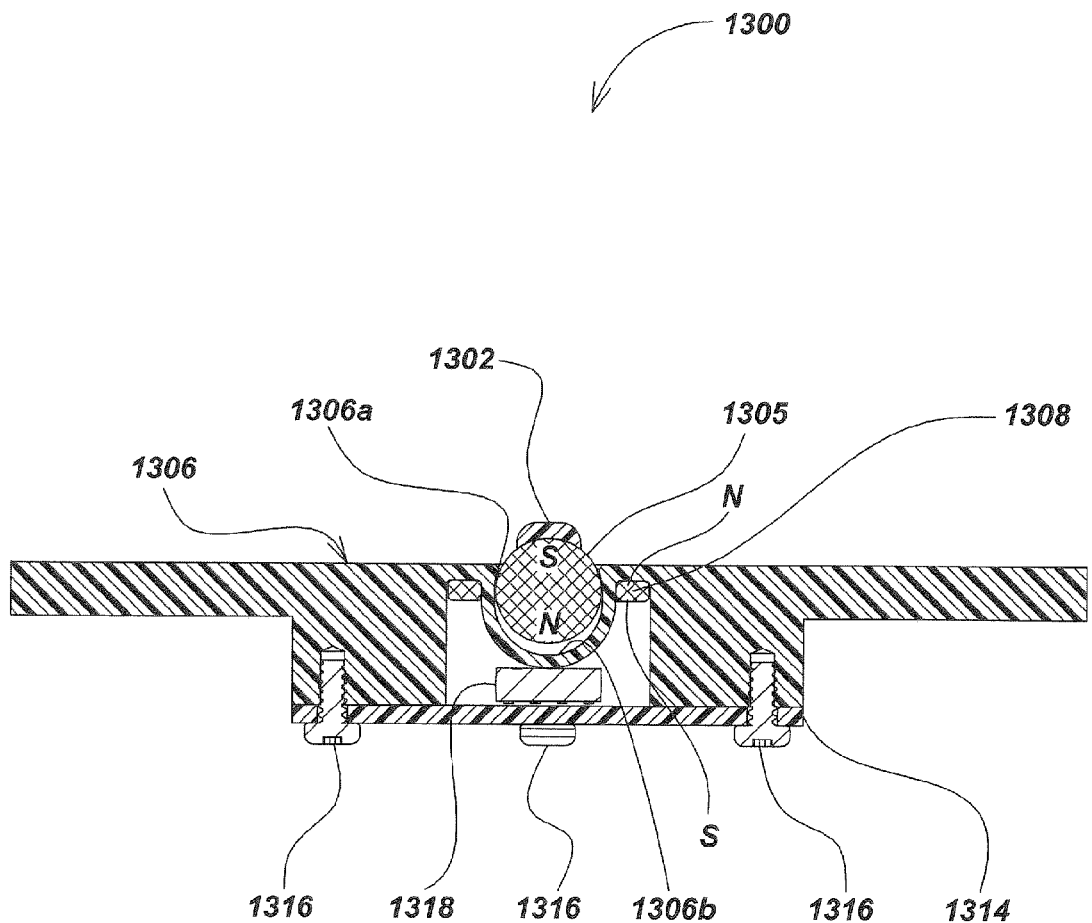
FIG. 13 is a vertical sectional view illustrating an alternate form of the embodiment of FIG. 9 in which a cup molded into a case holds the spherical magnet.

A magnetic manual user interface device 1300 is illustrated in FIG. 13 includes a case 1306 in which an upwardly opening spherical cavity 1306b is formed. A spherical magnet 1305 presses past a lip 1306a into the cavity 1306b and is retained by the lip 1306a. A flexible elastomeric material such as synthetic rubber nubbin 1302 is attached to the top center of the spherical magnet 1305 enabling finger-tip control over the tilt or depression of the spherical magnet 1305. Magnetic restoring force is produced by the interaction of the magnetic fields of the spherical magnet 1305 and an annular magnet 1308. This magnetic restoring force restores the initial orientation of the spherical magnet 1305 after displacement of the spherical magnet 1305 and release of the nubbin 1302. The PCB 1314 supports a magnetic sensor 1318 beneath the spherical magnet 1305 and the PCB 1314 is attached to the case 1306 by a plurality of the screws 1316.

Figure 14:
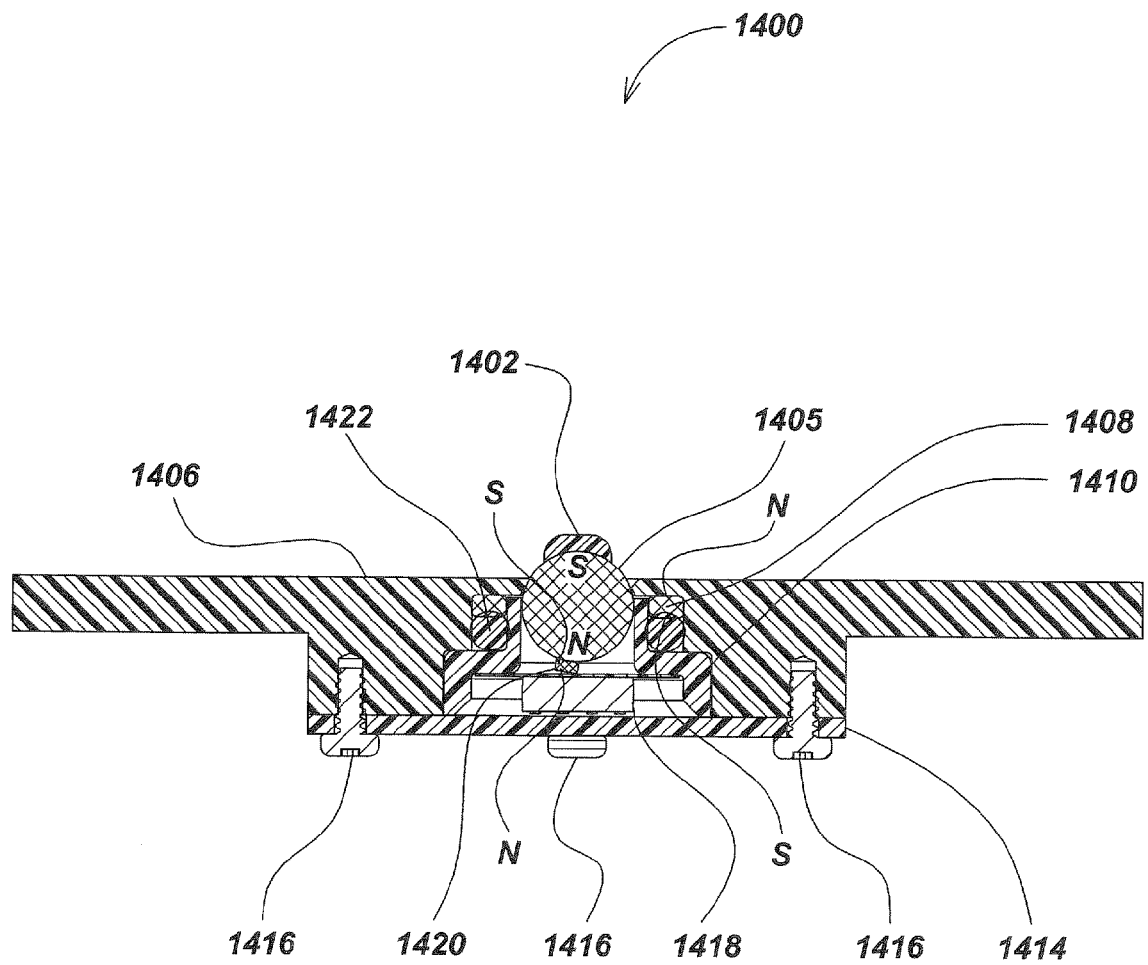
FIG. 14 is a vertical sectional view illustrating an alternate embodiment that utilizes a bias magnet to generate an asymmetric field.

Referring to FIG. 14, a magnetic manual user interface device 1400 utilizes a spherical magnet 1405 with a flexible elastomeric nubbin 1402 attached to the top of the spherical magnet 1405 for finger-tip control. A relatively small disk-shaped bias magnet 1420 is attached to the underside of the spherical magnet 1405 in a location such that the combined magnetic fields of the spherical magnet 1405 and the bias magnet 1420 are asymmetric with respect to a vertical axis (not illustrated). An annular magnet 1408 seats on an O-ring 1422 which in turn is seated on a shoulder molded into a stepped cylindrical support 1410. A magnetic sensor 1418 is secured in a recess in the lower section of the stepped cylindrical support 1410. The stepped cylindrical support 1410 is clamped in place by a PCB 1414 held by a plurality of screws 1416 to a case 1406. Displacement of the spherical magnet 1405 from its neutral position by finger tip pressure on the nubbin 1402 modifies the net magnetic field created by the spherical magnet 1405, the annular magnet 1408 and the disk-shaped bias magnet 1420. When the nubbin 1402 is released, restorative forces are provided by the magnetic restoring force developed between the spherical magnet 1405 and the annular magnet 1408. Due to the field asymmetry caused by the disk-shaped bias magnet 1420, the measured net magnetic field can be interpreted by interface circuitry and/or interface software as the rotation of the spherical magnet 1405 around a vertical axis perpendicular to the PCB 1414.

Figure 15:
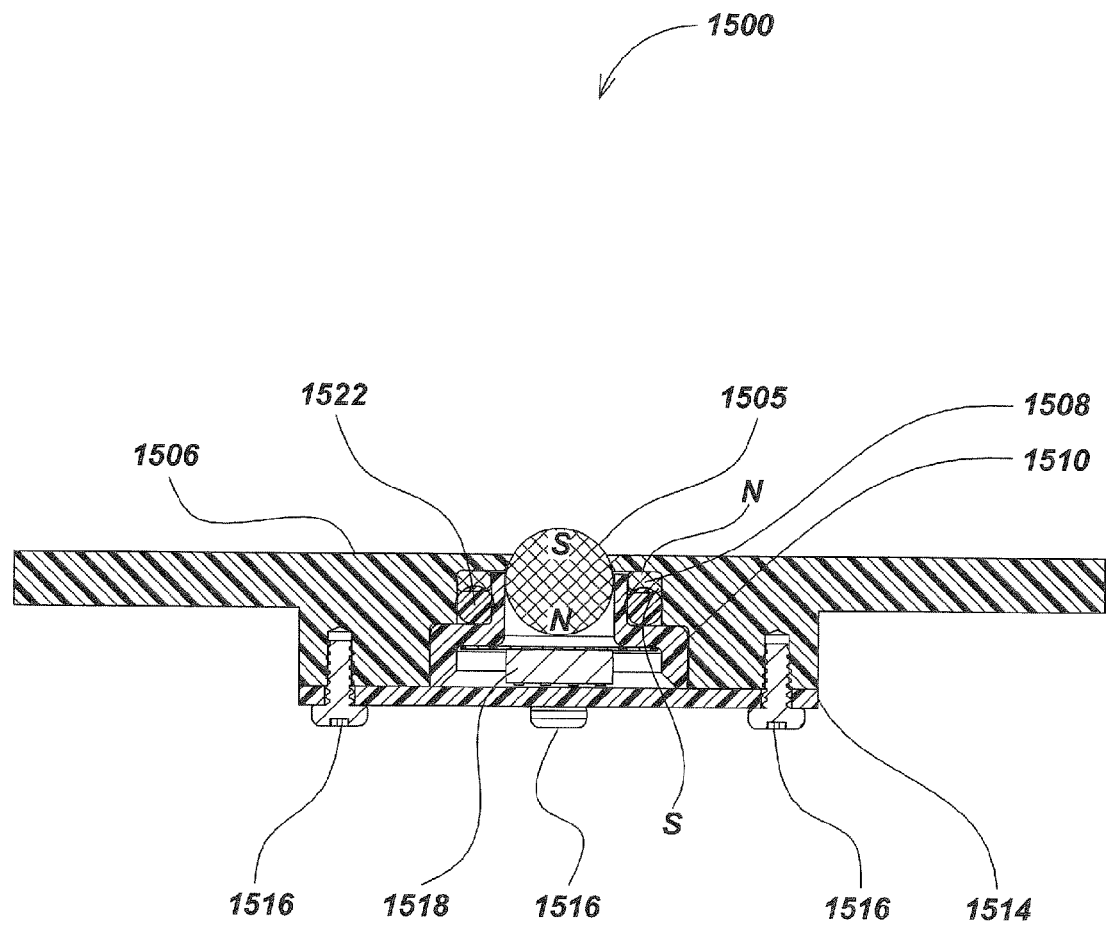
FIG. 15 is a vertical sectional view illustrating an alternate embodiment with a spherical magnet but without a separate manual actuator.

Referring to FIG. 15, a magnetic manual user interface device 1500 includes a case 1506 that constrains a spherical magnet 1505 mounted in a circular aperture in the case 1506. The spherical magnet 1505 is seated in a stepped cylindrical support 1510. An annular magnet 1508 is seated on an O-ring 1522, which is positioned on the shoulder of the stepped cylindrical support 1510. A magnetic sensor 1518 is supported on a PCB 1514 which is attached to the case 1506 by a plurality of screws 1516. The operation of the magnetic manual user interface device 1500 is similar to that of the magnetic manual user interface device 1400 illustrated in FIG. 14 except that the operator's finger directly engages the spherical magnet 1505 since it lacks a nubbin. A flattened top (not illustrated) on the spherical magnet 1505 can also be utilized.

Figure 16:
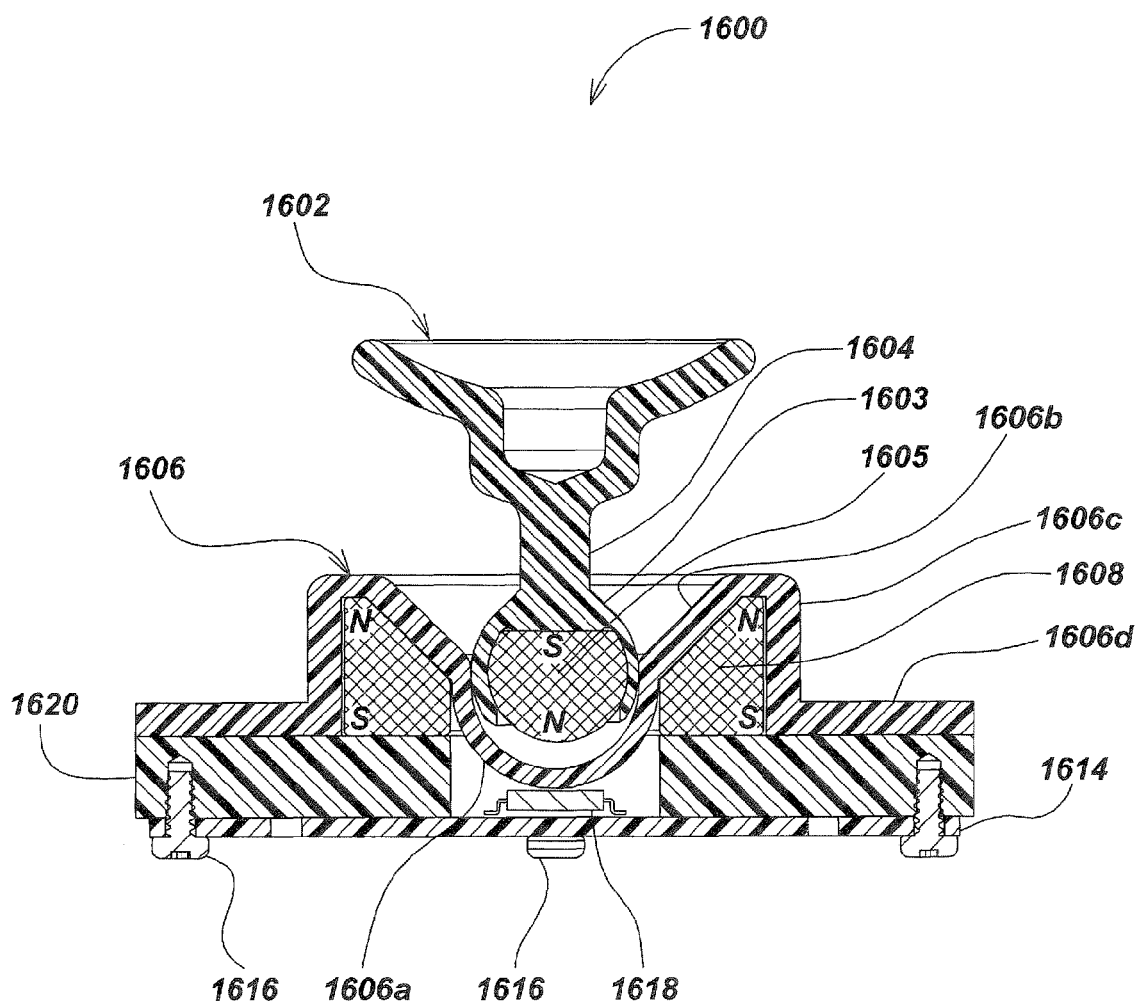
FIG. 16 is vertical sectional view illustrating an alternate embodiment that utilizes a paddle-shaped manual actuator and a semi-spherical magnet.

Referring to FIG. 16, a magnetic manual user interface device 1600 has an injection molded dish-shaped plastic paddle 1602 supported to allow a user to execute multiple directional control inputs. The paddle 1602 may be tilted, rotated in a clockwise manner, rotated in a counter-clockwise manner, and may also be depressed or pulled.

A cup-shaped retainer 1603 is molded at the lower end of a shaft 1604 that connects the retainer 1603 and the paddle 1602. The downwardly opening cavity of the retainer 1603 is provided with a horizontally extending flat top surface. The cavity of retainer 1603 is molded slightly offset from the centerline axis of paddle 1602 to provide a magnetic field bias. A semi-spherical magnet 1605 is press fit into the cavity of the retainer 1603. The semi-spherical magnet 1605 is provided with a complementary flattened top. The retainer 1603 is pivotally mounted in a rotationally symmetric plastic case 1606. The case 1606 is molded with a central spherical portion 1606a, an upper conical portion 1606b, a cylindrical portion 1606c and a peripheral flange portion 1606d. The inner diameter of the central spherical portion 1606a and the outer diameter of the retainer 1603 are sized to provide a free fit. An annular magnet 1608 with a chamfered or angled inner face is positioned between the portions 1606a, 1606b and 1606c of the case 1606. The angle of the chamfered surface of the annular magnet 1608 matches the slope of the upper conical portion 1606b of the case 1606. A single magnetic sensor 1618 is mounted on the upper side of a PCB 1614 and measures the net magnetic field. Digital data output from the magnetic sensor 1618 can be interpreted by interface circuitry and/or interface software as the displacement of paddle 1602 and semi-spherical magnet 1605 from its neutral position. The magnetic field bias caused by the offset of the retainer 1603 enables the sensor to measure rotation around the shaft axis. Restorative forces caused by magnetic interaction between the fields of the annular magnet 1608 and the semi-spherical magnet 1605 cause the paddle 1602 to return to its initial neutral orientation when released. The case 1606 is supported on top of a spacer 1620 made of Delrin® plastic or other suitable material. A plurality of screws 1616 secure the spacer 1620 to the PCB 1614.

Figure 17:
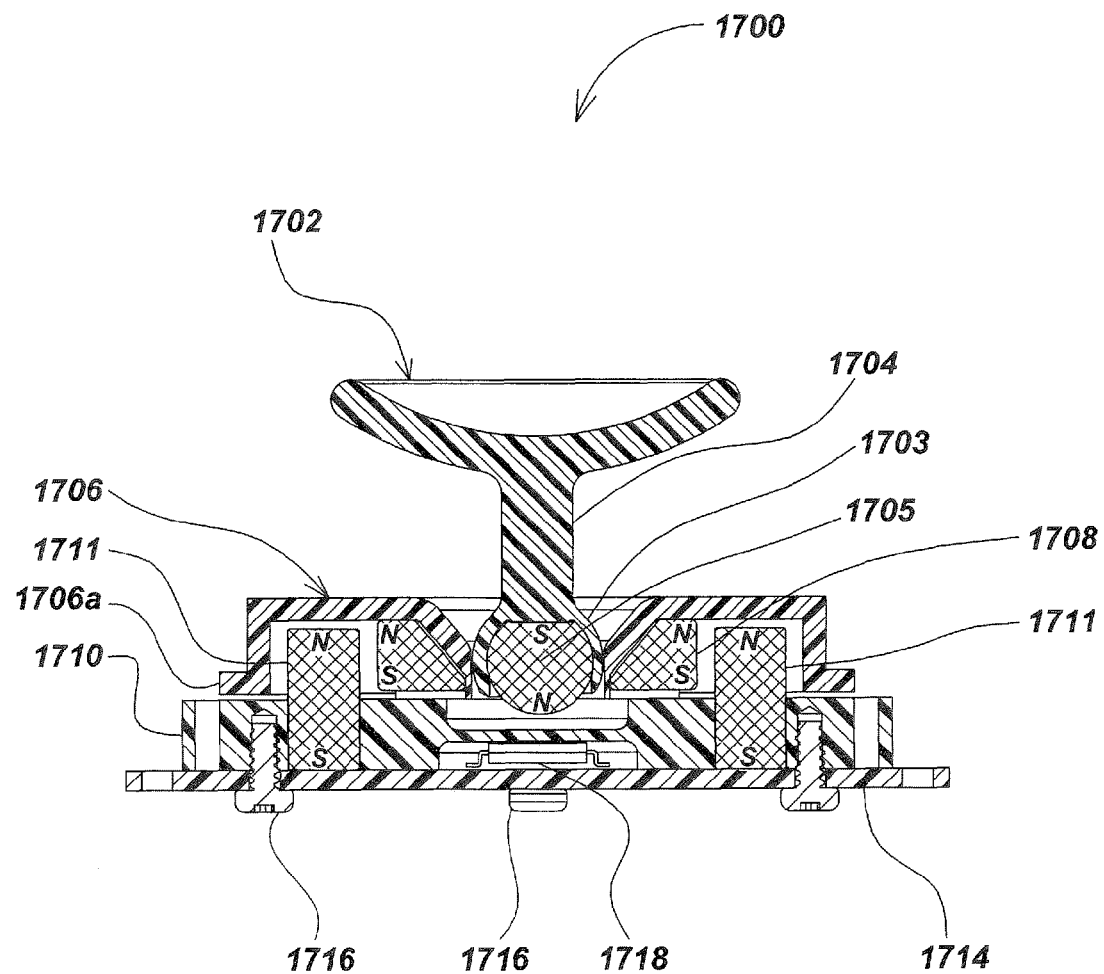
FIG. 17 is a vertical sectional view illustrating an alternate embodiment which includes ring-thrust magnets to aid in restoration of its manual actuator to a neutral position.

A magnetic manual user interface device 1700 illustrated in FIG. 17 has lateral restorative forces exerted on an annular magnet 1708 by additional magnets. Six cylindrical ring-thrust magnets 1711 are mounted in a circular pattern on a circular base 1710 around the annular magnet 1708. Circular base 1710 is mounted to a PCB 1714 with a plurality of screws 1716. A semi-spherical magnet 1705 is snap-fit or glued into a matching semi-spherical cavity molded in a cup-shaped retainer 1703 connected to the lower end of a shaft 1704 attached to a paddle 1702. The form of the cup-shaped retainer 1703 is such as to hold the semi-spherical magnet 1705 slightly offset from the centerline of shaft 1704, in order to magnetically bias the measured field. The shaft 1704 extends in a perpendicular fashion from the paddle 1702. The magnetic field bias caused by the offset of retainer 1703 enables interface circuitry and/or interface software to determine the rotation around the shaft axis from the measured net magnetic field. The chamfered annular magnet 1708 is attached to the molded top case 1706 that covers the six cylindrical ring-thrust magnets 1711. The cylindrical ring-thrust magnets 1711 have the same polarity as the annular magnet 1708. The top case 1706 may also have a lip 1706a which allows the top case 1706 to be retained by the external case (not illustrated). The paddle 1702 may be manually moved to tilt the shaft 1704 and the semi-spherical magnet 1705 in any direction. The paddle 1702 may also be depressed or lifted by a user. Either action causes a magnetic sensor 1718 to generate signals representative of such motion. Additionally, the top case 1706 and the paddle 1702 may together be manually moved laterally in any direction (forward, backward, left, right) The magnetic restoring force between the semi-spherical magnet 1705 and the annular magnet 1708 restores the paddle 1702 to its neutral vertical position when released. Magnetic restoring force from the cylindrical ring-thrust magnets 1711 acts to return the top case 1706 to its initial central position when it has been released after being laterally displaced.

Figure 18:
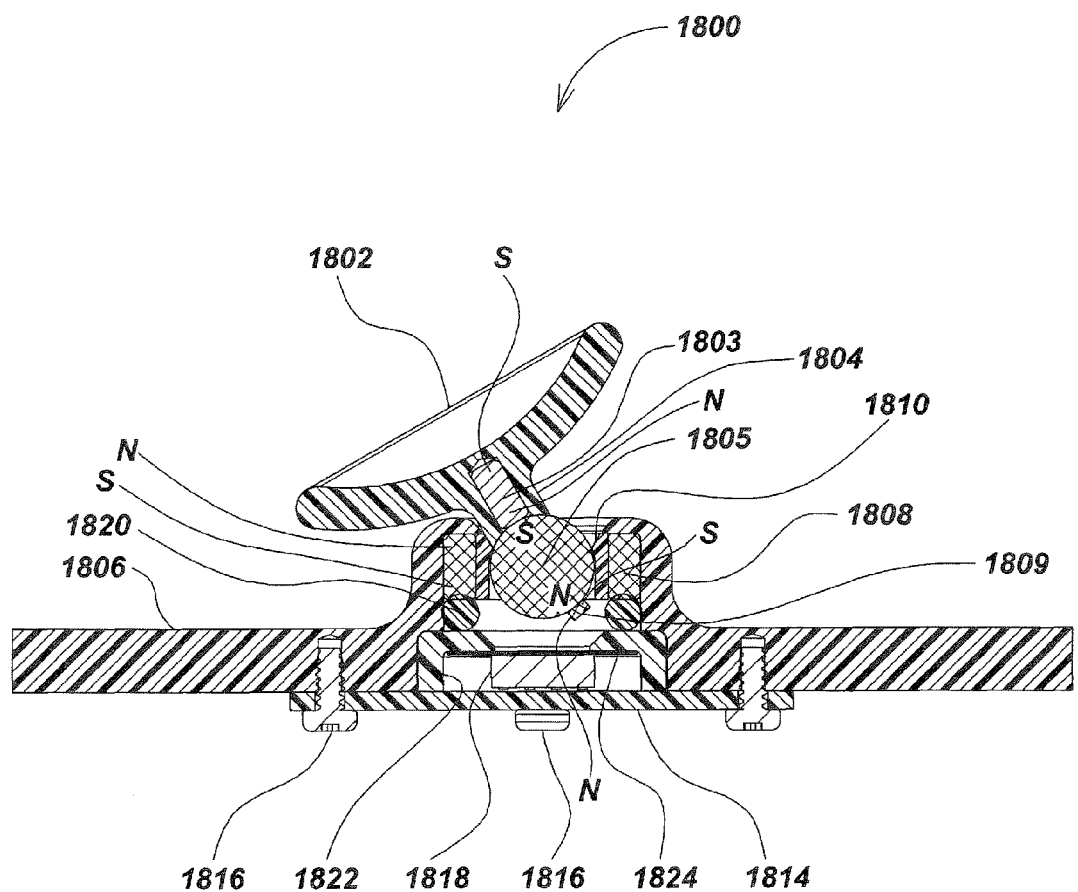
FIG. 18 is a vertical sectional view illustrating an alternate embodiment in which a magnetic steel pin is used to assist in retaining the spherical magnet to the actuator.

Referring to FIG. 18, a magnetic manual user interface device 1800 includes a molded paddle 1802 and a magnetic steel pin 1803 embedded within a shaft 1804 integrally molded with the paddle 1802. The paddle 1802 is illustrated fully tilted in a non-equilibrium position. When released, the paddle 1802 will return to a vertical position. The magnetic steel pin 1803 magnetically aligns the paddle 1802 and the shaft 1804 to a spherical magnet 1805 during assembly so that it can be held, and optionally adhesively bonded into the correct alignment. The spherical magnet 1805 is magnetically aligned to the paddle 1802 and the shaft 1804 by reason of the magnetic attraction between the spherical magnet 1805 and the magnetic steel pin 1803. The spherical magnet 1805 then can be optionally glued into the curved lower end of the shaft 1804 in the aligned relationship. A small bias magnet 1809 is attached to the lower end of the spherical magnet 1805. A magnetic sensor 1818 measures the net magnetic field from the spherical magnet 1805. An annular magnet 1808 and the bias magnet 1809 which allows interface circuitry and/or interface software to determine the rotation of the paddle 1802 around the vertical axis. The presence of the bias magnet 1809 allows the interface circuitry/software to determine the rotation around the shaft 1804 axis. The annular magnet 1808 is seated on an O-ring 1820 and concentrically surrounds the spherical magnet 1805. The annular magnet 1808 is lined with a Teflon® plastic sleeve 1810 to reduce friction. A PCB 1814 supports the magnetic sensor 1818 which is covered by a molded moisture seal support 1822 and a label-type moisture seal 1824. The seal support 1822 and the moisture seal 1824 have relatively low magnetic permeability and thus have negligible effect on the magnetic field measurements of the magnetic sensor 1818. The PCB 1814 is attached to a case 1806 with a plurality of screws 1816.

Figure 19:
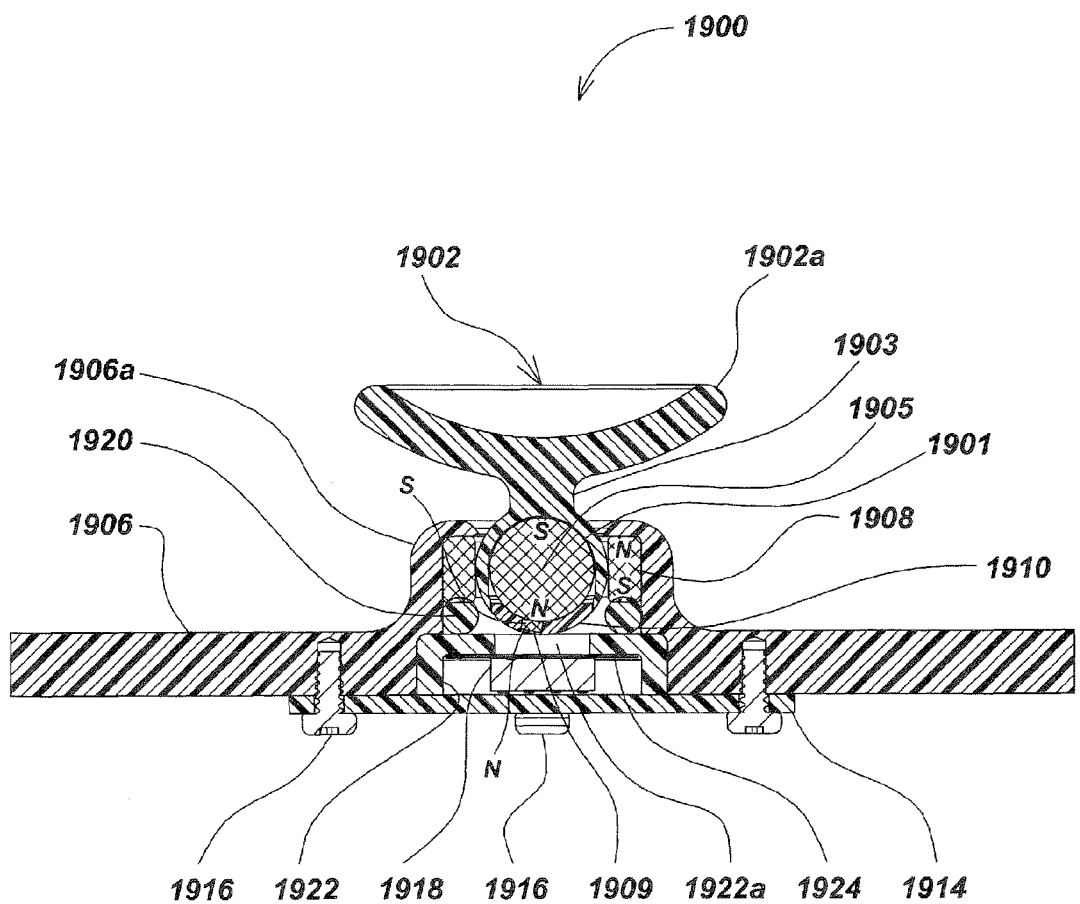
FIG. 19 is a vertical sectional view illustrating an alternative embodiment that includes a manual actuator with a paddle and an eccentric bias magnet in a plastic shell attached to the spherical magnet.

Referring to FIG. 19, a magnetic manual user interface device 1900 includes a manual actuator 1902 with a paddle 1902a which is integrally molded with a cup-like receptacle 1901 into which a spherical magnet 1905 is press-fit or glued. An integrally molded cylindrical shaft 1903 connects the underside of the paddle 1902a with the upper side of the cup-like receptacle 1901. The N-S axis of the spherical magnet 1905 is oriented along the vertical central axis of the cylindrical shaft 1903. A semi-spherical plastic cap 1910 snap fits into the end of the cup-like receptacle 1901 to retain the spherical magnet 1905 in position inside the cup-like receptacle 1901. The spherical cap 1910 is molded with an eccentric opening along its lower edge into which a small disk-shaped magnet 1909 is embedded by friction fit to serve as a bias magnet to the net magnetic field measured by a magnetic sensor 1918. The magnetic sensor 1918 is centrally mounted on a PCB 1914. A cylindrical seal support 1922 is also supported on the PCB 1914 over the magnetic sensor 1918. An adhesive label-type seal 1924 is attached to the underside of the cylindrical seal support 1922, and covers a circular aperture 1922a in the cylindrical seal support 1922. A plurality of Plastite® screws 1916 secure the PCB 1914 to a plastic case 1906. The case 1906 is molded with a cylindrical projection 1906a which encloses and retains an annular magnet 1908 and an O-ring 1920. The annular magnet 1908 concentrically surrounds the cup-like receptacle 1901 and spherical magnet 1905 contained therein. The N-S polarity of the annular magnet 1908 is oppositely oriented to that of the spherical magnet 1905 to provide the magnetic restoring forces that return the spherical magnet 1905 and the manual actuator 1902 to their neutral positions.

Figure 20:
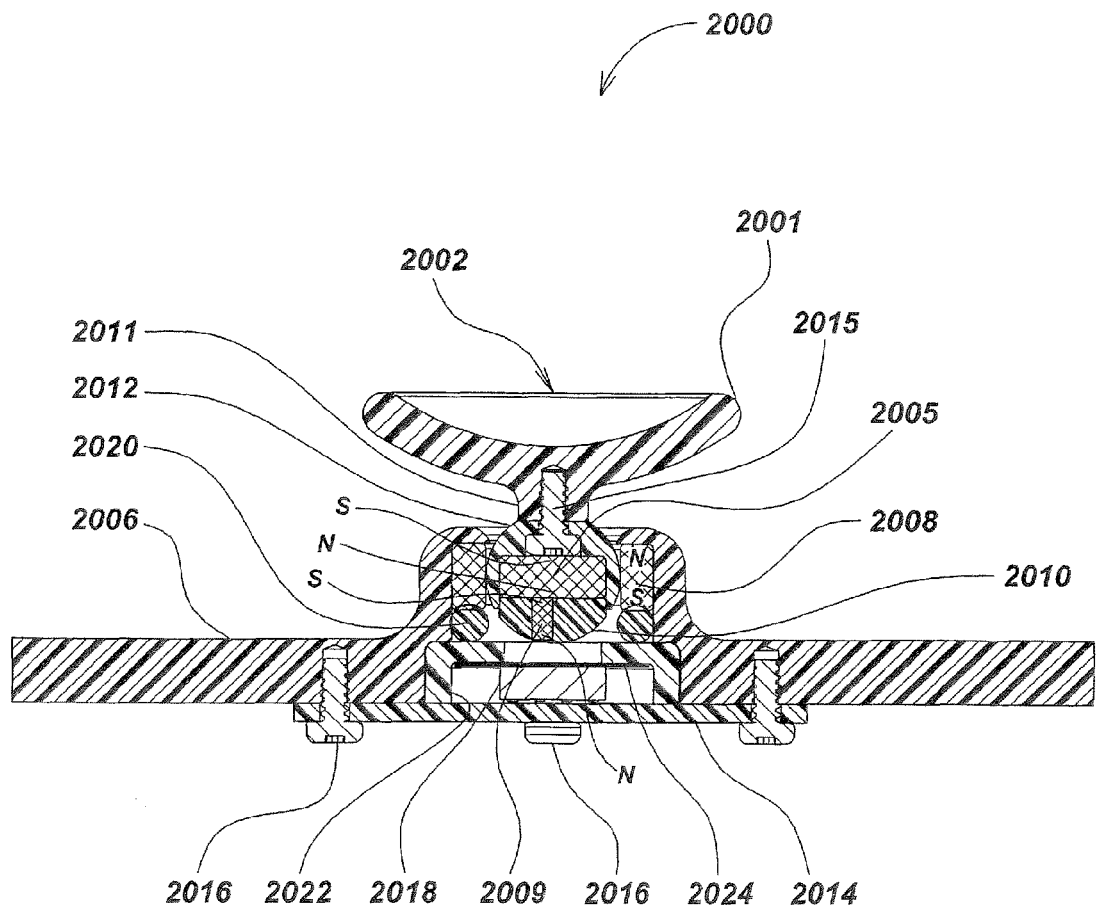
FIG. 20 is a vertical sectional view illustrating an alternate embodiment that includes a central disk-shaped magnet and a cylindrical bias magnet which is axially off-center relative to the disk-shaped magnet.

FIG. 20 illustrates a magnetic manual user interface device 2000 in which a disk-shaped magnet 2005 is used in place of a spherical magnet, and a cylindrical bias magnet 2009 is added to form the measured field. A paddle 2001 of a manual actuator 2002 is attached to a hollow spherical carrier 2012 by means of a screw 2015 that extends through the center of a shaft 2011 connecting the spherical carrier 2012 to the center of the paddle 2001. The disk-shaped magnet 2005 is retained inside the spherical carrier 2012 by a cap 2010, optionally by snap fit or adhesively bonded. The cylindrical bias magnet 2009 has a smaller diameter than the disk-shaped magnet 2005. The cylindrical bias magnet 2009 is tightly embedded in a correspondingly sized bore molded in the cap 2010. An O-ring 2020 supports an annular magnet 2008 that rests on a cylindrical seal mount 2022 to which a seal 2024 is adhesively attached. A PCB 2014 supports a magnetic sensor 2018 and is attached to a case 2006 by a plurality of screws 2016.

Figure 21:
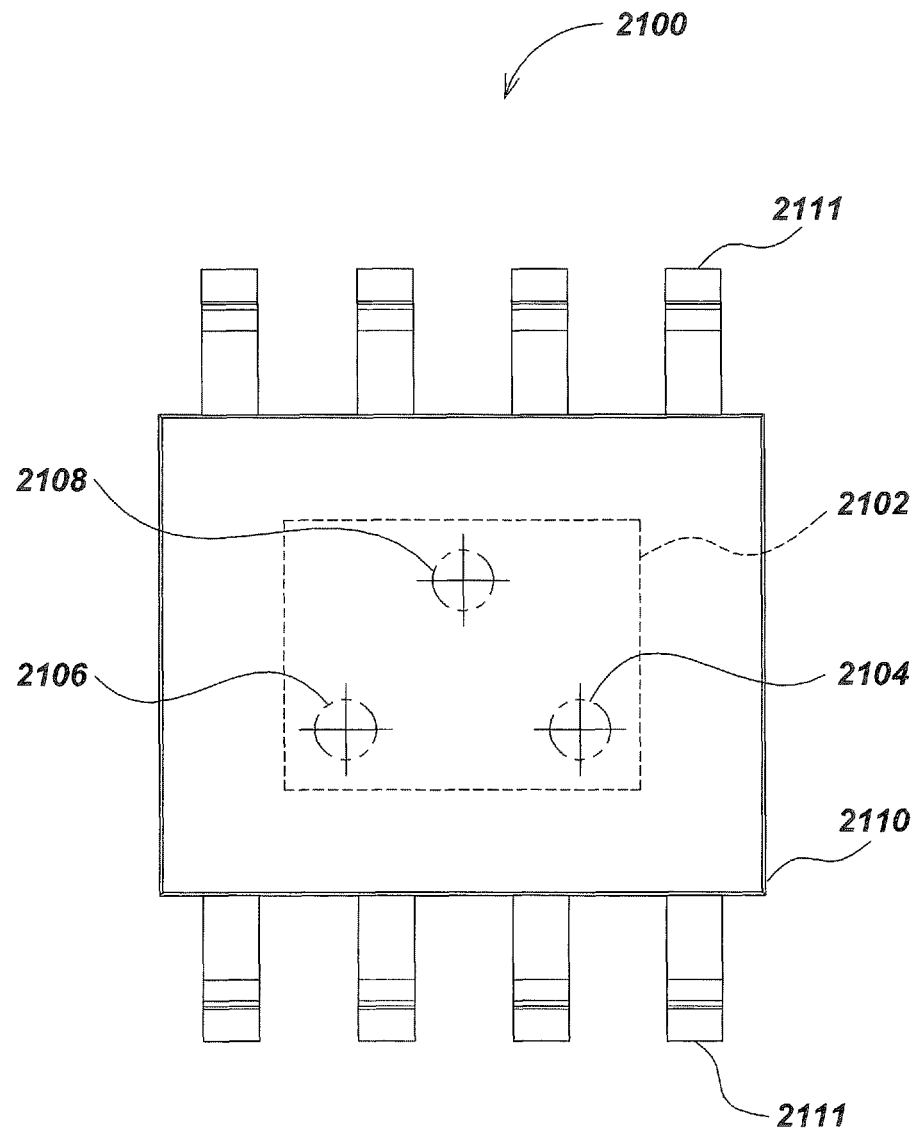
FIG. 21 is a top plan view illustrating an integrated circuit (IC) package containing a non-co-linear arrangement of three multi-axis magnetic sensors.

FIG. 21 illustrates a magnetic sensor integrated circuit (IC) device 2100 incorporating three tri-axis magnetic sensors 2104, 2106 and 2108, each having plurality of Hall effect devices. The magnetic sensor IC device 2100 has an IC package configuration including a rectangular outer plastic housing 2110 and a plurality of leads 2111 extending from opposite sides of the rectangular outer housing 2110. The leads 2111 extend parallel to each other and are configured for surface mounting and electrical connection via soldering to a plurality of solder pads (not illustrated) on PCB. The three magnetic sensors 2104, 2106 and 2108 may be provided on a single silicon die 2102 and are arranged in non-co-linear fashion. Each of the magnetic sensors 2104, 2106, 2108 is a three-axis magnetic sensor which produces digital output signals representing field strength along X, Y and Z axes. By using a plurality of three-dimensional magnetic sensors which are offset from each other on the X-Y plane (i.e., non-collinear), net magnetic field measurements produced by various combinations of magnets in a magnetic manual user interface device can produce a more detailed array of user inputs. When processed through appropriate software these net magnetic field measurements may be used to interpret a wider array of inputs from a user. Alternatively any suitable IC package, such as BGA, could be used. Alternatively separate sensor die could be used inside a single package.

Figure 22:
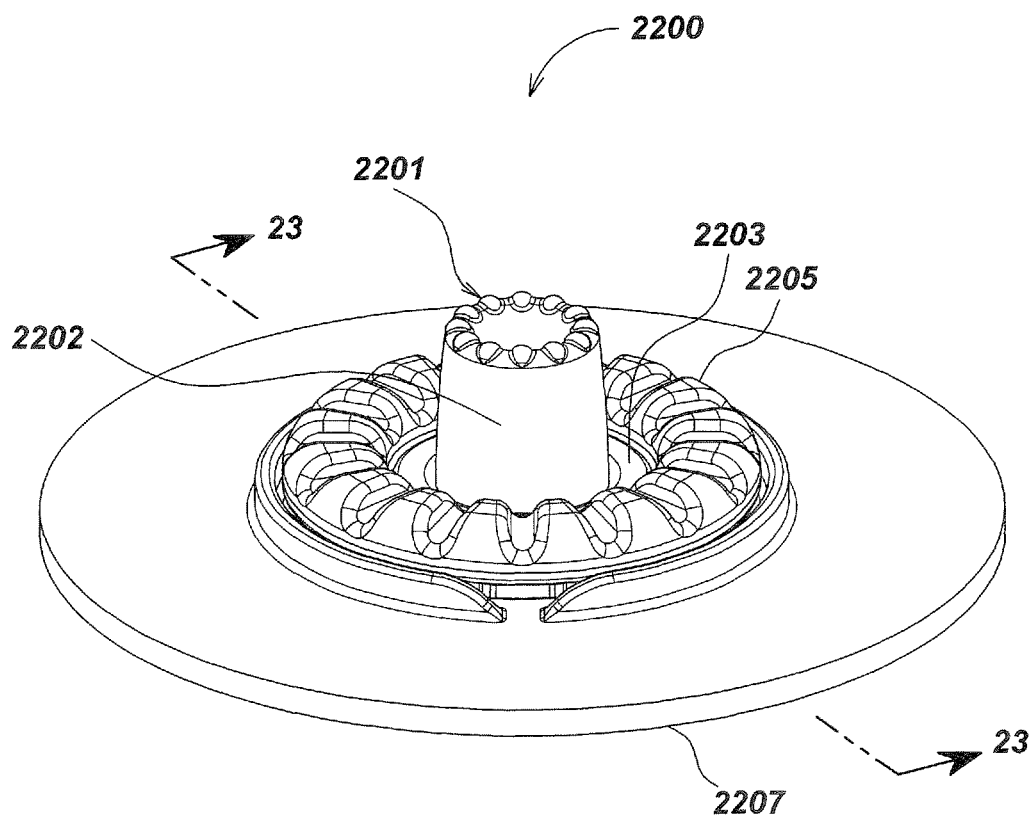
FIG. 22 is an isometric top view illustrating an alternate embodiment incorporating an annular or disk-shaped magnet and a plurality of roller magnets.

Referring to FIG. 22, a magnetic manual user interface device 2200 includes a flexible elastomeric manual actuator 2201 that includes a frusto-conical projection 2202 extending vertically from the center of a circular carrier 2203. The circular carrier 2203 is surrounded by a separate circular elastomeric jog-pad 2205. The flexible elastomeric manual actuator 2201 is seated in a flat circular outer case 2207. The flexible elastomeric manual actuator 2201 is formed with bumps on the top surface for increased grip. The circular elastomeric jog-pad 2205 may be rotated, moved horizontally within predetermined limits, or tilted in any direction. The frusto-conical projection 2202 can be tilted or vertically depressed.

Figure 23:
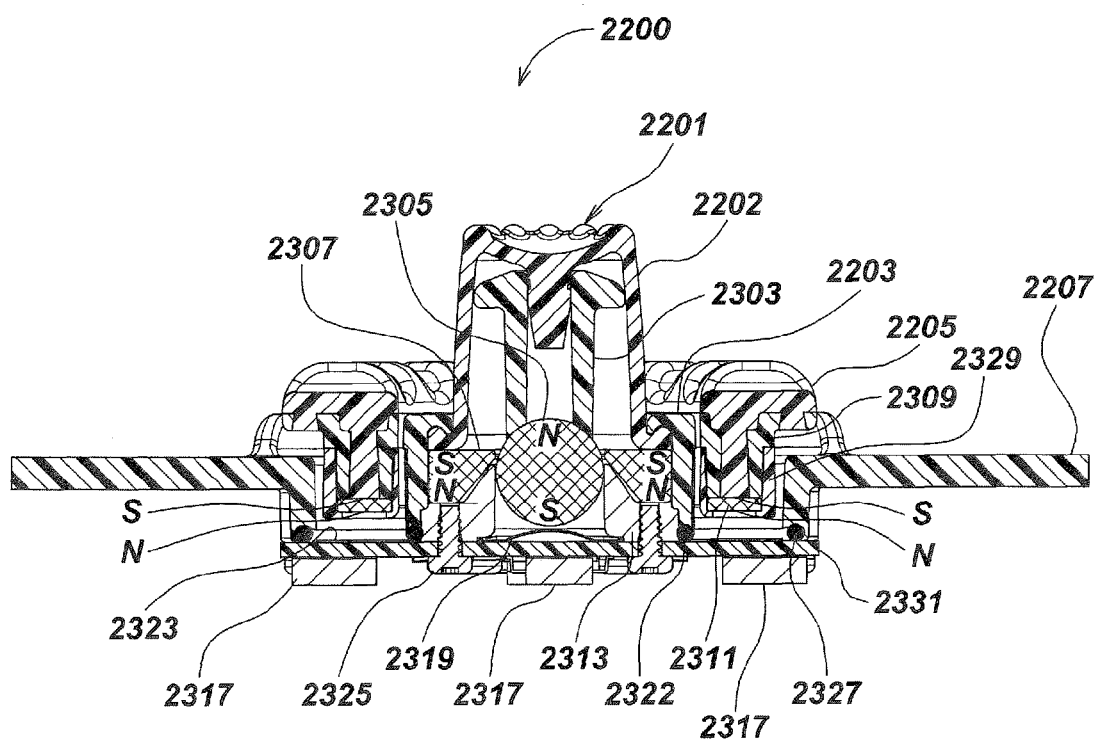
FIG. 23 is a vertical sectional view illustrating the embodiment of FIG. 22 taken along line 23-23 of FIG. 22.
Figure 24:
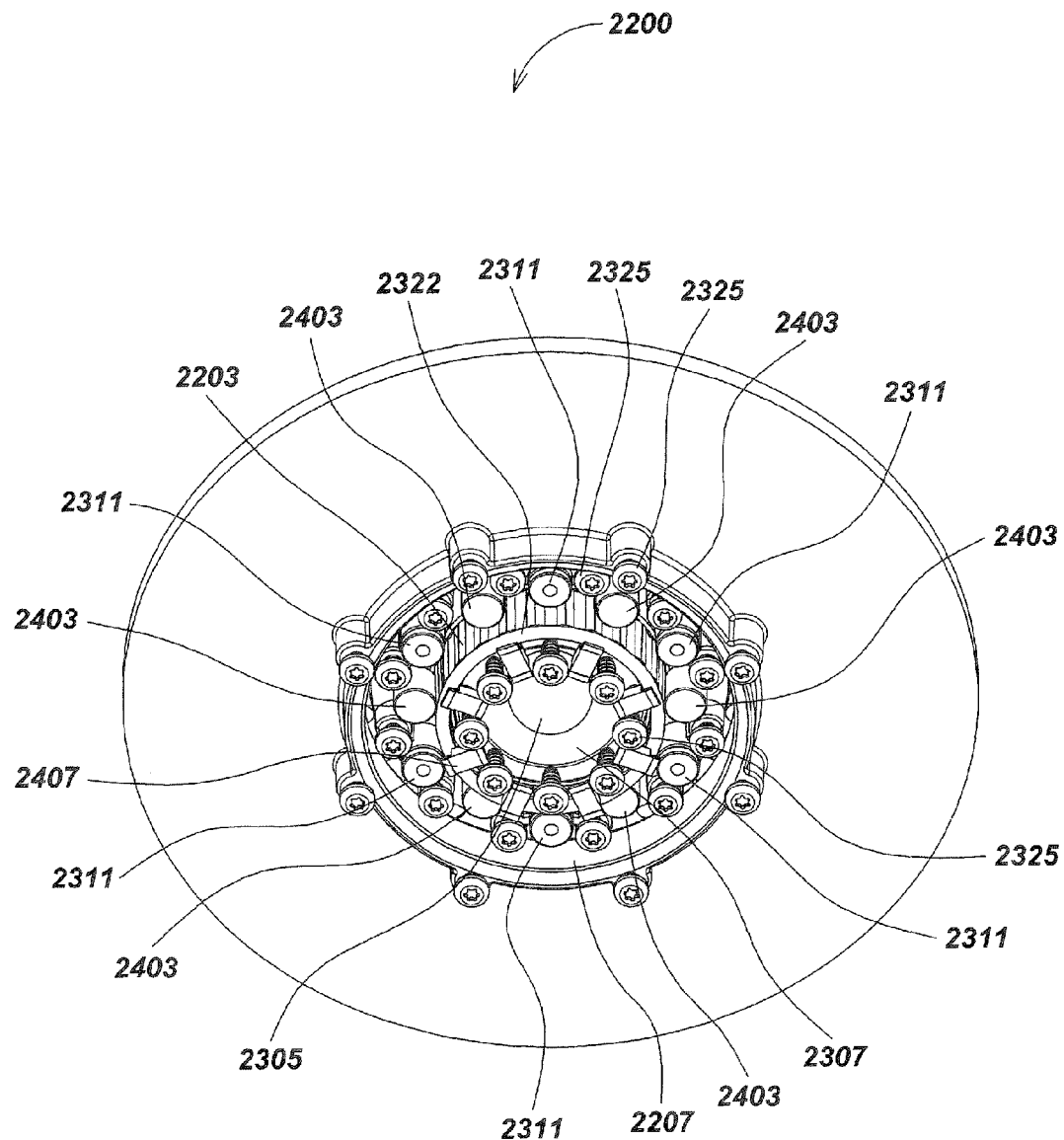
FIG. 24 is an isometric view of the embodiment of FIG. 22 taken from the bottom side with portions removed to illustrate the disposition of the roller magnets.

Referring to FIG. 23, the flexible elastomeric manual actuator 2201 is connected by means of a molded paddle 2303, which in turn is attached onto the upper half of a spherical magnet 2305. A annular magnet 2307 surrounds the spherical magnet 2305. The lower segment of the spherical magnet 2305 fits freely into an inner molded plastic ring 2313, molded from a low friction material. The circular elastomeric jog-pad 2205 is connected to an upper scroll ring 2309. A plurality of floating roller magnets 2403 (FIG. 24), are seated within the pockets 2329a (FIG. 25) in a lower scroll ring 2329 such that they attract towards and roll against the scallop-form outer surface of the circular carrier 2203. The Spherical magnet 2305, the annular magnet 2307, the roller magnets 2403, and the non-floating disk-shaped magnets 2311 (FIG. 24) generate a net magnetic field which is measured by a plurality of magnetic sensors 2317 and translated by interface circuitry/software into the displacement of circular elastomeric jog-pad 2205 and/or frusto-conical projection 2202 from their respective equilibrium positions. In FIG. 24 the PCB 2331 (FIG. 23) is removed. FIG. 24 illustrates the relative positions of the spherical magnet 2305, annular magnet 2307, non-floating disk-shaped magnets 2311, and roller magnets 2403. Depressing the flexible elastomeric manual actuator 2201 activates a dome-switch 2319. Movement of both the jog-pad 2205 and the projection 2202 is measured by a plurality of magnetic sensors 2317.

Referring still to FIG. 23, the dome-switch 2319 is positioned beneath the spherical magnet 2305. The dome-switch 2319 switches when depressed by the spherical magnet 2305. The PCB 2331 supports a plurality of magnetic sensors 2317. Also visible in FIG. 23 are the circular carrier 2203, the lower scroll ring 2329, a pair of sealing O-rings 2322 and 2327, a plurality of screws 2325, and a flat Teflon® plastic pad 2323 which reduces friction.

Figure 25:
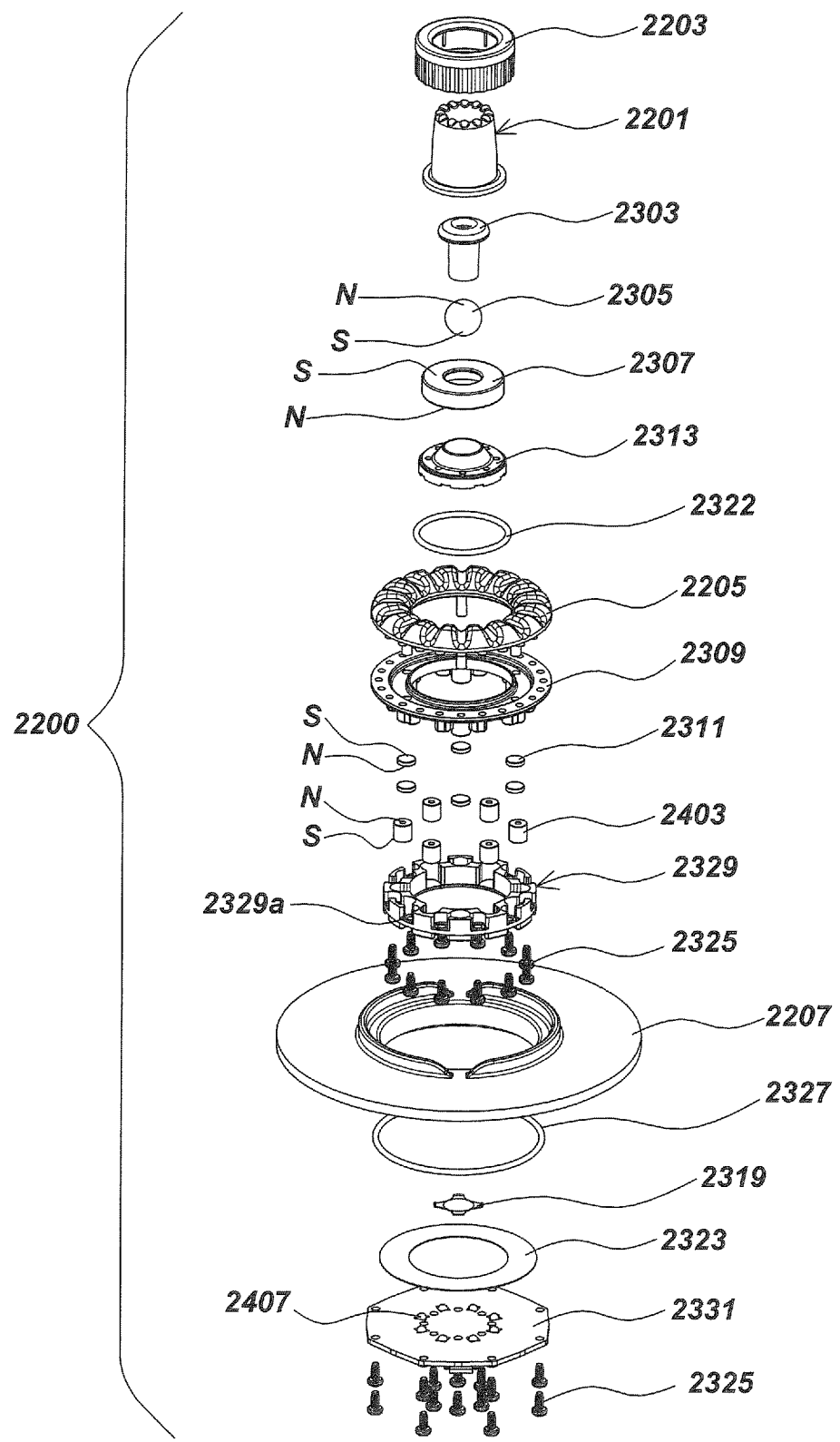
FIG. 25 is a reduced exploded isometric view of the embodiment of FIG. 22.

Referring to FIG. 25, the roller magnets 2403 and a plurality of non-floating disk-shaped magnets 2311 are contained in the lower scroll ring 2329. The scalloped outer edge of the circular carrier 2203 is also visible in FIG. 24. The interaction of the magnetic fields of the roller magnets 2403 and the annular magnet 2307 provides a radial spring-like force inward on the roller magnets 2403, as well as a vertically centering effect in their alignment relative to the annular magnet 2307.

Rotation of the circular elastomeric jog-pad 2205 causes rotation of the upper scroll ring 2309 and the lower scroll ring 2329. Movement of the roller magnets 2403 along the scalloped surface of the circular carrier 2203 causes slight inward and outward motion of the roller magnets 2403 as they are pressed outward by the scallop crests, and drawn inward by magnetic force into the scallop depressions. This serves the dual purposes of providing a recognizable change in net magnetic field patterns aiding in interpretation of the output of the magnetic sensors 2317, and also providing tactile and audible feedback to the user. The tendency of the roller magnets 2403 to draw in to the annular magnet 2307 provides a cogging resistance to the rotation of the circular elastomeric jog-pad 2205. Additionally, the tendency of the roller magnets 2403 to align vertically with the central plane of the annular magnet 2307 creates a vertical spring-like resistance to depression of the circular elastomeric jog-pad 2205.

The non-floating disk-shaped magnets 2311 that are attached to the upper scroll ring 2309 are located slightly further radially outward from the annular magnet 2307 than the roller magnets 2403. The polarity orientation of the annular magnet 2307 and of the non-floating disk-shaped magnets 2311 is with the South pole up, the North pole down. The polarity orientation of the roller magnets 2403 and the spherical magnet 2305 is with the North pole up, and the South pole down. These polarities may be reversed and interpreted as needed by software depending on the desired application.

The roller magnets 2403 rotate in their respective grooves and the non-floating disk-shaped magnets 2311 cause a periodic rise and fall of polarity (N-S-N-S) as the circular elastomeric jog-pad 2205 rotates. The cog-like effect of the scallop-curve edging on the circular carrier 2203 could also be achieved in an alternate embodiment by a faceted carrier (not illustrated) such as a carrier having 12 flats.

Referring to FIG. 24, a plurality of LEDs 2407 are mounted around the perimeter of the inner molded plastic ring 2313 (FIG. 25). The LEDs 2407 are preferably blue lens-type LEDs which are used to provide additional optical feedback to the user by casting light under the circular elastomeric jog-pad 2205 and the circular carrier 2203 to indicate a power-ON state. In an alternate embodiment a single LED can be used. A scheme of variable lighting of individual LEDs depending on the turning of the circular elastomeric jog-pad 2205 is also possible. Various colors may be used alone or in combination depending on the desired application. Optically transparent materials can be used in conjunction with the LEDs 2407.

FIG. 25 illustrates the relations of the flexible elastomeric manual actuator 2201, the paddle 2303, the annular magnet 2307, the spherical magnet 2305, the circular carrier 2203, the circular elastomeric jog-pad 2205, and the circular outer case 2207. The upper scroll ring 2309 is attached to the lower scroll ring 2329 in which slot-like pockets are molded containing the roller magnets 2403. Separately molded pockets retain the non-floating disk-shaped magnets such as 2311 in the lower scroll ring 2329. An inner molded plastic ring 2313 radially centers the freely fitting spherical magnet 2305. The lower scroll ring 2329 is attached to the upper scroll ring 2309 with a plurality of twelve Plastite® screws 2325. Similar screws are used to attach the PCB 2331, the circular carrier 2203, and the inner molded plastic ring 2313. The fifteen millimeter sealing O-ring 2322 sits around the base of the inner molded plastic ring 2313 and the thirty millimeter O-ring 2327 acts as a seal against the circular outer case 2207.

One of the roller magnets 2403 can be made stronger than the others, so that the data from the magnetic sensors 2317 may enable distinguishing between the roller magnets 2403 for purposes of calibration and to provide an indication of absolute rotational position of the lower scroll ring 2329 relative to the circular outer case 2207 by means of interface circuitry and/or interface software (not described herein). For example, one of the roller magnets 2403 could be made of material grade N50, N52, or N55 material and all of the other roller magnets 2403 could be made of N42 material.

Figure 26:
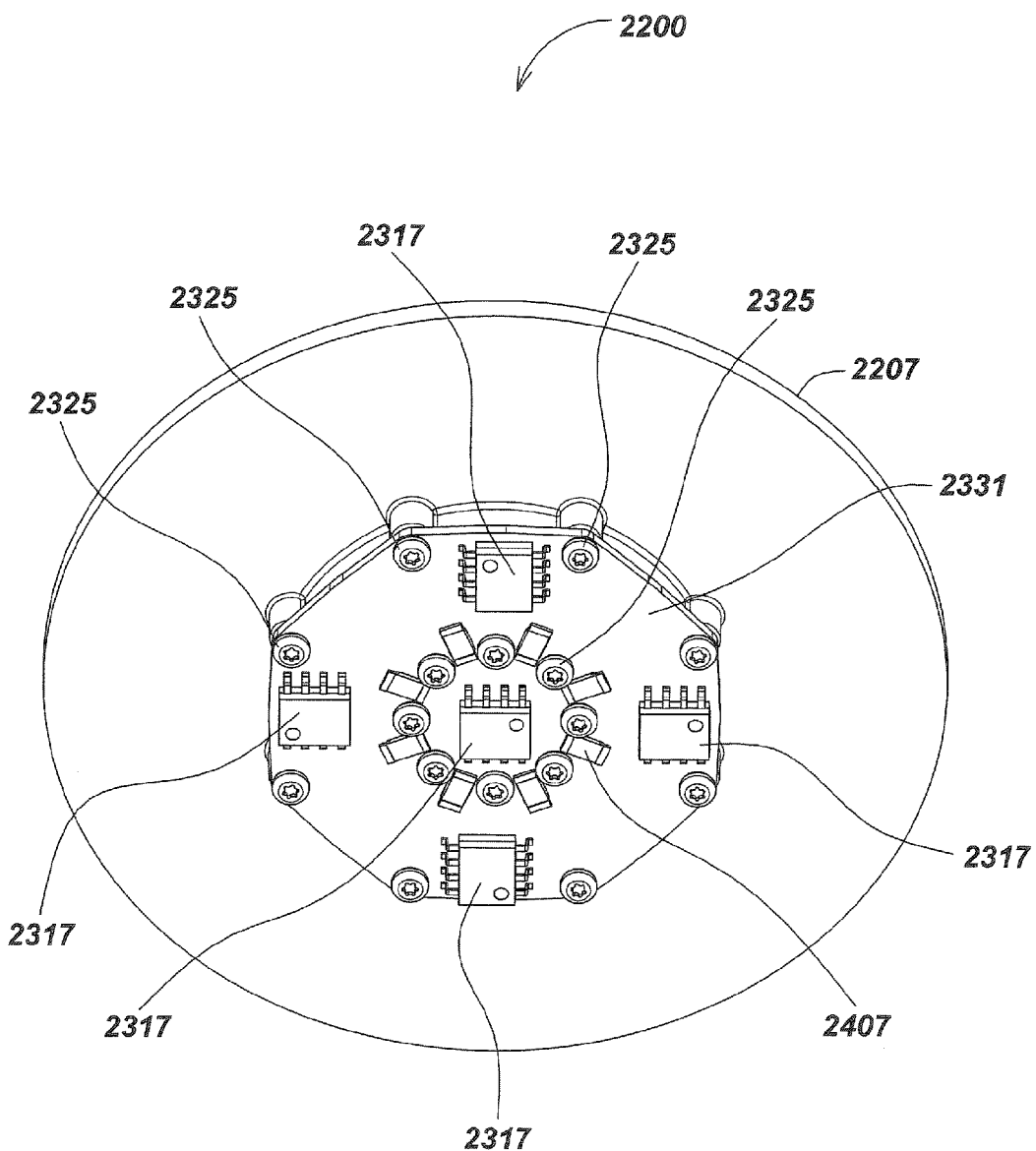
FIG. 26 is a bottom isometric view illustrating the embodiment of FIG. 22 fully assembled.
Figure 27:
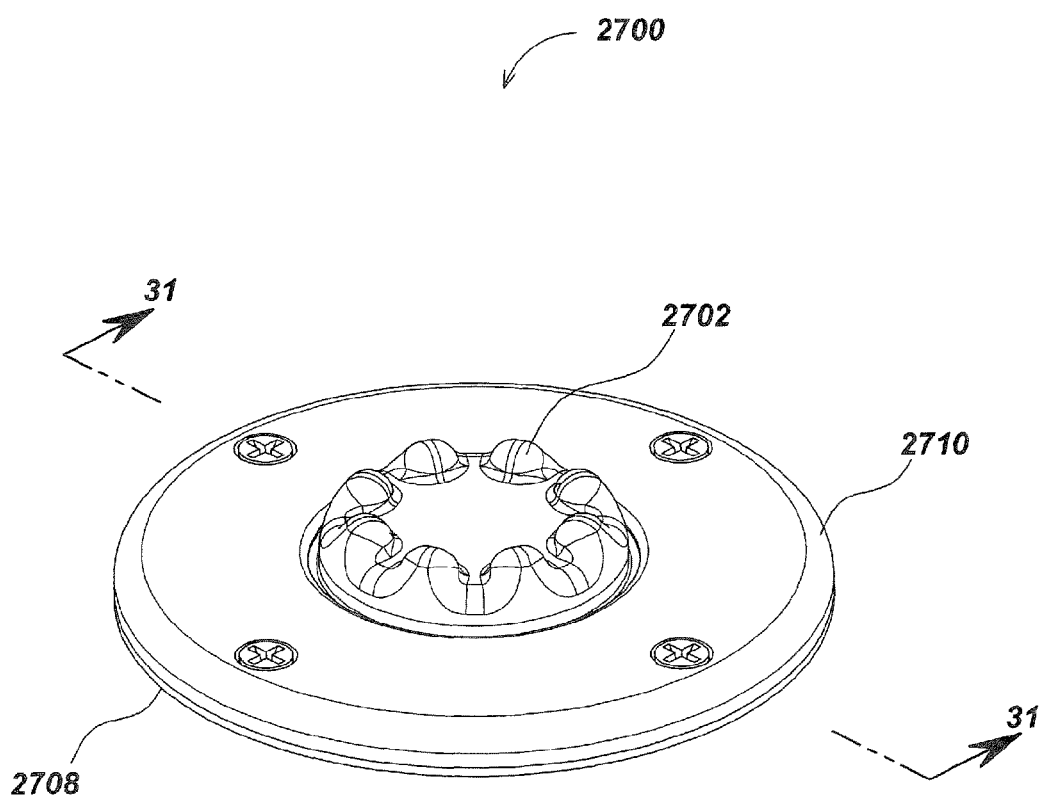
FIG. 27 is an isometric top view illustrating an alternate embodiment configured so that the jog-pad and roller magnets can be manually manipulated by the user without requiring any paddle or other upstanding manipulation member.
Figure 28:
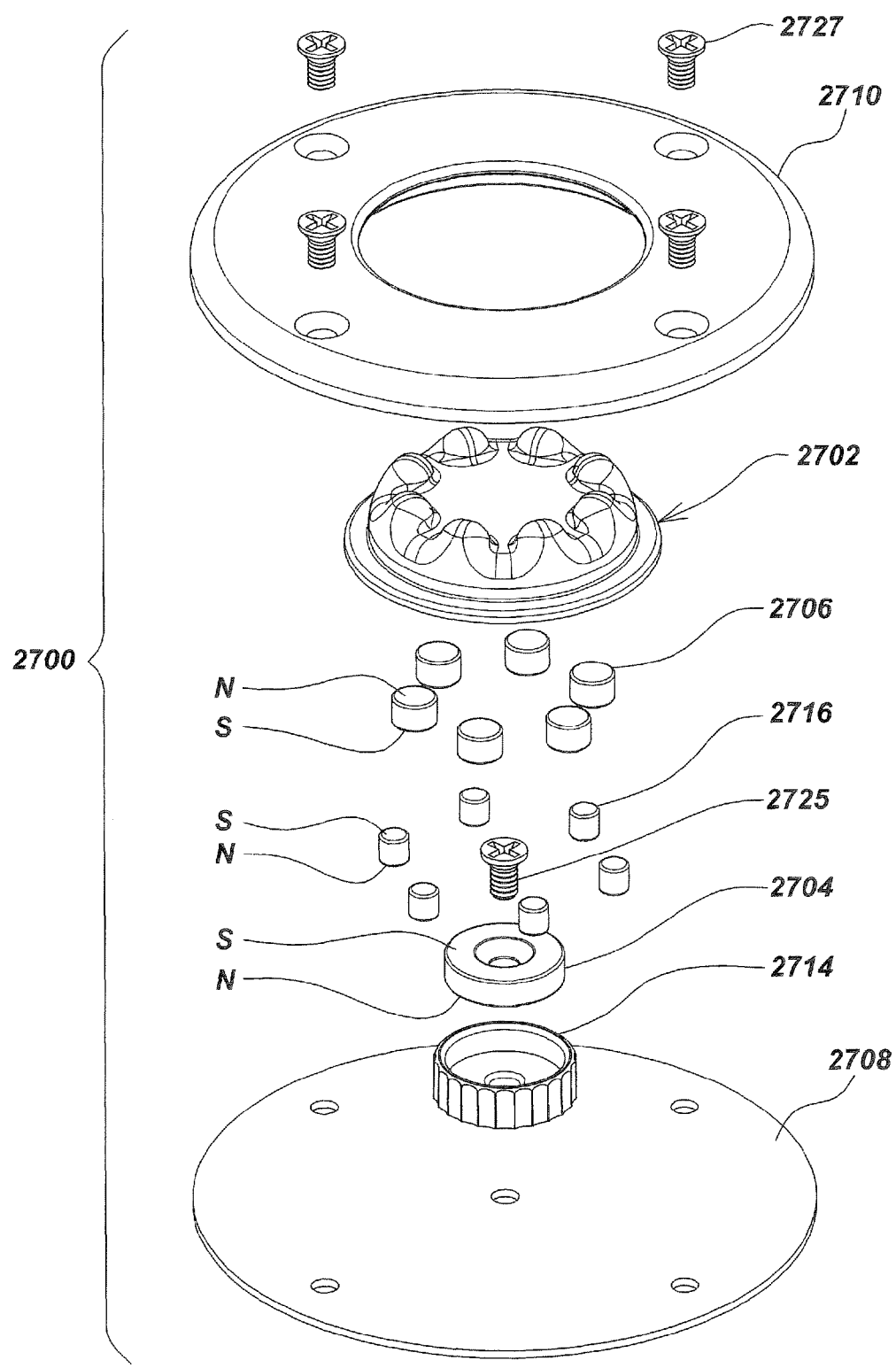
FIG. 28 is an exploded isometric view from the top side of the embodiment of FIG. 27 illustrating further details thereof.
Figure 29:
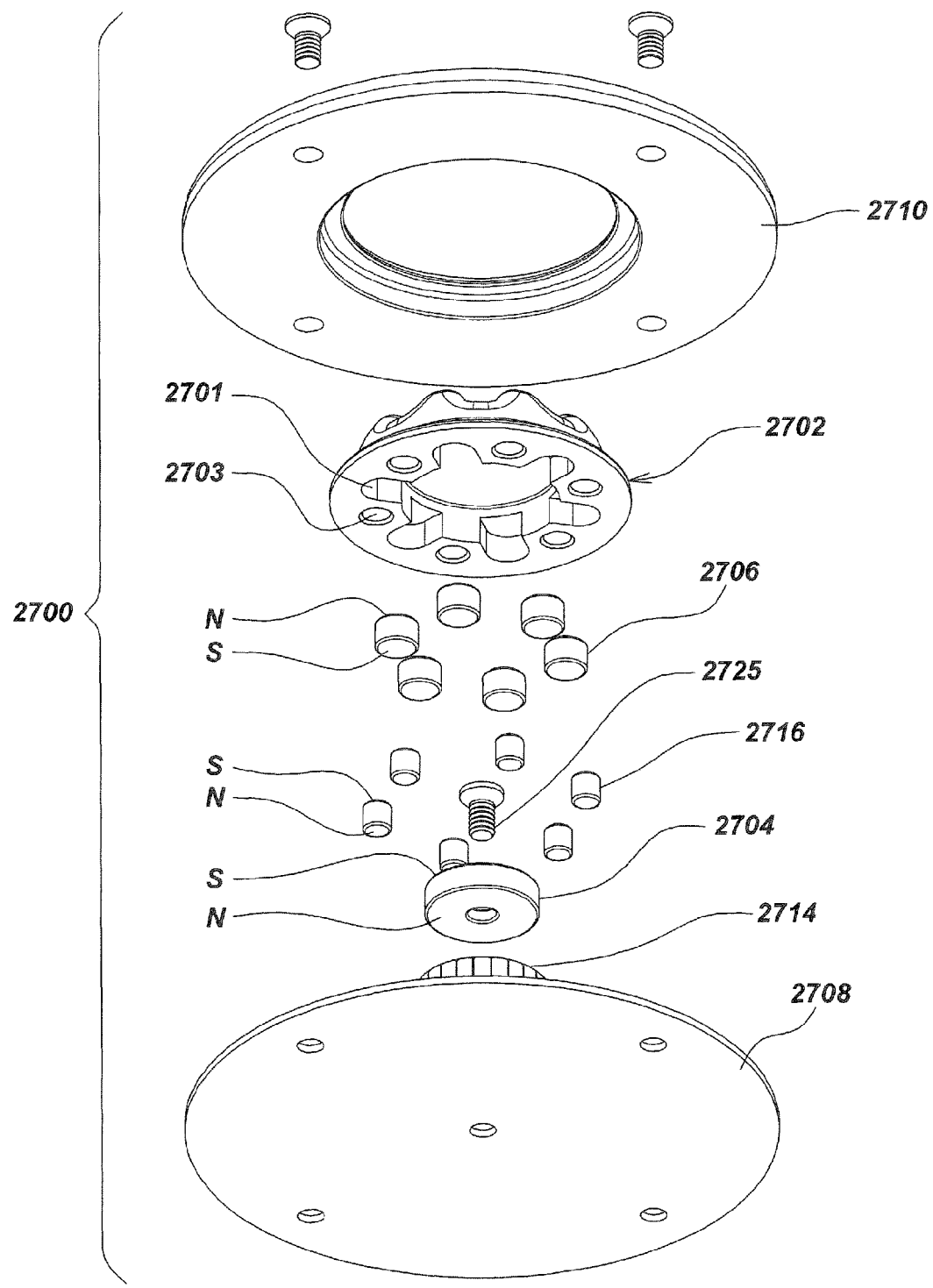
FIG. 29 is an exploded isometric view from the bottom side of the embodiment of FIG. 27.

Referring to FIG. 26, five magnetic sensors 2317, such as the aforementioned Melexis 90333 three-axis sensor, are mounted on the lower surface of the PCB 2331. Four magnetic sensors 2317 are mounted at ninety-degree spaced apart locations while a fifth magnetic sensor 2317 is mounted in the center of the PCB 2331 beneath the spherical magnet 2305. The flat pad 2323 (FIG. 25) of Teflon® plastic or similar material provides a low friction surface on which the lower scroll ring 2329 can be easily turned. The dome-switch 2319 (FIG. 23) is centrally situated below the spherical magnet 2305 such that pressing down on the flexible elastomeric manual actuator 2201, the paddle 2303, and the spherical magnet 2305 will actuate the switch.

An inner circle of screws 2325 attach the inner molded plastic ring 2313 to the PCB 2331, while an outer ring of screws 2325 attach the PCB 2331 and the overall mechanism to the circular outer case 2207. When energized, the LEDs 2407 provide a power-ON indication to the user.

Referring to FIGS. 27-30 a magnetic manual user interface device 2700 has a centrally situated annular magnet 2704 that sits within a carrier 2714, and is secured by a central screw 2725. A plurality of floating disk-shaped roller magnets 2706 roll and cog against the carrier 2714 in contact with the scalloped outer edge of the carrier 2714. The magnetic manual user interface device 2700 also utilizes a plurality of non-floating cylindrical magnets 2716. A Jog-pad 2702 is retained within an outer case 2710 which is fastened to a PCB 2708 by a plurality of screws 2727. A user can rotate the jog-pad 2702 clockwise or counter-clockwise, depress the jog-pad 2702 in any direction, or move it horizontally forward and back, left or right. The magnetic resistance of the floating disk-shaped roller magnets 2706 to being displaced provides tactile feedback when moving the jog-pad 2702. The user feels spring-like resistance whether rotating, depressing, or tilting the jog-pad 2702 to achieve the effects of scrolling, panning, selecting, etc. The tactile feedback results from magnetic suspension of the jog-pad 2702. Both the floating disk-shaped roller magnets 2706 and the non-floating cylindrical magnets 2716 are captured by and move with the jog-pad 2702. The magnets 2706 and 2716 fit into pockets 2701 and 2703, respectively, molded in the underside of the jog-pad 2702. The floating disk-shaped roller magnets 2706 have limited freedom of radial movement while the non-floating cylindrical magnets 2716 do not.

Figure 30:
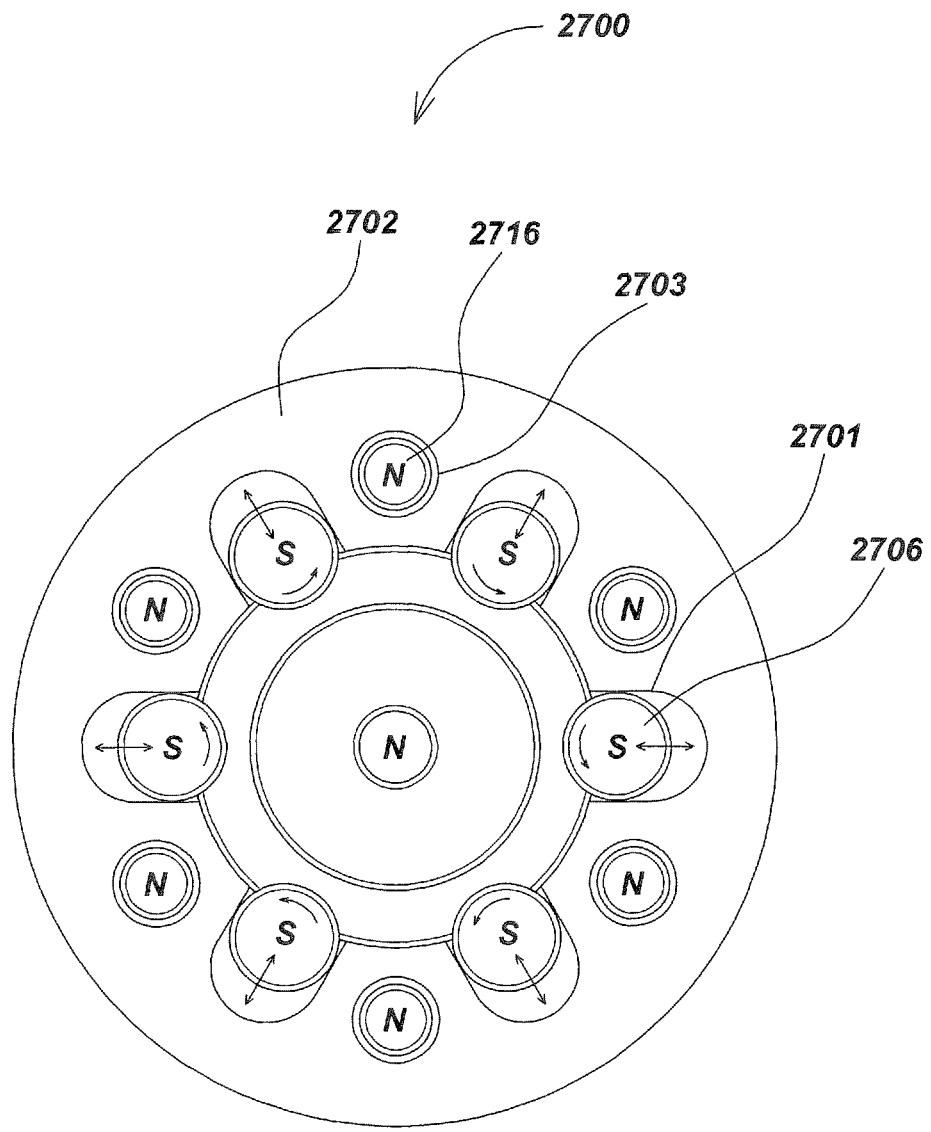
FIG. 30 is a bottom plan view of the embodiment of FIG. 27 illustrating further details of its roller magnets and its fixed magnets and illustrating their relative positions and polarities.

FIG. 30 illustrates the interspersed circumferential arrangement of the floating disk-shaped roller magnets 2706 and the non-floating cylindrical magnets 2716. Pockets 2701 are radially elongated to allow the floating disk-shaped roller magnets 2706 to move radially. Thus the floating disk-shaped roller magnets 2706 have limited freedom of motion within their corresponding pockets 2701, i.e. the floating disk-shaped roller magnets 2706 can move toward and away from the center of the annular magnet 2704. The floating disk-shaped roller magnets 2706 can also rotate freely about their own vertical axes clockwise and counter-clockwise as the jog-pad 2702 is rotated. The floating disk-shaped roller magnets 2706 are laterally constrained by the edges of the pockets 2701. The non-floating cylindrical magnets 2716 are constrained against movement in their respective pockets 2703 in all directions. A dome-switch (not illustrated) may be mounted underneath the central axis of the jog-pad 2702 and manually actuated by depressing the jog-pad 2702.

Figure 31:
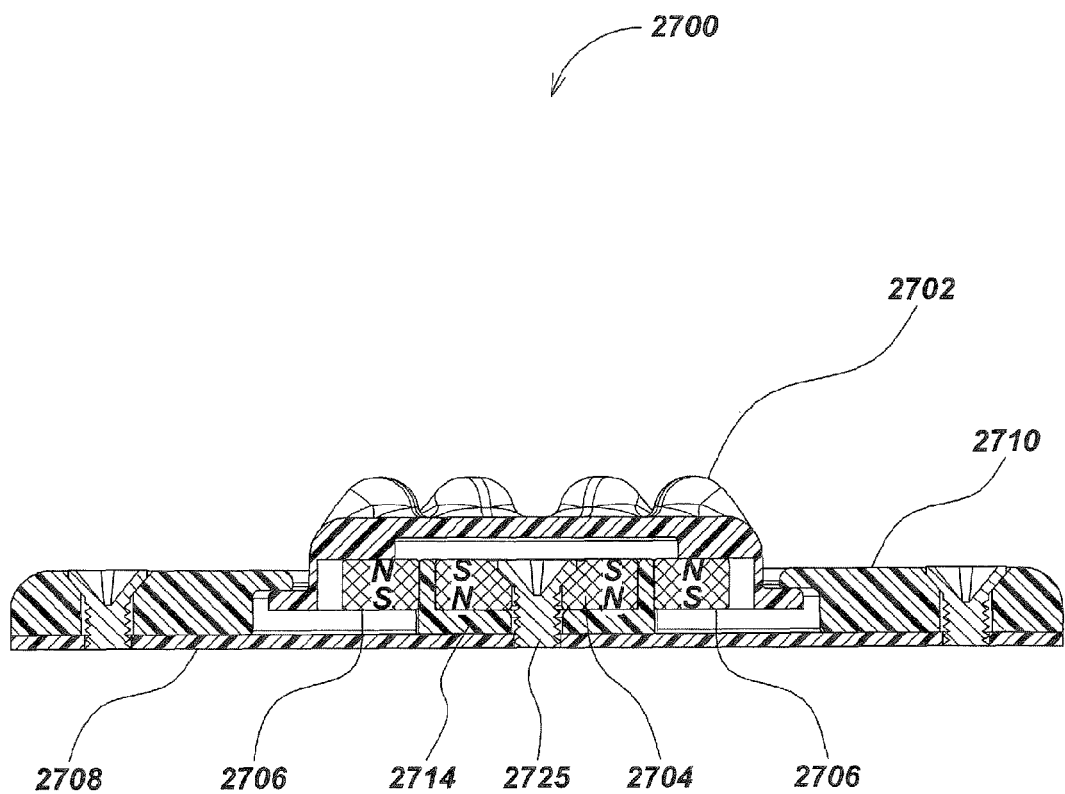
FIG. 31 is a vertical sectional view taken along line 31-31 of FIG. 27.

FIG. 31 further illustrates the relationship between the jog-pad 2702, the carrier 2714, the floating disk-shaped roller magnets 2706, the annular magnet 2704, the outer case 2710 and the PCB 2708. The magnetic fields of the non-floating cylindrical magnets 2716 mounted to jog-pad 2702 causes the measurements of the magnetic sensors (not illustrated) to vary as jog-pad 2702 is moved. A plurality of magnetic sensors (not illustrated) may be situated on either face of the PCB 2708 similarly to earlier embodiments.

Figure 32:
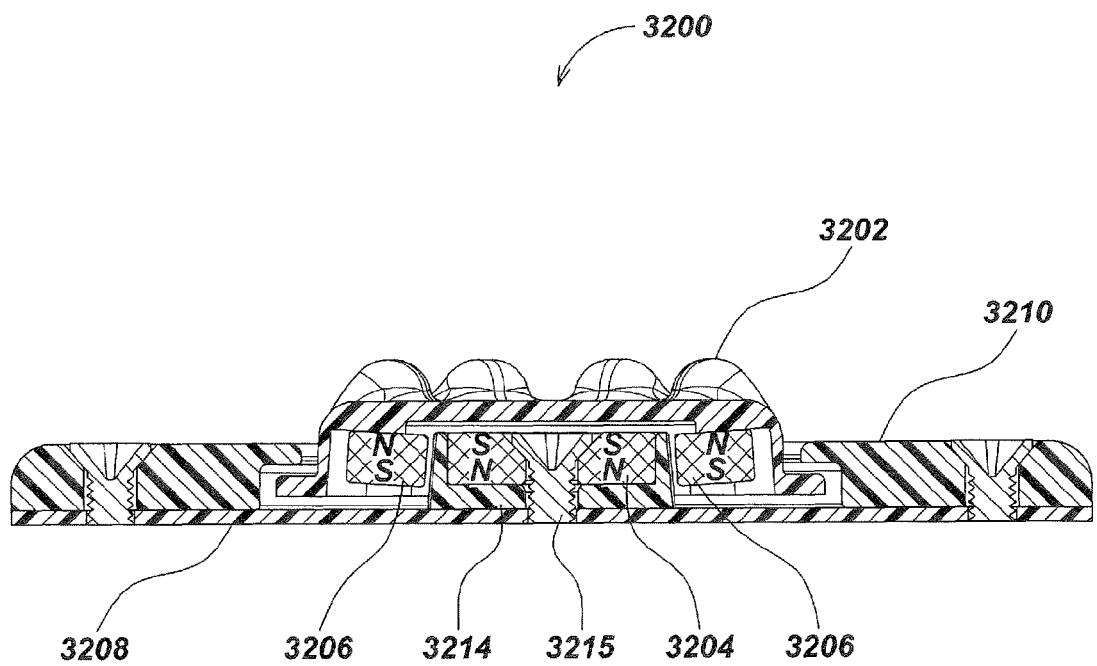
FIG. 32 is vertical sectional view illustrating an alternate form of the embodiment of FIG. 27 in which the roller magnets are angled inwardly toward the central magnet.

FIG. 32 illustrates a magnetic manual user interface device 3200 similar to the magnetic manual user interface device 2700 illustrated in FIGS. 27-30 except that the central axis of each floating roller magnet 3206 is canted at an angle relative to the plane of a carrier 3214. The angle is approximately four degrees relative to the face or plane of an annular magnet 3204. A molded shoulder within each roller magnet receptacle in a jog-pad 3202 constrains the movement of the floating roller magnets 3206. The jog-pad 3202 is mounted and constrained within a case 3210 by a molded shoulder in the case 3210. A PCB 3208 is attached to the annular magnet 3204 and the case 3210 by a plurality of screws 3215. This configuration provides a novel tactile sensation to rotation or depression of the jog-pad 3202. Because of the angle of the floating roller magnets 3206, a vertical component is added to the cogging action when the floating roller magnets 3206 are alternately forced outward by the ridges of the scalloped edges of the carrier 3214 and returned by magnetic attraction.

Figure 33:
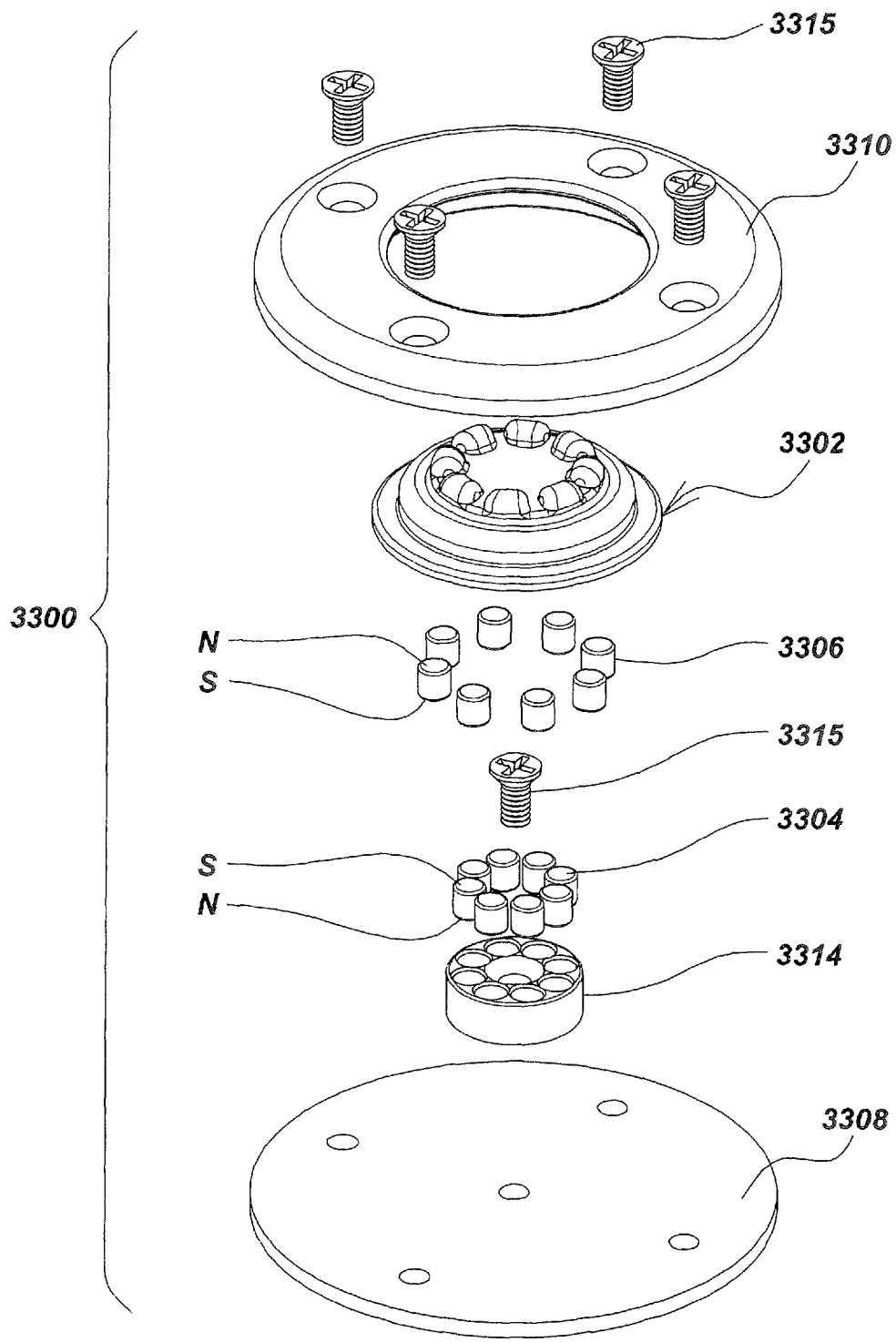
FIG. 33 is an exploded isometric view from the top side illustrating an alternate embodiment that utilizes a circular configuration of cylindrical magnets in place of the annular magnet.

Referring to FIG. 33, a magnetic manual user interface device 3300 includes a plurality of non-floating cylindrical magnets 3304 disposed in a ring or circular arrangement instead of the annular magnet (such as annular magnet 2704 in the embodiment of FIG. 31) surrounded by floating roller magnets 3306. The net magnetic field produced by the non-floating cylindrical magnets 3304 and the floating roller magnets 3306 may be measured by one or more magnetic sensors (not illustrated) which may be interpreted into displacement information by interface circuitry and/or interface software. The non-floating cylindrical magnets 3304 are seated in cylindrical cups molded in a plastic carrier 3314. A plurality of floating roller magnets 3306 are held in pockets 3301 (FIG. 34) molded into jog-pad 3302 and roll across the outer cylindrical surface of the carrier 3314 as the jog-pad 3302 is rotated. Non-floating magnets (not illustrated) may be positioned in similar pockets (not illustrated) in the jog-pad 3302. A case 3310 and the carrier 3314 are attached to a PCB 3308 by means of five screws 3315, thus retaining jog-pad 3302, carrier 3314, floating roller magnets 3306, and non-floating cylindrical magnets 3304.

Figure 34:
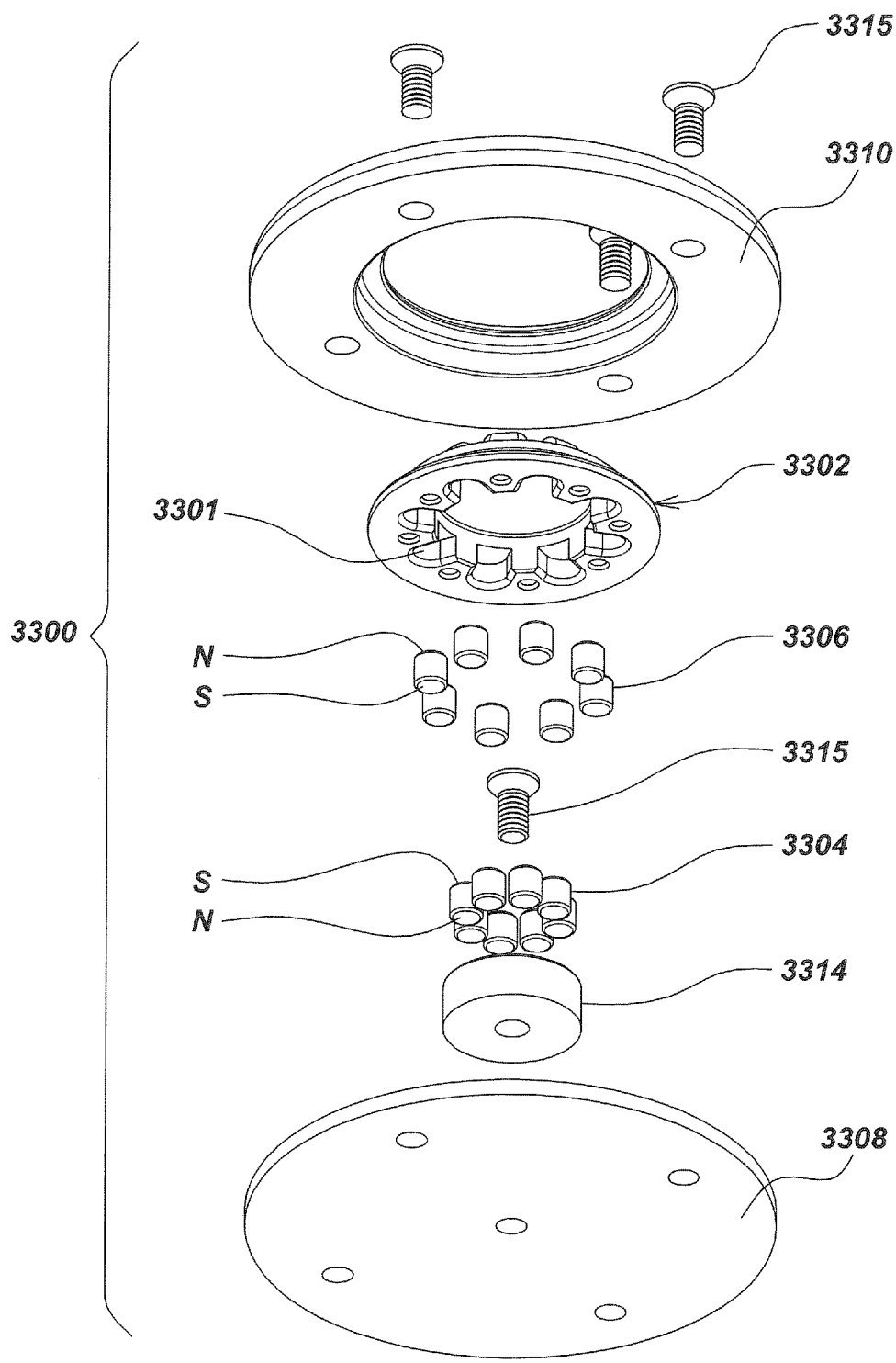
FIG. 34 is an exploded isometric view from the bottom side of the embodiment of FIG. 33.

Referring to FIG. 34, the non-floating cylindrical magnets 3304 are arranged in a circular array in the carrier 3314 and the assembly of individual magnets takes the place of the annular magnet in the various embodiments heretofore described. The non-floating cylindrical magnets 3304 in the carrier 3314 are uniformly oriented with their South poles oriented upward, while the floating roller magnets 3306 are uniformly oriented with their North poles upward.

Figure 35:
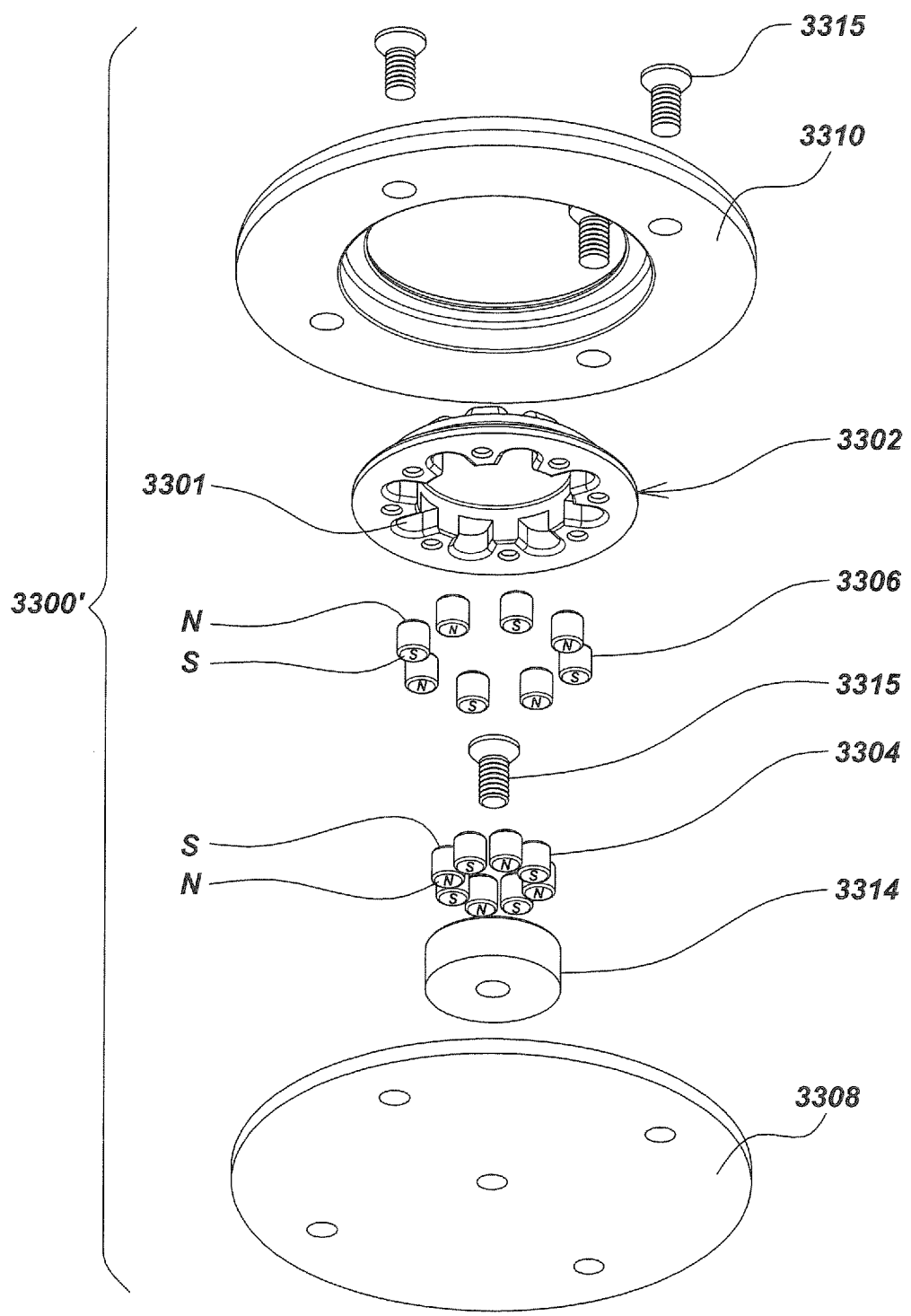
FIG. 35 is a view similar to FIG. 34 with the alternately arranged polarities of the cylindrical magnets denoted with the letters N and S to indicate polarity orientation.

Referring to FIG. 35, in an alternate form 3300' of the magnetic manual user interface device just described the pole orientation of the non-floating cylindrical magnets 3304 alternates, one to the next, from North up to South up. The polar orientation of the floating roller magnets 3306 likewise alternates one to the next. The benefit of this alternating-pole configuration is to provide a more distinct cogging effect as the floating roller magnets 3306 are rotated about the non-floating cylindrical magnets 3304, by reason of the alternating attraction and repulsion between the floating roller magnets 3306 and the non-floating cylindrical magnets 3304.

Figure 36:
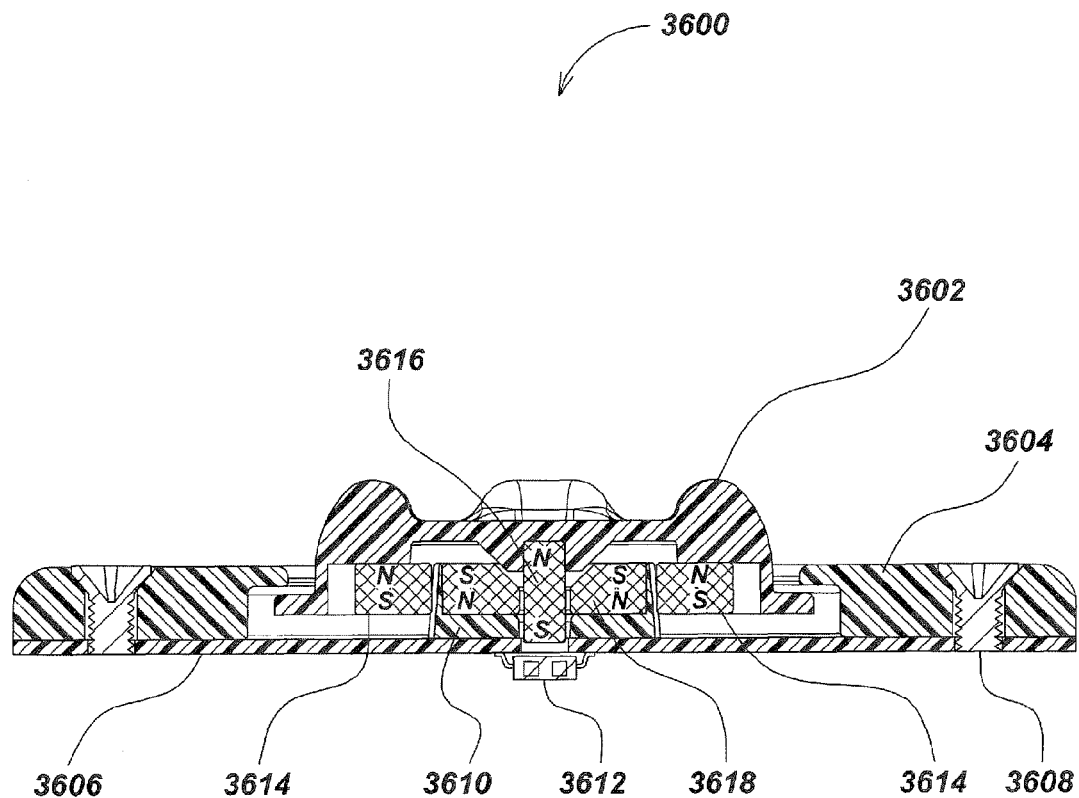
FIG. 36 is a vertical sectional view illustrating an alternate embodiment utilizing roller magnets, a central annular magnet and a cylindrical magnet.

Referring to FIG. 36, a magnetic manual user interface device 3600 includes a manual actuator in the form of a jog-pad 3602, a cylindrical sense magnet 3616 in place of the paddle used in earlier embodiments, and a dual three-axis magnetic sensor 3612 located centrally below the vertical axis of the cylindrical sense magnet 3616. The jog-pad 3602 is supports the cylindrical sense magnet 3616. One or more magnetic sensors measure the net magnetic field to determine the orientation and position of the jog-pad 3602 by means of interface circuitry and/or interface software. The jog-pad 3602 holds multiple floating roller magnets 3614 as well as non-floating cylindrical magnets 3617 (FIG. 38), moved relative to a centrally located annular magnet 3618.

Figure 37:
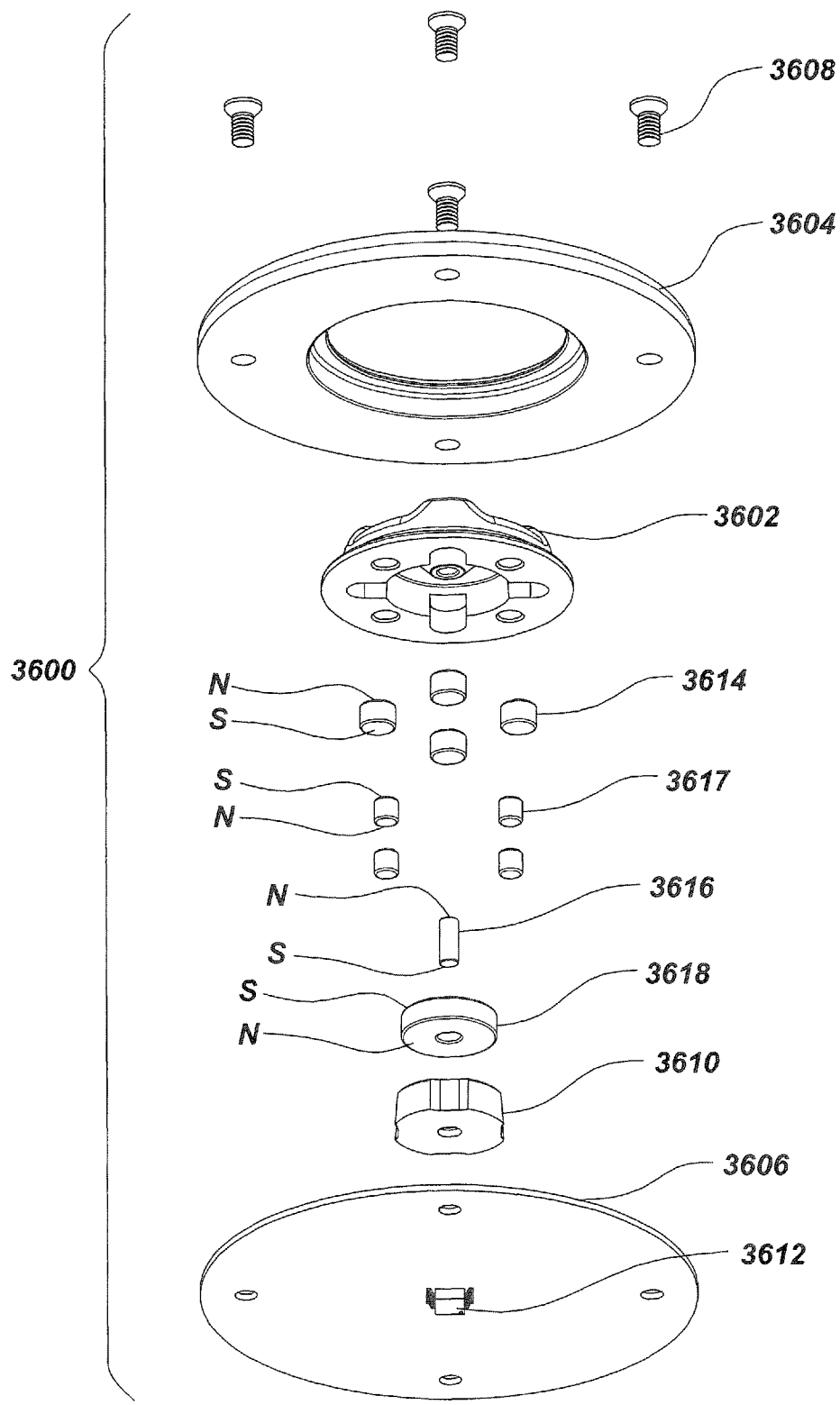
FIG. 37 is an exploded isometric view from the bottom side of the embodiment of FIG. 36.
Figure 38:
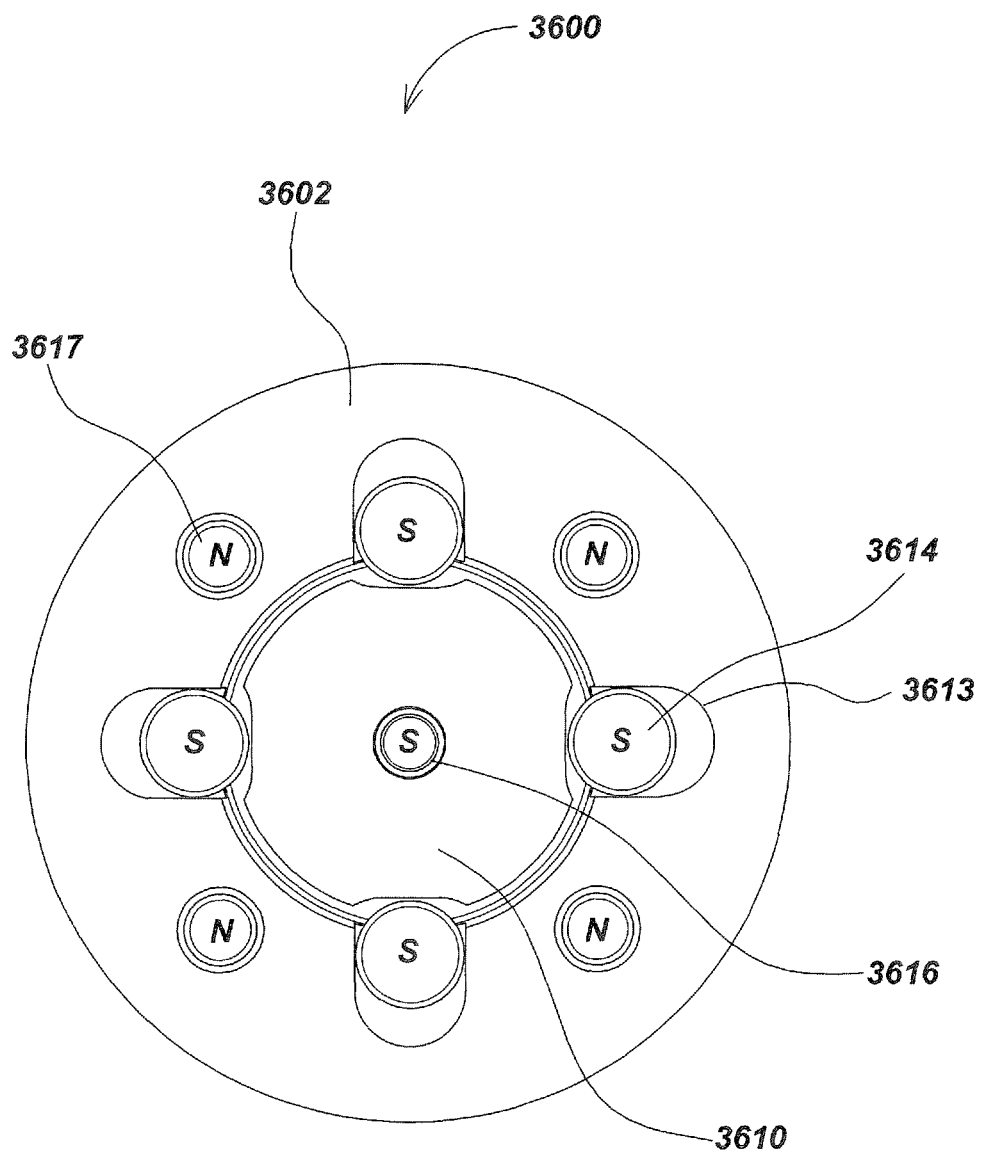
FIG. 38 is a bottom plan view of the jog-pad of the embodiment of FIG. 36.

Referring to FIG. 37, the cylindrical sense magnet 3616 is oriented with its North pole up. The cylindrical sense magnet 3616 is attached into a central pocket in the jog-pad 3602 with a friction-fit or held via suitable attachment means. A plastic carrier 3610 has a central clearance hole into which the lower end of the cylindrical sense magnet 3616 is inserted so that it floats above the dual three-axis magnetic sensor 3612. The carrier 3610 has four scallop-like lobes that are circumferentially distributed, which permit radial displacement and return of the floating roller magnets 3614 within the slots 3613 (FIG. 38) as the jog-pad 3602 is rotated. The cylindrical sense magnet 3616 passes through the central clearance hole of the annular magnet 3618 which is held by the carrier 3610. FIG. 38 illustrates the relative positions and polarities of the cylindrical sense magnet 3616, the floating roller magnets 3614, and the non-floating cylindrical magnets 3617. The floating roller magnets 3614 can move radially in their slots 3613. The non-floating cylindrical magnets 3617 are attached into corresponding round recesses molded in the jog-pad 3602. A bias magnet (not illustrated) could be attached to the lower end of the cylindrical sense magnet 3616. A plurality of screws 3608 hold a PCB 3606 to a case 3604.

Figure 39:
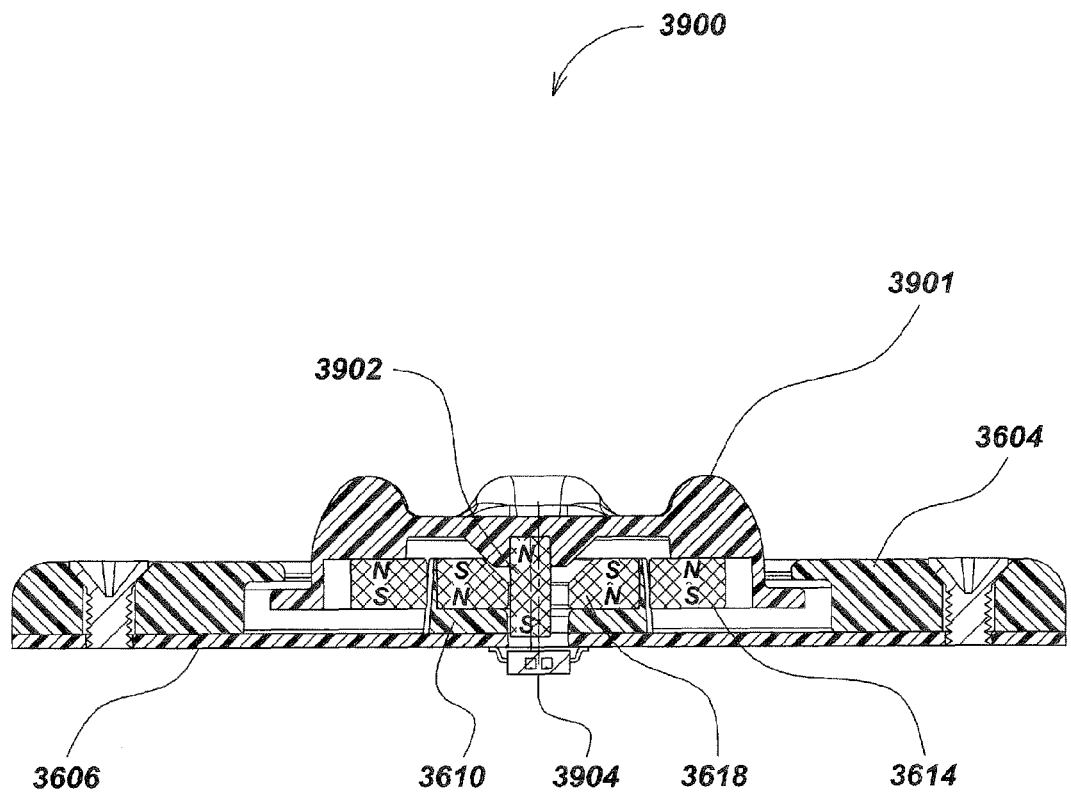
FIG. 39 is a vertical sectional view illustrating an alternate form of the embodiment of FIG. 36 in which the central cylindrical magnet is offset relative to the axis of rotation.

Referring to FIG. 39, a magnetic manual user interface device 3900 includes a jog-pad 3901 that supports an annular magnet 3614 to which it is rigidly attached. The annular magnet 3614 is magnetically aligned and supported by an annular magnet 3618. An offset magnet 3902 is rigidly attached to the jog-pad 3601. The axis of the cylindrical sense magnet 3902 is offset by a predetermined amount from the vertical central axis of jog-pad 3901, giving it a moderately eccentric rotation relative to the vertical central axis of jog-pad 3901. A dual tri-axis magnetic sensor IC 3904 is located below the lower end of the cylindrical sense magnet 3902 and is mounted on the PCB 3606 attached to the case 3604, such that one of the two sensors is approximately coincident with the axis of rotation of the jog-pad 3901. The cylindrical sense magnet 3902 is approximately offset from the same axis of rotation by the spacing of the sensing elements inside the dual magnetic sensor 3904. Each of the sensing elements of the dual magnetic sensor IC 3904 can measure the net magnetic field produced by all magnets. The advantage of using the eccentric alignment of the cylindrical sense magnet 3902 is that it enables digital output data to be interpreted as rotary position of the jog-pad 3901 by means of interface circuitry and/or interface software. Additional magnetic sensors (not illustrated in FIG. 39) may be included in the magnetic manual user interface device 3900 in order to provide more information about changes in position of the jog-pad 3901 and the cylindrical sense magnet 3902 by means of interface circuitry/software. An annular magnet 3618 surrounds the cylindrical sense magnet 3902.

Figure 40:
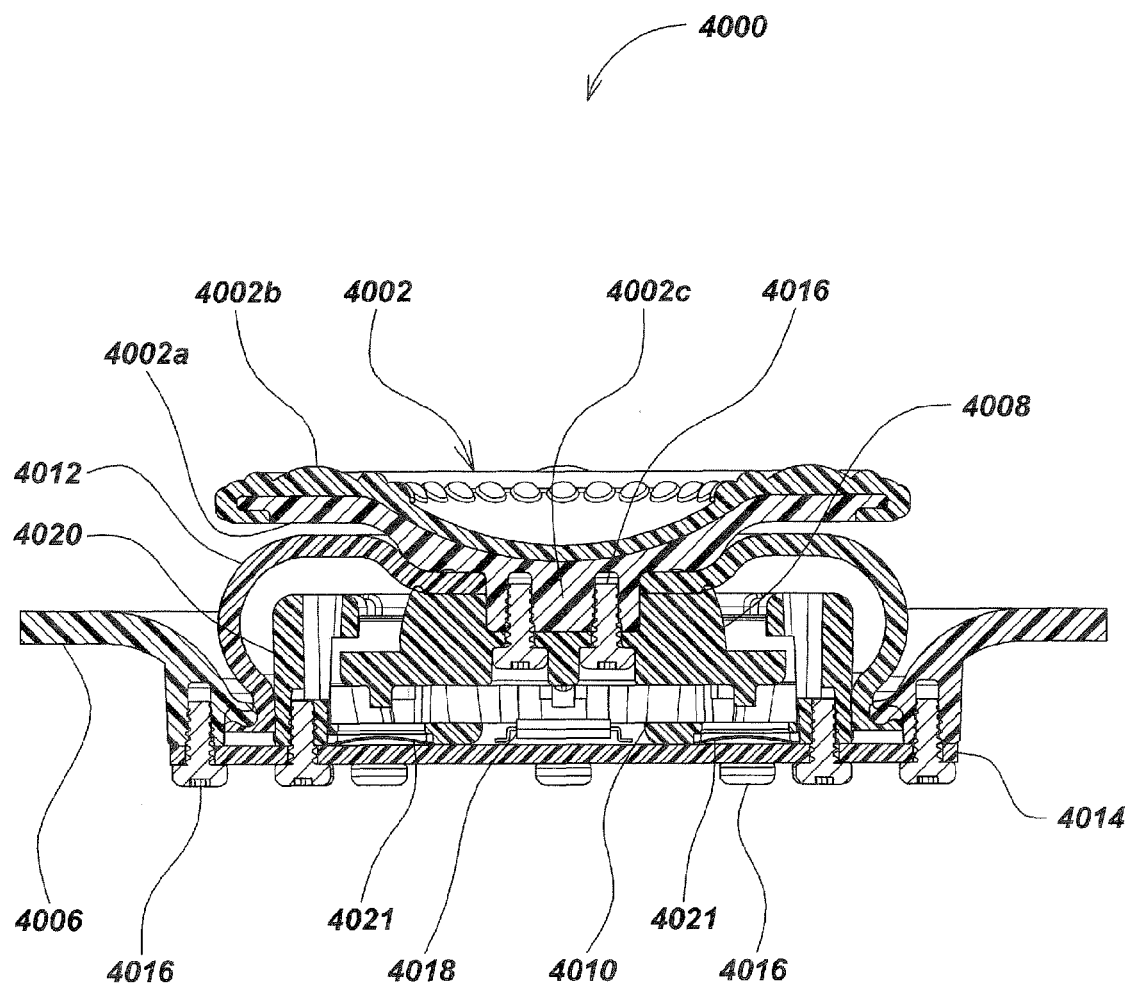
FIG. 40 is a vertical sectional view illustrating another embodiment in which a ring of disk magnets suspends a float.
Figure 41:
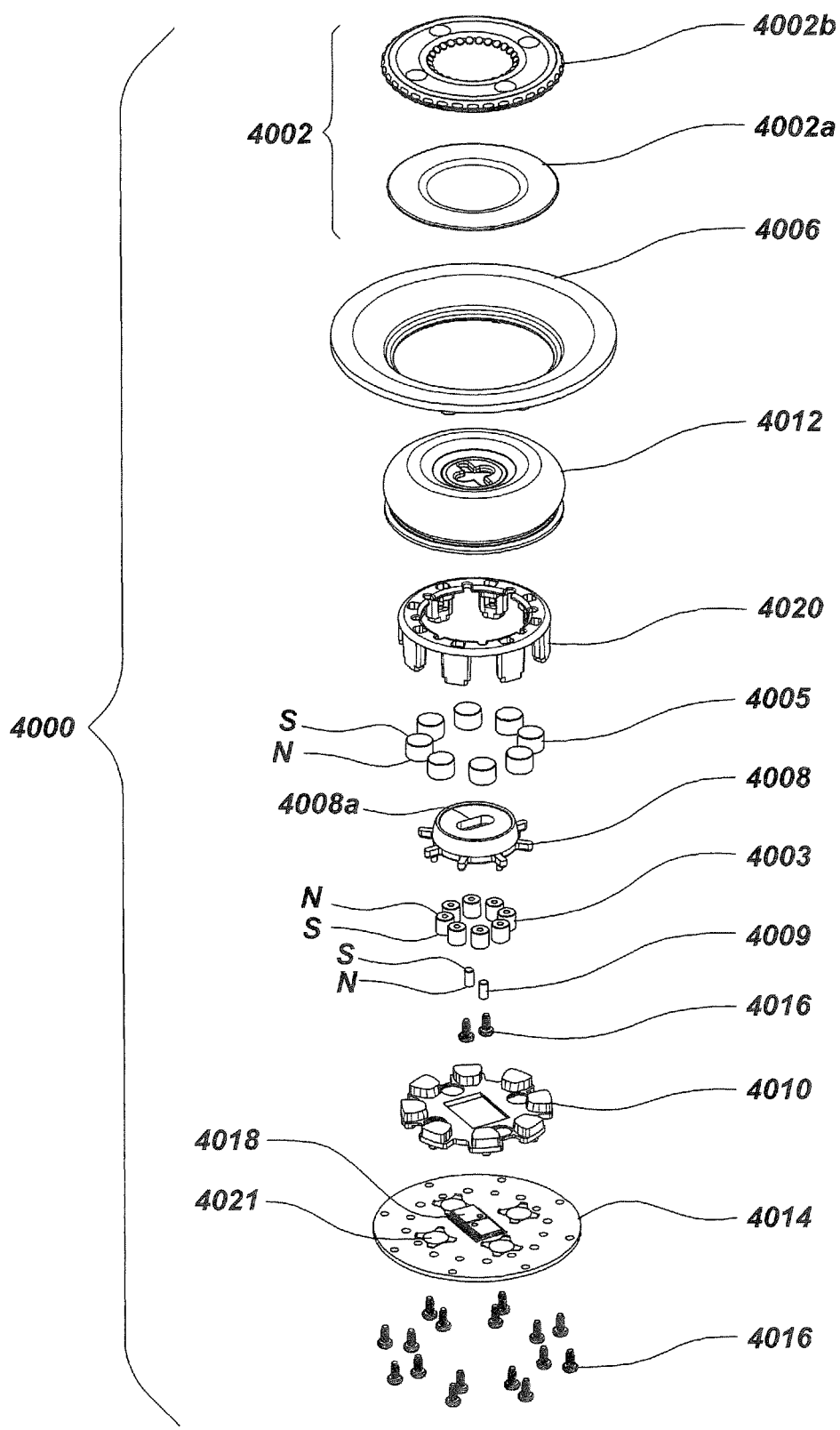
FIG. 41 is a reduced exploded isometric view from the top side of the embodiment of FIG. 40.
Figure 42:
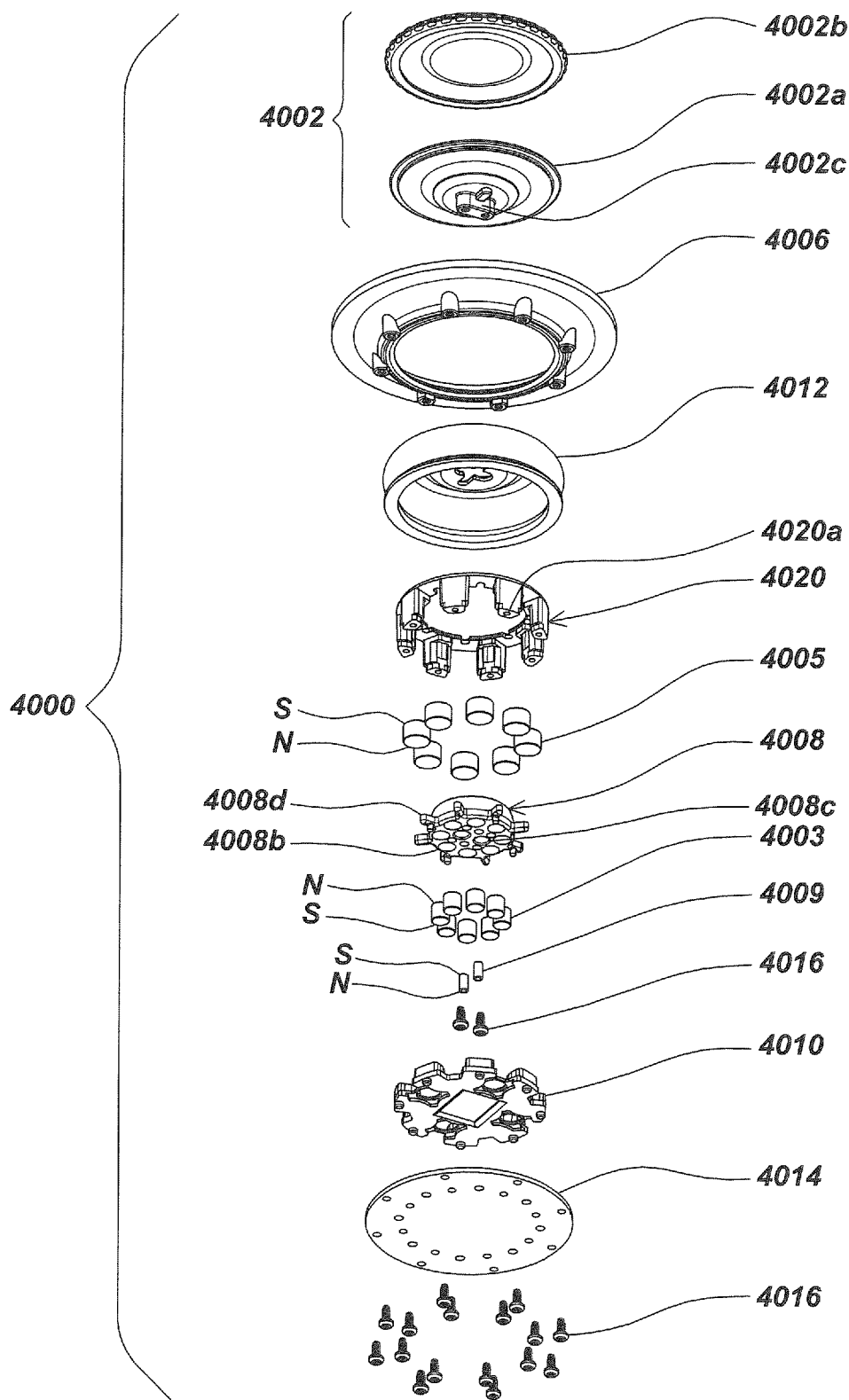
FIG. 42 is a view similar to FIG. 41 taken from the bottom side.

Referring to FIGS. 40-42, a magnetic manual user interface device 4000 includes a manual actuator in the form of a paddle assembly 4002 comprising a rigid plastic paddle base 4002*a* and a soft plastic over-mold 4002*b*. A plastic float 4008 is attached via screws 4016 to the paddle base 4002*a*. A protrusion 4002*c* on the bottom of the paddle base 4002*a* locks into an oval slot 4008*a* (FIG. 41) in the top of the float 4008, after passing through a cruciform opening in the top of a flexible elastomeric boot-seal 4012. The paddle assembly 4002 and the float 4008 are seated centrally within an upper magnet holding ring 4020. The flexible elastomeric boot-seal 4012 surrounds the upper magnet holding ring 4020 and the float 4008 and is centrally seated in an opening molded in the center of a circular case 4006. The paddle base 4002*a* rests on a shoulder molded in the upper surface of boot-seal 4012. The protrusion 4002*c* extends through an opening in the center of the boot-seal 4012 to attach to the float 4008 by a plurality of Plastite® screws 4016.

The float 4008 is approximately circular with eight evenly spaced wings 4008*d* (FIG. 42) protruding from its circumference. The float 4008 is molded with eight evenly spaced circular pockets 4008*b* in its lower portion, each pocket being located equidistant between two of the wings 4008*d* near the circumference of the float 4008. The eight pockets each hold a non-floating inner magnet 4003. In addition, two smaller pockets 4008*c* are molded in the underside of the float 4008 into which two smaller cylindrical sense magnets 4009 are seated to serve as sense magnets providing a varying magnetic field to a pair of magnetic sensors 4018 as the paddle assembly 4002 is moved. The eight inner magnets 4003 and the two sense magnets 4009 move with the float 4008. Eight cylindrical floating outer magnets 4005 in a circular array are moveably situated; one between each pair of wings 4008*d* extending from the float 4008. The floating outer magnets 4005 sit on raised segments molded in the surface of a lower magnet holding ring 4010. The upper magnet holding ring 4020 has an approximately circular configuration with eight descending arms equally spaced around its perimeter. The arms are molded so that they mate with openings along the perimeter of the lower magnet holding ring 4010 and contain the floating outer magnets 4005 within a limited region on their supporting segments. Upper magnet holding ring 4020 is secured to lower magnet holding ring 4010 and a PCB 4014 by screws 4016 into holes 4020*a* in the upper magnet holding ring 4020.

The float 4008 retains the inner magnets 4003 and the two cylindrical sense magnets 4009 by press fit, and is attached by screws 4016 to the paddle assembly 4002. The paddle assembly 4002 can turn clockwise or counter-clockwise to a limited degree. It can also move laterally left, right, forward, and backward or to any angle between to a limited degree. It can also move vertically when depressed by the user. Four of the eight wings 4008*d* molded into the float 4008 have stubs descending from their ends in this embodiment which serve to actuate one or more dome-switches 4021 directly beneath the stubs and mounted on the PCB 4014. Thus the user may execute a top, bottom, left or right "click" command by actuating a single dome-switch 4021, or a center "click" command by depressing the paddle assembly 4002 centrally and actuating all four dome-switches 4021 at approximately the same moment. The PCB 4014 also supports the magnetic sensors 4018 and associated circuitry, and is attached by an outer ring of eight screws 4016 to the outer case 4006. An inner ring of eight similar screws 4016 attaches the PCB 4014 to the lower magnet holding ring 4010.

When the user displaces the paddle assembly 4002 in any of six degrees of freedom, the net magnetic field is measured by the magnetic sensors 4018, each of which is either a single or a dual three-axis magnetic sensor such as the aforementioned Melexis MLX90333. Movement of the float 4008 is counteracted by magnetic forces between the inner magnets 4003, constrained within the float 4008, and the outer magnets 4005 which are constrained with limited motion by the upper and lower magnet holding rings 4020 and 4010, respectively. When the user-applied pressure on the paddle assembly 4002 is removed, the magnetic force restores the float 4008 and the paddle assembly 4002 to an equilibrium position. Two sense magnets 4009 provide additional magnetic fields in closer proximity to the magnetic sensors 4018 and enable greater precision in interpreting user input by means of interface circuitry and/or interface software.

Figure 43:
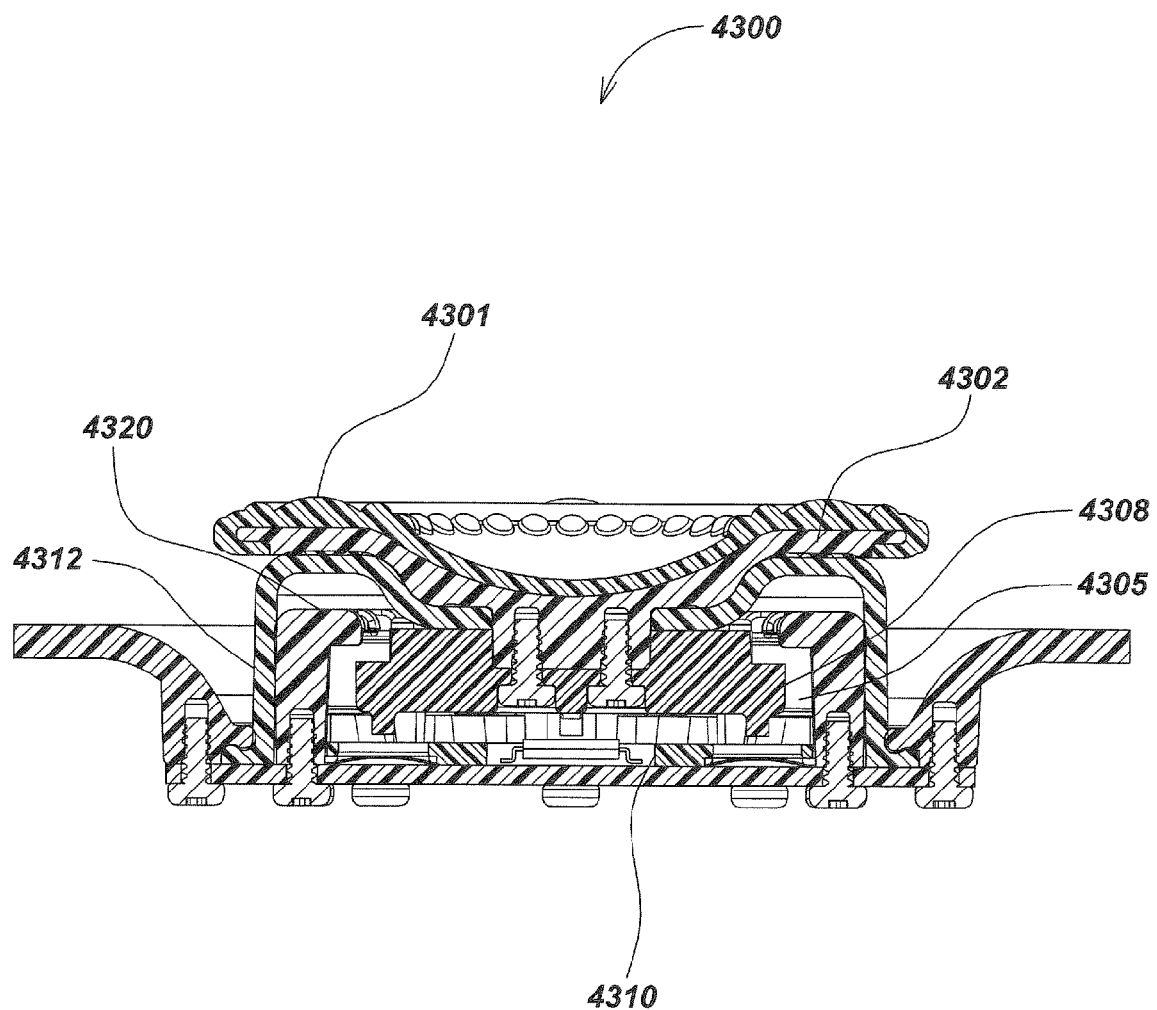
FIG. 43 is a vertical sectional view similar to FIG. 40 illustrating an alternate form with a stiffer cover that provides increased lateral resistance to motion.
Figure 44:
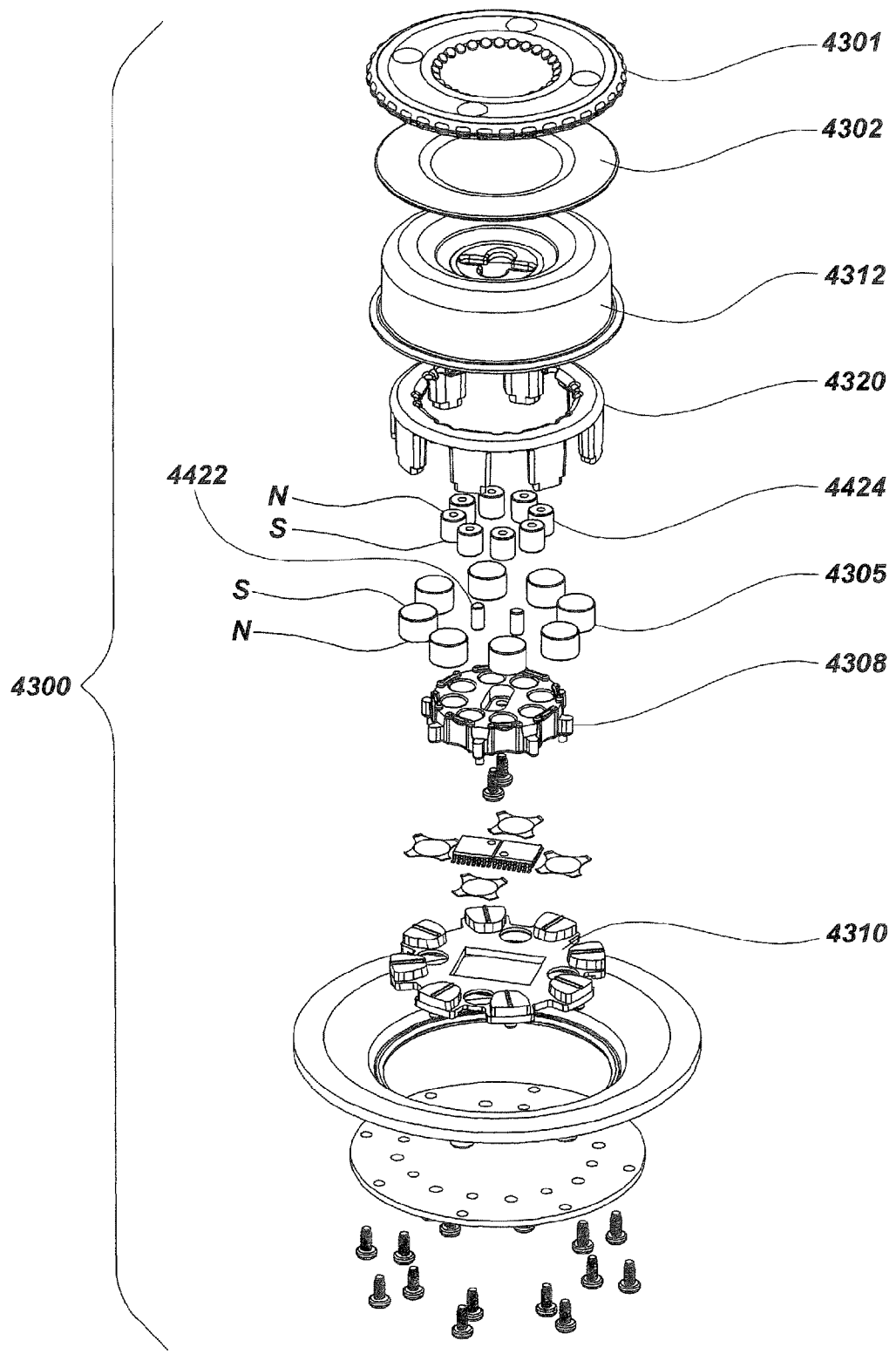
FIG. 44 is a reduced exploded isometric view of the embodiment of FIG. 43.

FIGS. 43 and 44 illustrate a magnetic manual user interface device 4300 similar to the embodiment just described, but with a different boot-seal construction. The magnetic manual user interface device 4300 has a similar paddle over-mold 4301 fitted to a paddle base 4302. A more rigid cover 4312 surrounds a float 4308. A lower magnet holding ring 4310 and an upper magnet holding ring 4320 constrain a plurality of outer magnets 4305. A plurality of inner magnets 4424 and a plurality of sense magnets 4422 are press-fit into openings in a float 4308.

Figure 45:
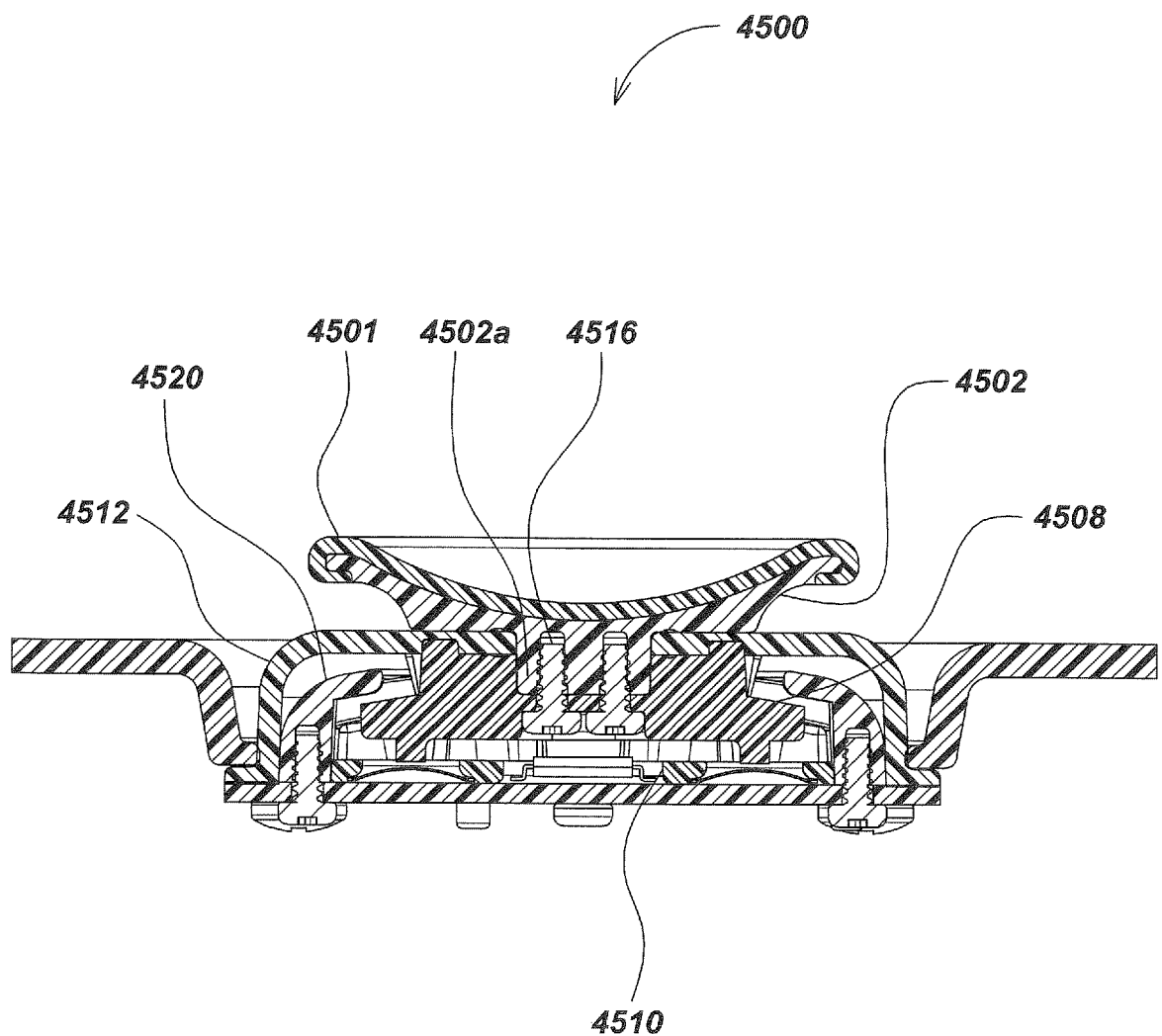
FIG. 45 is a vertical sectional view illustrating an alternate embodiment that includes an outer ring of magnets supported at an angle.
Figure 46:
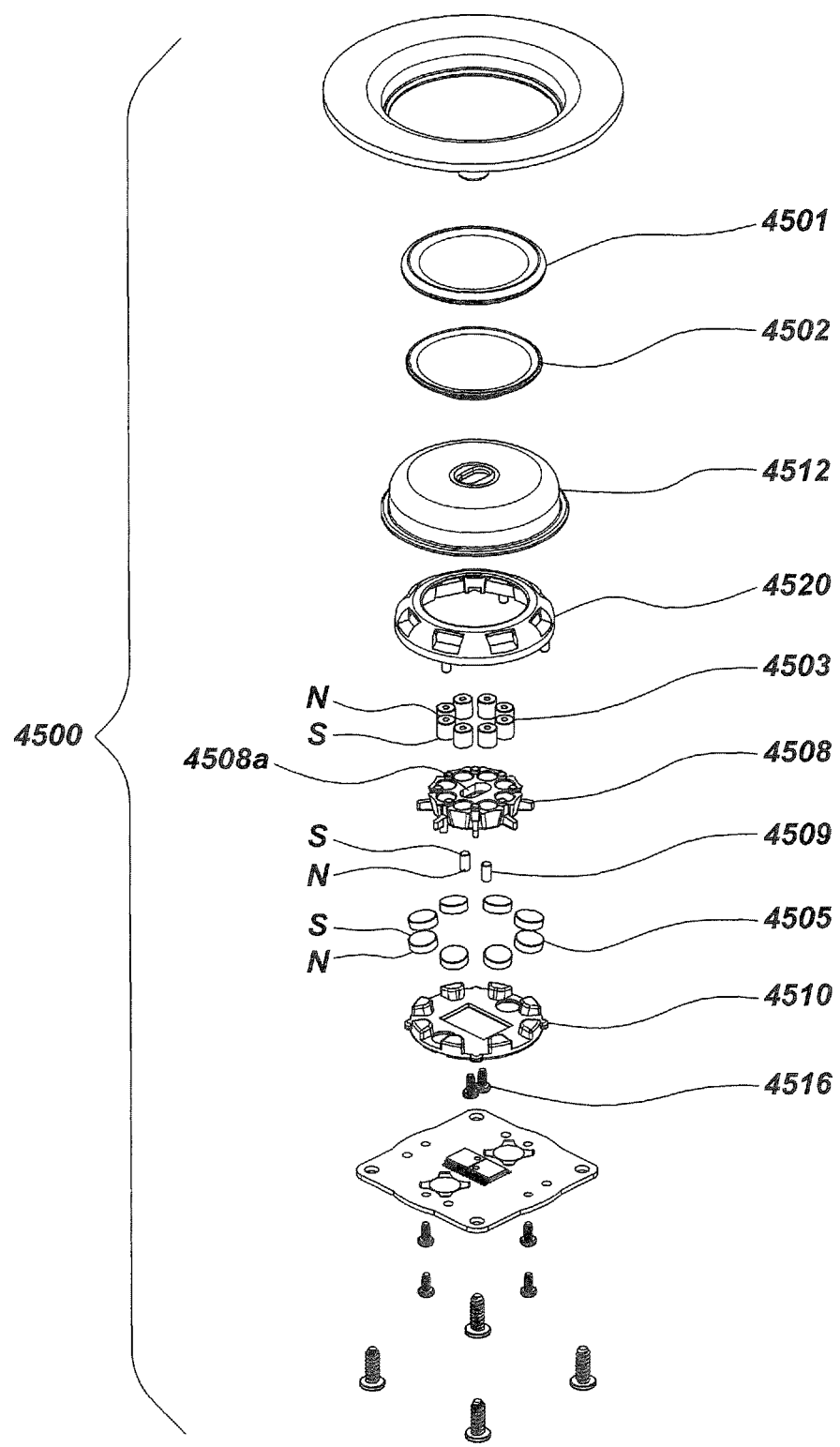
FIG. 46 is a reduced exploded isometric view from the top side of the embodiment of FIG. 45.
Figure 47:
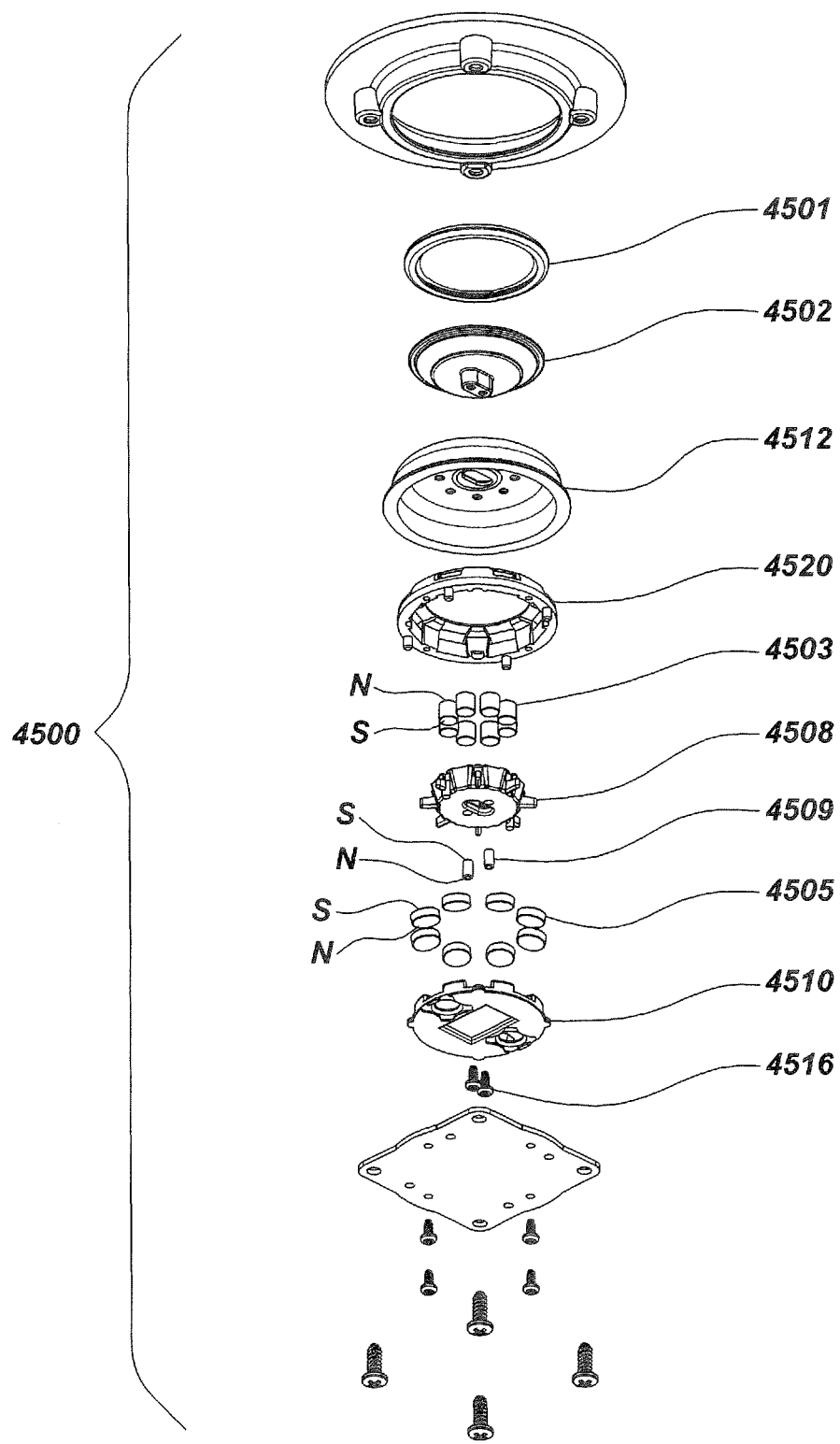
FIG. 47 is a view similar to FIG. 46 from the bottom side.

FIGS. 45-47 illustrate a magnetic manual user interface device 4500 that uses a different configuration of dome-switches or optionally tact switches (not illustrated). The outer magnetic field is configured to allow the a paddle over-mold 4501 and an attached paddle base 4502 of the magnetic manual user interface device 4500 to move downward, outward, and vertically. This is achieved by using outer disk magnets 4505 in a slanted chamber with some degree of movement within the chamber. User manipulation of the magnetic manual user interface device 4500 is achieved by movement of the paddle over-mold 4501 and the attached paddle base 4502. A float 4508 is attached to the paddle base 4502 by two screws 4516. A molded shaft 4502*a* of an approximately oval cross section extends from the paddle base 4502 and fits into a conformably shaped recess 4508*a* in the upper side of the float 4508. A flexible elastomeric boot-seal 4512 is seated around an upper magnet holding ring 4520 which is mated to a lower magnet holding ring 4510, which together constrain a plurality of outer disk magnets 4505. The lower magnet holding ring 4510 and upper magnet holding ring 4520 in turn are seated around the float 4508 which contains a plurality of cylindrical inner magnets 4503 and a plurality of sense magnets 4509. The outer disk magnets 4505 are seated on segments molded in the lower magnet holding ring 4510. These segments are slightly sloped so that the inner side of each outer disk magnet 4505 is raised. The slanted orientation of the eight outer disk magnets 4505 facilitates float 4508 to pan laterally and also downwardly in a single motion.

Figure 48:
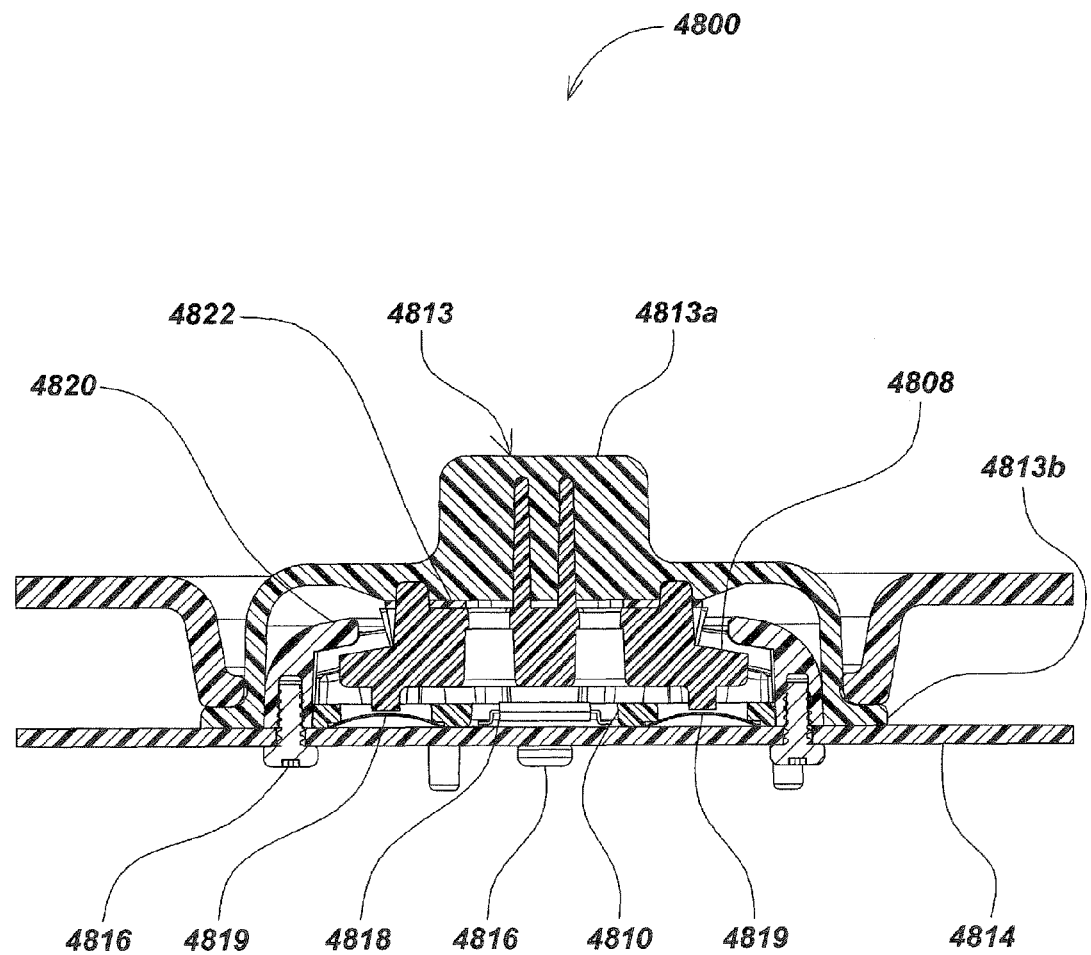
FIG. 48 is a vertical sectional view illustrating an embodiment utilizing a different form of manual actuator with a central upwardly projecting knob.
Figure 49:
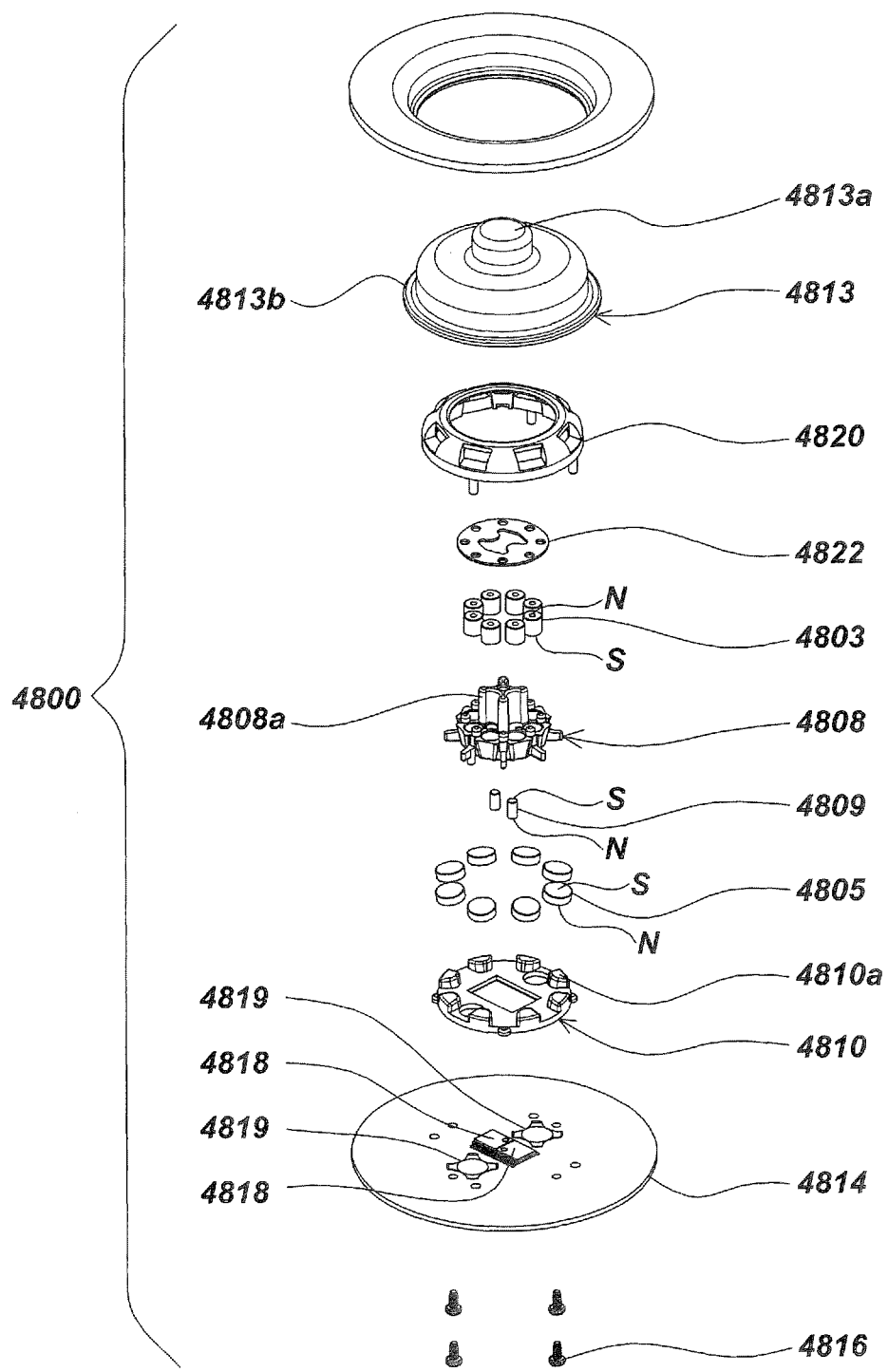
FIG. 49 is a reduced exploded isometric view from the top side of the embodiment of FIG. 48.

Referring to FIGS. 48 and 49, a magnetic manual user interface device 4800 is illustrated wherein the manual actuator 4813 includes an integrally molded central cylindrical cap 4813*a* with a surrounding lower round skirt 4813*b*. A plastic cylindrical float 4808 is molded with four vanes 4808*a* extending outward from its central axis. A series of molded nubs around the perimeter of the float 4808 also mate to corresponding recesses in the manual actuator 4813. Eight cylindrical inner magnets 4803 are contained in receptacles in the float 4808 and are covered by a circular layer of VHB® tape 4822. Two cylindrical sense magnets 4809 are secured within the float 4808 from below by friction fit into matching recesses molded in the float 4808. A lower magnet holding ring 4810 is molded with eight equidistant islands or raised platforms 4810*a* around its perimeter. The upper surface of each of the raised platforms 4810*a* is slanted downwards toward the outside of the lower magnet holding ring 4810. Eight outer disk-shaped magnets 4805 are seated on the upper surface of the raised platforms 4810*a* in the lower magnet holding ring 4810. The lower magnet holding ring 4810 mates with an upper magnet holding ring 4820 which contains the float 4808, the cylindrical inner magnets 4803, and the outer disk-shaped magnets 4805. A PCB 4814 supports a pair of dual tri-axis magnetic sensors 4818 and a pair of dome-switches 4819. The dome-switches 4819 can be depressed by extended nubs molded into the lower surface of two of the axial wings of the float 4808. The outer disk-shaped magnets 4805 nest between pairs of the axial wings in the float 4808 such that the float 4808 has freedom of movement to a limited degree in both lateral and vertical directions. The interaction between the outer disk-shaped magnets 4805 and the cylindrical inner magnets 4803 acts to suspend float 4808 vertically and center it laterally, as well as return it to an equilibrium position after it has been manually displaced. The PCB 4814 is attached by four screws 4816 to the upper magnet holding ring 4820.

Figure 50:
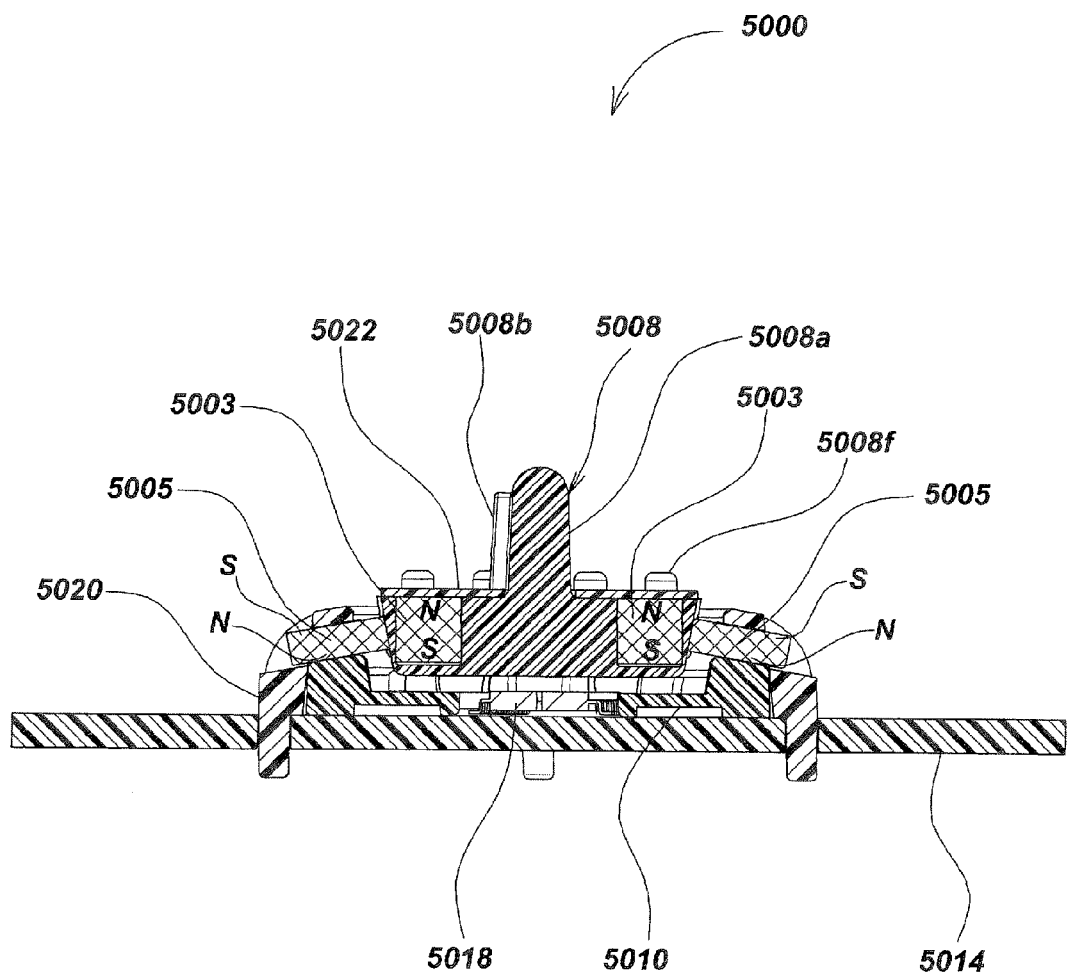
FIG. 50 is a vertical sectional view illustrating an alternate embodiment in which the manual actuator is integrally molded with the float.
Figure 51:
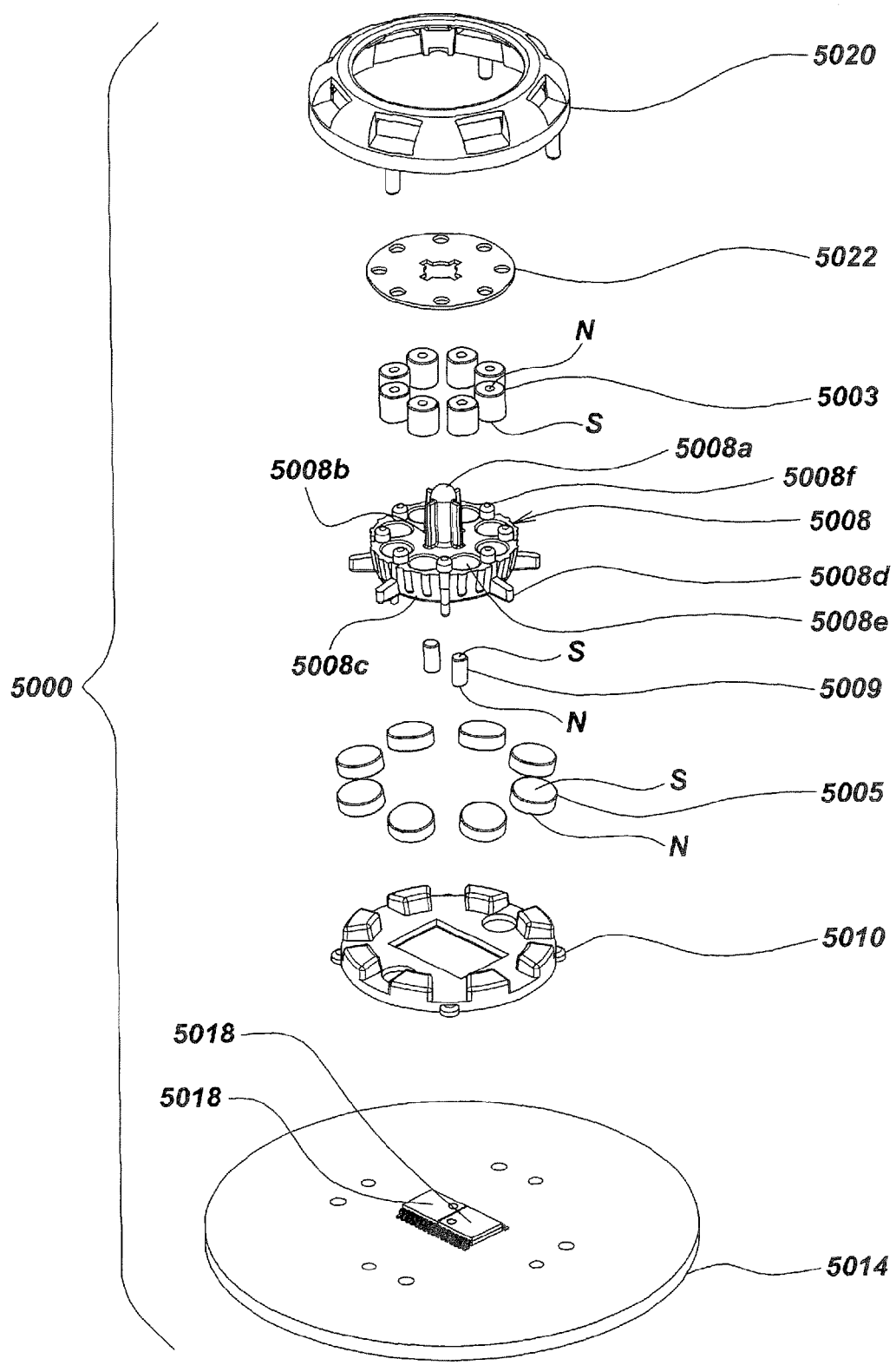
FIG. 51 is an exploded isometric view from the top side of the embodiment of FIG. 50.

Referring to FIGS. 50 and 51 a magnetic manual user interface device 5000 includes a manual actuator 5008 molded with a central vertical shaft 5008*a* from which four radially extending vanes 5008*b* protrude, and a lower cylindrical base 5008*c* (FIG. 51) from which eight wings 5008*d* radially extend equidistantly located around the perimeter of the cylindrical base 5008*c*. The upper surface of the cylindrical base 5008*c* is molded with eight circumferentially spaced recesses 5008*e* that each hold one of eight cylindrical inner magnets 5003 and eight nubs 5008*f* which protrude through corresponding circular holes in a circular layer of VHB® tape 5022. The VHB® tape 5022 provides a bonding surface for the attachment of a boot-seal (not illustrated). An upper magnet holding ring 5020 and a lower magnet holding ring 5010 function in the same fashion as the similar parts illustrated in FIG. 49. The manual actuator 5008 contains the cylindrical inner magnets 5003, while the lower magnet holding ring 5010 supports a plurality of outer magnets 5005 on raised slanted platforms equally spaced around its perimeter. Two dual three-axis magnetic sensors 5018 are mounted on a PCB 5014. The manual actuator 5008 holds the cylindrical inner magnets 5003 and has freedom of motion in six degrees of freedom. After it has been manually moved, the manual actuator 5008 is returned to an equilibrium position by magnetic restoring force. Two cylindrical sense magnets 5009 are attached to the manual actuator 5008.

Figure 52:
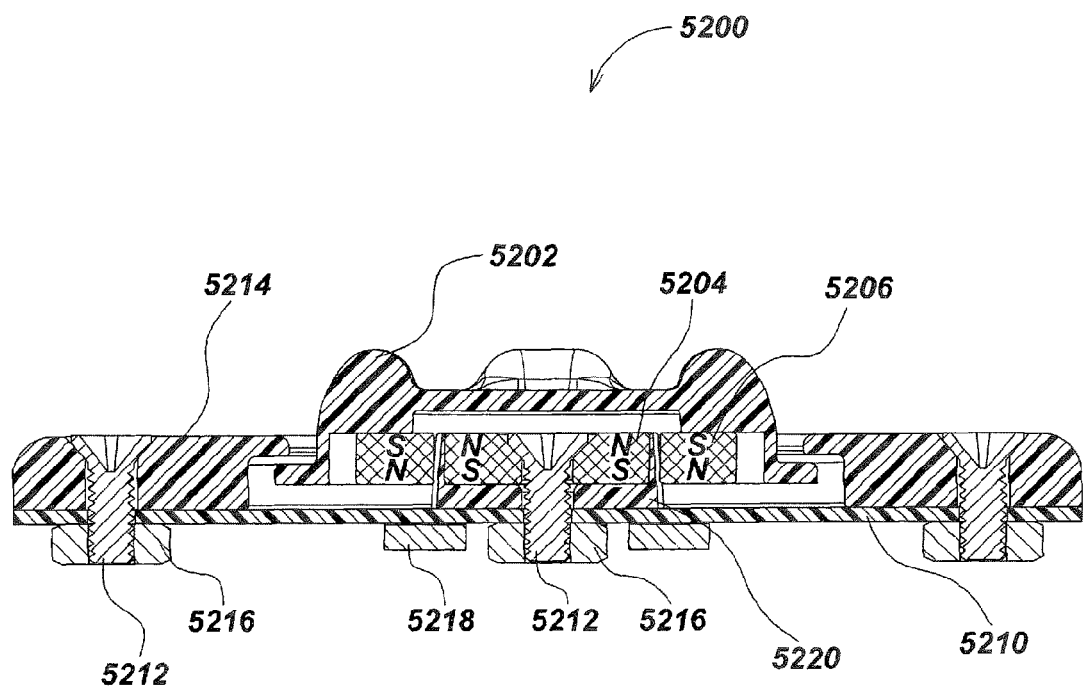
FIG. 52 is a vertical sectional view illustrating an alternate embodiment in which roller magnets move inside a rotatable float.
Figure 53:
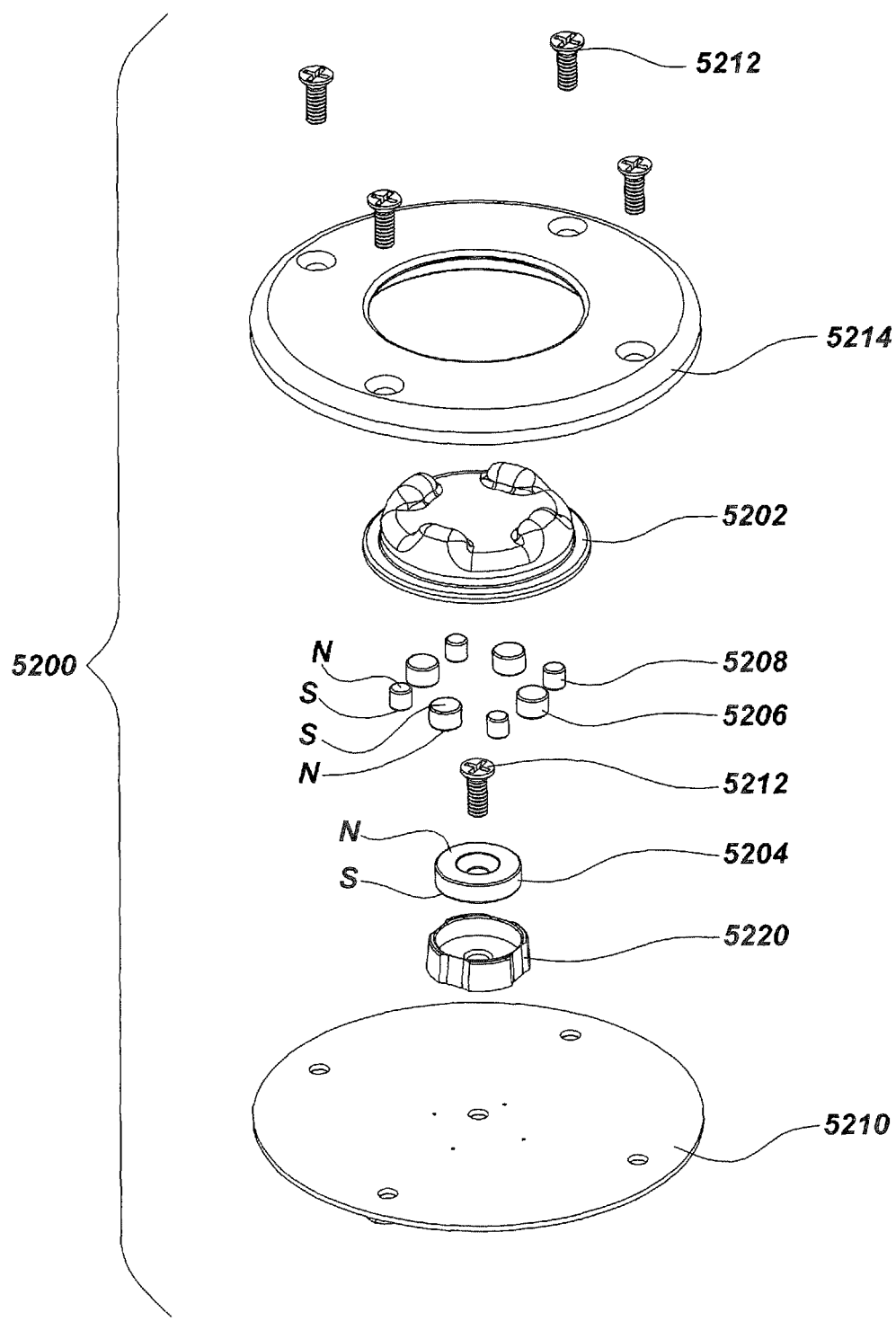
FIG. 53 is an exploded isometric view from the top side of the embodiment of FIG. 52.
Figure 54:
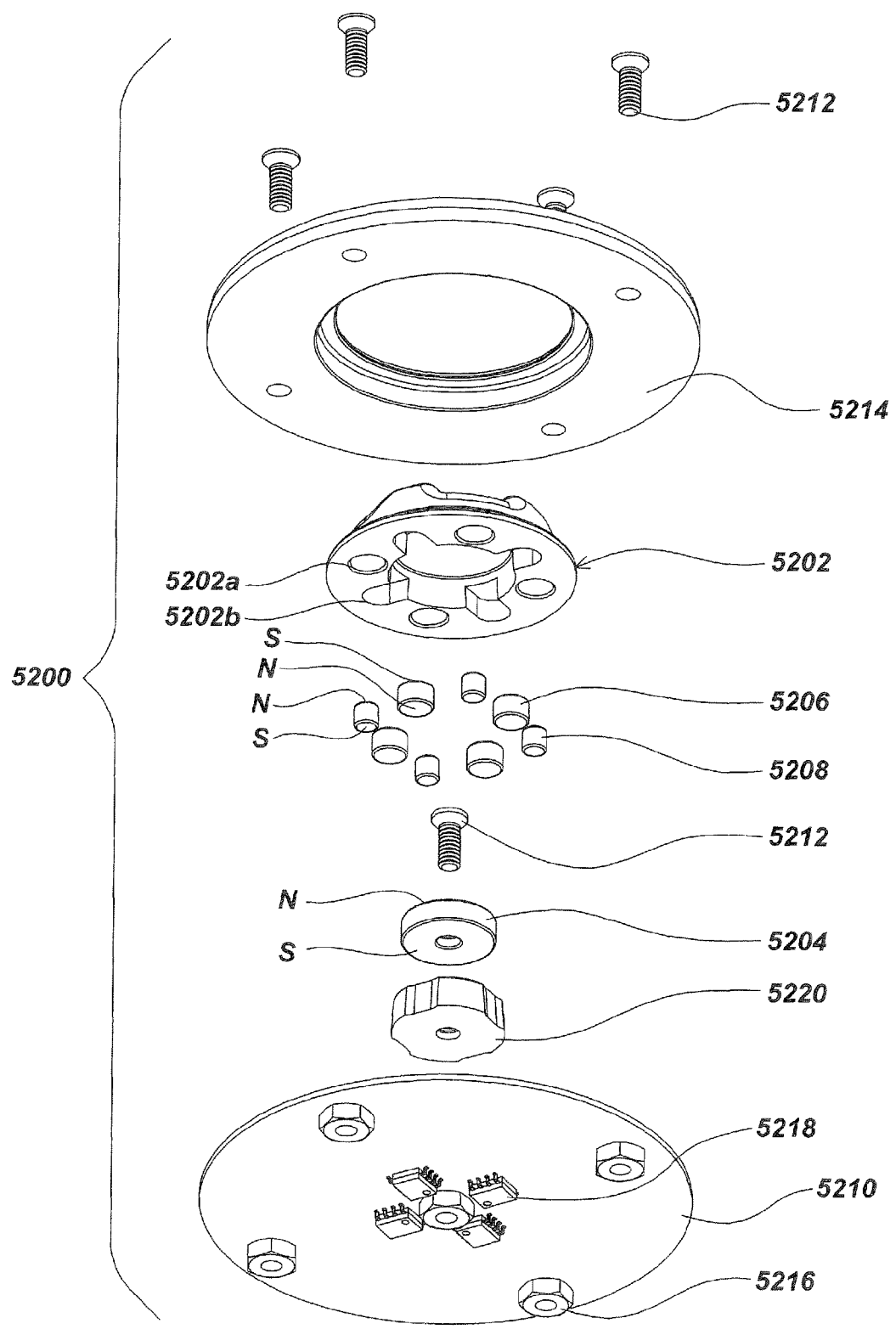
FIG. 54 is a view similar to FIG. 53 from the bottom side.

Referring to FIGS. 52-54 a magnetic manual user interface device 5200 has a low-profile floating manual actuator 5202. Pockets 5202*a* are molded into the underside of the flange between each pair of slots 5202*b*. A ring of four non-floating cylindrical magnets 5208 are seated in four pockets 5202*a*. Four floating disk roller magnets 5206 are free to radially move within four slots 5202*b* which are evenly distributed between the pockets 5202*a*. A molded plastic circular carrier 5220 with four scalloped grooves molded in its perimeter at four equidistant locations, holds an annular magnet 5204 in the pocket of the circular carrier 5220. Four screws 5212 secure a ring-shaped case 5214 to a PCB 5210 and are secured with nuts 5216. A central screw 5212 secures the annular magnet 5204 to its seat in the circular carrier 5220. Four magnetic sensors 5218 are attached to the bottom of the PCB 5210 which is in turn secured to the cover 5214 with a plurality of screws 5212 and nuts 5216.

The floating manual actuator 5202 can be manipulated to pan in all four directions (forward, backward, left, and right) and rotate clockwise and counter clockwise. The floating manual actuator 5202 can also be depressed against the magnetic resistance generated by the interaction of the annular magnet 5204, the floating roller magnets 5206, and the non-floating cylindrical magnets 5208. This depression of the floating manual actuator 5202 can be interpreted as a signal event, such as a click event, by software. The floating roller magnets 5206 are moved outward by the shoulders of the grooves of the circular carrier 5220, and attracted inward by magnetic attraction between the floating roller magnets 5206 and the annular magnet 5204. Their particular location at any degree of rotation, combined with the locations of the non-floating cylindrical magnets 5208 contained in the floating manual actuator 5202, provides a magnetic signature as measured by the magnetic sensors 5218 for every location of the floating manual actuator 5202 in rotation, panning, or depression.

Figure 55:
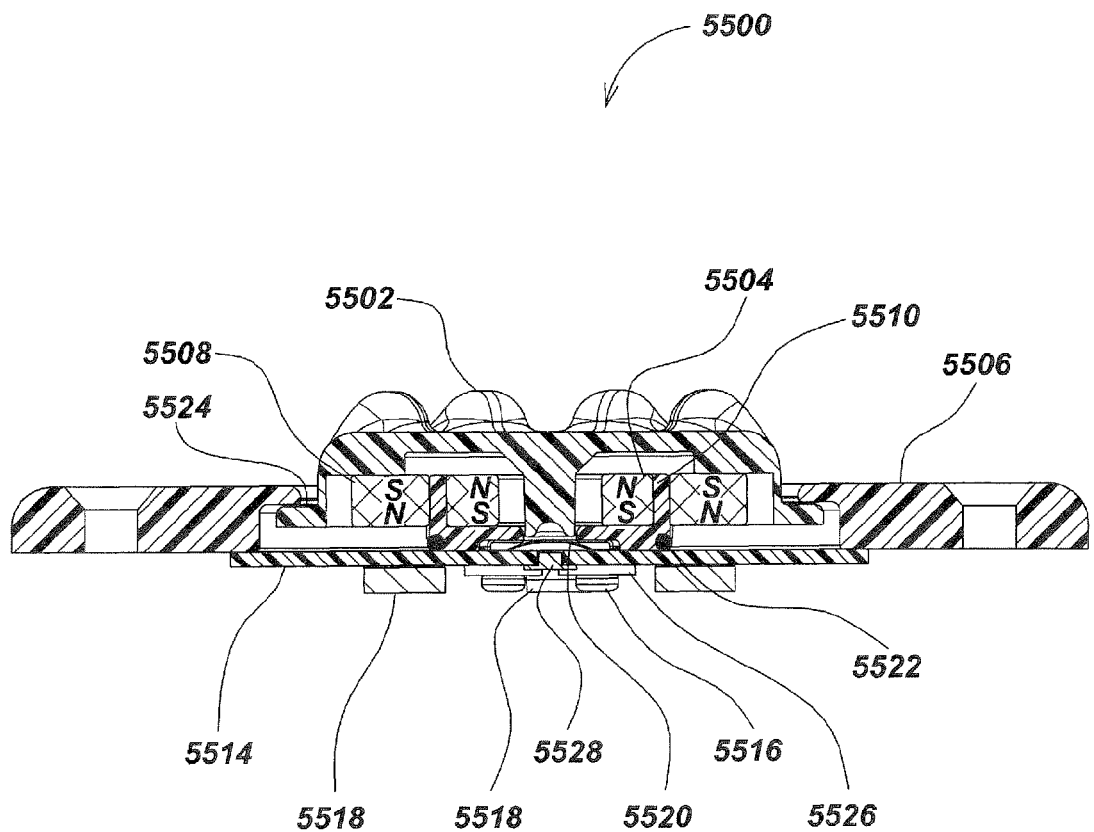
FIG. 55 is a vertical sectional view illustrating an alternate embodiment that utilizes six roller magnets and six relatively fixed magnets positioned around an annular magnet.
Figure 56:
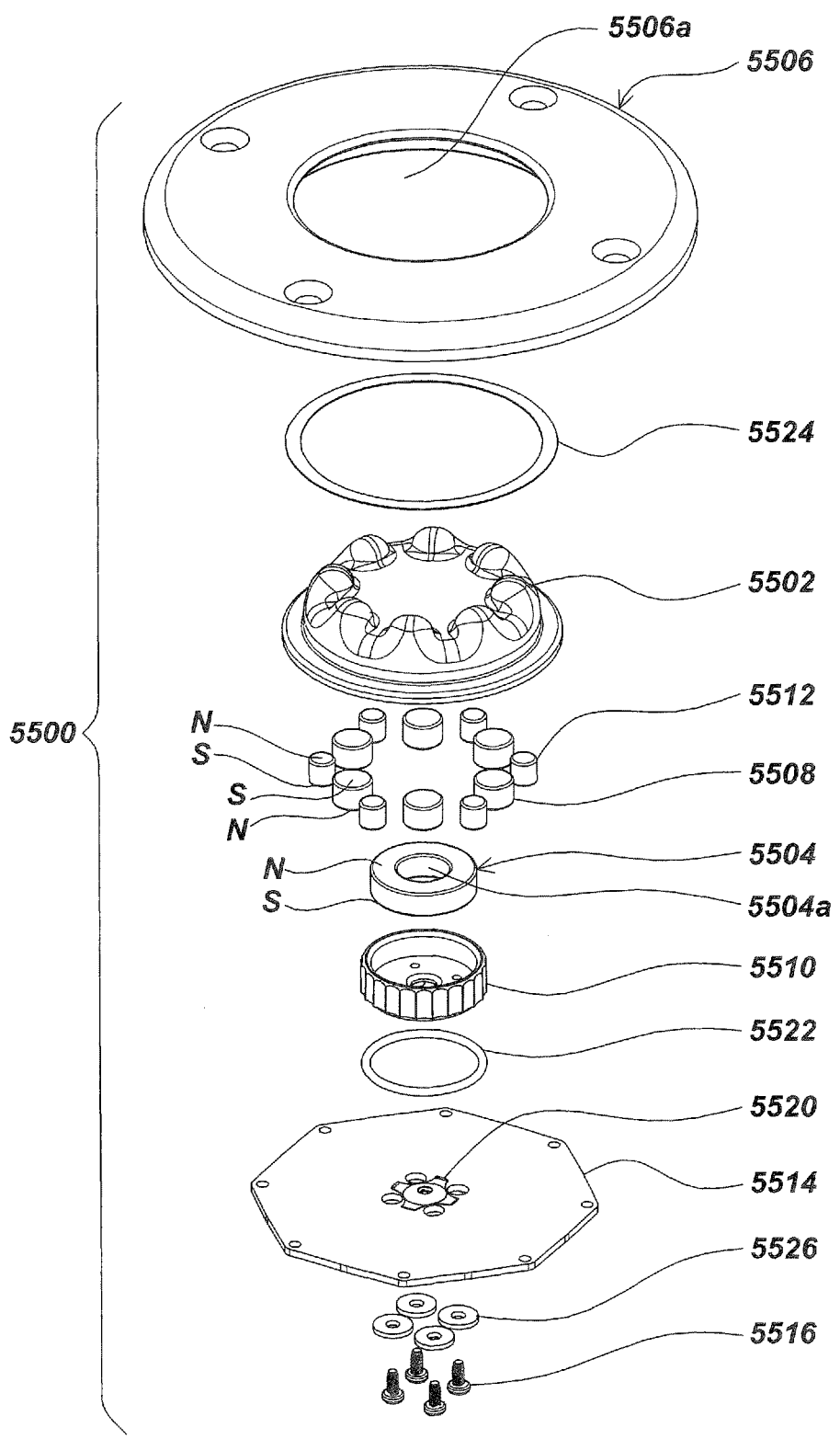
FIG. 56 is a reduced isometric exploded isometric view from the top side of the embodiment of FIG. 55.
Figure 57:
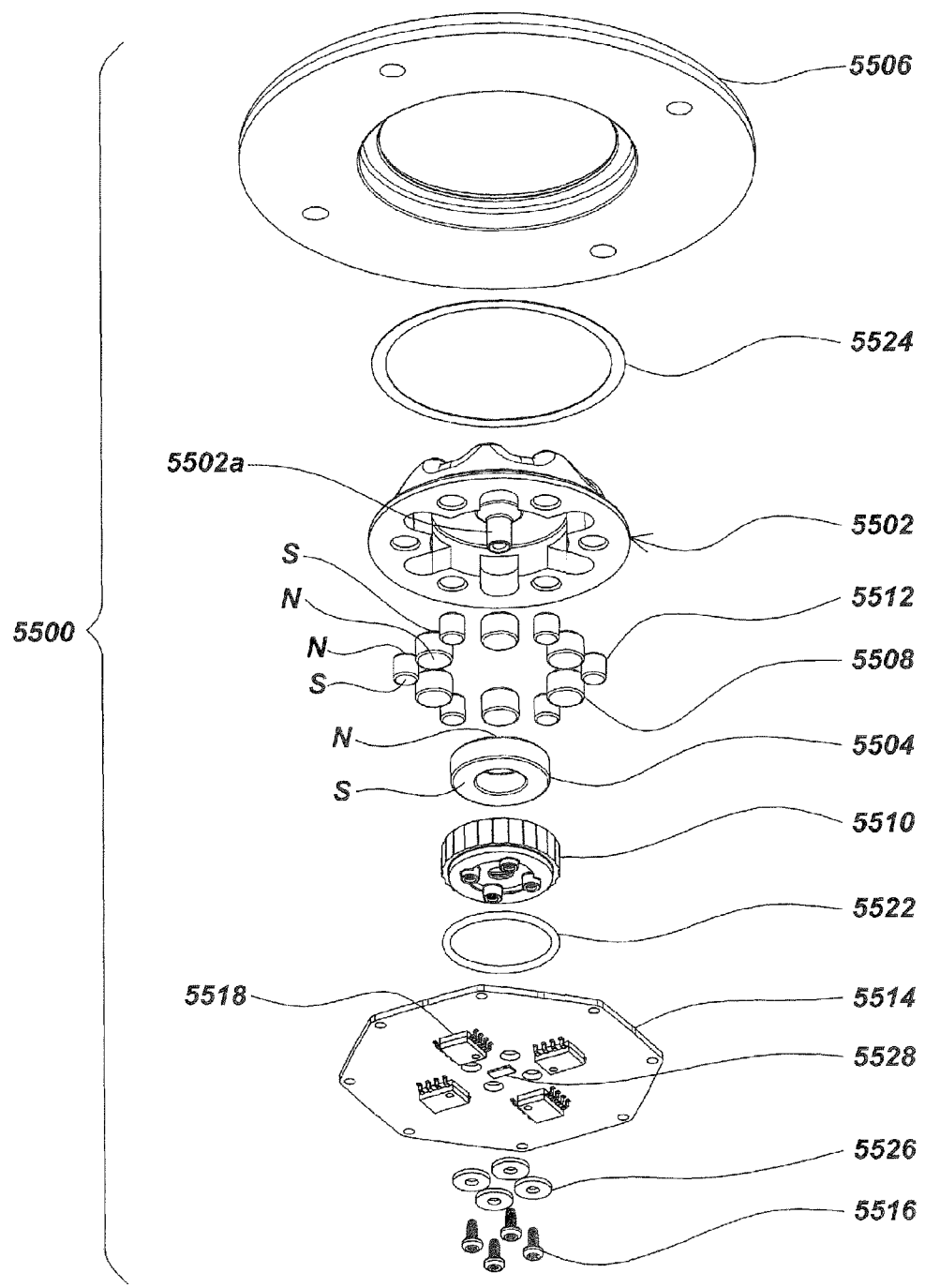
FIG. 57 is a view similar to FIG. 56 from the bottom side.

Referring to FIGS. 55-57 a magnetic manual user interface device 5500 includes a cylindrical carrier 5510 with a finely scalloped surface along its entire perimeter, and also includes a large number of floating roller magnets 5508 and non-floating cylindrical magnets 5512. A manual actuator 5502 also serves as a magnet capture ring, which retains six floating roller magnets 5508 in slots and non-floating cylindrical magnets 5512 in circular recesses molded in its lower surface. A cylindrical carrier 5510 is fitted into a circular central recess in the manual actuator 5502. An annular magnet 5504 with a circular bore 5504a through its center is attached to the carrier 5510. A molded cylindrical central extension 5502a in the manual actuator 5502 fits through the bore 5504a of the annular magnet 5504. A PCB 5514 is attached to the carrier 5510 with screws 5516 and washers 5526. O-ring 5522 serves as a seal. The manual actuator 5502 may rotate, pan or depress, actuating a central dome-switch 5520. An optional LED 5528 may be used to produce lighting effects indicating, for example, a power-ON state for the device. Case 5506 loosely retains the manual actuator 5502, with the manual actuator 5502 protruding through its central opening 5506a. Case 5506 is attached to the PCB 5514 with screws (not illustrated). A Teflon® plastic gasket 5524 provides a low-friction intermediary surface between the case 5506 and the manual actuator 5502. Four magnetic sensors 5518 are mounted to the bottom side of the PCB 5514.

Figure 58:
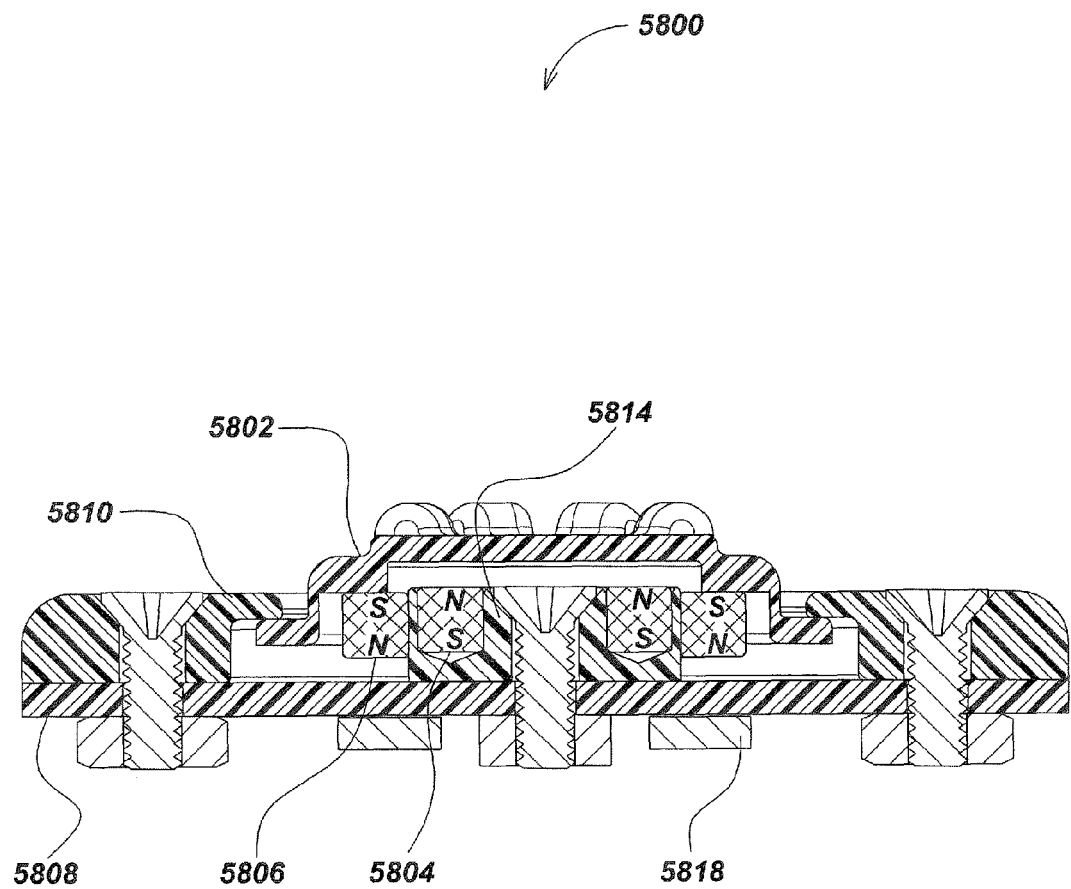
FIG. 58 is a vertical sectional view illustrating an alternate embodiment that uses eight cylindrical magnets arranged in an inner ring configuration and eight roller magnets arranged in an outer ring configuration.
Figure 59:
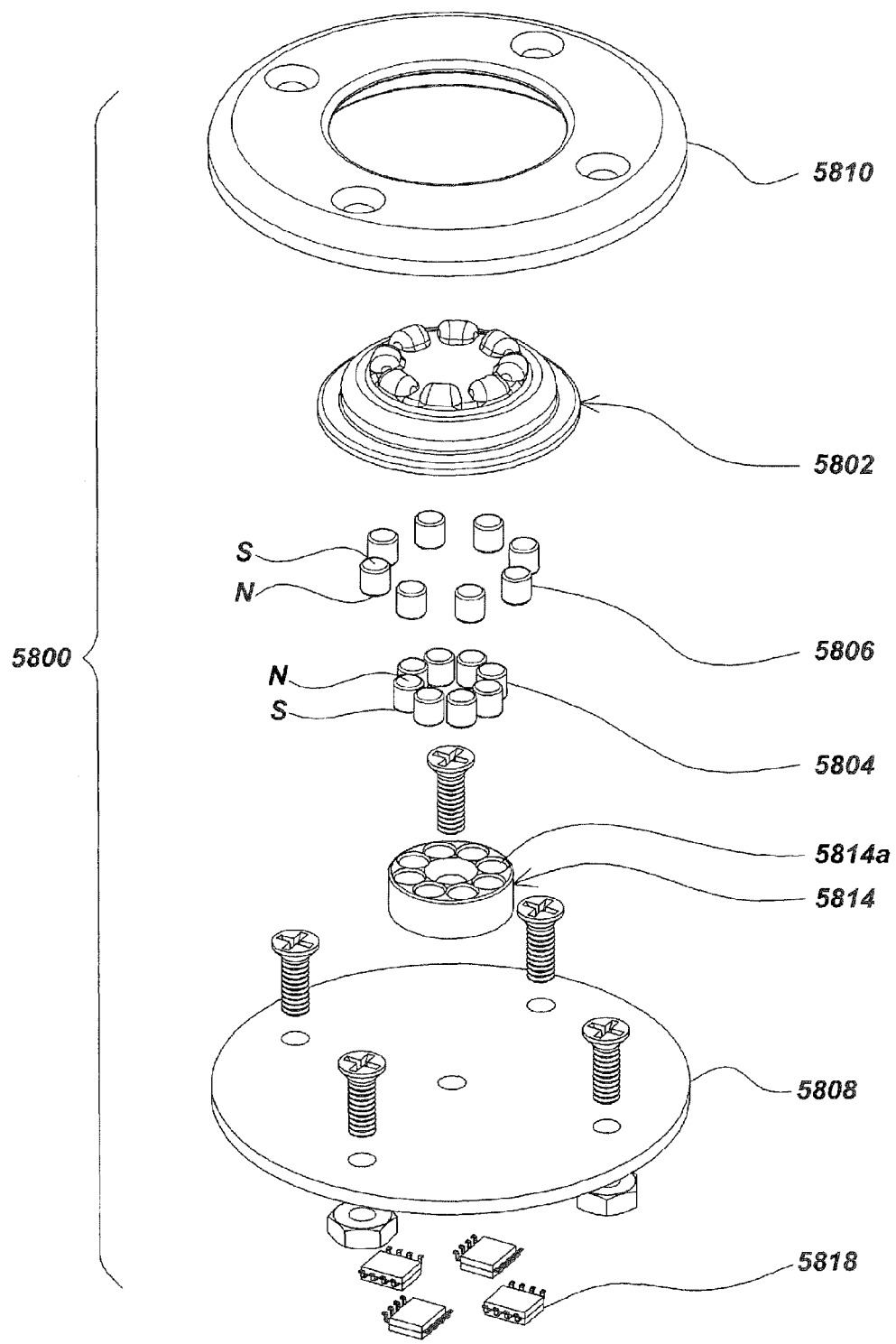
FIG. 59 is a reduced exploded isometric view from the top side of the embodiment of FIG. 58.
Figure 60:
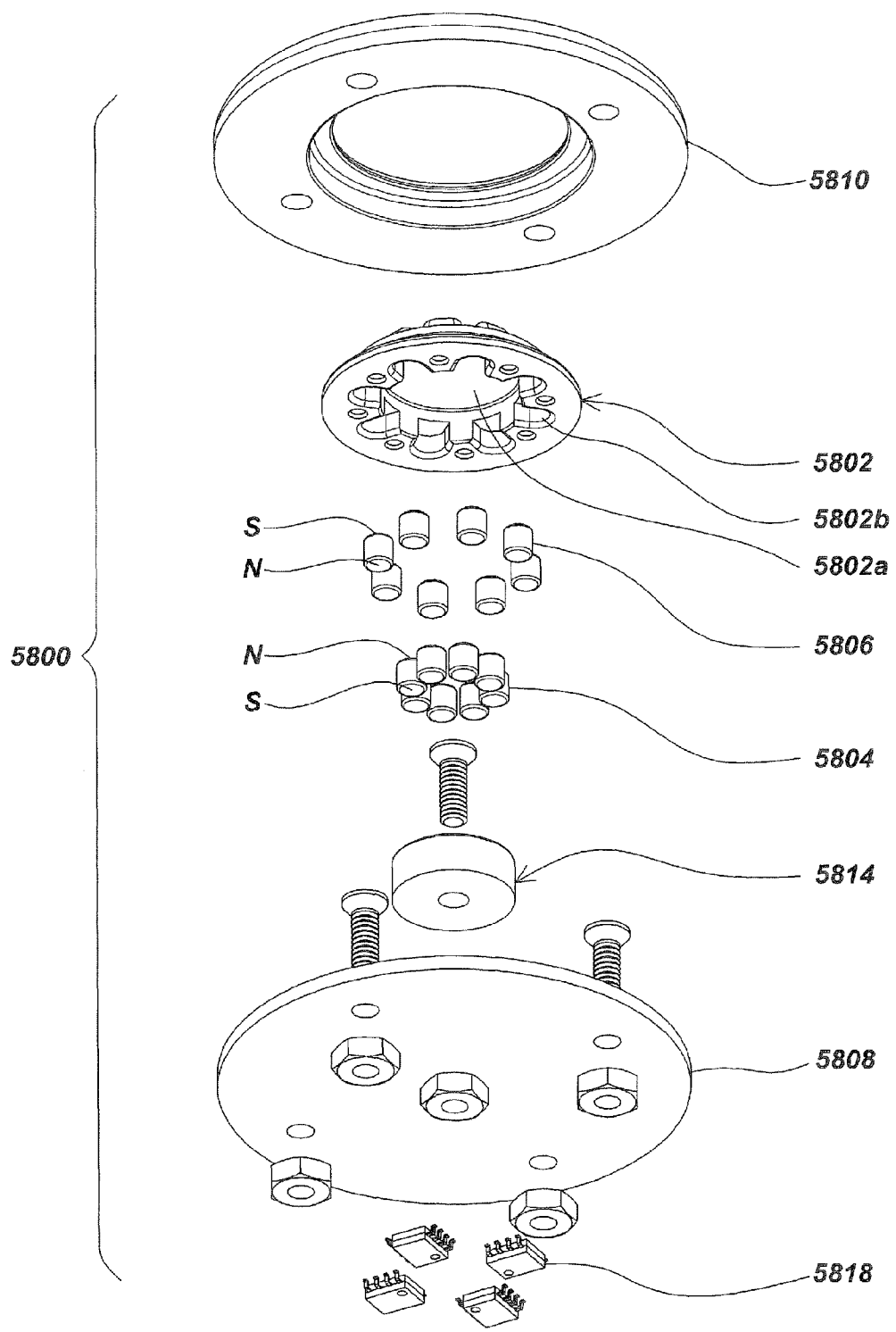
FIG. 60 is a view similar to FIG. 59 from the bottom side.

Referring to FIGS. 58-60 a magnetic manual user interface device 5800 uses a manual actuator 5802 which holds eight floating roller magnets 5806 in molded slots 5802b in its underside, around a central circle opening 5802a into which a cylindrical carrier 5814 is fitted. The upper surface of a cylindrical carrier 5814 holds eight non-floating cylindrical magnets 5804 in circular pockets 5814a evenly distributed around its upper surface. A PCB 5808 supports a plurality of magnetic sensors 5818 and associated circuitry and is attached to a ring-shaped case 5810. A ring-shaped case 5810 retains the manual actuator 5802, the floating roller magnets 5806, and the cylindrical carrier 5814. Rotation of the manual actuator 5802 around the cylindrical carrier 5814 causes movement of the floating roller magnets 5806 producing measurable changes in the net magnetic field formed by the floating roller magnets 5806 and the non-floating cylindrical magnets 5804. The magnetic restoring force between the non-floating cylindrical magnets 5804 and the floating roller magnets 5806 returns the manual actuator 5802 to a substantially centered and horizontal equilibrium position. Rotating the manual actuator 5802 clockwise or counter-clockwise will periodically bring new pairs of magnets into proximity as the floating roller magnets 5806 become more strongly linked to the next non-floating cylindrical magnet 5804 in rotation. Thus the manual actuator 5802 will provide a cogging tactile feedback to the user. The four magnetic sensors 5818 generate digital data representing the net magnetic field caused by the eight non-floating cylindrical magnets 5804 and the eight floating roller magnets 5806. The net magnetic field measurements can be interpreted by interface circuitry and/or interface software as the position of the manual actuator 5802. The floating roller magnets 5806 have a lateral degree of freedom defined by their containing slots such as 5802b.

Figure 61:
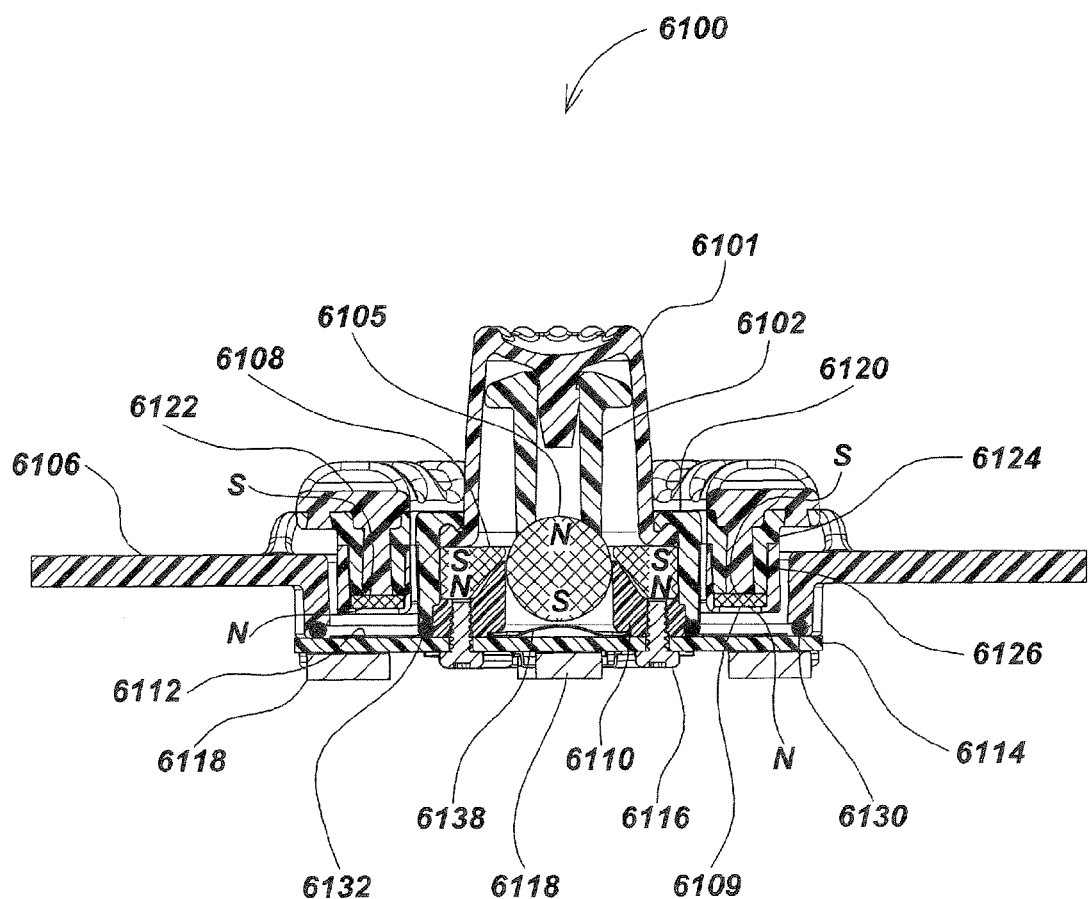
FIG. 61 is a vertical sectional view illustrating an alternate embodiment in which a central spherical magnet is attached to a central paddle, and a ridged scroll ring separates a plurality of roller magnets from an annular magnet.
Figure 62:
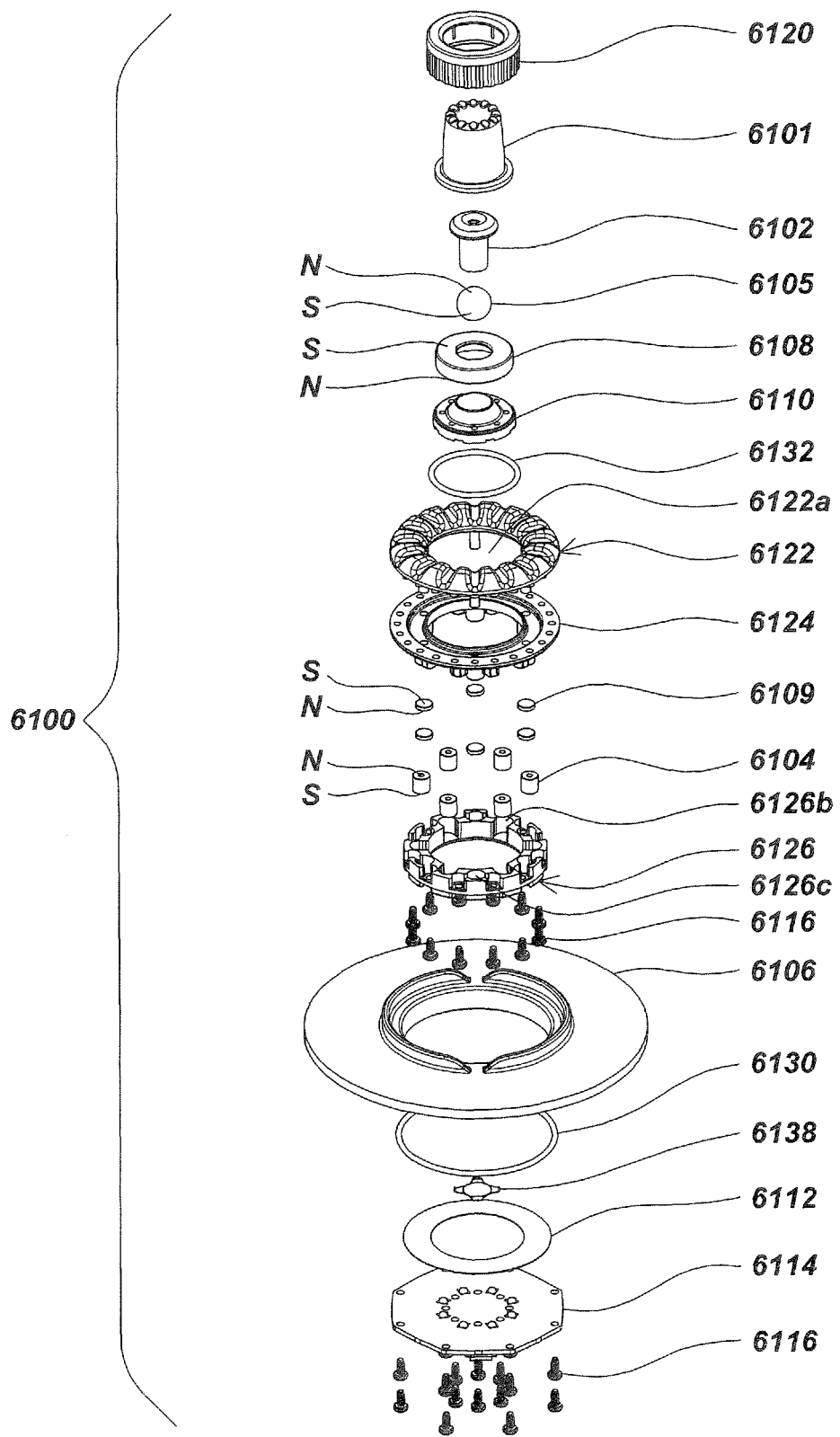
FIG. 62 is a reduced exploded isometric view taken from the top side of the embodiment in FIG. 61.
Figure 63:
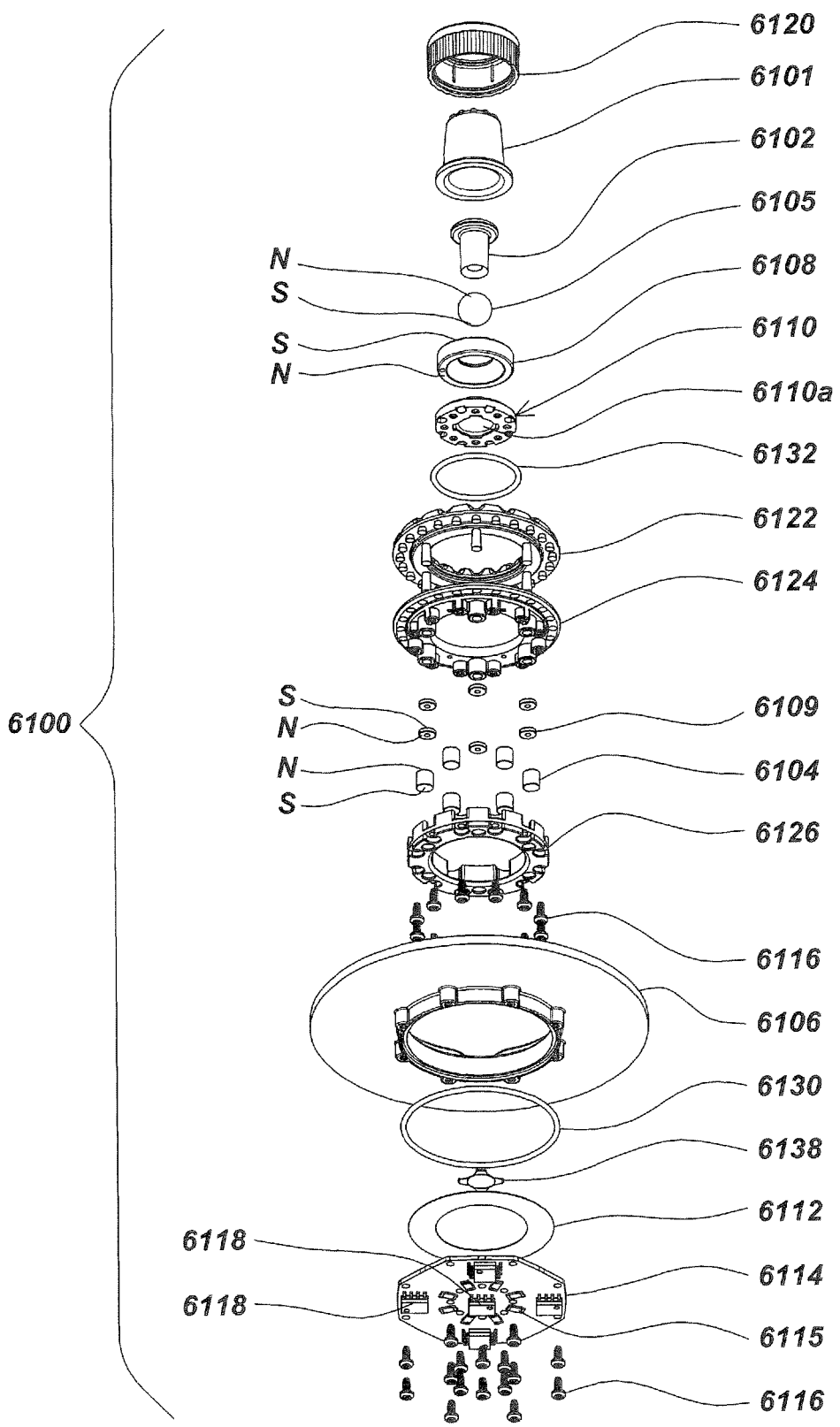
FIG. 63 is a view similar to FIG. 62 taken from the bottom side.

Referring to FIGS. 61-63 a magnetic manual user interface device 6100 includes a central spherical magnet 6105 attached to a paddle shaft 6102 with an attached flexible elastomeric manual actuator 6101. A scroll ring jog-pad 6122 with a central circular opening 6122a has a carrier 6120 fitted to its center into which an annular magnet 6108 is seated. The spherical magnet 6105 is held in the center of the annular magnet 6108 due to the oppositely oriented polarity of the spherical magnet 6105 and the annular magnet 6108. In an equilibrium, un-deflected state the N-S axis of the spherical magnet 6105 is co-axial with the N-S axis of the annular magnet 6108. The spherical magnet 6105 is also located in a circular opening 6110a in an inner ring 6110. The scroll ring jog-pad 6122 is attached to a scroll ring assembly comprising an upper scroll ring 6124 and a lower scroll ring 6126. The upper face of the molded lower scroll ring 6126 is molded with six slots 6126b that hold six cylindrical floating roller magnets 6104. The upper surface of the lower scroll ring 6126 also has six molded circular pockets 6126c distributed alternately to the said slots and located slightly further from the center axis of the spherical magnet 6105 and closer to the outer edge of the lower scroll ring 6126. Each of these circular pockets 6126c contains a non-floating disk magnet 6109. The upper scroll ring 6124 is attached to the lower scroll ring 6126 with twelve screws 6116.

The manual actuator 6101 facilitates joystick style user input, including the direction of various motions across a screen, for example, panning, and vertical controls including the actuation of a central dome-switch 6138. In addition, the scroll ring jog-pad 6122 may be rotated left or right. A Teflon® plastic pad 6112 provides a low-friction surface. A PCB 6114 supports five three-axis magnetic sensors 6118 allowing measurements of the net magnetic field to be interpreted. Four of magnetic sensors 6118 are arranged ninety-degrees apart in a box-like pattern while a fifth magnetic sensor 6118 is mounted in the center of the box-like pattern. The PCB 6114 is attached to the inner ring 6110 by an inner circle of eight screws 6116. The PCB 6114 also supports eight LEDs 6115 that are distributed around the central magnetic sensor 6118, which may be used to indicate various states of the device. Eight screws 6116 arranged in an outer ring configuration attach the PCB 6114 to an outer case 6106.

The floating roller magnets 6104 move radially in slots 6126b and ride against the scalloped outer edge of the carrier 6120, providing tactile and audible feedback to the user. Magnetic restoring force between the annular magnet 6108 and the spherical magnet 6105 returns the manual actuator 6101 to its vertical natural position when it is released after being displaced. Magnetic force also provides tactile resistance to rotation of the scroll ring jog-pad 6122 as a form of operator feedback. An O-ring 6132 is seated around the base of the inner ring 6110 which supports the spherical magnet 6105. An O-ring 6130 seals between the outer case 6106 and the PCB 6114.

Figure 64:
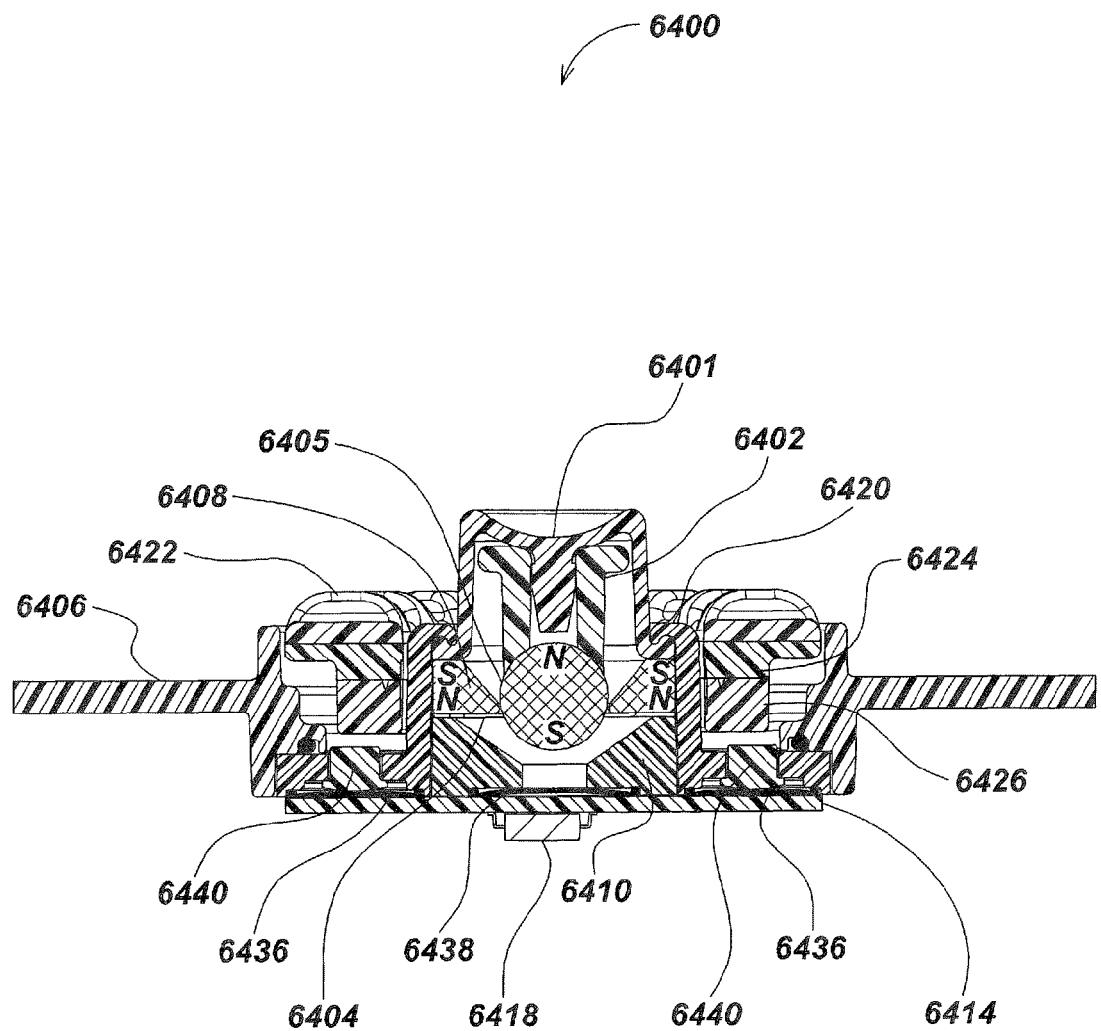
FIG. 64 is a vertical sectional view illustrating an alternate embodiment that utilizes auxiliary actuators to activate dome-switches at four points spaced around the base of the device.
Figure 65:
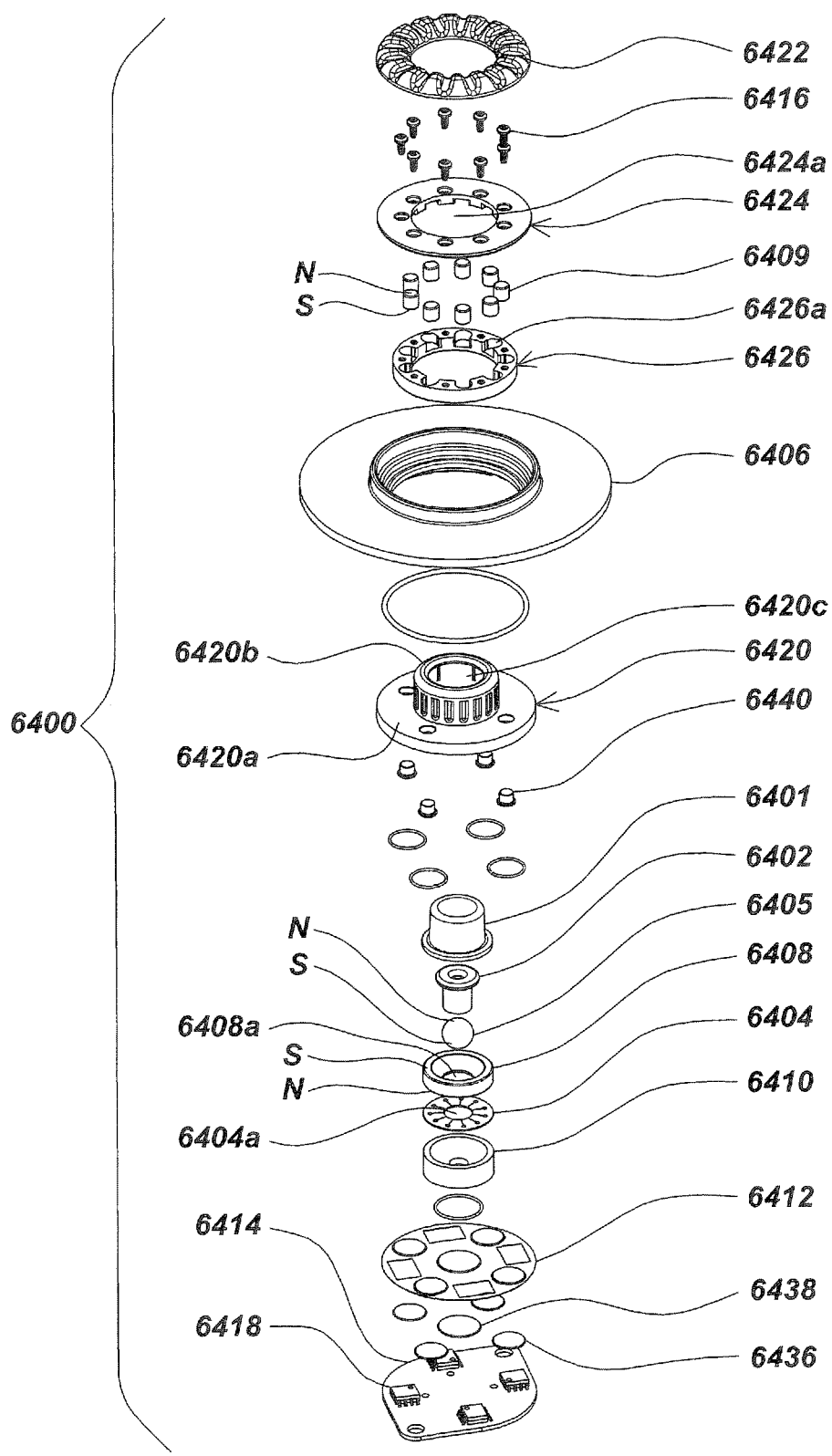
FIG. 65 is a reduced exploded isometric view of the embodiment of FIG. 64 taken from the top side.
Figure 66:
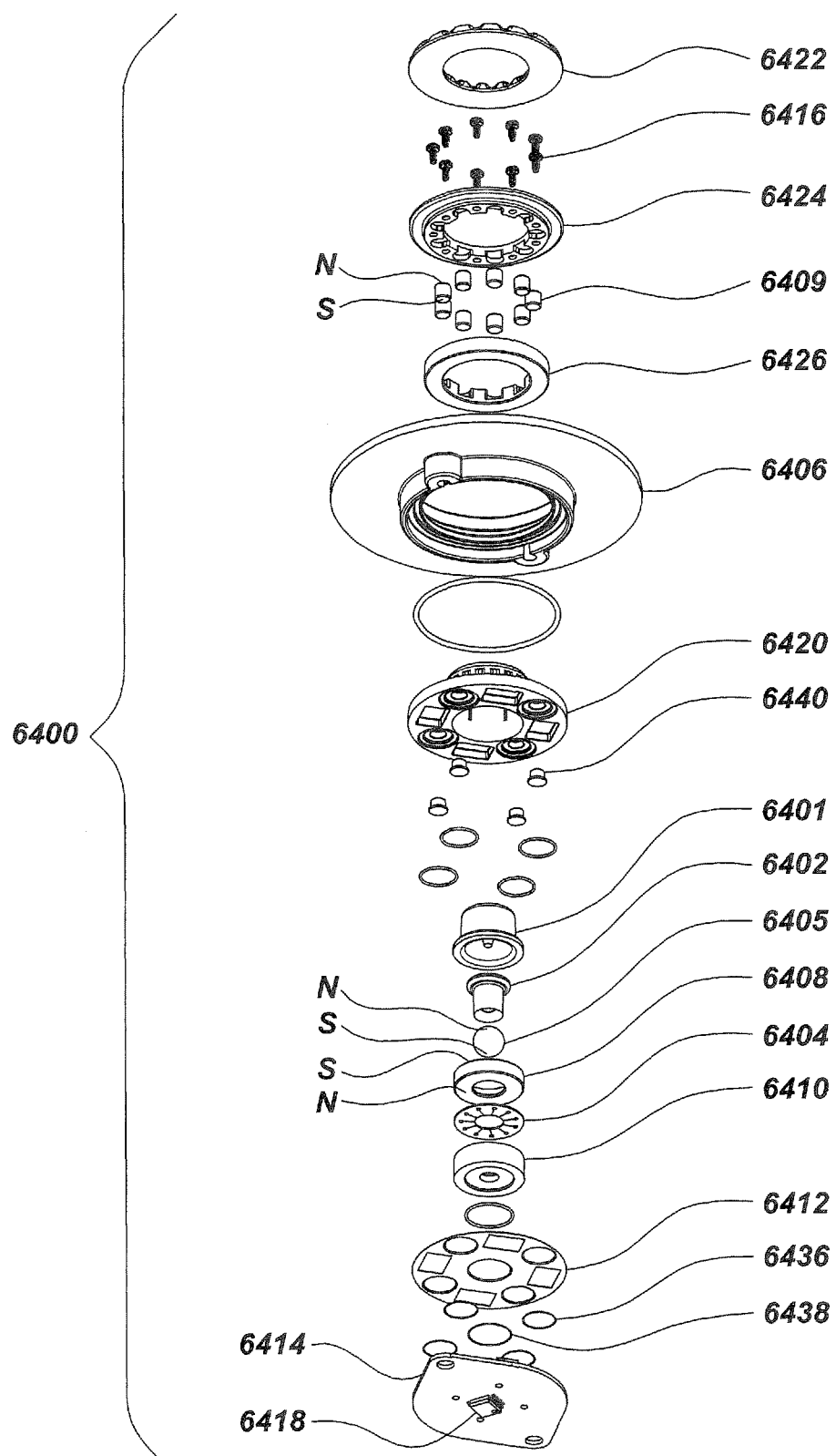
FIG. 66 is a view similar to FIG. 65 taken from the bottom side.

Referring to FIGS. 64-66 a magnetic manual user interface device 6400 has a plurality of floating roller magnets 6409 inserted into slots 6426a molded into a lower scroll ring 6426. An upper scroll ring 6424 is attached to the lower scroll ring 6426 with eight screws 6416 around a central circular opening 6424a in the upper scroll ring 6424. A single molded carrier 6420 has a circular flat skirt 6420a and a central column 6420b with a scalloped external face. The carrier 6420 has a circular opening 6420c through its center within which is seated an annular magnet 6408 supported by an inner ring 6410. A spherical magnet 6405 is rigidly attached with suitable adhesive or by other means to a paddle 6402 and rests on a centering disk 6404. The centering disk 6404 can be made of Mylar® plastic or similar material and is machined with cuts forming flexible tabs around a central opening 6404a. The centering disk 6404 guides the spherical magnet 6405 into the center of the circular opening 6408a in the annular magnet 6408 and, by means of flexible tabs, prevents the spherical magnet 6405 from moving radially when being depressed vertically. The scroll ring assembly comprising the lower scroll ring 6426 and upper scroll ring 6424 and containing the floating roller magnets 6409 fits around the central column 6420b of the carrier 6420 in such a manner that the floating roller magnets 6409, attracted magnetically inward by the annular magnet 6408, roll against the scalloped indentations in carrier 6420 when the scroll ring assembly is rotated. A jog-pad 6422 is attached to the scroll ring assembly with adhesive or other suitable means.

Referring still to FIGS. 64-66, a round adhesive sheet 6412 secures a dome-switch 6436 and a dome-switch 6438. Four magnetic sensors 6418 are mounted on the top side of a PCB 6414, which is attached to a case 6406 with screws (not illustrated). A fifth magnetic sensor 6418 is centrally mounted on the underside of the PCB 6414 aligned with the magnetic axis of spherical magnet 6405. The orientation of the various magnetic sensors 6418 may vary. For example the central one of the magnetic sensors 6418 may be oriented forty-five degrees out of alignment with the four surrounding magnetic sensors 6418. The surrounding magnetic sensors 6418 may be aligned at ninety degrees to their neighbors. The net magnetic field formed by the spherical magnet 6405, the annular magnet 6408, and the floating roller magnets 6409 is measured by five magnetic sensors 6418 which may be interpreted by interface circuitry/software as displacement of the jog-pad 6422 or a manual actuator 6401. Magnetic restoring force between the spherical magnet 6405 and the annular magnet 6408 return the manual actuator 6401 to an equilibrium position. Magnetic forces between the floating roller magnets 6409 (as they roll over scalloped edges of carrier 6420) and the annular magnet 6408 generates incremental resistance when the lower scroll ring 6426 is rotated clockwise or counter-clockwise providing tactile feedback to the user. Further user feedback is provided by the click of the floating roller magnets 6409 into the scalloped indentations of the carrier 6420 surface as the scroll ring assembly is rotated.

The underside of the carrier 6420 has four circular openings into which four dome-switch actuators 6440 are movably seated. A dome-switch 6436 is seated in each circular opening under each actuator 6440. A fifth dome-switch 6438 switch is situated centrally such that it can be actuated by the spherical magnet 6405 when the manual actuator 6401 attached to paddle 6402 is sufficiently depressed. The user can actuate any single dome-switch 6436 by tilting the jog-pad 6422 or depressing the manual actuator 6401 and the paddle 6402. The user can actuate four of the dome-switches 6436 by depressing the lower scroll ring 6426 vertically.

Figure 67:
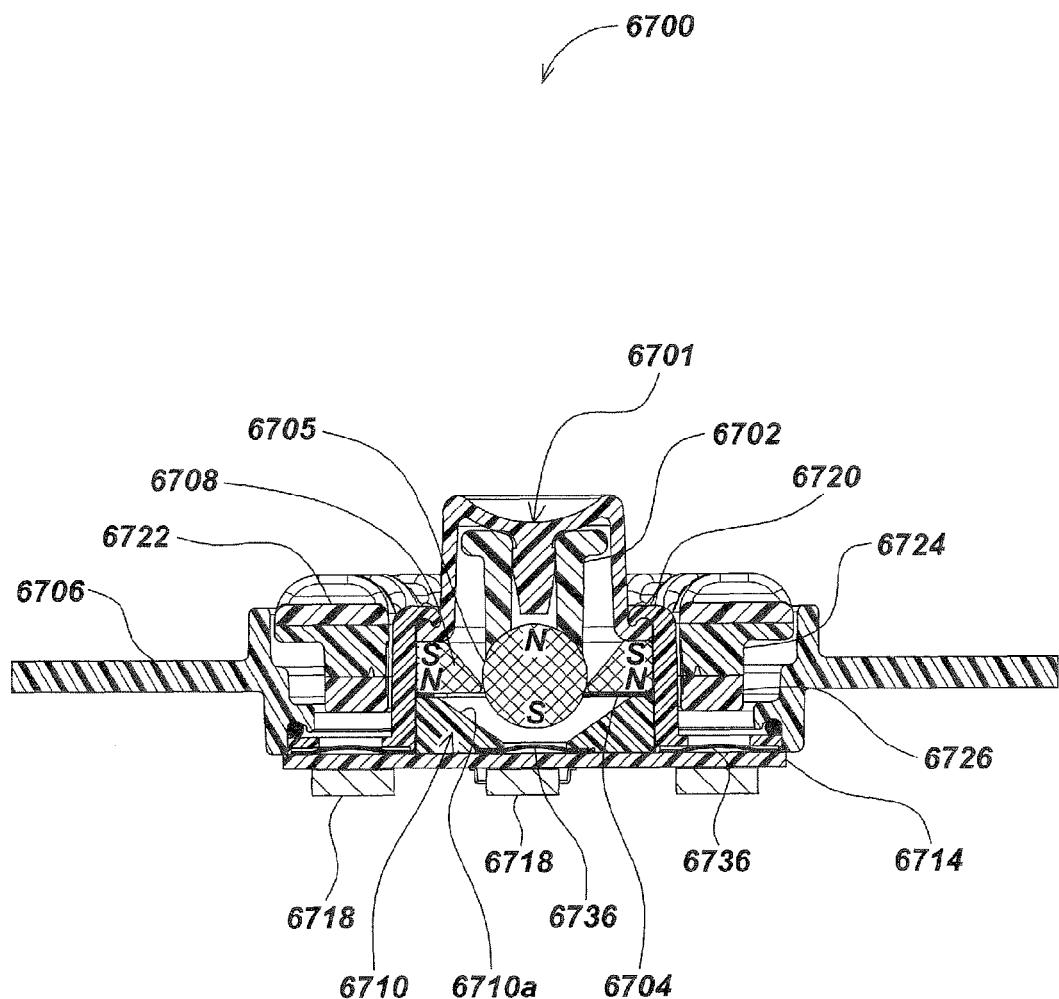
FIG. 67 is a vertical sectional view illustrating an alternate embodiment similar to that illustrated in FIG. 64 except that the latter utilizes a shorter primary actuator and does not utilize the auxiliary actuators.
Figure 68:
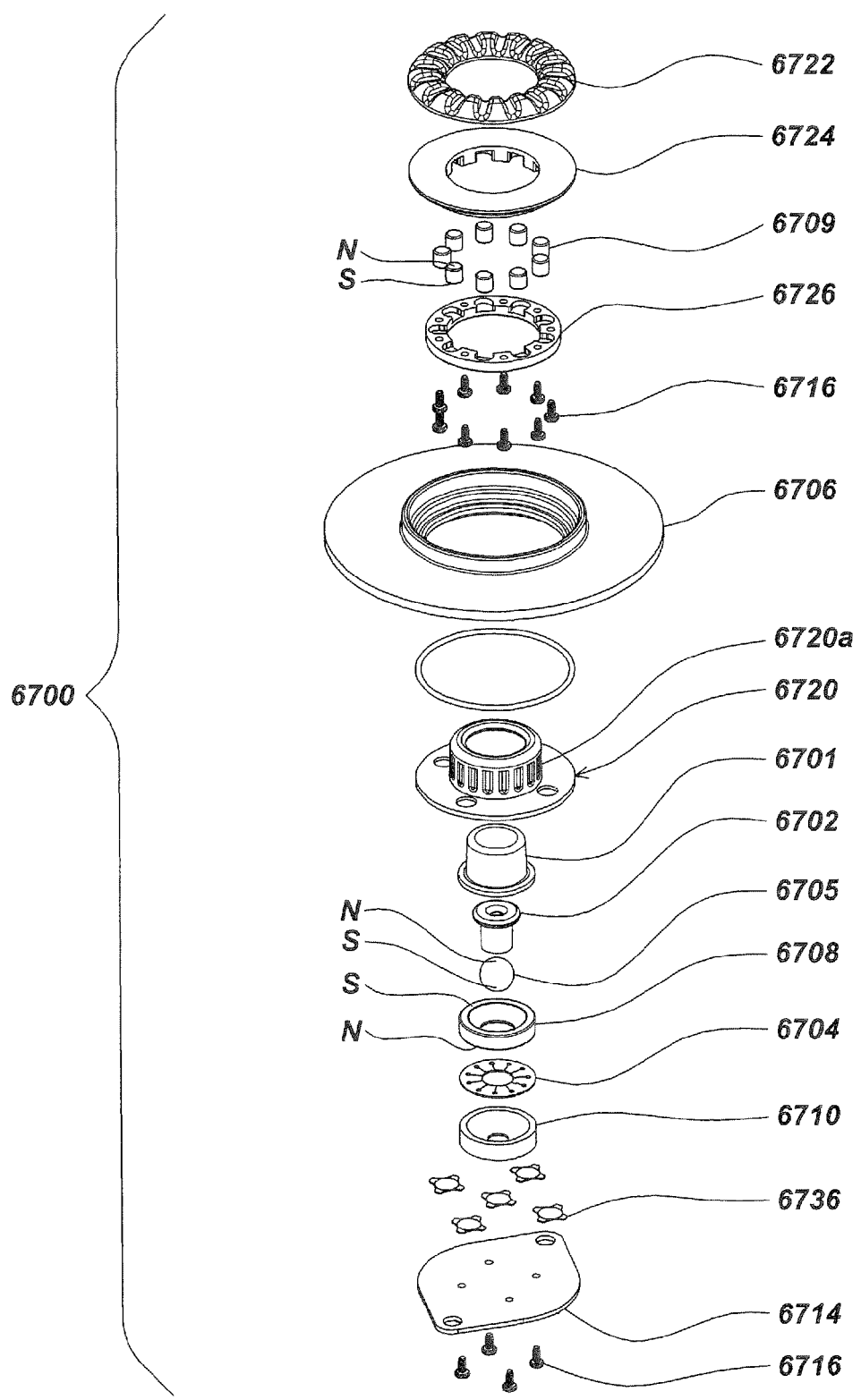
FIG. 68 is a reduced exploded isometric view take from the top side of the embodiment of FIG. 67.
Figure 69:
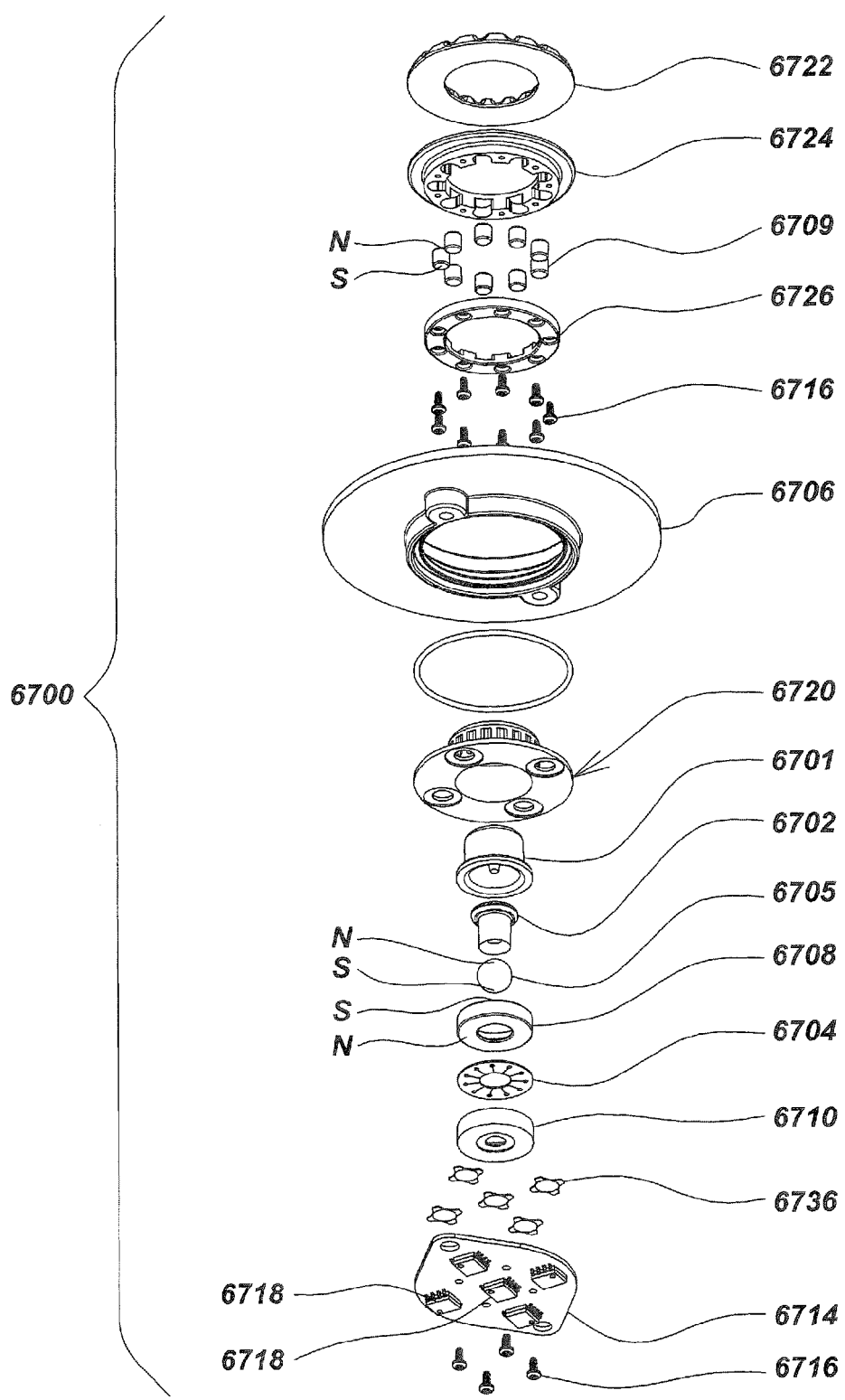
FIG. 69 is a view similar to FIG. 68 taken from the bottom side.

Referring to FIGS. 67-69 a magnetic manual user interface device 6700 includes a manual actuator 6701 that is attached to a paddle 6702 to which a spherical magnet 6705 is adhesively attached. The spherical magnet 6705 is supported by a flexible centering disk 6704 which tends to keep it centered when being displaced vertically toward a central dome-switch 6736. The inner surface 6710a of an inner ring 6710 is chamfered and guides the spherical magnet 6705 into contact with the dome-switch 6736 centrally located beneath the spherical magnet 6705. The remaining elements of magnetic manual user interface device 6700 operate as described in connection with FIGS. 64-66 above. A jog-pad 6722 is attached to an upper scroll ring 6724. A plurality of screws 6716 attaches the lower scroll ring 6726 to the upper scroll ring 6724. The upper scroll ring 6724 contains a plurality of floating roller magnets 6709 in corresponding slots molded in the underside of the upper scroll ring 6724. A carrier 6720 has scalloped curves 6720a on its outer face, against which the floating roller magnets 6709 roll. The floating roller magnets 6709 are attracted inwardly by the magnetic interaction with an annular magnet 6708. Four dome-switches 6736 are located in a square pattern on a PCB 6714, which also supports five magnetic sensors 6718. Four of the dome-switches 6736 can be actuated by depressing the jog-pad 6722 above a particular switch. The central dome-switch 6736 can be actuated by depressing the manual actuator 6701. Positional changes caused by tilting or depressing the manual actuator 6701 or by rotating or tilting the jog-pad 6722 may be interpreted by interface circuitry/software from net magnetic field measured by the magnetic sensors 6718. As in the earlier embodiments, restoring forces for the manual actuator 6701 are derived from interaction between magnets. The PCB 6714 is attached to a case 6706 with screws 6716.

Figure 70:
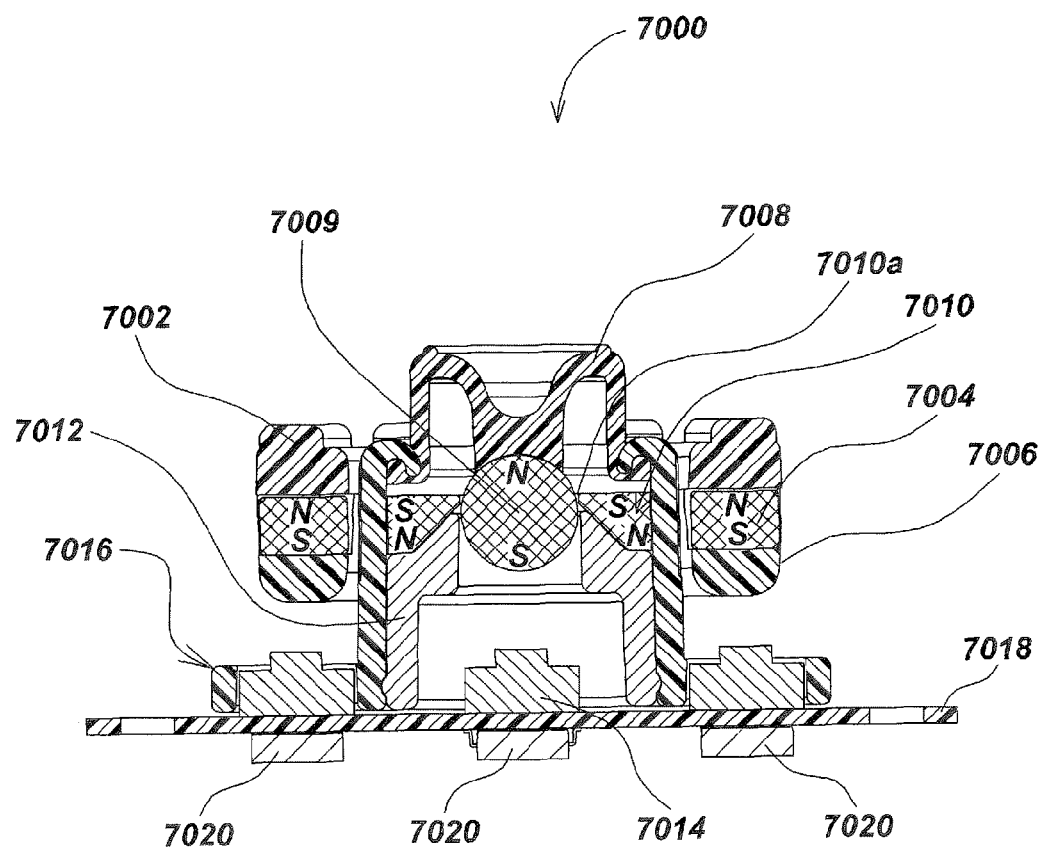
FIG. 70 is a vertical sectional view illustrating an alternate embodiment that utilizes a rotating scroll ring with four selection points, six roller magnets and a central spherical magnet suspended within an annular magnet.
Figure 71:
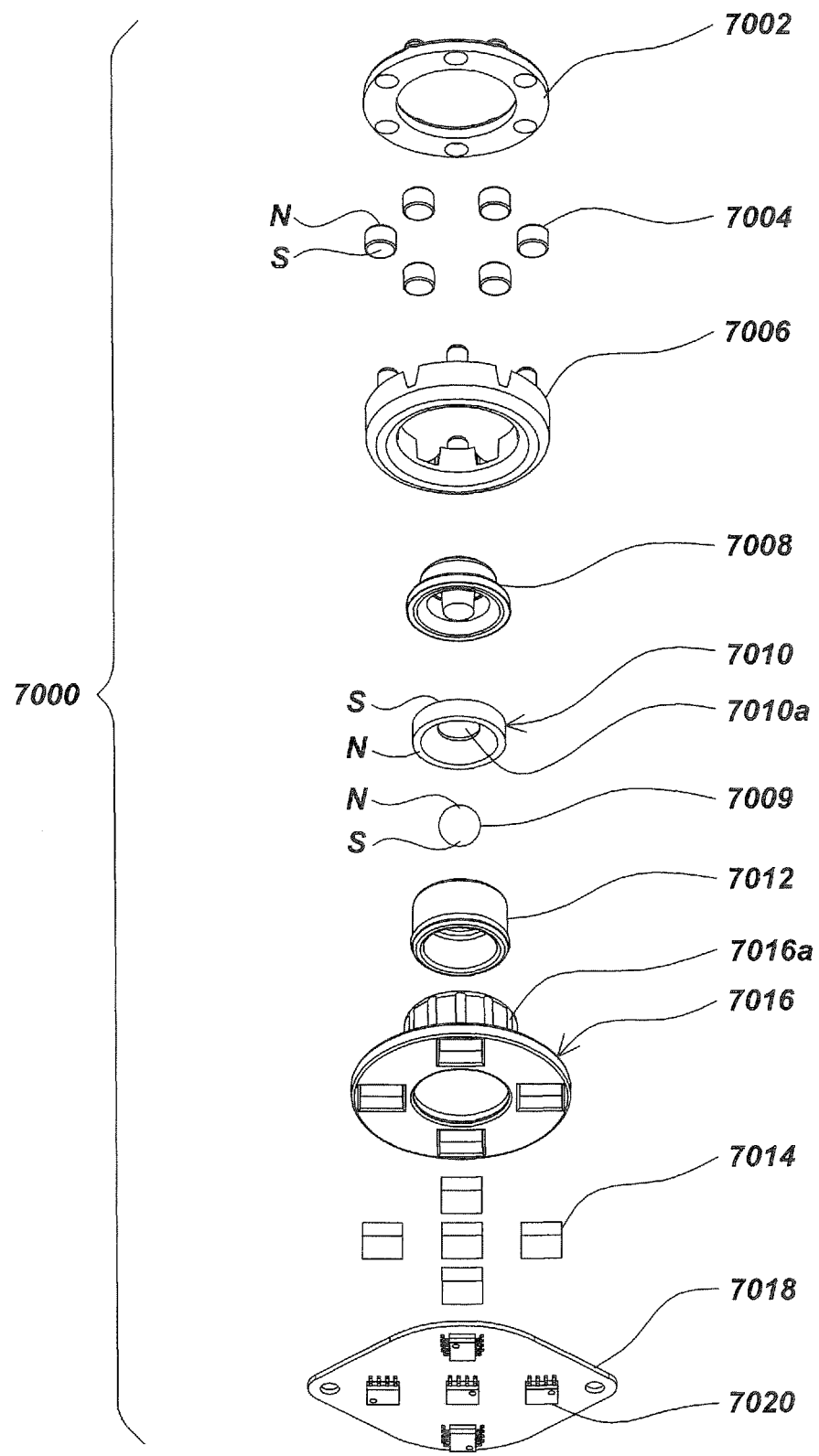
FIG. 71 is a reduced isometric exploded view of the embodiment of FIG. 70 taken from the bottom side.

FIGS. 70 and 71 illustrate a magnetic manual user interface device 7000 scaled to be fitted into a keyboard in a small computing device such as a laptop computer or the like. An elastomeric cylindrical manual actuator 7008 is attached to a spherical magnet 7009 which is seated within the central opening 7010a of an annular magnet 7010. A molded cylindrical stepped carrier 7016 supports and retains the annular magnet 7010. A top magnet capture ring 7002 holds a plurality of floating disk-shaped roller magnets 7004. The floating disk-shaped roller magnets 7004 have cylindrical configuration and are seated in cylindrical channels or recesses molded in the underside of the top magnet capture ring 7002. The floating disk-shaped roller magnets 7004 roll on the scalloped surface 7016a of the central raised section of the cylindrical stepped carrier 7016. The magnet capture ring assembly consists of the top magnet capture ring 7002 and a bottom magnet capture ring 7006 and their associated floating disk-shaped roller magnets 7004. A PCB 7018 supports five tact switches 7014 which can be actuated by depressing the elastomeric cylindrical manual actuator 7008. The outer four tact switches 7014 can be actuated singly or in adjacent pairs by tilting magnet capture ring assembly. All four outer tact switches 7014 can be actuated by axially depressing the top magnet capture ring 7002. Five magnetic sensors 7020 are mounted on the PCB 7018 to measure the net magnetic field produced by the spherical magnet 7009, and the annular magnet 7010 and the floating disk-shaped roller magnets 7004. The measured net magnetic field may be interpreted by interface circuitry/software as displacement of the spherical magnet 7009 and/or the floating disk-shaped roller magnets 7004. As in earlier embodiments magnetic restoring forces center the elastomeric cylindrical manual actuator 7008 to its initial neutral orientation after displacement and release, and also provide tactile feedback in the rotation of the magnetic ring assembly. Molded plastic annular magnet bottom support ring 7012 serves to support the annular magnet 7010.

Figure 72:
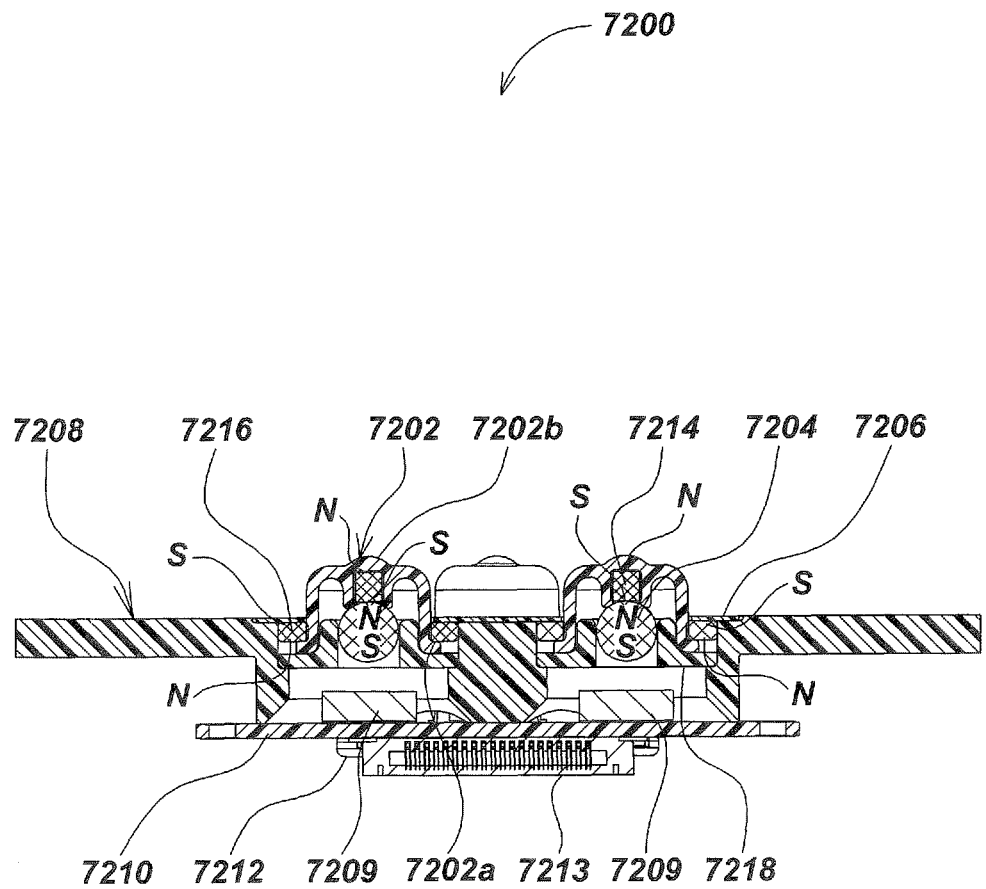
FIG. 72 is a vertical sectional view illustrating an alternate embodiment utilizing spherical magnets and aligning annular magnets.
Figure 73:
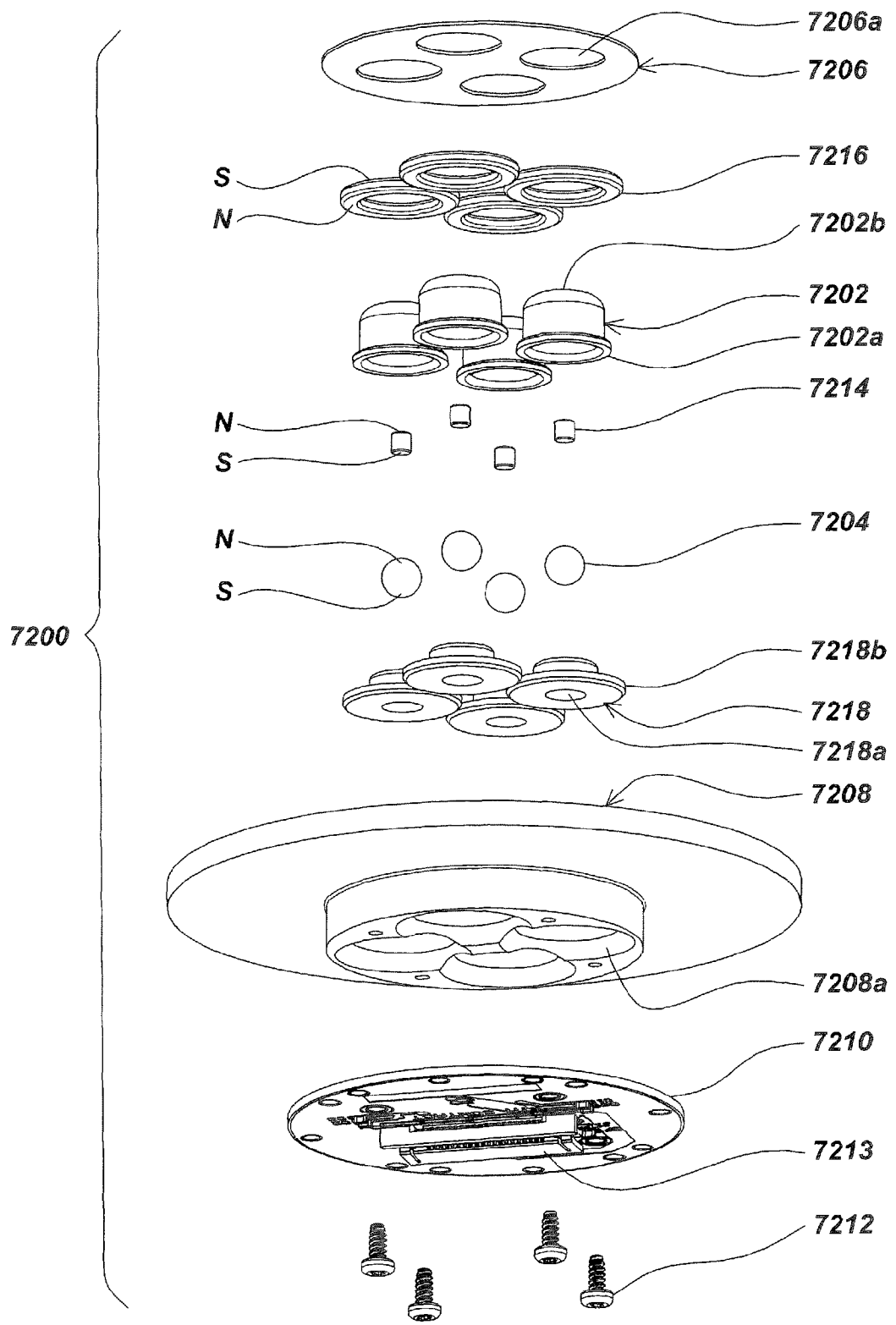
FIG. 73 is an exploded isometric view of the embodiment of FIG. 72 taken from the bottom side.

FIGS. 72 and 73 illustrate a magnetic manual user interface device 7200 that utilizes four spherical magnets 7204 and four corresponding annular magnets 7216. A case 7208 supports four control points. Each control point comprises a cylindrical ball-sleeve 7218 molded as a central circular bore 7218a with a flat circular skirt 7218b at its base, one of the four spherical magnets 7204 which sits in a corresponding circular bore 7218a, and a small cylindrical magnet 7214 attached by adhesive or other suitable means to the top center of the spherical magnet 7204. Each control point is covered with a flexible elastomeric cover 7202 which is molded with a flange 7202a around its base, which seats on the skirt 7218b of the corresponding ball-sleeve 7218. Each annular magnet 7216 is seated on the flange 7202a around the base of the corresponding flexible elastomeric cover 7202. Each flexible elastomeric cover 7202 has a central nipple 7202b in its upper surface which covers the corresponding cylindrical magnet 7214. The case 7208 contains four circular recesses 7208a in its central region. Each of the circular recesses 7208a serves as a mounting location for one of the four control point assemblies. A thin durable label 7206 of Mylar® plastic or similar suitable material has four circular cutouts 7206a which fit over the flexible elastomeric covers 7202. The label 7206 retains the four control point assemblies and is adhesively attached to the case 7208. A PCB 7210 fits onto the central circular region of the case 7208 from below and supports four magnetic sensors 7209 each centrally situated beneath a control point assembly. Four screws 7212 hold the PCB 7210 to the case 7208. A multi-pin electrical connector 7213 is attached to the lower surface of the PCB 7210 and is electrically connected to circuit traces (not illustrated) on the PCB 7210. The multi-pin electrical connector 7213 serves to connect to a computing system, robotic system, or other system.

Any of the four control points of the magnetic manual user interface device 7200 may be tilted in any direction, moved through a series of directions and angles, or depressed lowering its cylindrical magnet 7214 and attached spherical magnet 7204 toward its corresponding magnetic sensor 7209. Such movements of the individual control points may be done individually or in combination. The combined coordinated output of the four magnetic sensors 7209 may be interpreted in software to precisely identify the net magnetic field near each control point and the rates of change thereof. Individual control points may be moved forward, back, left, right or to any angle in between, as well as vertically. Any combination of such angles among the four control points will provide a magnetic signature that is measured by the magnetic sensors 7209.

Figure 74:
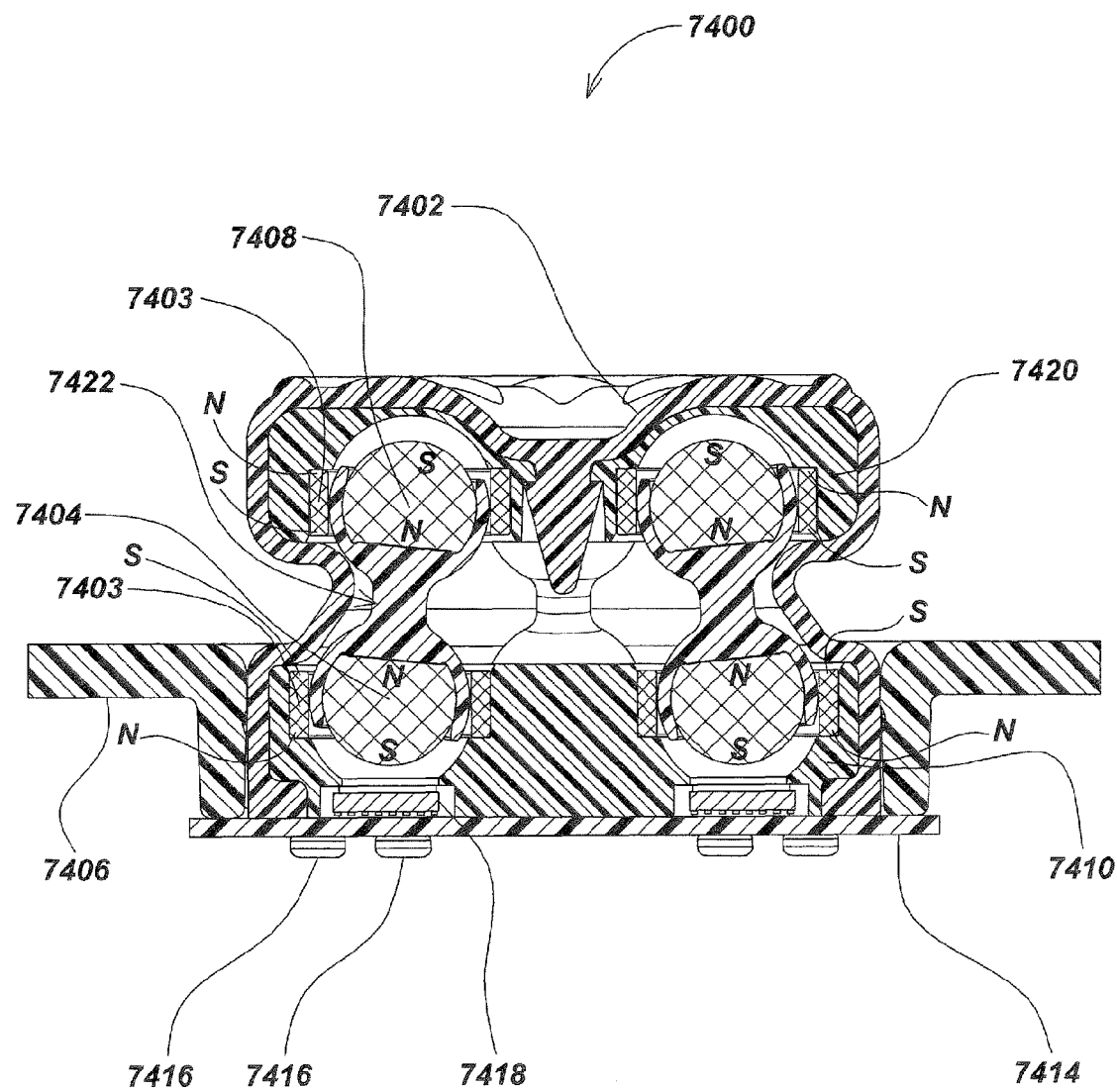
FIG. 74 is a vertical sectional view illustrating an alternate embodiment that utilizes four double-ended connecting rods and semi-spherical magnets that are surrounded at their upper and lower ends with annular magnets.
Figure 75:
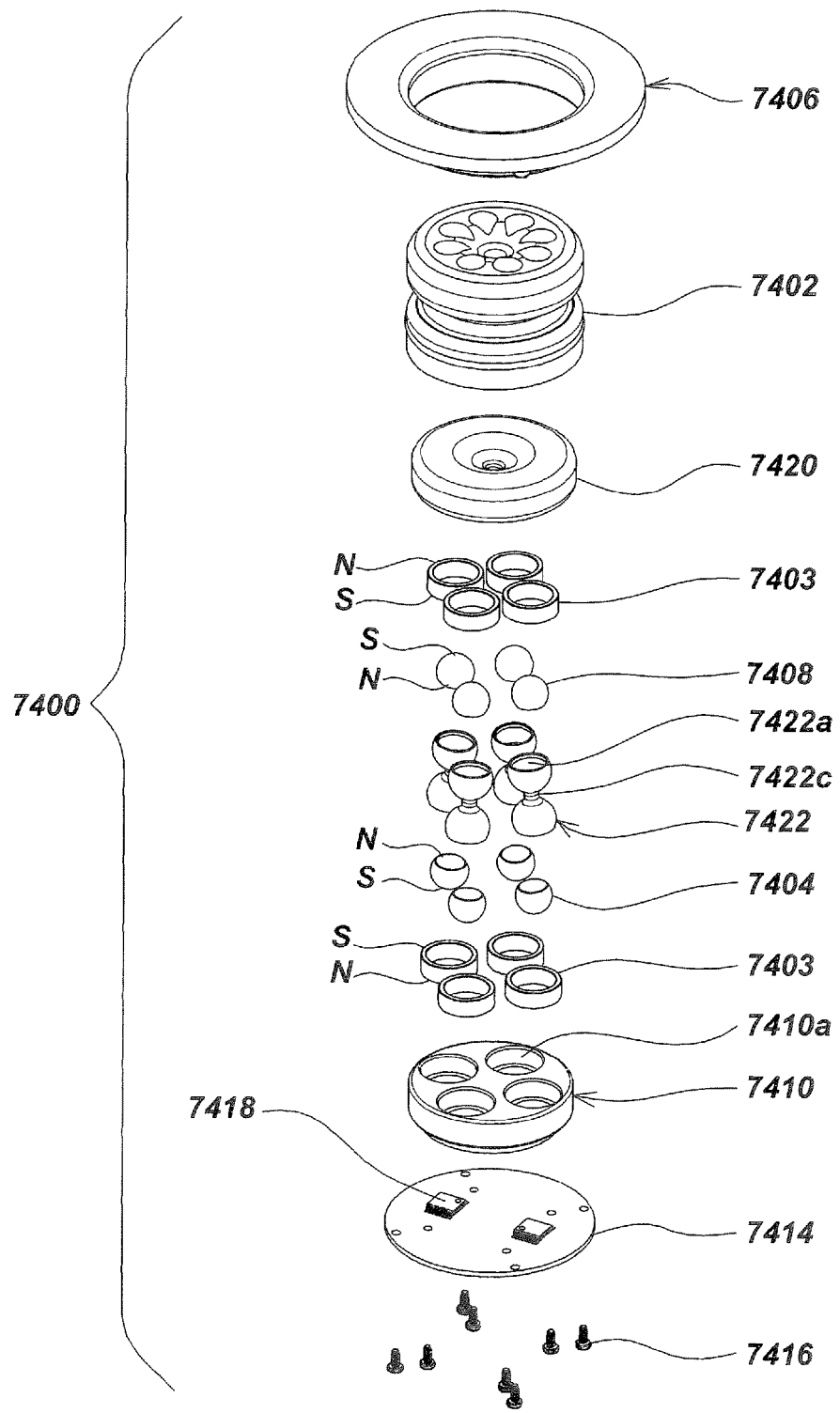
FIG. 75 is a reduced isometric exploded view of the embodiment of FIG. 74 taken from the top side.
Figure 76:
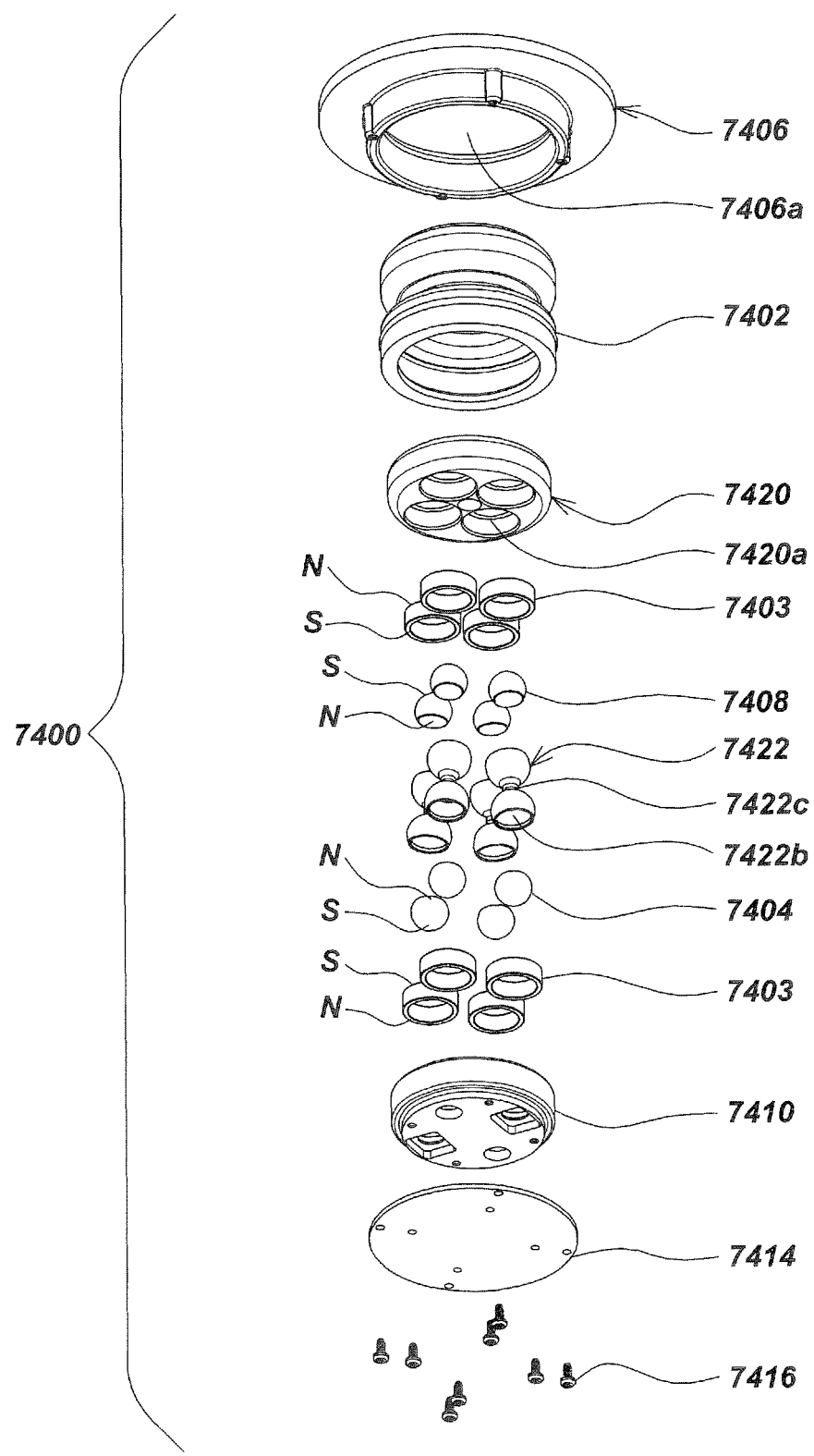
FIG. 76 is a view similar to FIG. 75 taken from the bottom side.

Referring to FIGS. 74-76, a magnetic manual user interface device 7400 includes four double-ended connecting rods 7422, molded as cups with a central shaft 7422c. Each connecting rod 7422 has a semi-spherical magnet 7408 mounted in the molded upper cup 7422a and a semi-spherical magnet 7404 mounted in the molded lower cup 7422b. The semi-spherical magnets 7404 and 7408 each have one flattened surface. Each of the connecting rods 7422 is molded with a central shaft 7422c connecting two molded cups 7422a and 7422b each of which has a flat interior bottom and approximately spherical sides. The semi-spherical magnets 7408 are fitted into the upper cups 7422a of the connecting rods 7422, and semi-spherical spherical magnets 7404 are fitted into the lower cups 7422b of the connecting rods 7422. Four annular magnets 7403 surround corresponding ones of the upper cups 7422a and four annular magnets 7403 surround corresponding ones of the lower cups 7422b. A molded plastic base 7410, approximately circular in shape, has four wells 7410a molded in its upper surface. Each of the wells 7410a is designed to receive the lower end of a corresponding one of the connecting rods 7422. Each of the lower four annular magnets 7403 fits into one of the wells 7410a and retains the lower end of the corresponding connecting rod 7422. The corresponding semi-spherical magnet 7404 is held within the annular magnet 7403 by magnetic force.

The upper end of each of the connecting rods 7422 with its semi-spherical magnet 7408 is similarly inserted into a well 7420a (FIG. 76) molded in the lower surface of a circular press cap 7420. The semi-spherical magnet 7408 at the upper end of each of the connecting rods 7422 is held within its surrounding annular magnet 7403 by magnetic force. The wells 7420a in the press cap 7420 are slightly closer together than the wells 7410a in the base 7410 such that the upper ends of the connecting rods 7422 are closer together than the lower ends. The vertical axes of the connecting rods 7422 that extend through their central shafts 7422c are inwardly inclined as best seen in FIG. 74. The base 7410 is retained within a larger stepped cylindrical case 7406 which has a central circular opening 7406a (FIG. 76) for receiving the base 7410. A PCB 7414 supports two three-axis magnetic sensors 7418. Optionally four sensors can be used for finer discrimination of user inputs. The PCB 7414 is attached by a plurality of screws 7416 to the base 7410 and to the case 7406.

The magnetic manual user interface device 7400 of FIGS. 74-76 can be manually manipulated as follows. Each of the four connecting rods 7422 can pivot about the centers of their two semi-spherical magnets 7404 and 7408. The four connecting rods 7422 can be jointly moved by manual manipulation of a press cap 7420. The motion of the four connecting rods 7422 can be combined to pan, tilt, or rotate in any direction, or move up or down. Any of the connecting rods 7422 can move toward its corresponding magnetic sensor and that magnetic sensor 7418 can measure a threshold level of net magnetic field or change in net magnetic field around that connecting rod 7422 via suitable software as constituting a "click" message from the operator. Thus, by measuring the net magnetic field, the magnetic manual user interface device 7400 enables the user to send a left, right, top or bottom "click" command. By pressing the connecting rods 7422 downward centrally and simultaneously, the user may also send a center "click" command. Manual clockwise and counter-clockwise rotation of the press cap 7420 can also be interpreted from the measured net magnetic fields and can be translated into various commands for a display. The magnetic manual user interface device 7400 has a flexible elastomeric cover 7402. The cover 7402 fits over the press cap 7420 and against the inner rim of the central circular opening 7406a (FIG. 76) of case 7406 and provides a moisture resistant seal.

Figure 77:
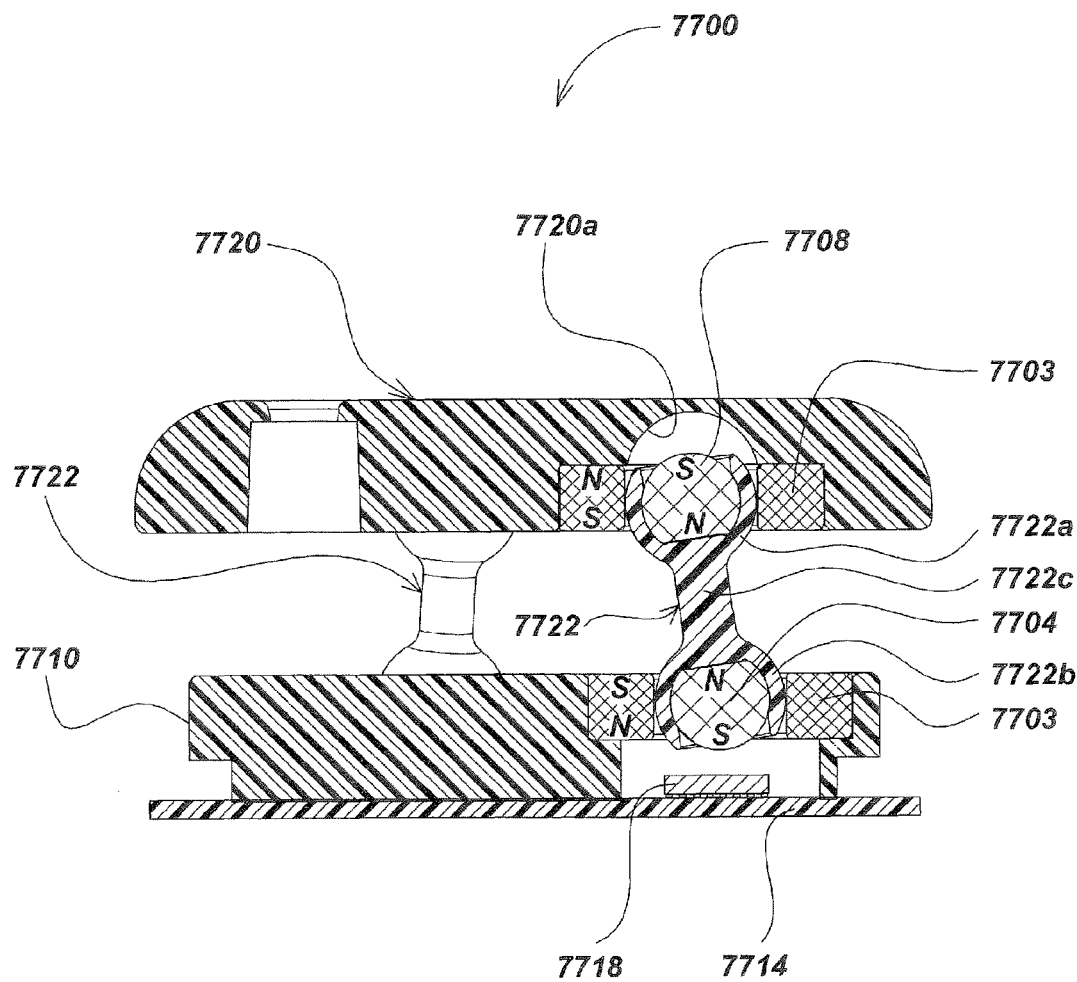
FIG. 77 is a vertical sectional view illustrating an alternate embodiment that utilizes three double-ended connecting rods.
Figure 78:
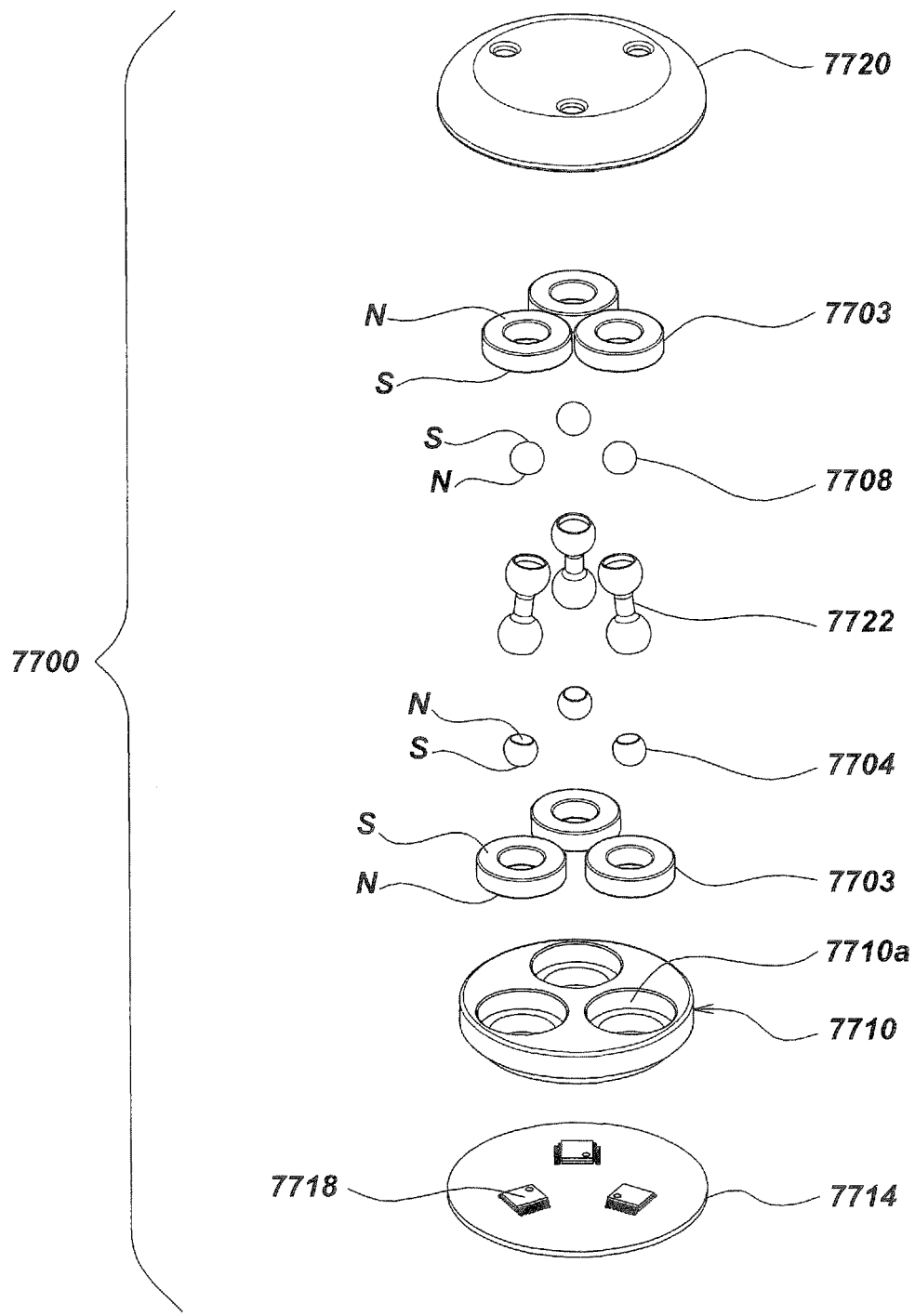
FIG. 78 is a reduced exploded isometric view of the embodiment of FIG. 77 taken from the top side.

Referring to FIGS. 77 and 78 a manual magnetic user interface device 7700 is similar to the embodiment of FIGS. 74-76, except that the former uses only three double-ended connecting rods 7722 arranged in a triangular configuration. Each of the connecting rods 7722 has upper and lower cups 7722a and 7722b at either end connected by a central shaft 7722c. Each of the cups 7722a and 7722b contains a semi-spherical upper magnet 7708 with one flattened side. Three wells 7720a (FIG. 77) molded in a press cap 7720 and three recesses 7710a (FIG. 78) in a circular base 7710 receive annular magnets 7703 associated with a semi-spherical lower magnet 7704 and the semi-spherical upper magnet 7708. A PCB 7714 supports three magnetic sensors 7718, each centrally located beneath the corresponding semi-spherical lower magnet 7704.

Figure 79:
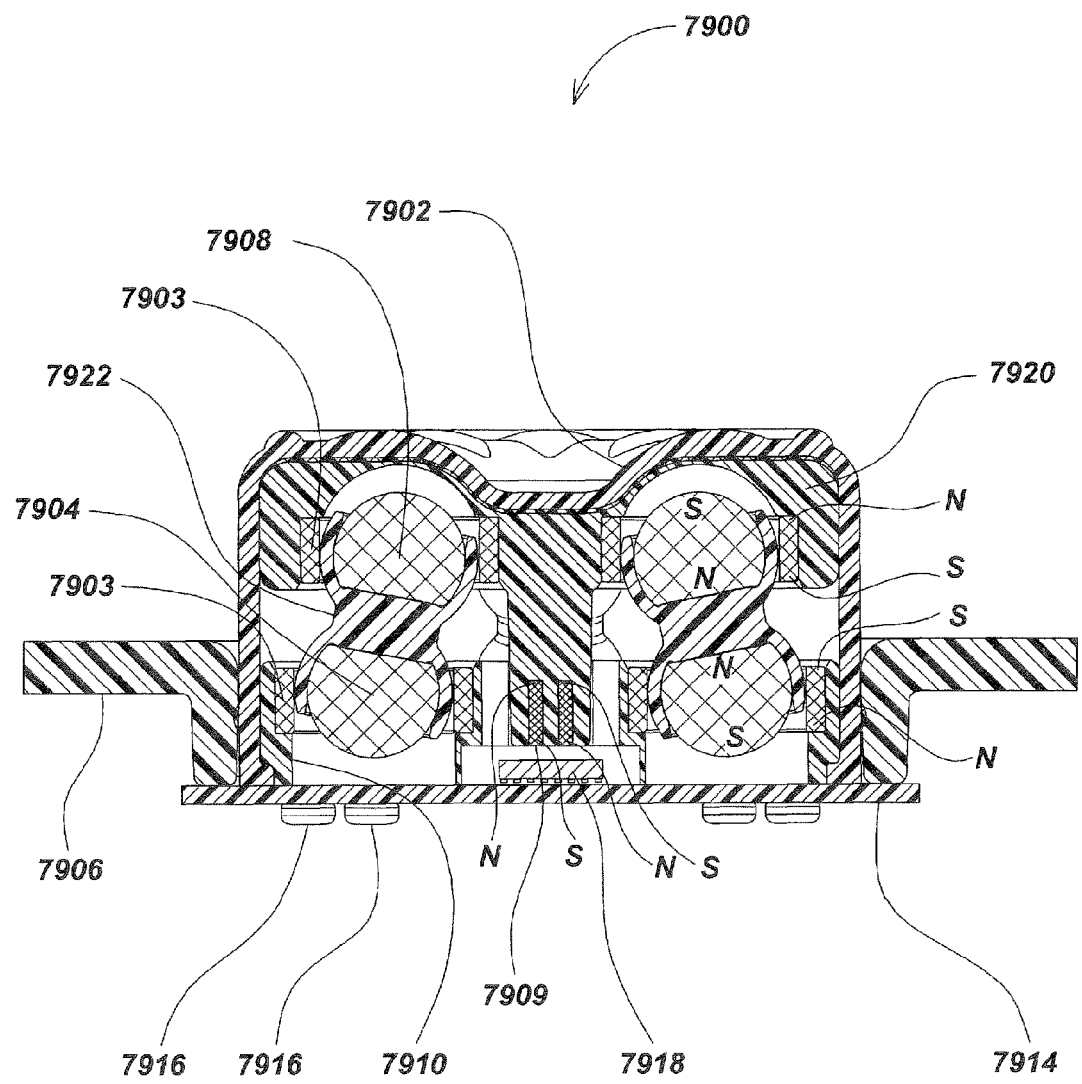
FIG. 79 is a vertical sectional view illustrating an alternate embodiment in which shorter double-ended connecting rods are utilized with semi-spherical magnets at each end, and in which sense magnets are used to enable measurement of motion by magnetic sensors.
Figure 80:
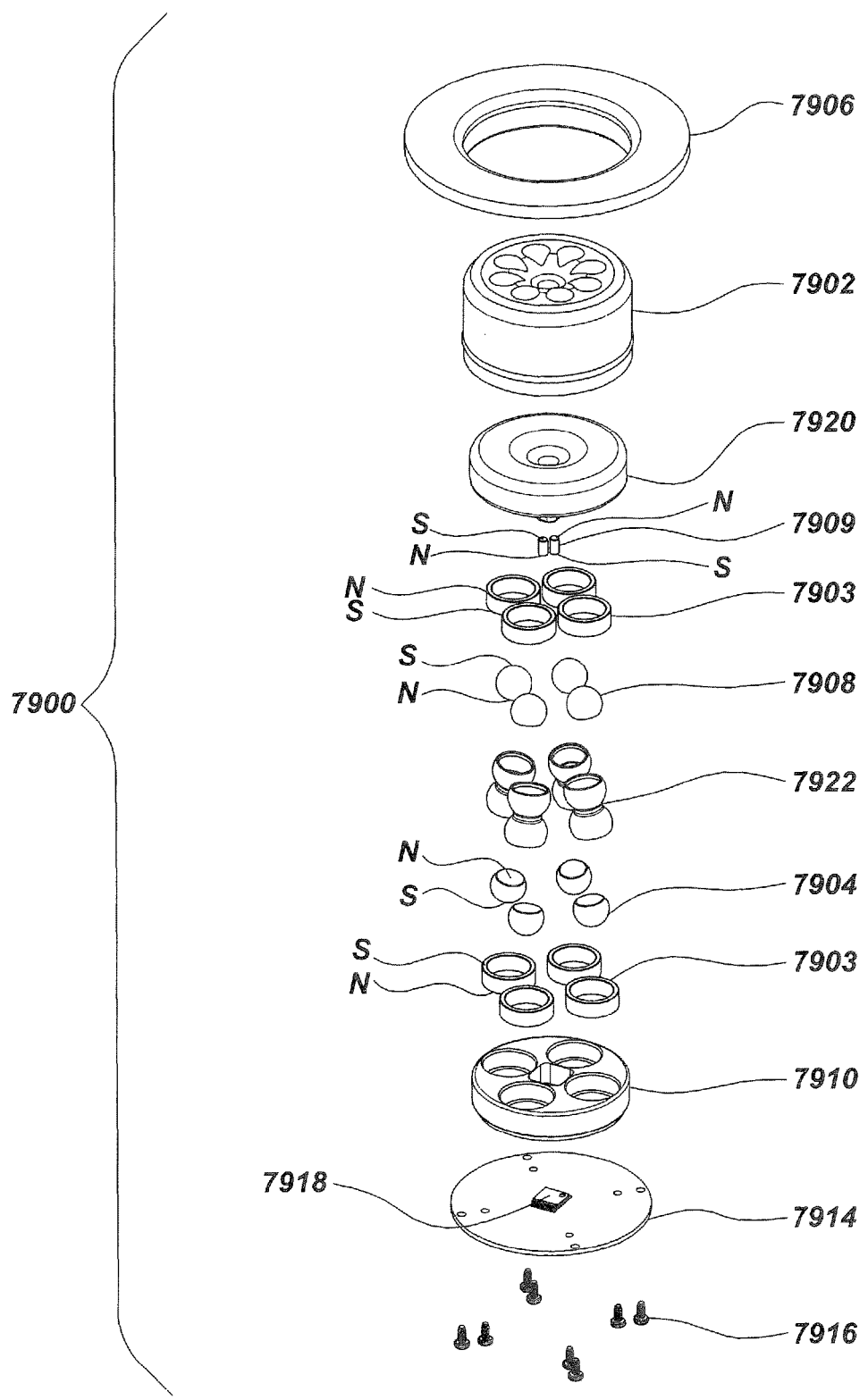
FIG. 80 is a reduced exploded isometric view of the embodiment of FIG. 79 taken from the top side.
Figure 81:
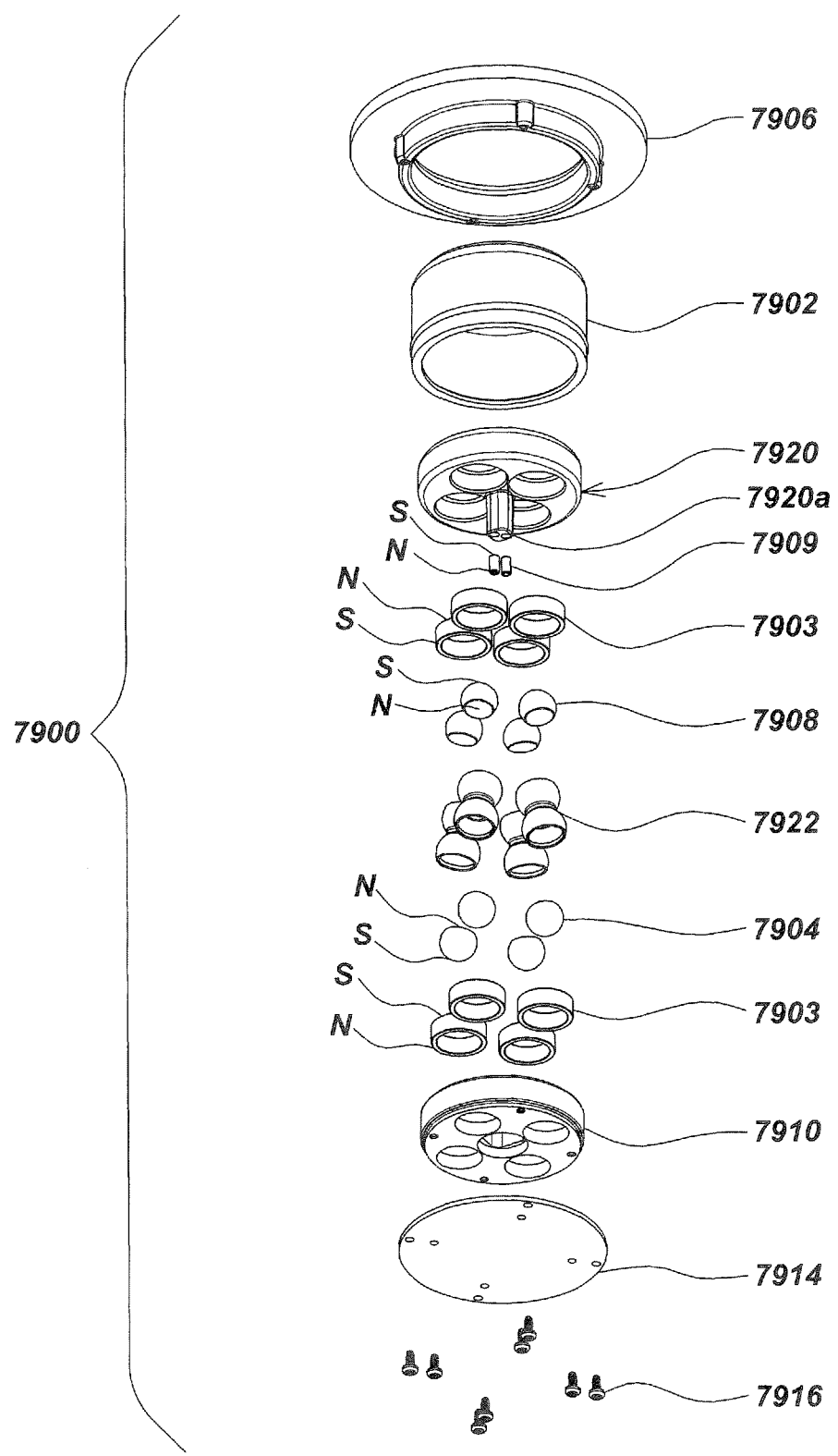
FIG. 81 is a view similar to FIG. 80 take from the bottom side.

Referring to FIGS. 79-81, a magnetic manual user interface device 7900 includes four double-ended connecting rods 7922, but only a single dual-type magnetic sensor 7918. Four or five sensors could optionally be used, optionally adding sensors under each magnet 7904. A press cap 7920 is molded with a central post 7920a (FIG. 81) having bores or channels that hold pin-shaped sense magnets 7909 (FIG. 79). The upper cap 7920 supports a flexible elastomeric cover 7902. The pin-shaped sense magnets 7909 are positioned above the dual three-axis magnetic sensor 7918 and act as sense magnets providing a localized magnetic field for the magnetic sensor 7918 and do not contribute significantly to magnetic restoring forces. The magnetic sensor 7918 measures the net magnetic field produced by all magnets of the embodiment near the pin-shaped sense magnets 7909. The digital signals output from the magnet sensor 7918 may be interpreted as the displacement of the upper cap by means of interface circuitry and/or interface software. The pin-shaped sense magnets 7909 may have opposite polarity. The pin-shaped sense magnets 7909 are closer to the magnetic sensor 7918 and provide a stronger and more readily measurable field than do the semi-spherical magnets 7904 and the annular magnets 7903 at the lower end of each of the connecting rods 7922. The press cap 7920 (FIG. 79) and the circular base 7910 (FIG. 80) receive the opposite ends of the double-ended connecting rods 7922 and retain the annular magnets 7903. The annular magnets 7903 maintain magnetic restoring force with the semi-spherical magnets 7904 and 7908. A PCB 7914 supports the dual-type magnetic sensor 7918 and is attached by a plurality of screws 7916 to the circular base 7910 and to the case 7906.

Figure 82:
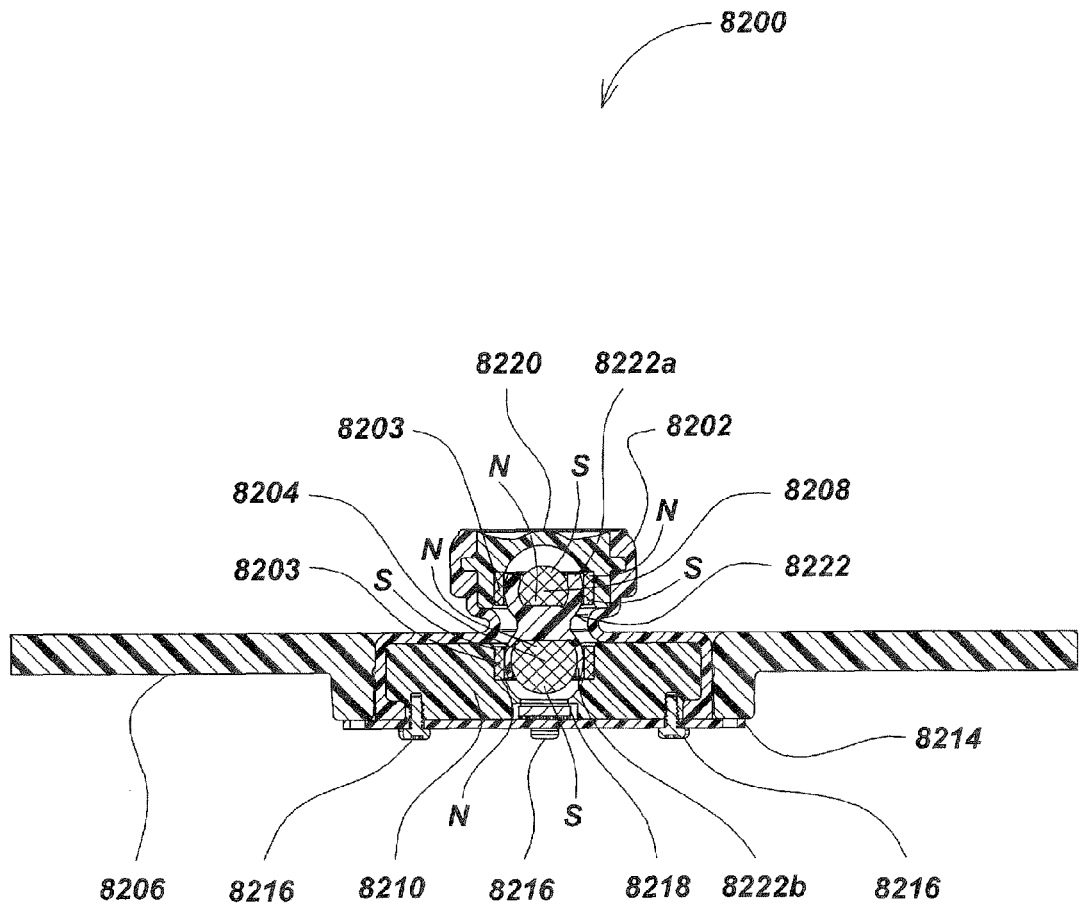
FIG. 82 is a vertical sectional view illustrating an alternate embodiment that utilizes a single double-ended connecting rod with semi-spherical magnets at each end, each suspended within annular magnets.
Figure 83:
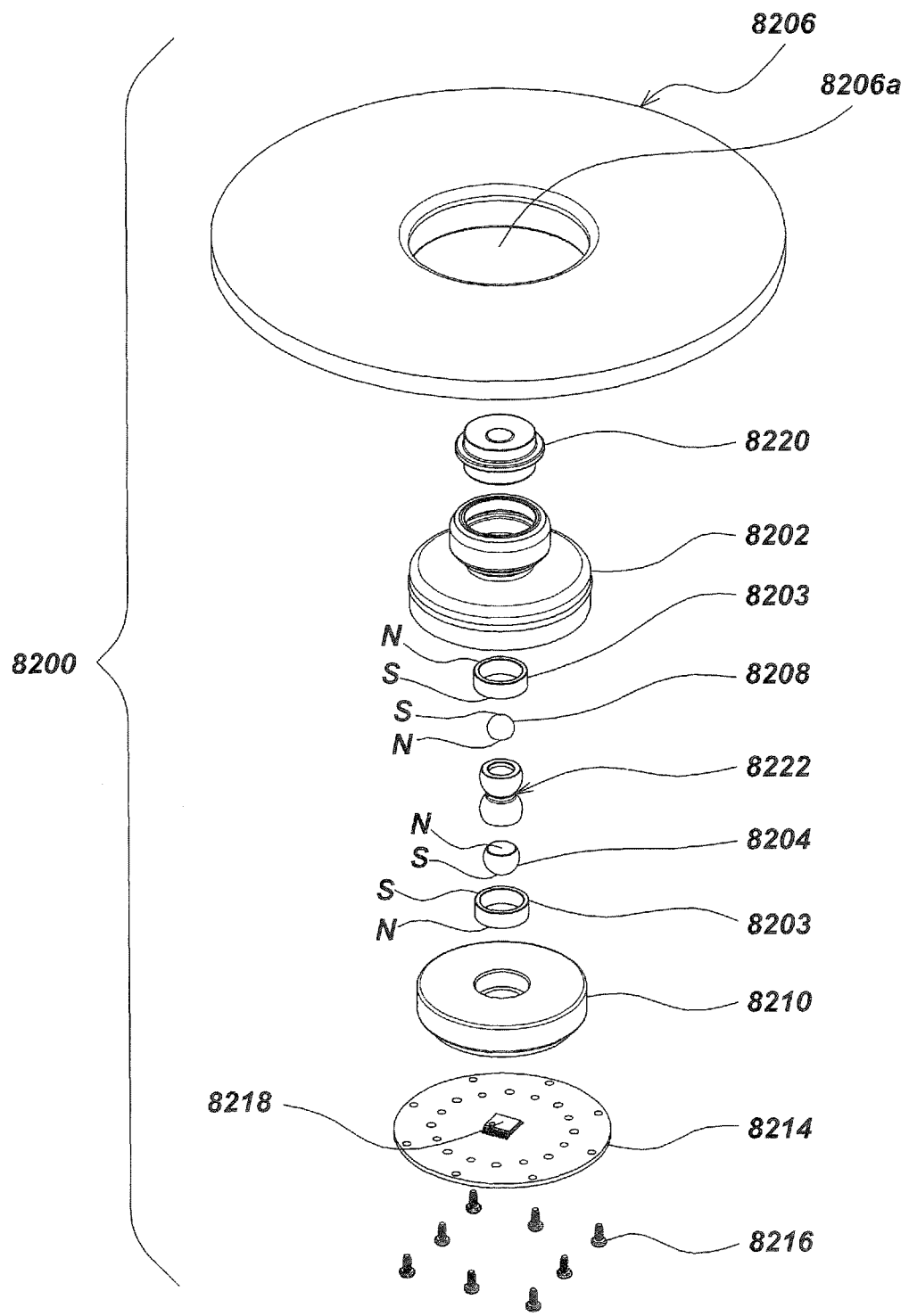
FIG. 83 is a reduced exploded isometric view of the embodiment of FIG. 82 taken from above.

Referring to FIGS. 82 and 83, a magnetic manual user interface device 8200 includes a single double-ended connecting rod 8222 with an upper cup 8222*a* and a lower cup 8222*b*. The internal space of each cup is flat-bottomed with two semi-spherical magnets 8204 and 8208 fitted into the cup 8222*a* and cup 8222*b*. The upper semi-spherical magnet 8208 is slightly smaller in diameter than the lower semi-spherical magnet 8204. The double-ended connecting rod 8222 is seated between a press cap 8220 and a cylindrical base 8210. Two annular magnets 8203 are fitted to circular openings in the press cap 8220 and the base 8210 and provide magnetic restoring force with the semi-spherical magnets 8208 and 8204. The base 8210 is attached by a plurality of screws 8216 to a PCB 8214, which supports a single three-axis magnetic sensor 8218. The magnetic sensor 8218 is centrally located on the PCB 8214 directly beneath the lower semi-spherical magnet 8204. The base 8210 sits within a circular opening 8206*a* centrally molded in the case 8206. A flexible elastomeric cover 8202 encloses the double-ended connecting rod 8222 and the press cap 8220 leaving the central section of the press cap 8220 exposed. The larger semi-spherical magnet 8204 at the bottom end of connecting rod 8222 provides a relatively stronger net magnetic field for measurement by the magnetic sensor 8218.

Figure 84:
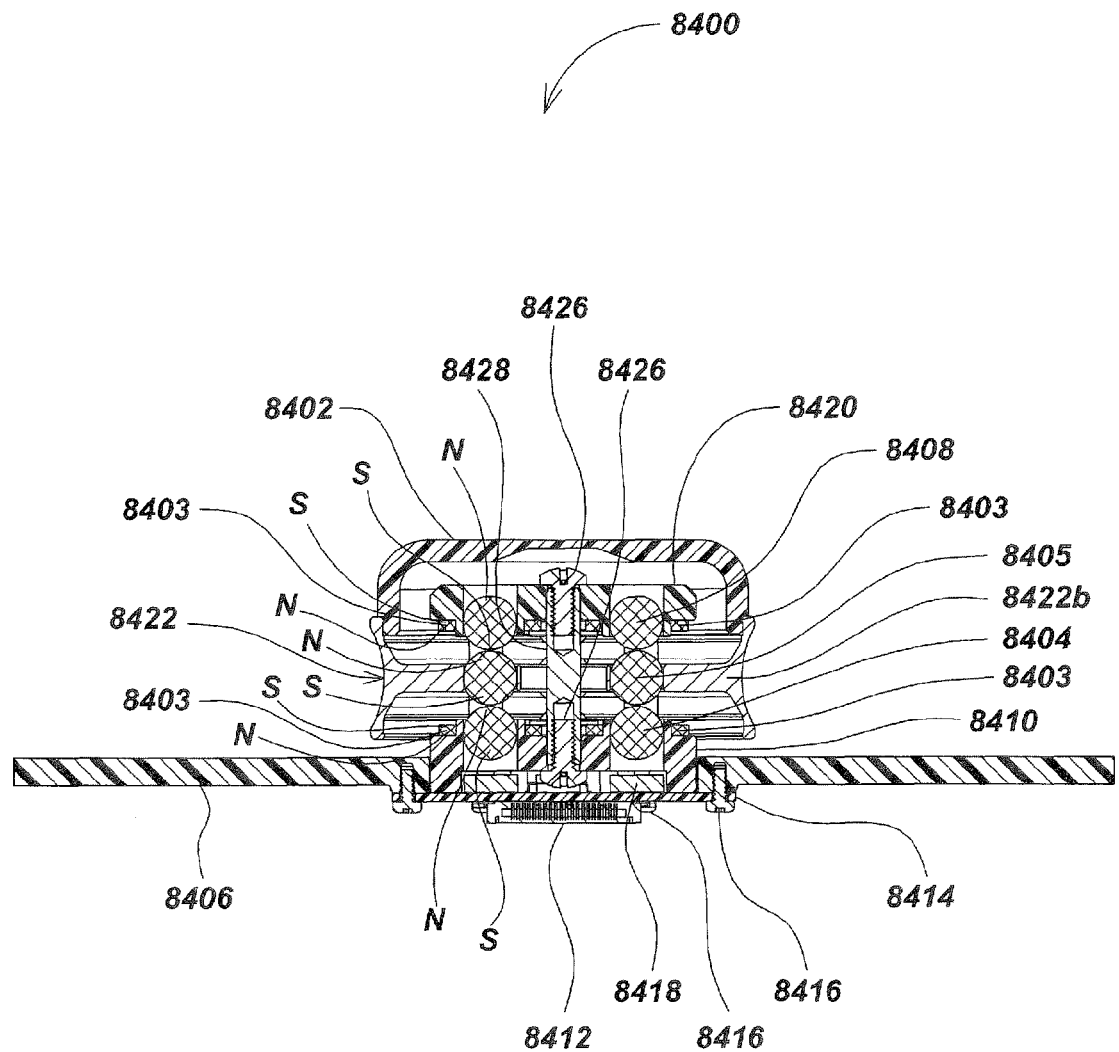
FIG. 84 is a vertical sectional view illustrating an alternate embodiment in which four columns of three spherical magnets each are used.
Figure 85:
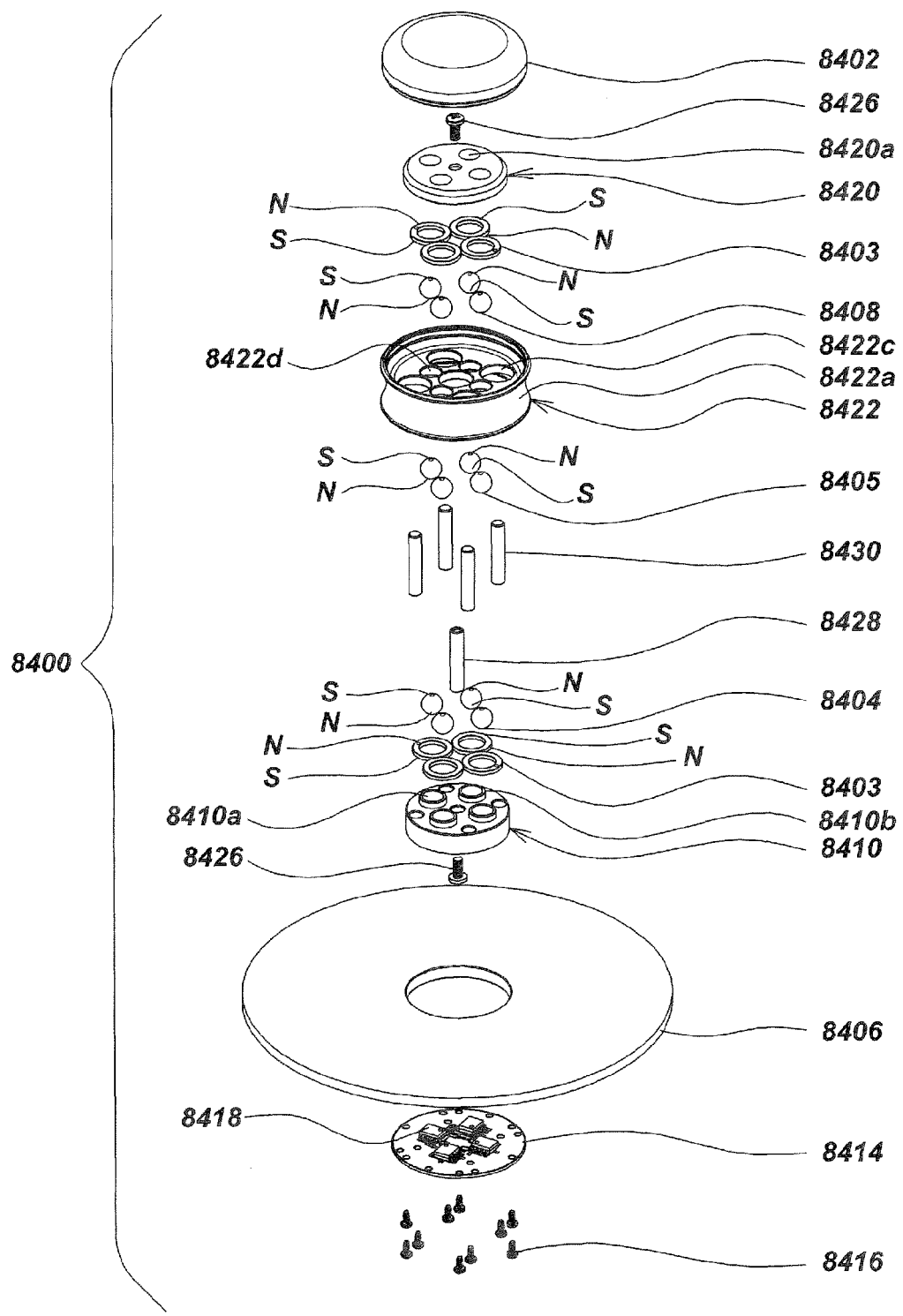
FIG. 85 is a reduced exploded isometric view of the embodiment of FIG. 84 taken from the top side.
Figure 86:
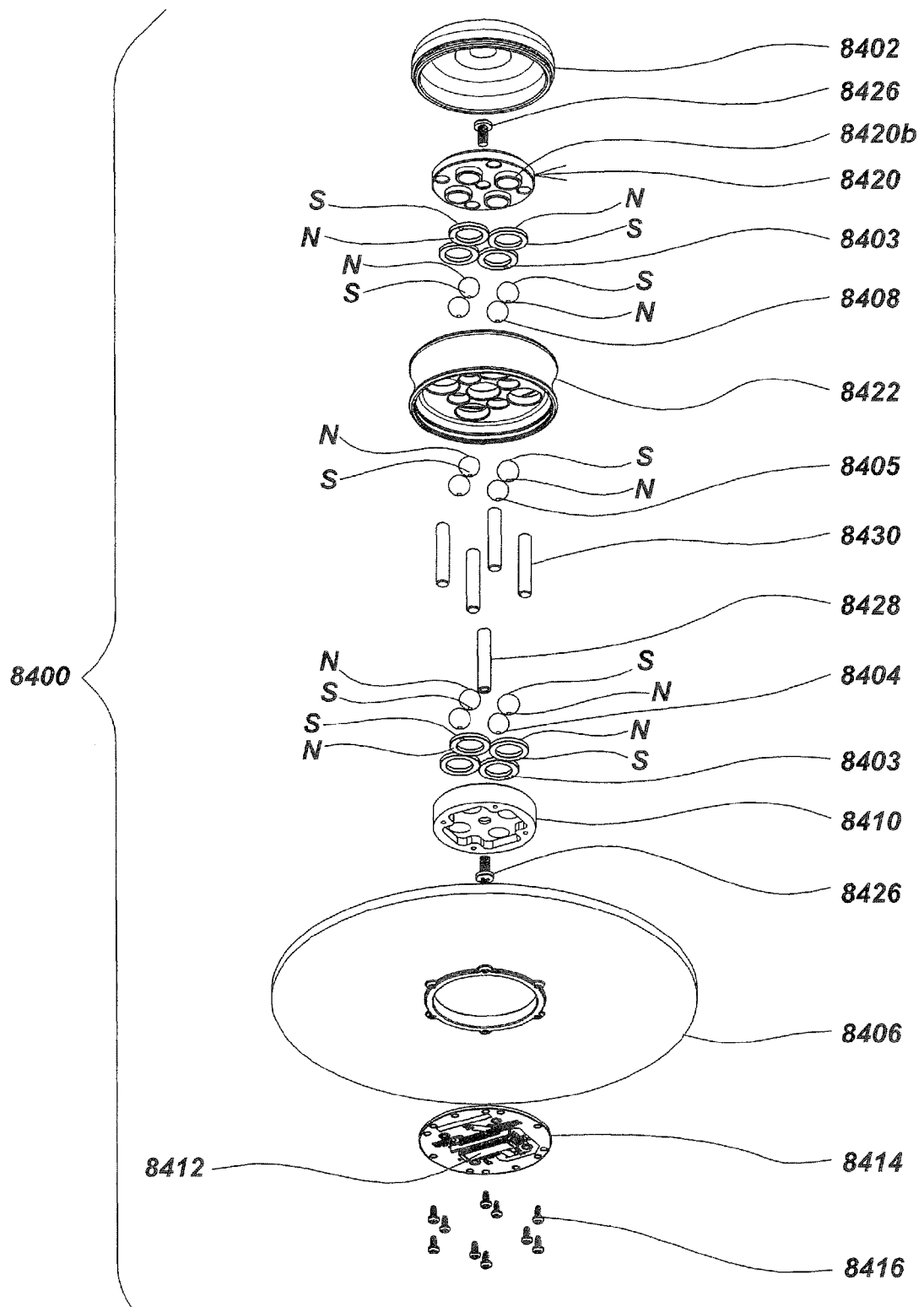
FIG. 86 is a view similar to FIG. 85 taken from the bottom side.

Referring to FIGS. 84-86, a magnetic manual user interface device 8400 includes an press cap 8420 and a base 8410 that are rigidly separated by four columnar risers 8430 arranged at the four corners of a rectangle. The central columnar riser 8428 is threaded to receive screws 8426 at its top and bottom which attach it to the press cap 8420 and the base 8410. The magnetic manual user interface device 8400 further includes a disk-shaped slider 8422 with inwardly curved sides. The curvature of the peripheral sidewall 8422*a* of the slider 8422 is such that its diameter is smaller at its center than at its top and bottom. At its narrowest diameter it is horizontally divided by a flat circular internal platform 8422*b* (FIG. 84). Five holes 8422*c* (FIG. 85) are molded into the platform 8422*b*, each being approximately eight millimeter in diameter, to allow the risers 8428 and 8430 to pass therethrough. The clearance around the risers 8428 and 8430 as they pass through the holes 8422*c* is sufficient to allow them limited motion in all directions. In addition to the five holes 8422*c*, the central dividing platform 8422*b* of the slider 8422 has four smaller holes 8422*d* molded into it, each being approximately five millimeter in diameter. These smaller holes 8422*d* allow for the oriented press fit of four spherical magnets 8405.

Four stacks of spherical magnets are formed, each stack comprising one floating upper spherical magnet 8408, one central non-floating, press-fit spherical magnet 8405, and one floating lower spherical magnet 8404. In their initial orientations, all three spherical magnets 8404, 8405 and 8408 are in one stack oriented with the same pole upward, the top orientation being North in the first stack, South in the second stack, North in the third stack, and South in the fourth stack. The resultant polarity in each stack causes the three spherical magnets 8404, 8405 and 8408 to tend to stay in position and orientation relative to each other.

The upper spherical magnet 8408 in each stack is seated in a circular recess 8420*a* (FIG. 85) in the press cap 8420, each recess being molded with a circular lip 8420*b* (FIG. 86) at its entrance in the lower surface of the press cap 8420. An annular magnet 8403 is seated around each lip 8420*b* creating a magnetic restoring force with the upper spherical magnet 8408 in each stack. The lower spherical magnet 8404 in each stack is similarly seated in recesses 8410*a* (FIG. 85) in the base 8410 which are similarly molded with lips 8410*b* around each recess, around which a plurality of lower annular magnets 8403 are seated. Thus for each stack of spherical magnets, magnetic restoring forces are established at the top and bottom of the stack with the annular magnets 8403. The center spherical magnets 8405 are not surrounded by annular magnets and are instead held in a fixed orientation to slider 8422 with the spherical magnets 8408 and 8404 above and below them. A thin Teflon® plastic shim (not illustrated) can optionally be placed between adjacent spherical magnets to improve the repeatability of the magnetic manual user interface device 8400 in use by reducing contact friction.

A slider cap 8402 (FIG. 84) is friction- or snap-fit to the slider 8422 such that moving the slider cap 8402 moves the slider 8422 and magnets 8405. Magnets 8405 are mounted fixed to slider 8422 with their poles vertically aligned. Panning the slider 8422 in any direction will displace the spherical upper and lower magnets 8404 and 8408 against their magnetic restorative force. Additional restorative forces are derived from the magnetic interaction between each annular magnet 8403, and the corresponding ones of the upper and lower spherical magnets 8408 and 8404. A PCB 8414 supports a multi-pin connector 8412 on its lower side. Four magnetic sensors 8418 are mounted on the upper side of the PCB 8414. The PCB 8414 is attached to the case 8406 and to the base 8410 by Plastite® screws 8416.

When the magnetic manual user interface device 8400 is panned in any direction or the slider 8422 is moved toward any corner or depressed, the net magnetic field can be measured by the magnetic sensors 8418 which are converted to digital data representative of such movement and transmitted to a computing system via the multi-pin connector 8412. Depressing the slider cap 8402 or slider 8422 centrally such that all four columns of spherical magnets are lowered simultaneous can be interpreted as a center "click" command, while depressing the slider cap 8402 toward one corner (left, right, front or rear) provides four distinct "click" commands. The tendency of the spherical magnets 8404 and 8408 in each column to self align provides a smooth transition away from the neutral position and back to the neutral position of the slider cap 8402 and slider 8422.

Figure 87:
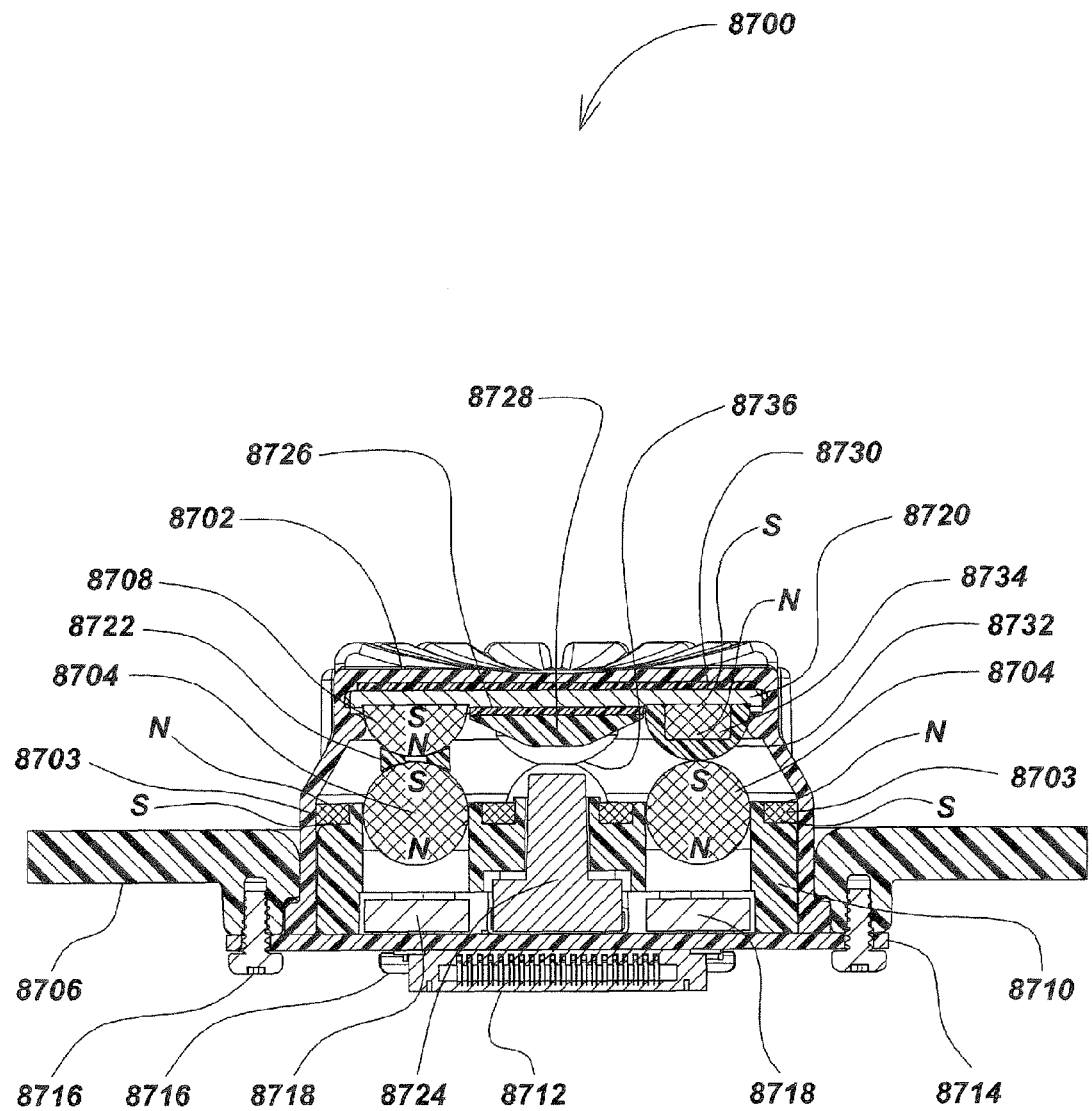
FIG. 87 is vertical sectional view illustrating an alternate embodiment in which cylindrical magnets are surrounded by plastic domes and cooperate with four spherical magnets.
Figure 88:
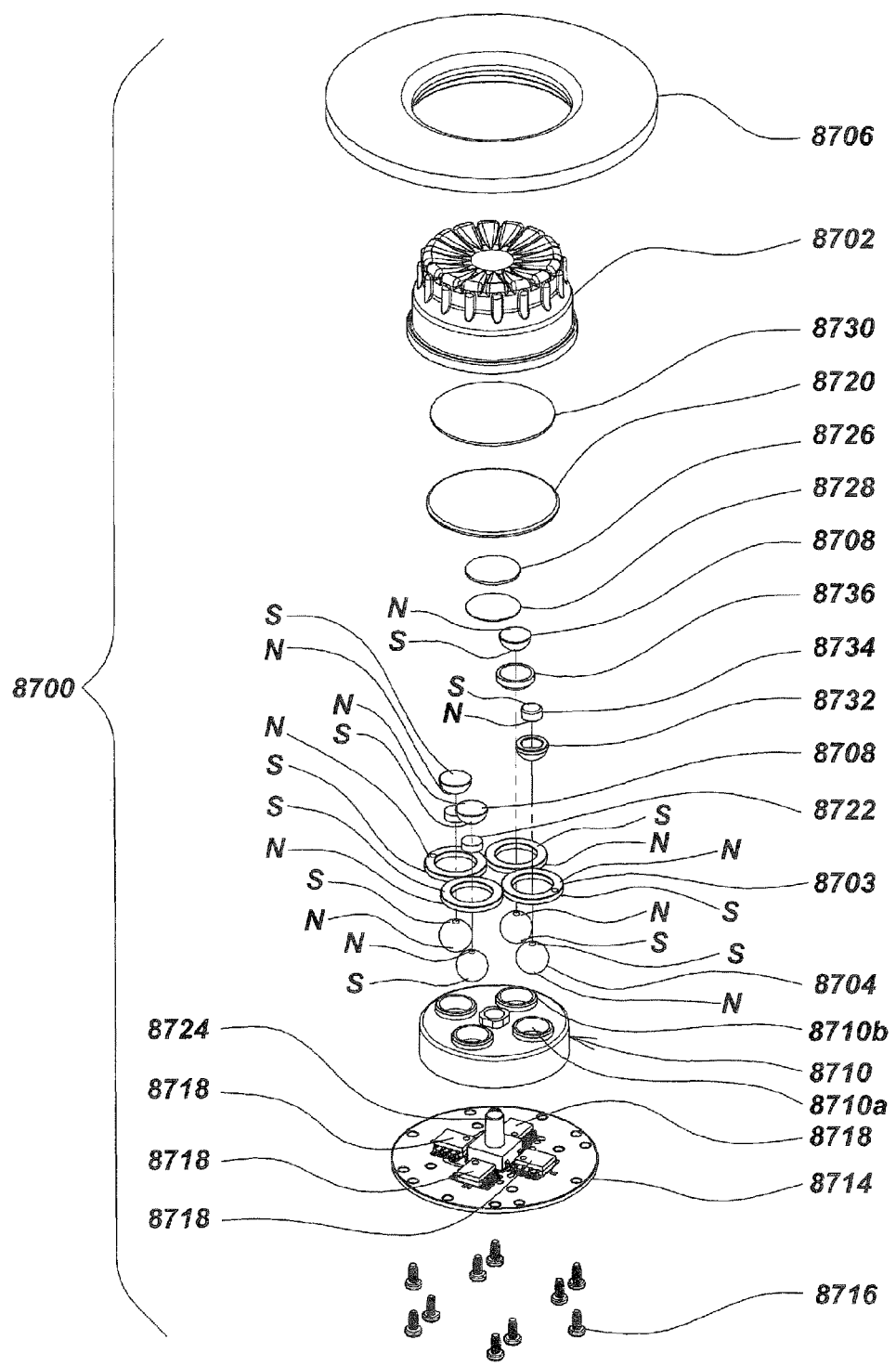
FIG. 88 is a reduced exploded isometric view of the embodiment of FIG. 87 taken from above.

Referring to FIGS. 87 and 88, a magnetic manual user interface device 8700 includes a molded cylindrical base 8710 that supports four spherical magnets 8704 in recesses

8710*a* (FIG. 88) with surrounding lips 8710*b*. A plurality of annular magnets 8703 are seated around the corresponding lips 8710*b*. Various magnet caps and spacers are illustrated. One spherical magnet 8704 optionally supports a slip cap 8732 which houses a cylindrical magnet 8734. The configuration of a cylindrical magnet within a plastic slip cap or holder is an alternative to a second spherical magnet or semi-spherical magnet. Another spherical magnet 8704 supports a low-friction spacer 8722 against a semi-spherical magnet 8708 with flattened top. Still another spherical magnet 8704 supports a spacer 8736 and a semi-spherical magnet 8708. A PCB 8714 supports four magnetic sensors 8718 and a central tact switch 8724 whose actuator extends through a central opening in base 8710. A spacer 8728 and a layer of VHB® tape 8726 lie above the central tact switch 8724. Washer cap 8720 and a layer of VHB® tape 8730 act as a mounting surface for the upper fixed magnets. A flexible elastomeric cover 8702 is secured by a case 8706 which captures a base 8710. The PCB 8714 attaches to the base 8710 and the case 8706 with ten screws 8716. A connector 8712 provides an interface to an external computing device or other systems.

Figure 89:
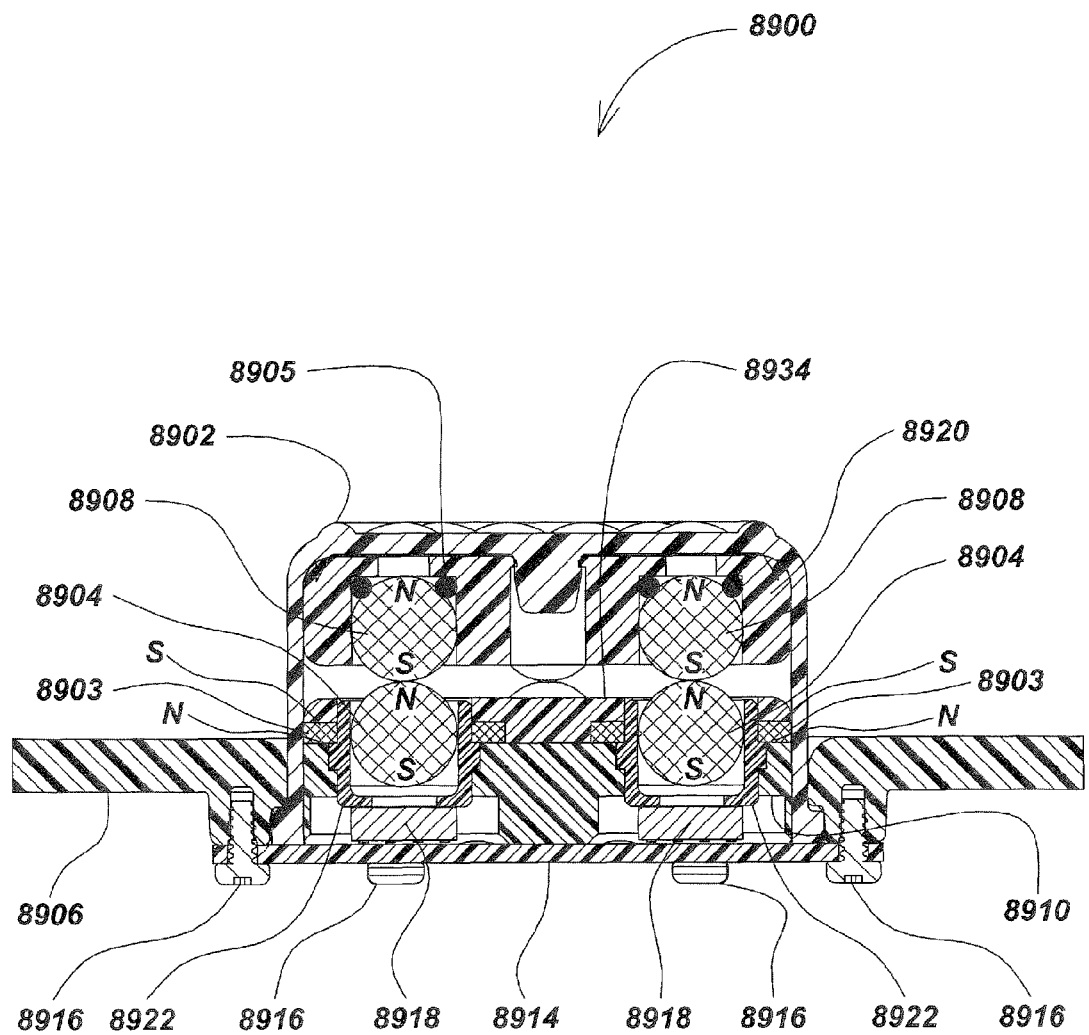
FIG. 89 is a vertical sectional view illustrating an alternate embodiment that utilizes four columns of two spherical magnets each.
Figure 90:
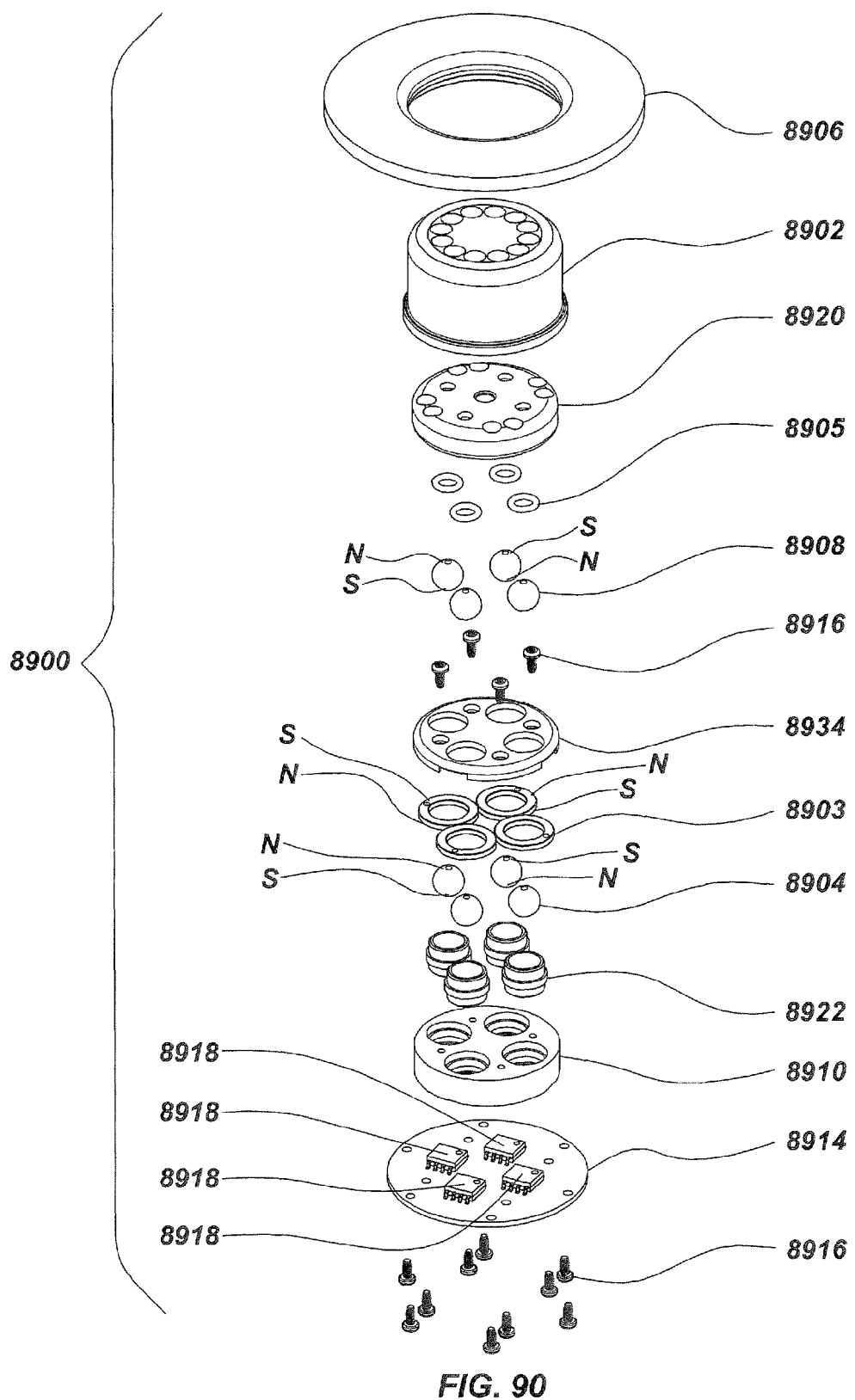
FIG. 90 is a reduced exploded isometric view of the embodiment of FIG. 89 taken from the top side.

Referring to FIGS. 89 and 90, a magnetic manual user interface device 8900 includes four stacks of two magnets each; one lower spherical magnet 8904 and one upper spherical magnet 8908. The magnets provide restorative forces by reason of magnetic interaction. Eight spherical magnets 8904 and 8908 are arranged in four stacks of two magnets. The upper spherical magnets 8908 are rigidly retained in circular recesses in the lower face of a press cap 8920 and centered in openings in a molded ring-keep 8934. Each of the upper spherical magnets 8908 contacts the upper surface of a lower spherical magnet 8904. The lower spherical magnets 8904 are individually seated in molded sleeves 8922 which are seated in corresponding circular recesses in a base 8910. An annular magnet 8903 surrounds each sleeve 8922 providing magnetic restoring force in alignment with the lower spherical magnet 8904 contained by the sleeve 8922. A PCB 8914 supports four magnetic sensors 8918 and is attached to the base 8910 by a plurality of screws 8916. Magnetic sensors 8918 measure the net magnetic fields beneath each lower spherical magnet 8904. The digital signals output from the magnetic sensors 8918 can be interpreted by interface circuitry and/or software as positional data of the upper press cap 8920. An O-ring 8905 (FIG. 90) sits on top of each upper spherical magnet 8908 between the upper spherical magnet 8908 and the press cap 8920. A flexible elastomeric cover 8902 (FIG. 89) encloses the press cap 8920 and the assembly of spherical and annular magnets. The cover 8902 is retained by a case 8906 which holds its lower flange against the PCB 8914. A plurality of screws 8916 attaches the PCB 8914 to the base 8910 and the case 8906.

The magnetic manual user interface device 8900 may be used as follows. The press cap 8920 within the flexible elastomeric cover 8902 can be moved freely in any direction as the upper spherical magnets 8908 roll against the lower spherical magnets 8904, against the magnetic restoring force between upper and lower spherical magnets 8908 and 8904 and their individual annular magnets 8903. In addition to lateral movement in any direction, the press cap 8920 within the cover 8902 may be tilted or centrally depressed. Any movement of the press cap 8920 moves the upper spherical magnets 8908 and their magnetically coupled corresponding lower spherical magnets 8904. The associated magnetic field changes represent unique positional information that can be measured by the magnetic sensors 8918. The net magnetic fields measured at each magnetic sensor 8918 may be interpreted as positional information by interface circuitry and/or interface software.

Figure 91:
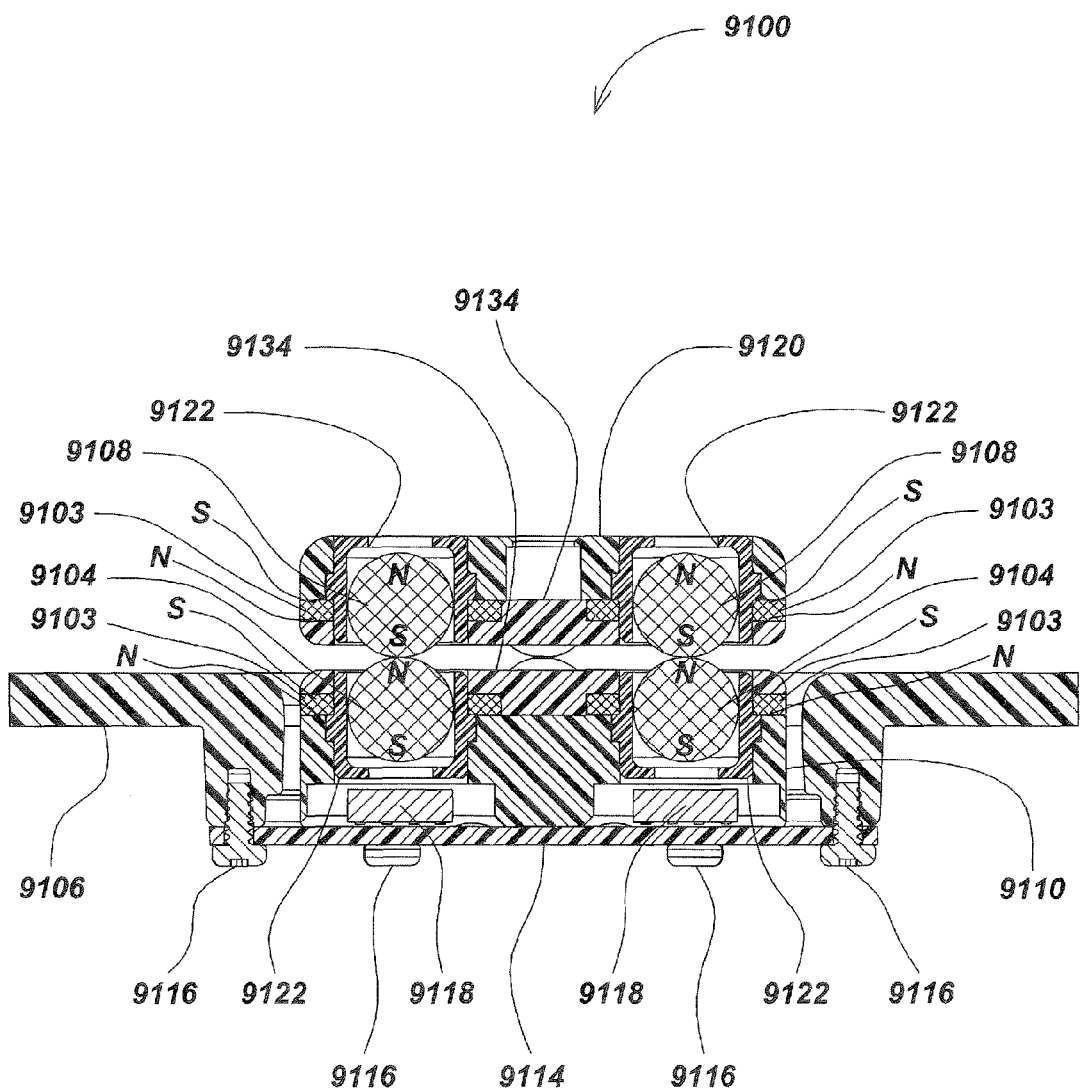
FIG. 91 is a vertical sectional view illustrating an alternate embodiment that utilizes eight spherical magnets in four columns of two each, and a different configuration of the annular magnets.
Figure 92:
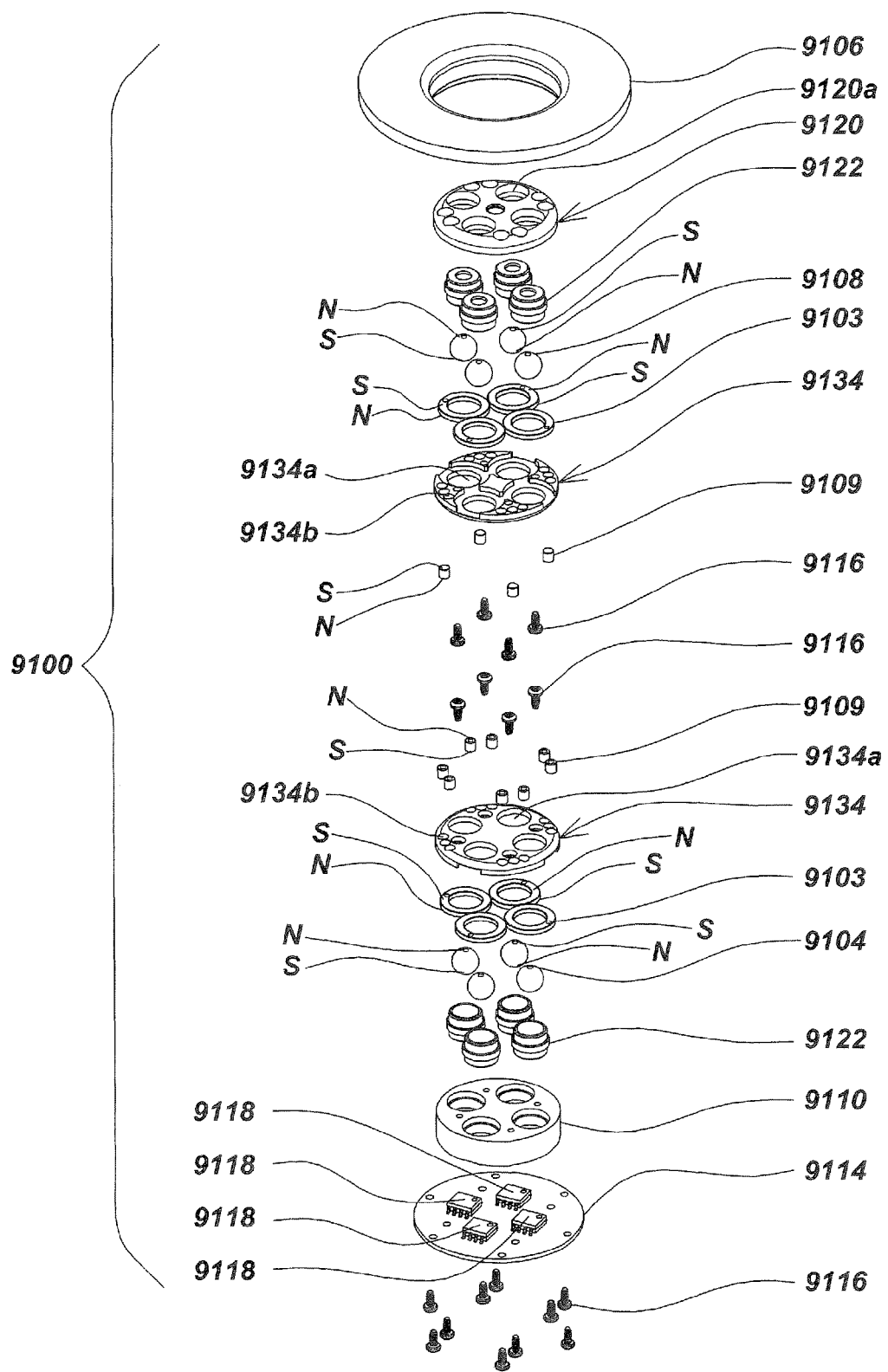
FIG. 92 is a reduced exploded isometric view of the embodiment of FIG. 91 taken from the top side.

FIGS. 91 and 92 illustrate a variation of the embodiment just described. A magnetic manual user interface device 9100 also uses four upper spherical magnets 9108 and four lower spherical magnets 9104. The four upper magnets 9108 are contained in corresponding sleeves 9122 which are retained in circular openings 9120*a* (FIG. 92) in an press cap 9120 and seated in aligned circular openings 9134*a* in a pair of upper and lower ring-keeps 9134. Each upper sleeve 9122 is surrounded by an upper annular magnet 9103 which is retained between the outer surface of the sleeve 9122 and the inner surface of the circular opening 9134*a* in the ring-keep 9134. Each ring-keep 9134 has three small circular recesses 9134*b* molded between each pair of the openings 9134*a* which hold small cylindrical magnets 9109. In the upper ring-keep 9134, four small cylindrical magnets 9109 are placed in the center recess of each set of three recesses 9134*b*, such that a cylindrical magnet 9109 is located between each pair of annular magnets 9103 in the upper ring-keep 9134.

The upper assembly containing the upper spherical magnets 9108, the upper annular magnets 9103, the small cylindrical magnets 9109, the press cap 9120 and the upper ring-keep 9134 are held together by a plurality of screws 9116 and forms a single floating unit. The lower surface of the upper spherical magnets 9108 contacts the upper surface of the lower spherical magnets 9104. The lower spherical magnets 9104 are seated in individual lower sleeves 9122 which are in turn retained in circular recesses molded in a base 9110. The lower annular magnets 9103 are seated in circular recesses in lower ring-keep 9134 and around the upper end of each sleeve 9122. Moving the upper floating unit produces magnetic restoring forces between each spherical magnet 9108 and 9104 and its corresponding annular magnet 9103. The floating unit may be moved in any direction, tilted or centrally depressed to provide a variety of command inputs to the system being controlled.

Four magnetic sensors 9118 (FIG. 92) measure the net magnetic field of all magnets in the embodiment, which can be interpreted by interface circuitry and/or interface software as positional data. The magnetic sensors 9118 output digital data to a computer system regarding manual user inputs. The floating unit is retained in contact with the lower assembly because of magnetic restoring force. A plurality of screws 9116 attaches a PCB 9114 to the base 9110 and a case 9106.

Figure 93:
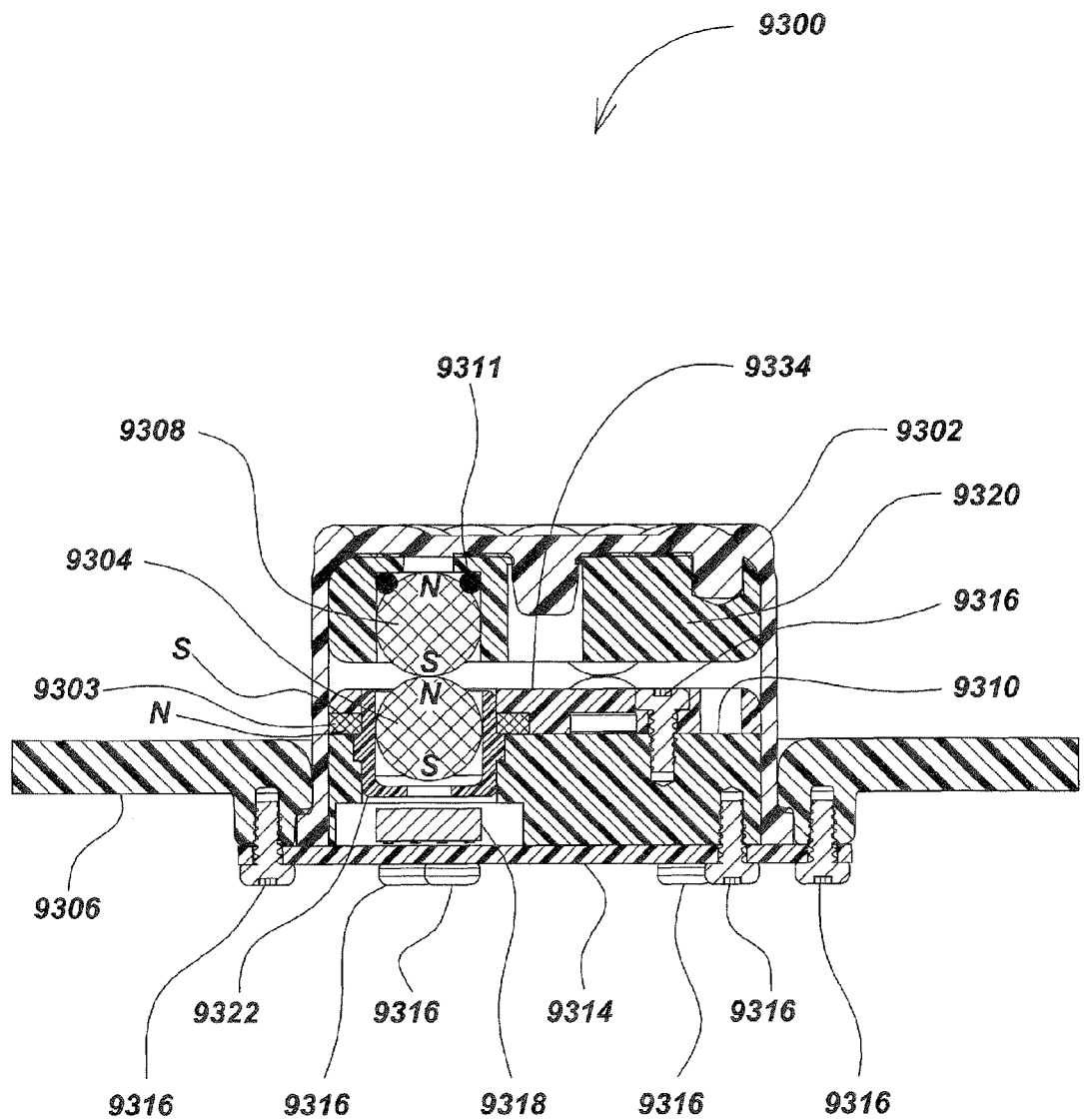
FIG. 93 is a vertical sectional view illustrating an alternate embodiment that utilizes six spherical magnets in three columns of two magnets each.
Figure 94:
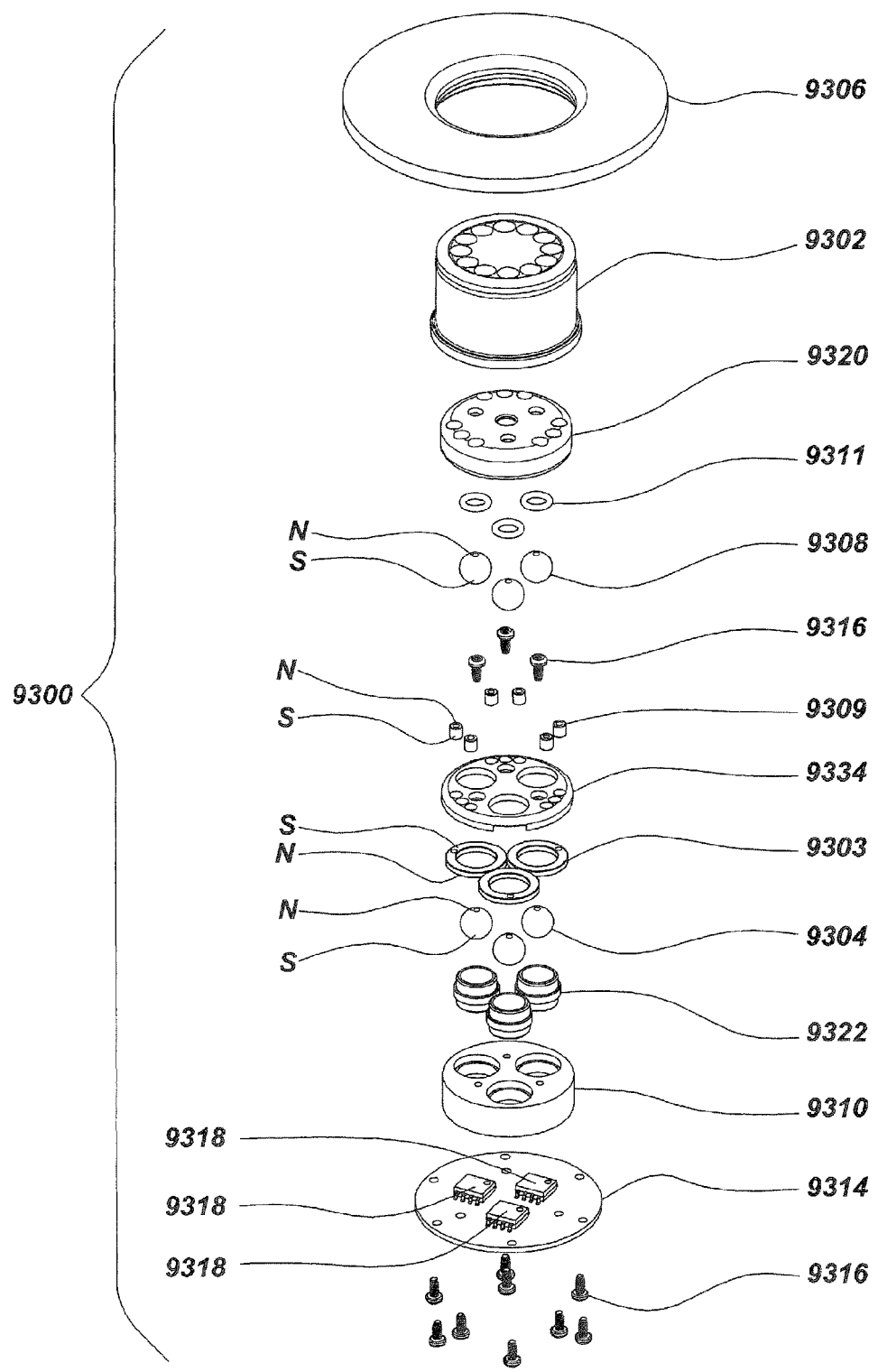
FIG. 94 is a reduced exploded isometric view of the embodiment of FIG. 93 taken from the top side.

Referring to FIGS. 93 and 94 a magnetic manual user interface device 9300 includes three pairs of spherical magnets 9304 and 9308. Flexible elastomeric cover 9302 encloses the exposed portions of magnetic manual user interface device 9300. The upper spherical magnets 9308 are fixed in circular recesses in combination with O-ring 9311 in press cap 9320. The lower spherical magnets 9304 are positioned in individual sleeves 9322 which are seated in circular recesses in a molded base 9310. Annular magnets 9303 retained in ring-keep 9334 fit around the upper end of sleeves 9322. Magnetic restoring force between the two spherical magnets 9304 and 9308 in each vertical pair, as well as between lower spherical magnets 9304 and their corresponding annular magnets 9303, tends to return the press cap 9320 and the spherical magnets 9304 and 9308 to their initial neutral orientations after displacement by the hand of a user. Small cylindrical magnets 9309 are seated in the outer recesses of each group of three recesses distributed around the outer portion of the upper surface of ring-keep 9334 and provide additional magnetic fields, improving discrimination of user inputs. The net magnetic fields measured by magnetic sensors 9318 can be interpreted as positional data by interface circuitry and/or interface software. A plurality of screws 9316 holds a PCB 9314 to the base 9310 and a case 9306.

Figure 95:
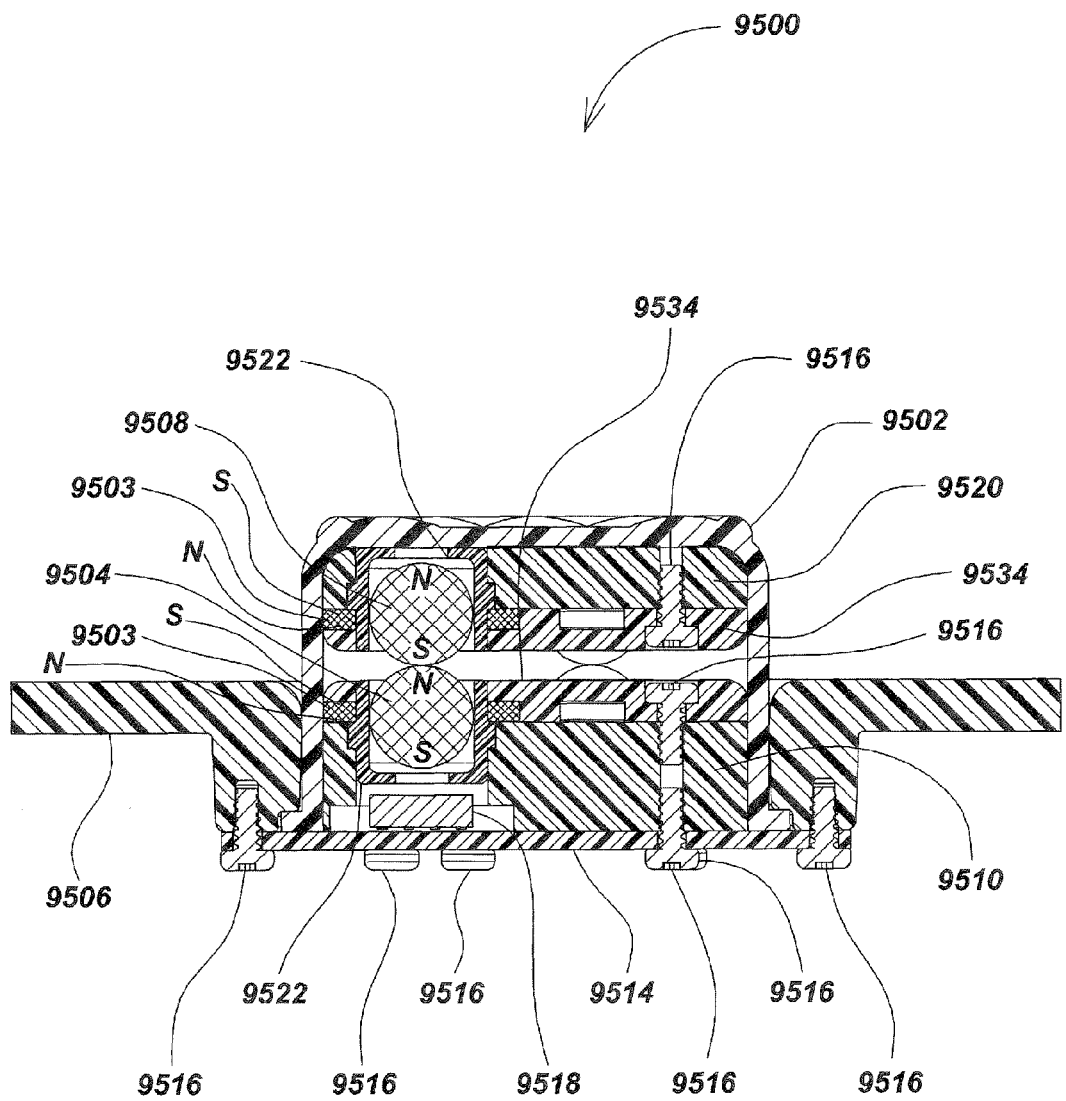
FIG. 95 is a vertical sectional view illustrating an alternate embodiment that utilizes six spherical magnets in three columns of two magnets each with a different configuration of the annular magnets.
Figure 96:
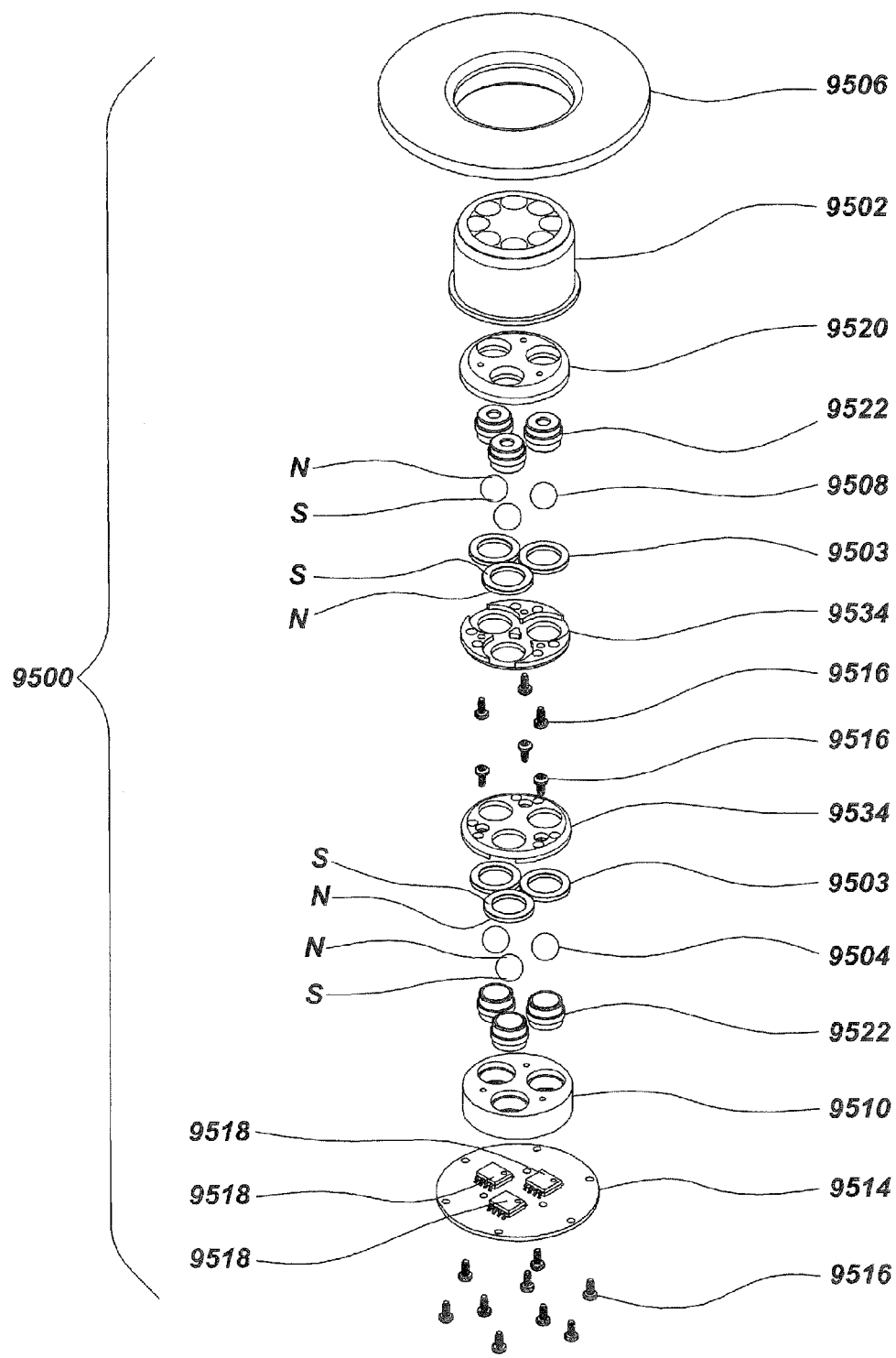
FIG. 96 is a reduced exploded isometric view of the embodiment of FIG. 95 taken from the top side.

Referring to FIGS. 95 and 96, a magnetic manual user interface device 9500 has three upper spherical magnets 9508 and three lower spherical magnets 9504. The upper spherical magnets 9508 are positioned in sleeves 9522 which are in turn centered in annular magnets 9503 seated in recesses in a press cap 9520. A similar construction positions the lower spherical magnets 9504 in sleeves 9522. Sleeves 9522 are surrounded by annular magnets 9503 in recesses in a base 9510. Three screws 9516 attach the press cap 9520 to a ring-keep 9534 in the upper assembly, and similarly three screws attach lower ring-keep 9534 to the base 9510. The lower surface of each upper spherical magnet 9508 is in contact with the upper surface of a corresponding lower spherical magnet 9504, creating a magnetic restoring force. Movement of the upper assembly causes both upper and lower spherical magnets 9504 and 9508 to rotate against the magnetic restoring force. Additionally, each of the spherical magnets 9504 and 9508 is suspended within its annular magnet 9503 and the resultant magnetic restoring force for each spherical magnet also tends to return it to its initial orientation. There are three magnetic sensors 9518 on a PCB 9514 which each measure the net magnetic field produced by all magnets within the embodiment. The measured net magnetic field may be interpreted as positional data by interface circuitry and/or interface software. A flexible elastomeric actuator cover 9502 contains both upper and lower arrays of spherical magnets 9504 and 9508 and is retained by a case 9506. The PCB 9514 is attached to the case 9506 by a plurality of screws 9516.

Figure 97:
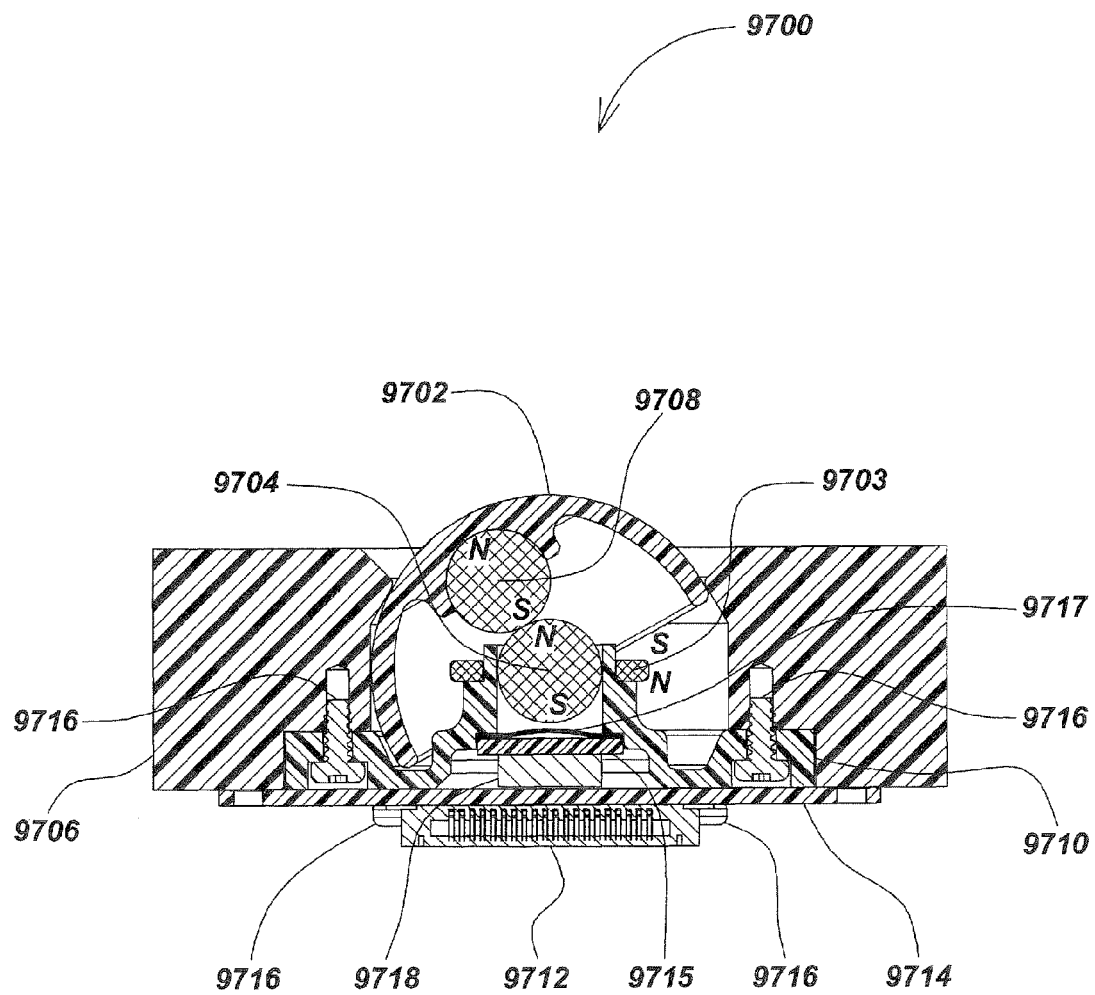
FIG. 97 is a vertical sectional view illustrating an alternate embodiment that utilizes two contacting spherical magnets, one of which is fixed in an actuator dome.
Figure 98:
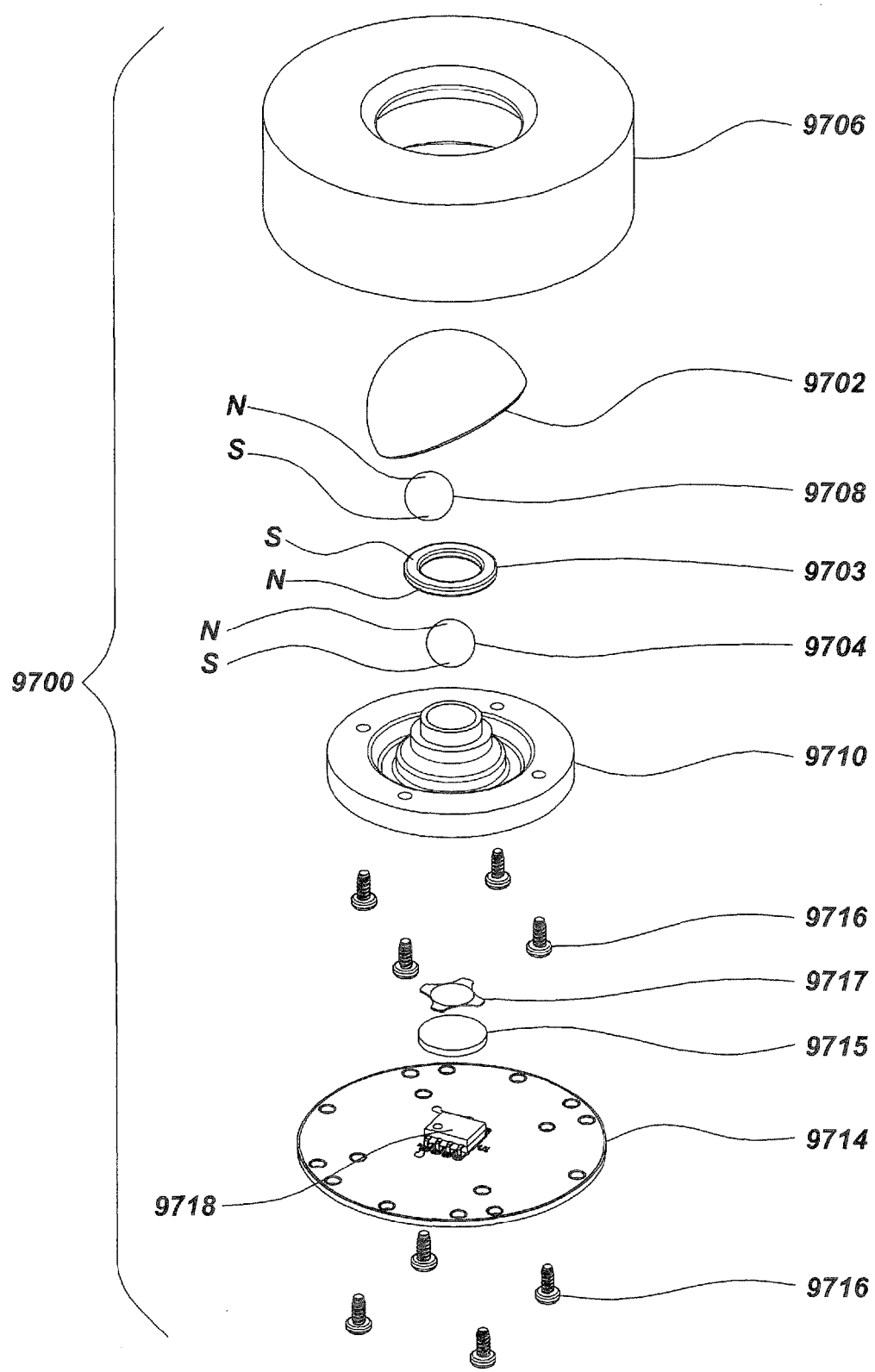
FIG. 98 is a reduced exploded isometric view of the embodiment of FIG. 97 taken from the top side.

Referring to FIGS. 97 and 98, a magnetic manual user interface device 9700 includes a single upper spherical magnet 9708 that is fixed in a dome-shaped manual actuator 9702 within an outer case 9706. A lower spherical magnet 9704 is contained in a carrier 9710 such that it may rotate freely in response to the movement of upper spherical magnet 9708. The magnetic restoring force between lower spherical magnet 9704 and an annular magnet 9703 provides restorative force to the lower spherical magnet 9704 and therefore to the upper spherical magnet 9708 and the manual actuator 9702. The manual actuator 9702 can be tilted in any direction and may also be rotated within case 9706. The design of the carrier 9710 is such that the dome-shaped manual actuator 9702 will bottom out against the carrier 9710 before it has traveled far enough to expose the underside of the dome-shaped actuator 9702 or its internal components. The dome-shaped manual actuator 9702 may be depressed vertically as well, displacing both the upper spherical magnet 9708 and the lower spherical magnet 9704 within the surrounding annular magnet 9703. A dome-switch 9717 is centrally seated beneath the lower spherical magnet 9704 on a Delrin® plastic spacer 9715 and provides a "click" or selection signal. The net magnetic field produced by all magnets in the embodiment is measured by a magnetic sensor 9718 which can be interpreted as positional data by interface circuitry and/or interface software. A plurality of screws 9716 attach a PCB 9714 with a connector 9712 to the carrier 9710 and also to the case 9706.

Figure 99:
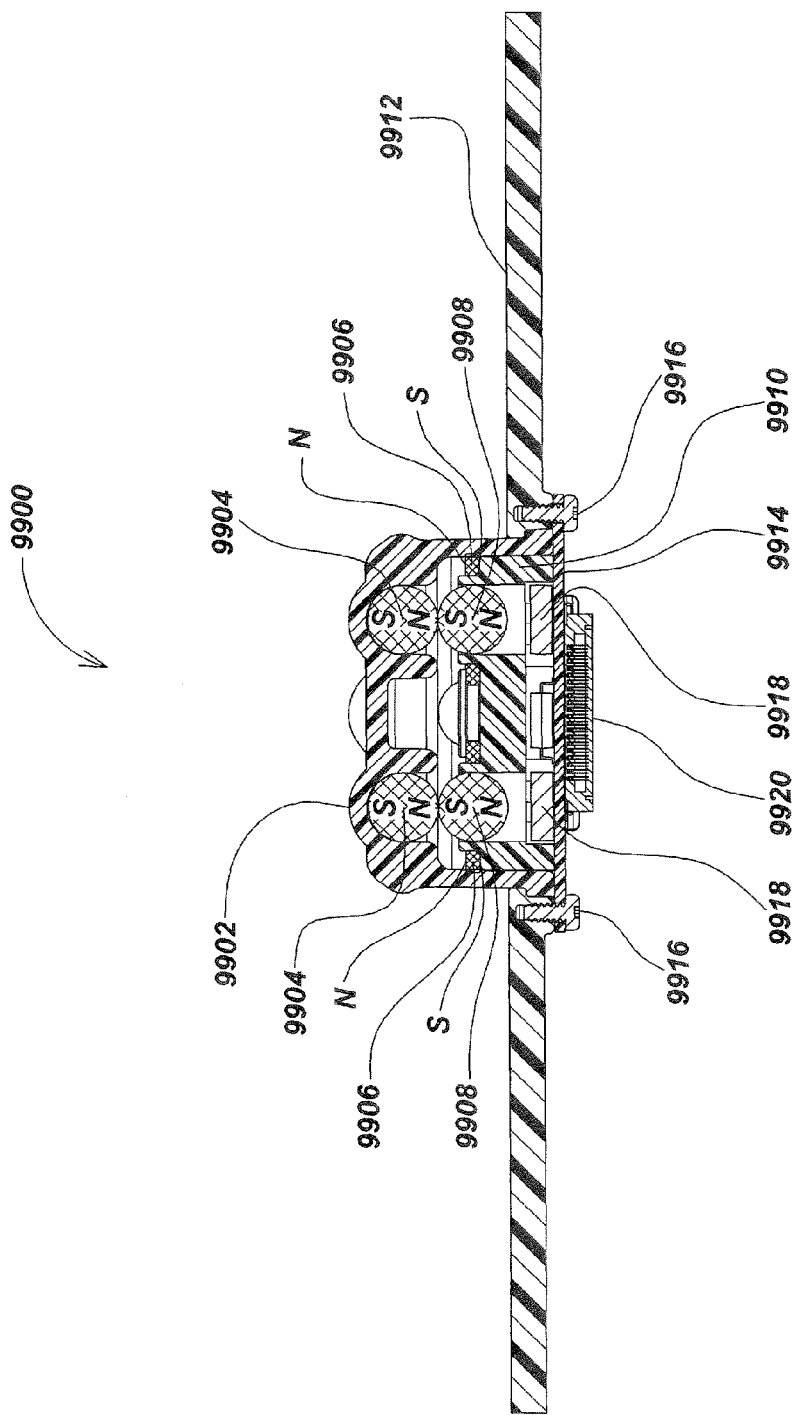
FIG. 99 is a vertical sectional view illustrating an alternate embodiment that utilizes eight spherical magnets in four columns of two magnets each, with the upper spherical magnets being confined in a pliant manual actuator.
Figure 100:
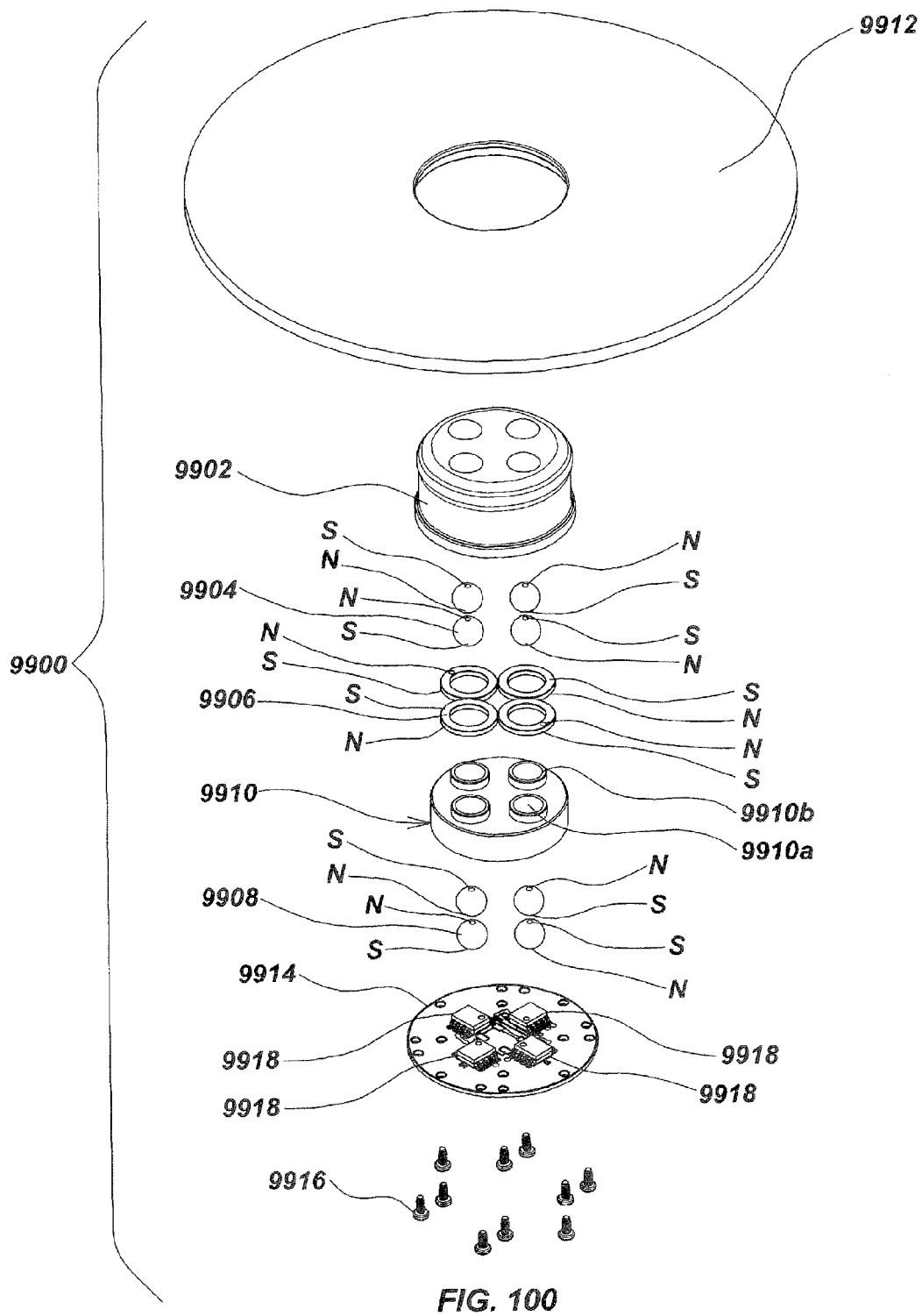
FIG. 100 is a reduced exploded isometric view of the embodiment illustrated in FIG. 99 taken from the top side.
Figure 101:
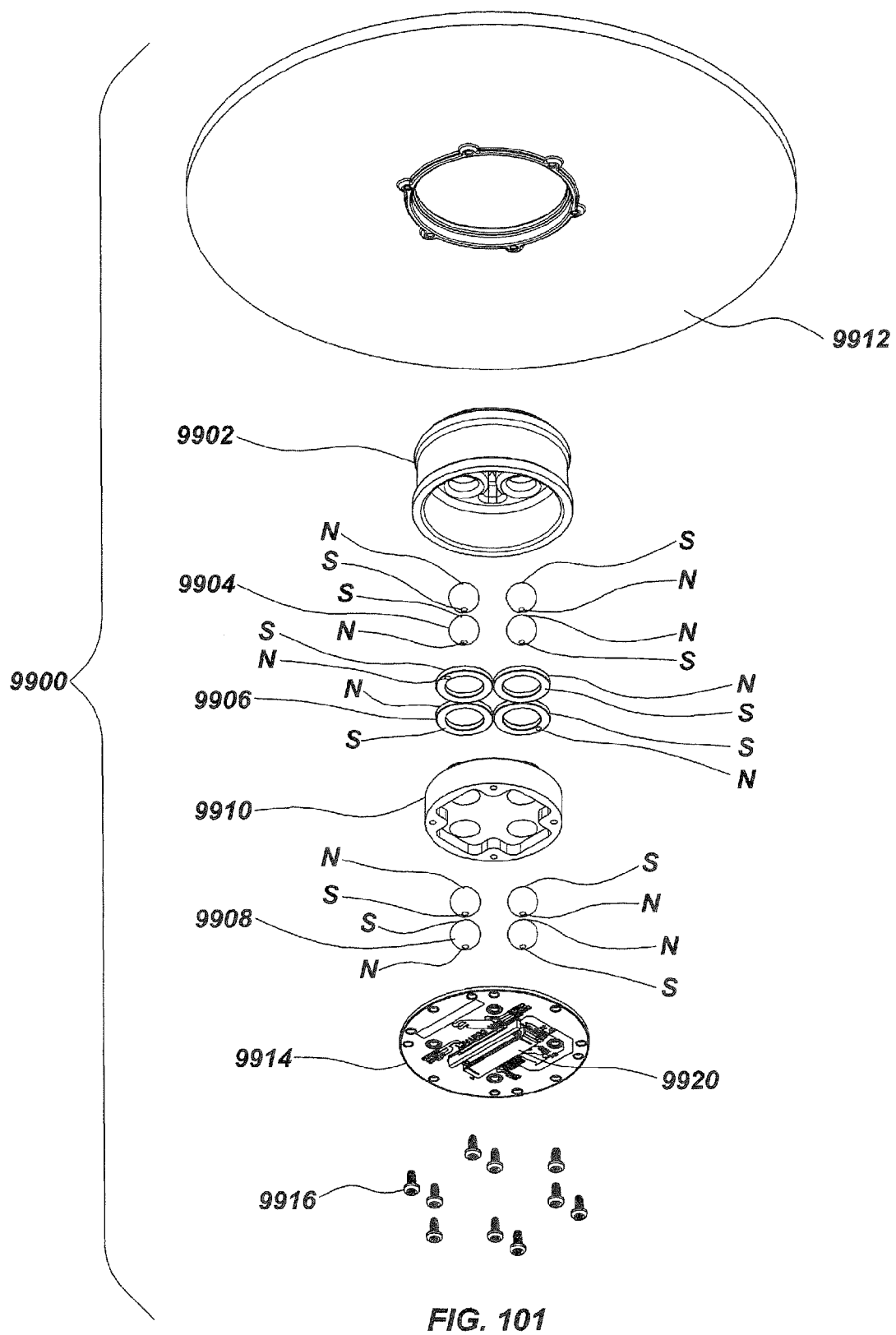
FIG. 101 is a view similar to FIG. 100 taken from the bottom side.

Referring to FIGS. 99-101, a magnetic manual user interface device 9900 includes four stacks of two spherical magnets in each stack. Upper spherical magnets 9904 rest in contact with lower spherical magnets 9908, held by magnetic force and covered with a pliant or flexible "squeezer" elastomeric actuator 9902. The upper spherical magnets 9904 are bonded to the elastomeric actuator 9902. The lower spherical magnets 9908 are positioned in circular bores 9910a (FIG. 100) in a base 9910. Each bore 9910a in the base 9910 has a small raised circular neck 9910b around its upper opening, around which an annular magnet 9906 is seated. Magnetic restoring force between the annular magnets 9906 and the lower spherical magnets 9908 returns the lower spherical magnets 9908 to their initial neutral orientations. This in turn tends to restore the upper spherical magnets 9904 to their initial neutral orientations when the elastomeric actuator 9902 is released. Beneath the lower spherical magnets 9908, magnetic sensors 9918 measure the net magnetic field produced by all the magnets above them. The digital data output by the magnetic sensors 9918 can be translated into positional data by interface circuitry and/or interface software. The digital data may also be transmitted to an associated computer system (not illustrated) through a system connector 9920. A plurality of screws 9916 attaches a PCB 9914 with its magnetic sensors 9918 to a case 9912. A central circular opening in the case 9912 admits the elastomeric actuator 9902.

Figure 102:
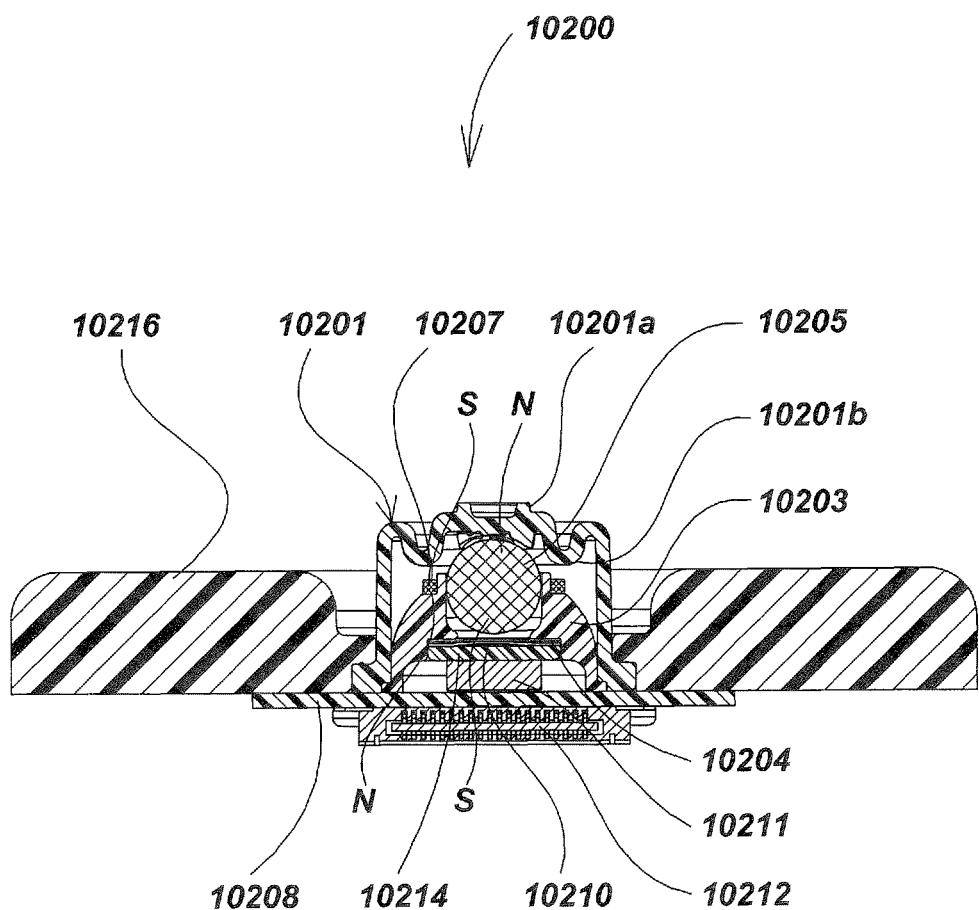
FIG. 102 is a vertical sectional view illustrating an alternate embodiment that utilizes a frictional contact to control the motion of a spherical magnet.
Figure 103:
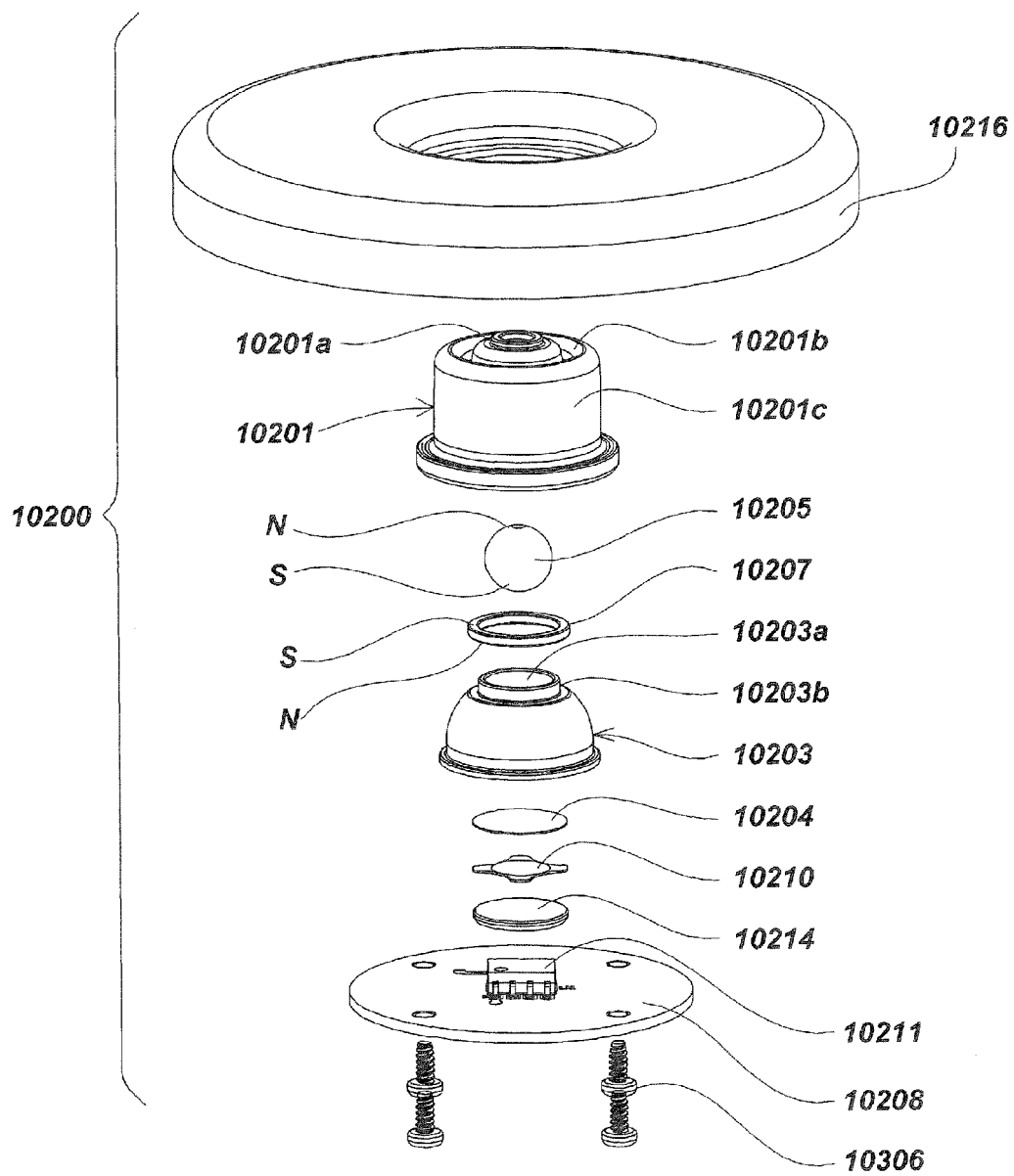
FIG. 103 is a reduced exploded isometric view of the embodiment of FIG. 102 taken from the top side.

Referring to FIGS. 102 and 103, a dual state magnetic manual user interface device 10200 can include a dome-switch at the lower limit of travel of the manual actuator on the minus-Z (downward) axis that activates a second mode when depressed. In this second mode a spherical magnet can still be rotated with the dome-switch depressed providing a second distinct command set to the interface. A skid pad made of a low-friction material such as Polytetrafluoroethylene (PTFE) thermoplastic or ultra-high molecular weight polyethylene (UHMWPE) material can be interposed between dome-switch and spherical magnet. The skid pad can allow the spherical magnet to freely rotate in the second mode. A mechanical dome-switch is typically only mildly magnetic and does not substantially interfere with the ability of a magnetic sensor to measure the net magnetic field near its location. The magnetic manual user interface device of the present invention could also include a virtual switch. In a virtual switch, the abrupt downward travel of the spherical magnet could be unambiguously interpreted by interface circuitry and/or interface software using the measured net magnet field from a magnetic sensor and interpreted as a switching action based on measuring a predetermined minimum rate of motion or based on some predefined boundary being passed in the motion of the spherical magnet.

Again referring to FIGS. 102 and 103, a magnetic manual user interface device 10200 utilizes a frictional connection between a pliant or deformable cup-shaped cylindrical manual actuator 10201 and a spherical magnet 10205 that allows a user to manipulate the manual actuator 10201 to move the spherical magnet 10205. When the user releases the manual actuator 10201, the frictional contact ceases, and the spherical magnet 10205 restores to its initial orientation as a result of magnetic restoring force between the spherical magnet 10205 and an annular magnet 10207 that surrounds the spherical magnet 10205. A dome-shaped ball-sleeve 10203 with a bore 10203a surrounds the spherical magnet 10205 and has a shoulder 10203b on which the annular magnet 10207 is seated. A central section 10201a of the top surface of manual actuator 10201 is spaced slightly above the upper surface of the spherical magnet 10205. The manual actuator 10201 is molded of an elastomeric or other suitable pliant material that has sufficient flexibility such when the central section 10201a is pressed downwardly by a user it contacts an upper surface of the spherical magnet 10205. A frictional grip or operative coupling is thereby established between the upper surface of the spherical magnet 10205 and the lower surface of the central section 10201a of the manual actuator 10201. Depressing the central section 10201a of manual actuator 10201a sufficient amount lowers the spherical magnet 10205 within the field of the annular magnet 10207. The magnetic axes of the spherical magnet 10205 and the annular magnet 10207 are co-axial. The polarities of the magnets 10205 and 10207 are oppositely oriented such that the interaction of their magnetic fields provides restoring forces that urge the axis of the spherical magnet 10205 to align with a neutral vertical axis when released.

The central section 10201a (FIG. 103) of the pliant manual actuator 10201 is coupled by a folded circular section 10201b to an outer cylindrical section 10201c. This construction allows the user to tilt the spherical magnet 10205 off its neutral axis when frictional contact is established between the central section 10201a and the upper surface of the spherical magnet 10205 by urging the central section 10201a in a specific direction away from the neutral vertical axis. The flexible folded section of 10201b folds on one side of the manual actuator 10201 and expands or unfolds on the opposite side of the manual actuator 10201. Thus once depressed the central section 10201a is still deformable laterally to allow the spherical magnet 10205 to be tilted by moving the central section away from the neutral axis. When the user releases the central section 10201a it disengages from the upper surface of the spherical magnet 10205 and returns to its neutral centered position due to the resilience of its pliant material. The manual actuator 10201 has an axis that extends vertically through the central section 10201a, and co-axial with the central axis of its cylindrical section 10201c. When the spherical magnet 10205 and the manual actuator 10201 are in their neutral positions, the central section 10201a is disengaged from the spherical magnet 10205 and the axis of the manual actuator 10201 is co-axial with the magnetic axis of the spherical magnet 10205.

Depressing the central section 10201a (FIG. 102) of the manual actuator 10201 further activates a multiple state mechanically activated switch in the form of a two state dome-switch 10210. When the dome-switch 10210 is activated it generates a "click" output signal. This "click" output signal is an electrical signal that is communicated from the dome-switch 10210 to a connected computing device by way of a connector 10212. The dome-switch 10210 provides tactile and audible feedback to the user.

The ball-sleeve 10203 (FIG. 103) retains the spherical magnet 10205 above a UHMWPE skid pad 10204 which provides a low-friction barrier between the spherical magnet 10205 and the dome-switch 10210. A circular carrier spacer 10214 supports the dome-switch 10210 and rests on a magnetic sensor 10211 which is mounted on a PCB 10208. Screws 10306 attach the PCB 10208 to a case 10216. The magnetic restoring force established between the spherical magnet 10205 and the annular magnet 10207 serves to restore the spherical magnet 10205 to its initial orientation when the friction between the spherical magnet 10205 and the manual actuator 10201 is released.

Figure 104:
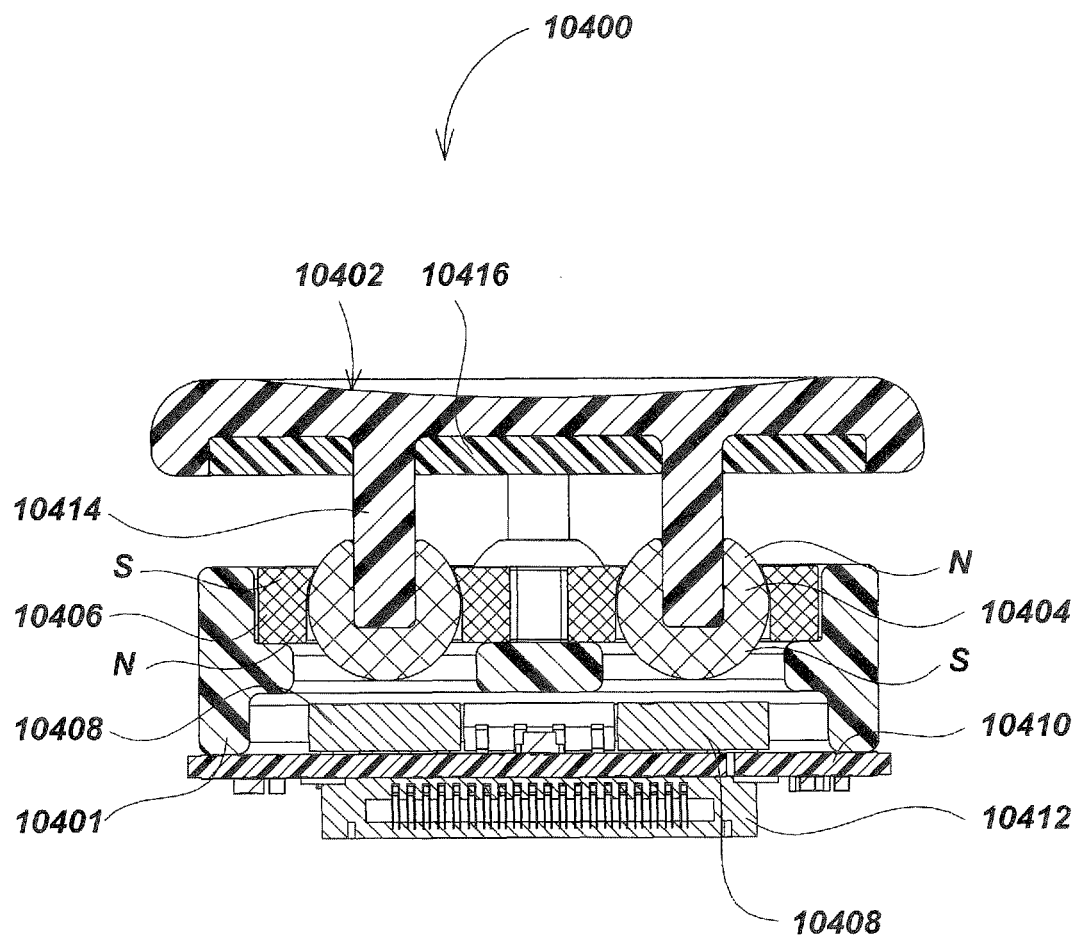
FIG. 104 is a vertical sectional view of an alternate embodiment that utilizes an actuator with multiple flexible legs, each leg being inserted into a spherical magnet.
Figure 105:
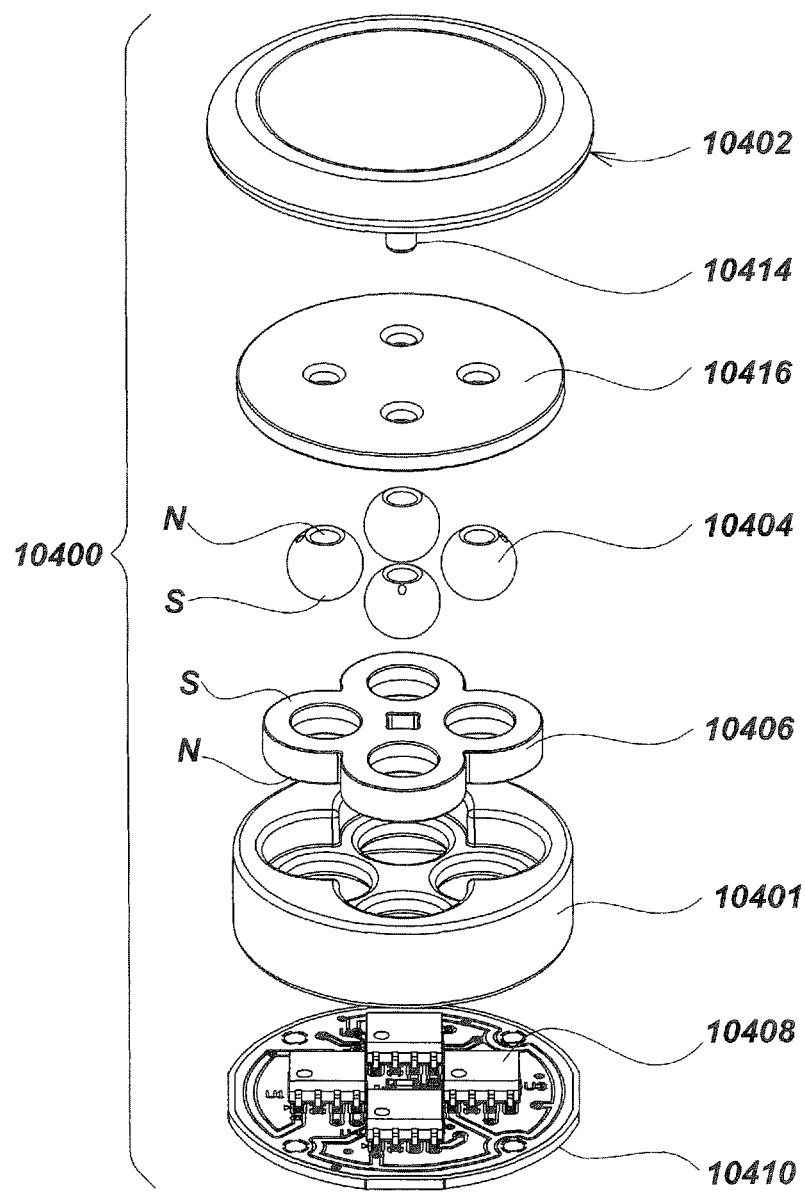
FIG. 105 is an exploded isometric view illustrating an alternate embodiment similar to that of FIG. 104.

Referring to FIGS. 104 and 105, a magnetic manual user interface device 10400 includes four spherical magnets 10404 each of which has been drilled or molded to receive one leg 10414 of a four-legged synthetic rubber over-molded manual actuator 10402. A semi-rigid plastic support ring 10416 has four circular openings through which the four legs 10414 of actuator 10402 extend. A four-lobed molded magnet 10406 retains the four spherical magnets 10404 in circular openings molded in each lobe. Molded magnet 10406 is seated in a case 10401. The molded magnet 10406 has a polarity that is oppositely oriented to that of the four spherical magnets 10404. Each spherical magnet 10404 is seated above a corresponding magnetic sensor 10408. The legs 10414 of the manual actuator 10402 provide alignment for the spherical magnets 10404. The legs 10414 are sufficiently flexible to permit angular and vertical movement of the manual actuator 10402. A connector 10412 mounted on a PCB 10410 connects to the magnetic sensors 10408 and allows digital signals representing magnetic field measurements to be transmitted to a computer system (not illustrated).

Figure 106:
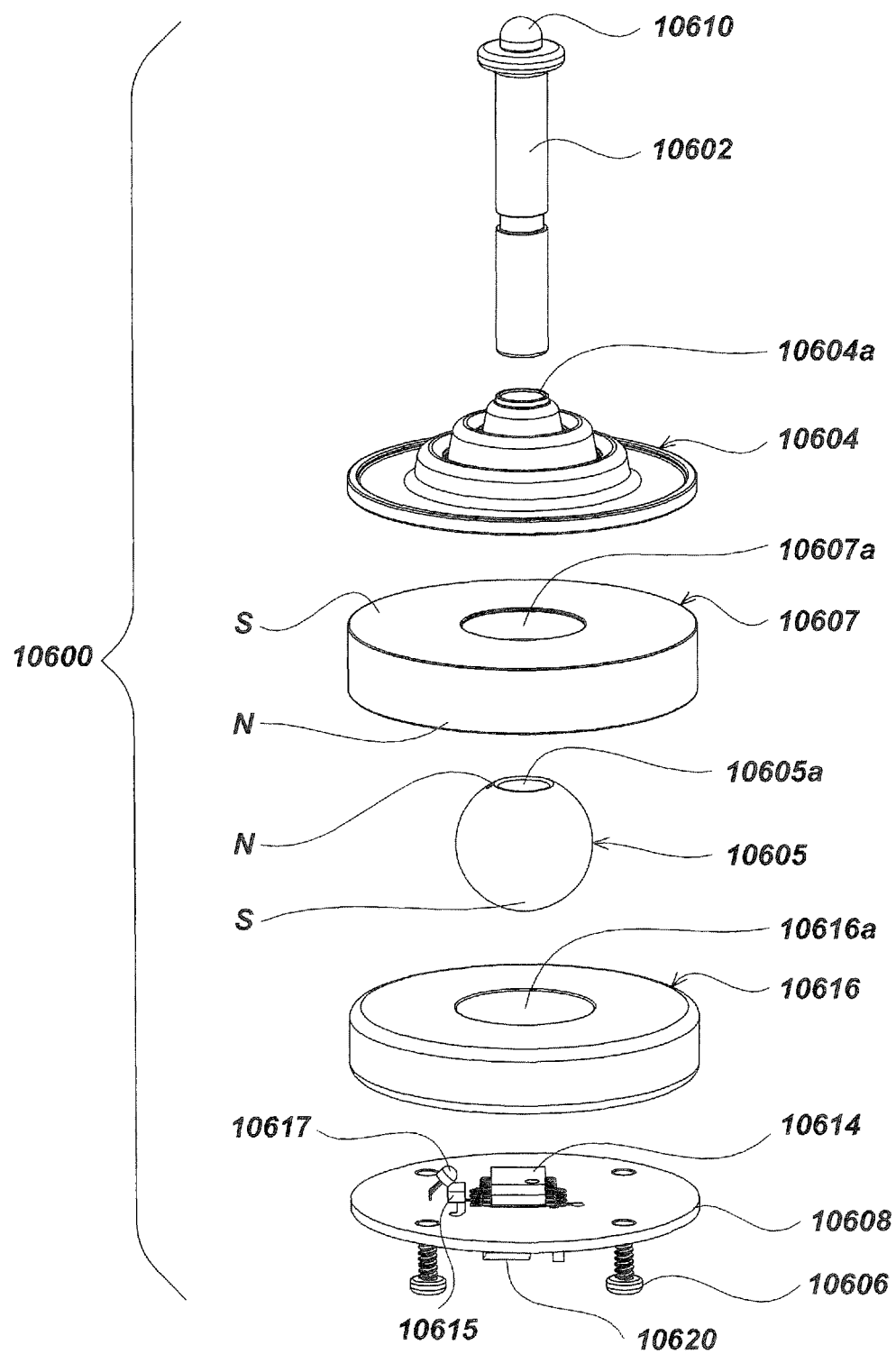
FIG. 106 is an exploded isometric view illustrating an alternate embodiment that utilizes an optical element to detect rotation of the spherical magnet.
Figure 107:
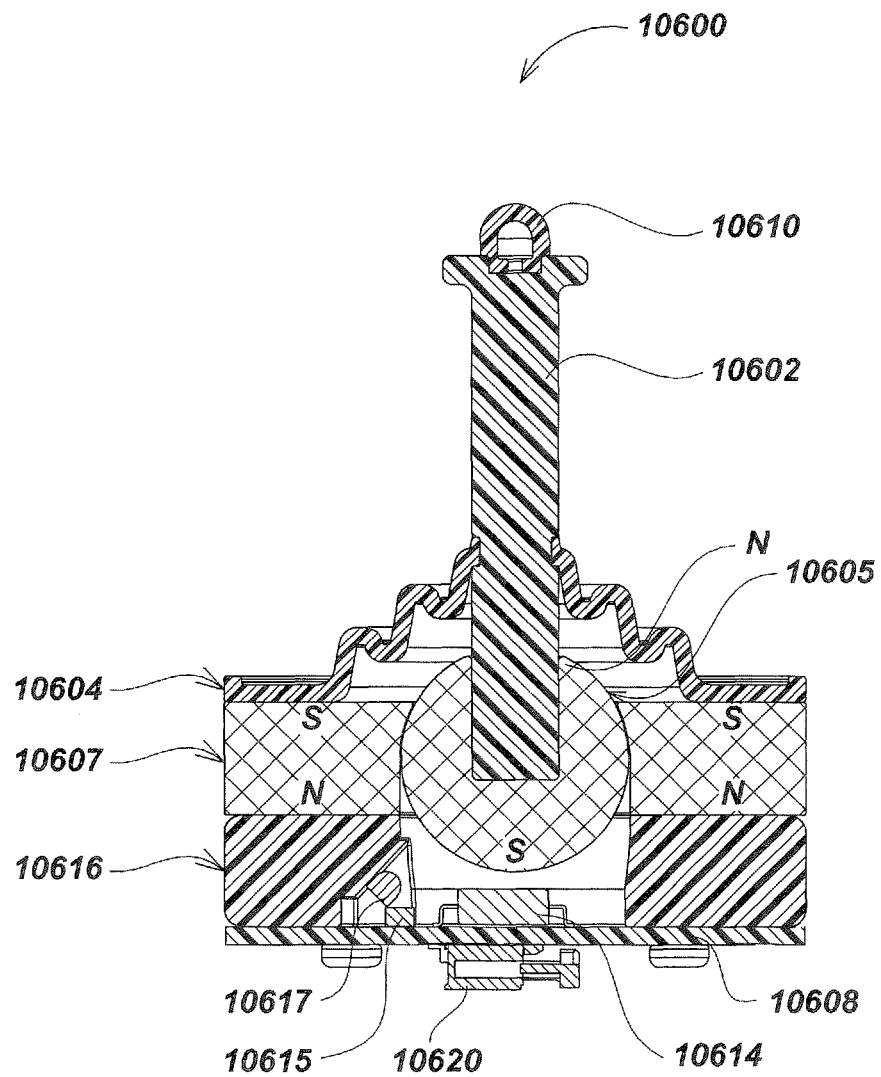
FIG. 107 is an enlarged vertical sectional view of the embodiment of FIG. 106.

Referring to FIGS. 106 and 107, a magnetic manual user interface device 10600 includes an LED 10617 and an optical sensor 10615 which are both mounted on a PCB 10608 in addition to a magnetic sensor 10614. The optical sensor 10615 is a two dimensional surface displacement measuring sensor such as those commonly used in optical computer mice user input devices. A multi-pin electrical connector 10620 mounted on the PCB 10608 provides a means of connecting the magnetic sensor 10614, optical sensor 10615 and LED 10617 to an external computing device. A vertically extending manual actuator shaft 10602 includes a mechanically linked push-button switch 10610 mounted on an upper end thereof. Push-button switch 10610 is electrically connected to PCB 10608. Electrical leads (not illustrated) pass through a hollow bore (not illustrated) in the center of the manual actuator shaft 10602, and through a central opening 10604a in a flexible stepped dust boot 10604 and through a central opening 10607a in a cylindrical bonded annular magnet 10607. The lower end of the manual actuator shaft 10602 is embedded in a drilled bore 10605a in a spherical magnet 10605. The spherical magnet 10605 can be depressed into the central bore 10616a of an annular sleeve 10616 in alignment with the central plane of the bonded annular magnet 10607. A plurality of screws 10606 secures PCB 10608 to the annular sleeve 10616. The bottom periphery of the spherical magnet 10605 is located just above the magnetic sensor 10614. The net magnetic field of the spherical magnet 10605 and the annular magnet 10607 is measured by a magnetic sensor 10614. In addition, any rotation of the manual actuator shaft 10602 and the spherical magnet 10605 is measured by the optical detector 10615 enabling a higher-precision of measurement of user input including tilting, rotating or depressing the manual actuator shaft 10602. The push-button switch 10610 can be replaced with a mechanical locking mechanism that selectively holds the joystick in a deflected position.

In another form of the magnetic manual user interface device 10600, a pair of optical sensors (not illustrated) mounted ninety degrees to each other can replace the magnetic sensor 10614. Spherical and annular magnets would still be required to provide restorative force on the X, Y, and Z axes. Both the magnetic sensor or sensors and a plurality of optical sensors can be used to measure changes in the position of the spherical magnet 10605. The magnetic sensor can only measure the net magnetic field which can be translated into positional data of the spherical magnet 10605 through interface circuitry and/or interface software. The use of both sensor types reduces measurement hysteresis due to the clearance between the outer diameter of the spherical magnet 10605 and the inner diameter of the annular magnet 10607.

While we have described numerous embodiments of a magnetic manual user interface device, other embodiments and modifications of the present invention will occur to those skilled in the art in view of the teachings herein. For example detents and other mechanical interfaces between parts of the magnetic manual user interface devices could be designed to provide a "snap" sound or other audible feedback to the user indicating a transition between two switch states. This would supplement the tactile feedback of the restorative forces provided by the interaction between the concentrically arranged magnets as the manual actuator is moved. The spherical magnets need not be perfectly spherical. The term "substantially spherical" in reference to a magnet shall include round or nearly round, including semi-semi-spherical. Two-axis magnetic sensors could be used instead of three-axis magnetic sensors, with some sacrifice in performance. A plurality of single-axis Hall effect sensors and a digital signal processor could similarly be employed. Other types of magnetic sensing elements besides Hall effect devices could be used such as fluxgate, magnetoresistive, magnetoinductive, GMR and AMR sensing elements. Other configurations can be implemented in which the magnet whose tilt is measured is not directly connected to the manual actuator, but is indirectly or momentarily operatively coupled to the manual actuator. Therefore, the protection afforded the present invention should only be limited by the following claims, which include all such embodiments and modifications when viewed in conjunction with the above specification and accompanying drawings.

We claim:

1. A manual user interface device, comprising:
a manual actuator having an axis;
an annular magnet having a central bore;
a substantially spherical magnet that can be operatively coupled to the manual actuator, the spherical magnet being positioned in the bore of the annular magnet, the magnetic axes of the magnets being substantially co-axial, and the polarity of the magnets being oppositely oriented such that the interaction of their magnetic fields provides restoring forces that urge the spherical magnet so that its axis is aligned with a neutral axis; and
a three-axis magnetic sensor positioned to detect changes in a magnetic field due to movement of the spherical magnet and generate signals representative of the direction and amount of movement of the spherical magnet relative to the neutral axis.

2. The manual user interface device of claim 1 wherein the manual actuator is a pliant deformable cup-shaped member.

3. The manual user interface device of claim 2 wherein a central section of the cup-shaped member can be depressed and deformed to establish a frictional contact with an upper surface of the spherical magnet.

4. The manual user interface device of claim 3 and further comprising a ball-sleeve supporting the annular magnet.

5. The manual user interface device of claim 4 wherein the ball-sleeve is dome shaped and includes a neck around which the annular magnet is seated.

6. The manual user interface device of claim 3 and further comprising a mechanically activated switch beneath the spherical magnet which can be activated by depressing the central section of the cup-shaped member.

7. The manual user interface device of claim 6 wherein the switch is a dome-switch.

8. The manual user interface device of claim 6 and further comprising a low-friction barrier separating the spherical magnet and the two state switch.

9. The manual user interface device of claim 6 and further comprising a carrier float separating the magnetic sensor and the two state switch.

10. A manual user interface device, comprising:
an annular magnet;
a sleeve supporting the annular magnet;
a substantially spherical magnet positioned in a bore of the annular magnet, the magnetic axes of the magnets being substantially co-axial, and the polarity of the magnets being oppositely oriented such that the interaction of their magnetic fields provides restoring forces that urge the spherical magnet so that its axis is aligned with a neutral axis;
a manual actuator having an axis, the manual actuator including a pliant deformable cup-shaped member with a central section that can be deformed downwardly by manual engagement with a user's hand to establish a frictional contact with an upper surface of the spherical magnet, the central section being deformable laterally to allow the spherical magnet to be tilted by moving the central section away from the neutral axis;
a mechanically activated switch beneath the spherical magnet which can be activated by depressing the central section of the cup-shaped member; a low-friction barrier separating the spherical magnet and the switch; and
a three-axis magnetic sensor positioned to detect changes in a magnetic field in three-axes at a point in space resulting from movement of the spherical magnet and generate signals representative of the direction and amount of movement of the spherical magnet relative to the neutral axis.

11. The manual user interface device of claim 1 wherein the annular magnet has a rigid shape.

12. The manual user interface device of claim 10 wherein the annular magnet has a rigid shape.

13. The manual user interface device of claim 1, wherein the three-axis magnetic sensor is an integrated circuit sensor for sensing magnetic fields in three orthogonal axes at a point in space.

* * * * *